US009079999B2

(12) United States Patent
Advincula

(10) Patent No.: US 9,079,999 B2
(45) Date of Patent: Jul. 14, 2015

(54) METHODS FOR PREPARING POLYMER COATINGS BY ELECTROCHEMICAL GRAFTING OF POLYMER BRUSHES, COMPOSITIONS PREPARED THEREBY AND COMPOSITIONS FOR PREPARING THE COATINGS

(76) Inventor: Rigoberto Advincula, Friendswood, TX (US)

( * ) Notice: Subject to any disclaimer, the term of this patent is extended or adjusted under 35 U.S.C. 154(b) by 361 days.

(21) Appl. No.: 12/393,898

(22) Filed: Feb. 26, 2009

(65) Prior Publication Data

US 2009/0236229 A1 Sep. 24, 2009

Related U.S. Application Data

(60) Provisional application No. 61/031,641, filed on Feb. 26, 2008, provisional application No. 61/042,377, filed on Apr. 4, 2008, provisional application No. 61/042,381, filed on Apr. 4, 2008.

(51) Int. Cl.

| | |
|---|---|
| ***C25D 9/02*** | (2006.01) |
| ***C25D 11/00*** | (2006.01) |
| ***C25D 21/00*** | (2006.01) |
| ***C25B 3/00*** | (2006.01) |
| ***C08F 292/00*** | (2006.01) |
| ***C08F 2/38*** | (2006.01) |
| ***C08F 2/58*** | (2006.01) |
| ***C08F 4/00*** | (2006.01) |
| ***C08F 293/00*** | (2006.01) |
| ***C09D 5/44*** | (2006.01) |

(52) U.S. Cl.

CPC ................ *C08F 292/00* (2013.01); *C08F 2/38* (2013.01); *C08F 2/58* (2013.01); *C08F 4/00* (2013.01); *C08F 293/005* (2013.01); *C09D 5/4419* (2013.01); *C09D 5/4476* (2013.01); *C25D 9/02* (2013.01); *C08F 2438/03* (2013.01)

(58) Field of Classification Search

CPC ........................................................ C08F 2/58

USPC ........................................... 205/91, 414, 317

See application file for complete search history.

(56) References Cited

U.S. PATENT DOCUMENTS

| | | | | |
|---|---|---|---|---|
| 4,040,925 | A * | 8/1977 | McGinniss | 204/478 |
| 6,294,245 | B1 * | 9/2001 | Roitman et al. | 428/212 |
| 6,803,228 | B1 * | 10/2004 | Caillat et al. | 435/287.2 |

(Continued)

FOREIGN PATENT DOCUMENTS

WO WO 2007010536 A2 * 1/2007

OTHER PUBLICATIONS

Jones, D. M.; Brown, A. A.; Huck, W. T. S.: Surface-Initiated Polymerizations in Aqueous Media: Effect of Initiator Density. Langmuir, 2002, 18, 1265-1269.*

(Continued)

*Primary Examiner* — Nicholas A Smith
*Assistant Examiner* — Brian W Cohen
(74) *Attorney, Agent, or Firm* — Robert W. Strozier

(57) ABSTRACT

New methods for the grafting of complex polymer coatings onto conducting surfaces, new grafting compositions and new substrates with grafted coating of the grafting compositions are disclosed. The method offers a new and convenient approach for the preparation of polymer coatings by electrochemically grafting and reactive crosslinking, and/or graft polymerizing.

25 Claims, 82 Drawing Sheets

(56) References Cited

U.S. PATENT DOCUMENTS

| | | | | |
|---|---|---|---|---|
| 7,402,262 | B2 * | 7/2008 | Lellouche | 252/500 |
| 2009/0123514 | A1 * | 5/2009 | Domb | 424/423 |

OTHER PUBLICATIONS

Fulghum, T.; Karim, S. M. A.; Baba, A.; Taranekar, P.; Nakai, T.; Masuda, T.; Advincula, R. C.: Conjugated Poly(phenylacetylene) Films Cross-Linked with Electropolymerized Polycarbazole Precursors. Macromolecules, 2006, 39, 1467-1473.*

Waenkaew, P.; Taranekar, P.; Phanichphant, S.; Adnivcula, R. C.: Electro-Copolymerization of Layer-by-Layer Deposited Polythiophene and Polycarbazole Precursor Ultrathin Films. Macromolecular Rapid Communications, 2007, 28, 1522-1527.*

Gabriel, S.; Cecius, M.; Fleury-Frenette, K.; Cossement, D.; Hecq, M.; Ruth, N.; Jerome, R.; Jerome, C.: Synthesis of Adherent Hydrophilic Polypyrrole Coatings onto (Semi)conducting Surfaces. Chemistry of Materials, 2007, 19, 2364-2371.*

Deng, S.; Advincula, R.C.: Polymethacrylate Functionalized Polypyrrole Netwrok Films on Indium Tin Oxide: Electropolymerization of a Precursor Polymer and Comonomers. Chemistry of Materials, 2002, 4073-4080.*

Weiss, Z.; Mandler, D.; Shustak, G.; Domb, A. Pyrrole Derivatives for Electrochemical Coating of MEtallic Medical Devices. Journal of Polymer Science: Part A: Polymer Chemistry, vol. 42, 1658-1667 (2004).*

Taranekar, P. et al. "Quantitative Electrochemical and Electrochromic Behavior of Terthiophene and Carbazole Containing Conjugated Polymer Network Film Precursors: EC-QCM and EC-SPR" Langmuir, 2007, 23, p. 908-917.*

* cited by examiner

(V) (VI) (VII)
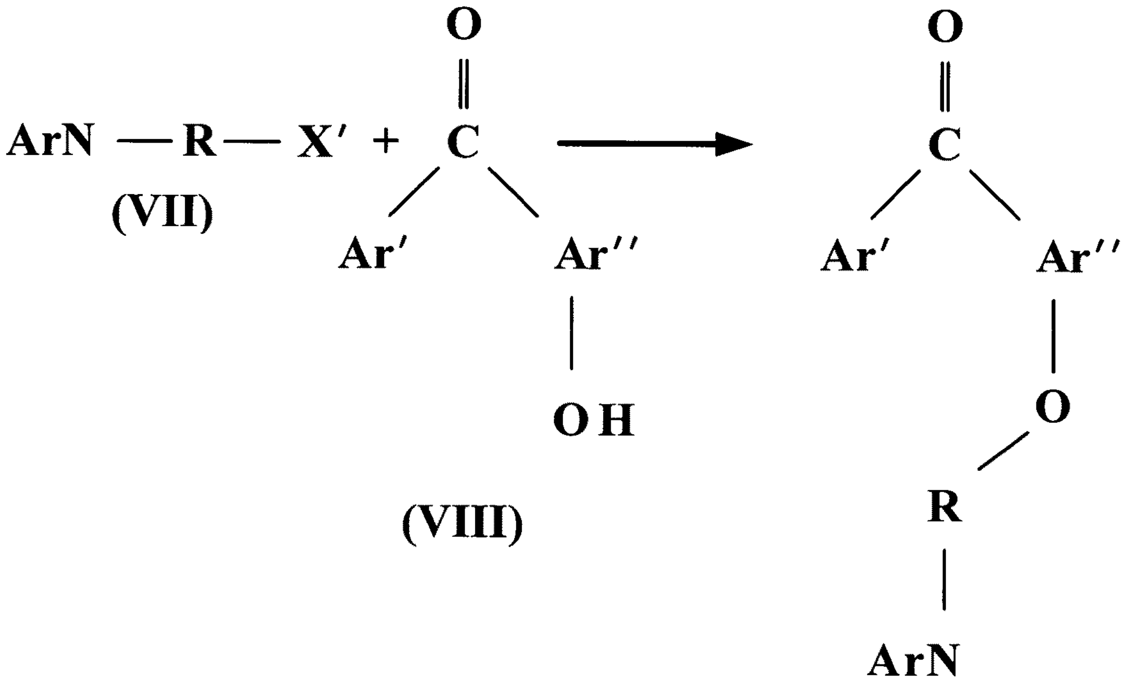
(VII)
(VIII)
(IX)
FIG. 1

Height: 14.7 nm 4-cyano-4-(phenylcarbonothioylthio) pentanoic acid

CTA1

CTA2

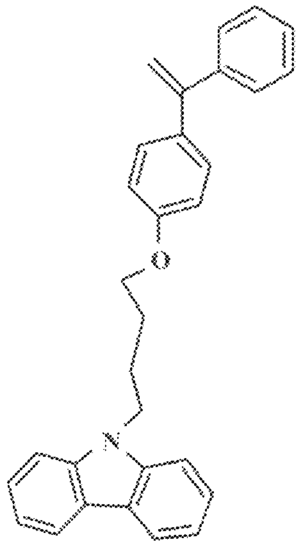

Carbazole-DPE
Can be activated for anioic polymerization

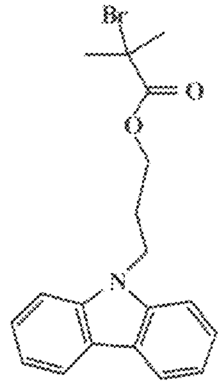

Carbazole-ATRP
Can be activated for LFRP polymerization

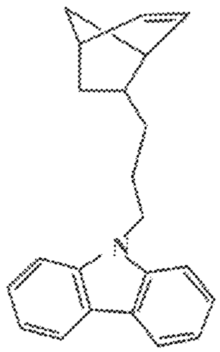

Carbazole-norbornene
Can be activated for metathesis polymerization

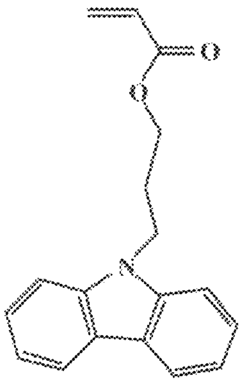

Carbazole-acrylate
Can be activated for anioic polymerization

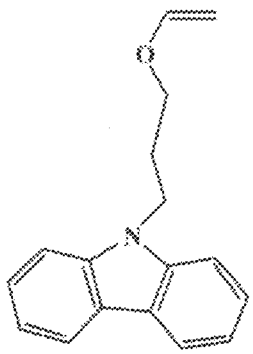

Carbazole-vinyl acetate
Can be activated for cationic polymerization

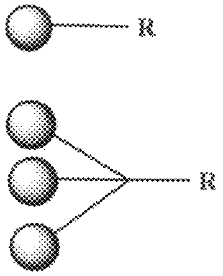

= electro-polymerizable group

R = tethered initiator

FIG. 22

$G_0$CBz-TEG

Bare ITO

10 µm $G_1$Cbz-PEG Electropolymerized on ITO substrate

10 µm $G_1$Cbz-TEG Electropolymerized on ITO substrate

CV of 10μM $G_0$Cbz-TEG on SH-Cbz Coated Au

CV of 10μM $G_2$Cbz-TEG on SH-Cbz Coated Au

| Substrates | | ΔF (hertz) | Δm (microgram) |
|---|---|---|---|
| Electropolymerized TEG-G$_1$ on SH-Cbz | ■ | -58.2489 | 1.264 |
| Electropolymerized TEF-G$_1$ on Bare Gold | ▦ | -58.4328 | 1.268 |
| Electropolymerized PEG-G$_1$ on SH-Cbz | ▦ | -61.4016 | 1.332 |
| TEG-SH | □ | -76.0510 | 1.650 |
| PEG-SH | ▥ | -122.964 | 2.668 |
| Bare Gold | ▨ | -130.273 | 2.827 |
| 1-Butane-SH | ▩ | -157.558 | 3.419 |
| 3-Mercapto-1-Propanesulfonic Acid SAM | ▨ | -563.390 | 12.225 |

Non-Specific Adsorption Proteins onto a Solid Surface

PEGylated Linear - Dendron Macromolecules

$G_0$CBztEG $G_1$CBztEG $G_2$CBztEG

Scheme 3A

Scheme 3B $G_1CbzCOOMe$ $G_1CbzOH$ $G_2CbzCOOMe$ $G_2CbzCOOH$ $G_1CbzCOOH$ $G_1CbzEG$

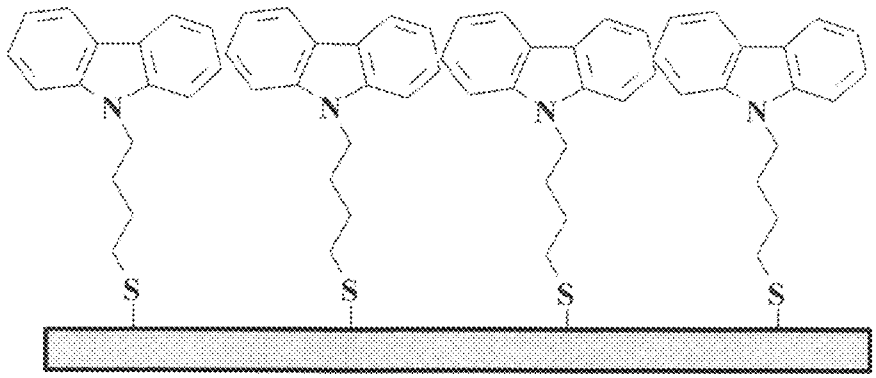
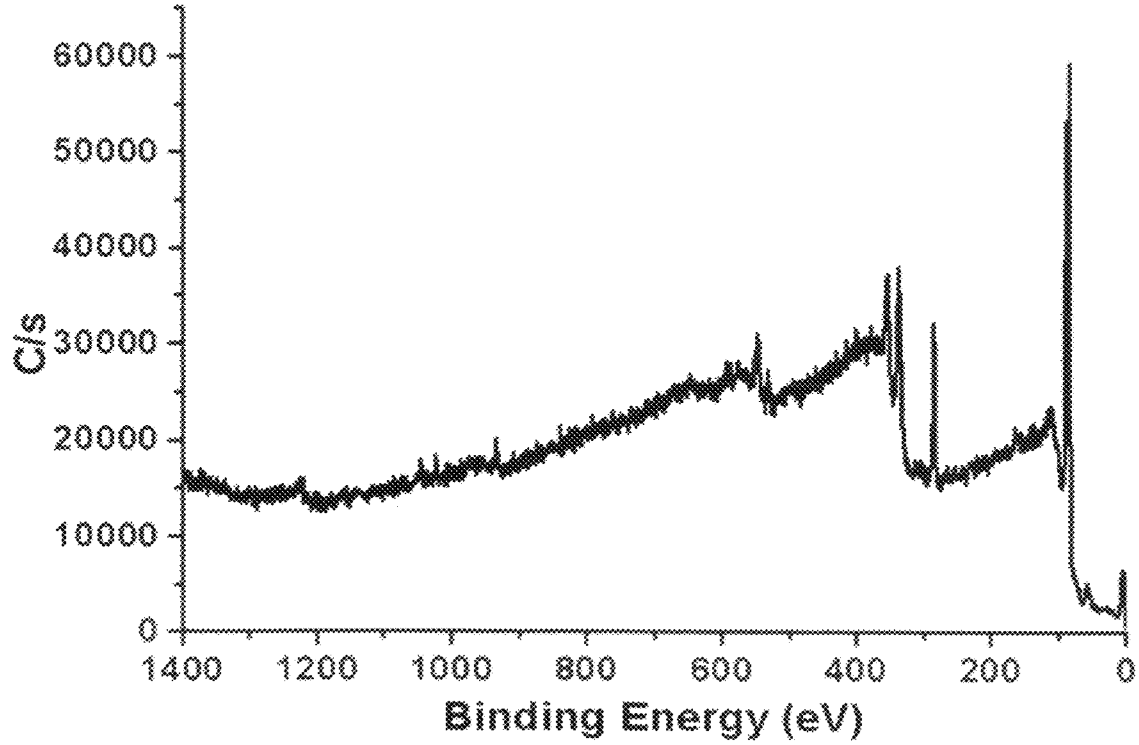
FIG. 41A

Comparison of Three Different Protein Absorption (Fb, Lysozyme, and BSA) onto Films from 1μM $G_0/G_1/G_2$CBzTEG

*Scheme 2*. Synthesis of PEG dendrons.

METHODS FOR PREPARING POLYMER COATINGS BY ELECTROCHEMICAL GRAFTING OF POLYMER BRUSHES, COMPOSITIONS PREPARED THEREBY AND COMPOSITIONS FOR PREPARING THE COATINGS

RELATED APPLICATIONS

The present invention claims the benefit and priority to U.S. Provisional Patent Application Ser. No. 61/031,641, filed Feb. 26, 2008, 61/042,377, filed Apr. 4, 2008 and 61/042,381, filed Apr. 4, 2008.

GOVERNMENTAL SPONSORSHIP

Not Applicable.

REFERENCE TO A SEQUENTIAL LISTING

Not Applicable.

BACKGROUND OF THE INVENTION

1. Field of the Invention

Embodiments of the present invention relate to new methods for grafting of complex polymer coatings onto or from a surface of a substrate including surfaces of conductive and non-conductive materials.

More specifically, embodiments of the present invention relate methods for grafting of complex polymer coatings onto or from a surface of a substrate including surfaces of conductive and non-conductive materials, where the methods involve a new and convenient approach for the preparation of polymer coatings by electrochemically grafting designed reactive initiators or monomers onto the surface that are capable of polymerizing monomers, macromonomers, or crosslinking to themselves, or reacting with preformed polymers or mixtures or combinations thereof.

2. Description of the Related Art

Surface modifications and thin film coatings can be formed by attaching polymers via covalent end-group, forming polymer structures on the surface such as so-called "polymer brushes" on surfaces. This process, unlike non-covalent attachment, enhances the stability and durability of the films against solvent and other displacing agents such as surfactants. One known method for making polymer brushes involves the chemisorption of pre-formed polymers containing for example a polysiloxane backbone with grafted side chains having different exposed functional anchoring groups. However, this methodology require extensive synthetic efforts for the preparation of the functionalized polymers prior to reacting them with a surface.

Another method for making polymer brushes includes covalently attaching polymers onto $SiO_2$ surfaces by ultra violet (UV) irradiation. For example, exposed benzophenone moieties on the outer layer can undergo photo induced cross-linking with other polymers. The benzophenone moiety is well known for its photo reactivity and its ability to attach to C—H bonds in a wide range of different chemical environments. However, most of such studies using this approach have been limited to the self-assembly of silanized benzophenone units, which can only be attached onto $SiO_2$ surfaces or other oxide surfaces, but not electrodeposited on metallic electrode surfaces.

Other molecules including polymers can be electro-deposited on a wide variety of electrode materials such as platinum, gold, glassy carbon, ITO-covered surfaces and carbon felt. A number of monomers have been electropolymerized by cathodic and anodic polymerization, giving both electrically insulating and conducting polymer coatings, respectively. Previous methods include the electropolymerization of monomers such as pyrrole and indole derivatives to graft benzophenone onto surfaces with the purpose of photochemically immobilizing enzymes. Most known conducting polymers are prepared by oxidative electropolymerization (anodic). Most known insulating polymers are prepared by reductive electropolymerization (cathodic).

Prior art teaches methods for preparing polymer thin film coatings onto a solid surface by physical adsorption or chemical adsorption techniques. Most common film coatings are prepared by physical adsorption, such as dip-coating, drop casting, spin-coating, doctor blade film application, or roll-to-roll coating. The limitations of physical adsorption are that solvent, temperature, or mechanical abrasion can easily detach these coatings from the solid-substrate surface.

An approach for the preparation of polymer thin film coatings is to use chemical adsorption by attaching polymers via the formation of covalent bonds through a chemical reaction. One known method for forming robust polymer coatings consists in reacting the end-group of a pre-formed polymer (such as a macromolecule) to form so-called "polymer brushes". This process, unlike non-covalent attachment, enhances the stability and durability of the films against solvent and other displacing agents such as surfactants. The reactive groups are chemically complementary to the surface to which the polymer is to be attached to. The types of chemistry involved for covalent attachment include acid-base chemistry, the attachment of thiols on noble metals, the attachment of silane on silica or hydroxyl surfaces, the reaction of an aldehyde with an amine, and other common organic reactions or metal-ligand chemistries. One known method for making polymer brushes involves the chemisorption of pre-formed polymers containing for example a polystyrene chain with an exposed functional reactive end-group such as a thiol group attached to a gold surface. An alternative is to use polymers with reactive side groups or hyperbranched macromolecules such as dendrimers having reactive peripheral groups on the surface. However, such process requires extensive synthetic efforts for the preparation of the functionalized polymers and is not readily applicable to conducting electrode substrates.

A favored method for preparing polymer thin film coatings is to directly electro-deposit polymers on a wide variety of electrode materials such as platinum, gold, glassy carbon, ITO-covered surfaces, and carbon felt. A number of monomers have been electropolymerized by cathodic and anodic polymerization, giving both electrically insulating and conducting coatings, respectively.

The study of the chemistry and biological applications of polymers such as polyethyleneglycol (PEG) is of immense interest both for fundamental and pharmaceutical applications. Traditionally, PEG has been used in biological research as precipitating agents for protein and other biological macromolecules and viruses, PEGylation of drugs for improving efficacy, and to facilitate biological cell fusion, a technique commonly used in cell hybridization technology. There is a growing interest for surface modification with PEG that offer new chemistries and application of surface analytical methods.

While numerous methods have been presented for preparing polymeric coating such as polymer brush coating on surfaces, many of these methods are restricted in use to certain type of surfaces. Thus, there is a need in the art for more robust methodologies and compositions for efficient coating of surfaces.

SUMMARY OF THE INVENTION

Embodiments of the present invention provides a method for preparing polymer coatings including electrochemically grafting a reactive initiator or monomer onto a surface of a substrate including an electrically conductive material or electrically non-conductive material. Once the reactive initiator or monomer or photo-reactive initiator or monomer is grafted onto the surface, the method includes activating the reactive initiator depending on the type of reactive initiator being activated. For example, if the reactive initiator is a photo-reactive initiator, then the activating is via UV irradiation or irradiating the initiator modified surface with UV radiation. Other initiators and initiator activation methods are possible. Other monomers and polymerization mechanisms from the surface are possible. The method can also include grafting an additional layer of polymer onto the surface. In certain embodiment the chemically reactive initiator includes an electro-polymerizable moiety and a reactive chemical group. In certain embodiments, the additional layer is grafted via crosslinking of the chemically reactive group with a spin coated polymer film or by surface initiation polymerization of monomers via chemical activation. In certain embodiments, the underlying electro-polymerized film is, by nature, a pi-conjugated and electrically conducting polymer, which can imbue electro-optical characteristics to the dual layered film. Such polymer coatings are particularly relevant for applications such as anti-corrosion, non bio-fouling, anti-reflection surfaces, electrochromic coatings, water resistant coatings, packaging, electrodes, sensors, medical devices, micro-electromechanical devices, and displays.

Embodiments of the present invention provides a polymer film including a first polymer layer formed from an electrochemically polymerizable photo-reactive initiator including an electro-polymerizable moiety and a photo-reactive chemical group and optionally a second polymer layer of polymer, where the initiator is capable of electrochemical attachment to a surface of a substrate and photo-induced polymerization and the second layer can be spin deposited or co-polymerized photo-chemically onto the first polymer layer.

Embodiments of the present invention provides a substrate including a polymer film, where the polymer film includes a first polymer layer formed from an electrochemically polymerizable photo-reactive initiator including an electro-polymerizable moiety and a photo-reactive chemical group and optionally a second polymer layer of polymer, where the initiator is capable of electrochemical attachment to a surface of a substrate and photo-induced polymerization and the second layer can be spin deposited or co-polymerized photo-chemically onto the first polymer layer.

Embodiment of the present invention relates generally to a new method for making polymer brushes and coatings on surfaces.

Embodiments of the present invention offers a new method of grafting polymer brushes by surface initiated polymerization (SIP) using electropolymerized electroactive monomer initiators (EMI). The EMI is designed to have an electroactive monomeric component for electropolymerization and deposition to a conducting substrate and another component to have initiation capabilities for chain-addition type polymerization. The use of the EMI initiator was first demonstrated on living free-radical addition polymerization via reversible addition fragmentation chain transfer (RAFT) but can be applied to any other initiator or polymerization mechanism that can be initially bound on a surface electrochemically including atom transfer radical polymerization (ATRP), free-radical polymerization, cationic polymerization, anionic polymerization, metathesis polymerization, group transfer polymerization, and ring-opening polymerization. Step polymerization can include amide, ester, urethane, urea, imides, imine, and metal mediated coupling reactions. Metal coordination polymerization can include organometallic, metallocene or metal catalysts. The EMI initiators can also be deposited using chemical oxidative techniques. Thus, other EMI initiators designed for free-radical, anionic, cationic, metathesis, coordination, and others can also be employed as long as the initiator is first electrochemically deposited to the surface. Electropolymerization results in a conducting or insulating polymer layer next to the solid electrode substrate. A polymer brush can then be polymerized from these initiators using monomers or macromonomers to form a functional polymer brush coating. Note that other combinations are possible based on copolymer and crosslinking with the electrodeposited EMI layer or other copolymers and post-polymerization chemistries with the polymer brushes. Note that electroactive macromonomers with one or two more electropolymerizable units on the chain can be grafted onto the electrode surface as a preformed polymer. Note that electroactive monomers or catalysts for step or condensation polymerization or coordination polymerization reactions are possible.

A method for preparing polymer coatings comprising the steps of (SEE CLAIMS).

Design and synthesis of electroactive monomer initiators (EMI) and other electroactive monomers or catalysts.

Electrodeposition and electropolymerization of the EMI to form a conducting or insulation polymer layer on the electrode.

Initiation, propagation, and termination of an addition polymerization using the electrodeposited EMI forming a polymer brush.

Other combinations are possible based on copolymer, branching, hyperbranching, and crosslinking with the electrodeposited EMI layer or other copolymers and post-polymerization chemistries with the polymer brushes.

Embodiments of the present invention provide a method for making polymer coatings including the steps of electrochemically grafting on a surface of a substrate at least one electrochemically graftable, reactive compound of the general formula (I):

$$(ECAG\text{-}R)_i\text{-}(RG)_j \qquad (I)$$

where ECAG is an electrochemically active group capable of electrochemically reacting with a surface of a substrate, RG is a reactive group capable of undergoing a chemical or photochemical reaction, R is carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", $NR"_2$, SR", $PR"_2$, or mixtures thereof and R" are alkyl, aryl, alkaryl or aralkyl groups having between 1-20 carbon atoms and where i and j are integers each independently having a value between about 1 and about 1000. The method also include the step of activating the RG groups. Once activated, the RG groups can cross-link and/or can be used to initiate the polymerization of an added monomer. The method can include the step crosslinking the RG groups to form a crosslinked film on the surface of the substrate or grafting an additional polymer layer onto the surface of the substrate through the activated RG groups or crosslinking and grafting. In certain embodiments, the ECAG group is an electrochemically active aryl compound. In other embodiments, the electrochemically active aryl compound is selected from the group of nitrogen containing unsaturated ring compounds, sulfur containing unsaturated ring compounds, nitrogen and sulfur containing unsaturated ring compounds, and mixtures thereof. In other embodiments, the unsaturated ring compounds are aromatic ring compounds. In other embodiments, RG is a photo-reactive group and the activating step is irradiation by electromagnetic radiation. In other embodiments, the method can also include the step of prior to the electrochemically grafting step, treating the surface with an alpha thiol, omega ECAG' compound to form a self-assembly monolayer on the surface of the substrate, where the ECAG group electrochemically react with the ECAG' group and where the ECAG group and the ECAG group can be the same or different. In certain embodiments, the values of i and j are between about 1 and about 100. In certain embodiments, the values of i and j are between about 1 and about 75. In other embodiments, the values of i and j are between about 1 and about 50. In other embodiments, the values of i and j are between about 1 and about 40. In other embodiments, the values of i and j are between about 1 and about 30. In other embodiments, the values of i and j are between about 1 and about 20. In other embodiments, the values of i and j are between about 1 and about 10.

Embodiments of the present invention provide a method for making polymer coatings including the steps of electrochemically grafting on a surface of a substrate at least one electrochemically graftable, reactive compound of:

the general formula (II):

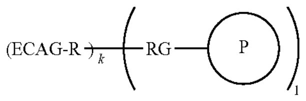

where ECAG is an electrochemically active group capable of electrochemically reacting with a surface of a substrate, RG is a reactive group capable of undergoing a chemical or photochemical reaction, R is a carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms and Ⓟ is a pre-formed oligomeric or polymeric moiety or group having between about 10 and about 100,000 repeat units and where k and l are integers each independently having a value between about 1 and about 100; and/or the general formula (III):

$$(ECAG)_n\text{-}(MM)_m$$

where ECAG is an electrochemically active group capable of electrochemically reacting with a surface of a substrate, MM is macromolecule comprising a pre-formed oligomer or polymer with a reactive group or groups capable of reacting with the ECAG groups to from different molecular structures, where n and m are integers each independently having a value between about 1 and about 100. The method can also include the steps of activating the RG groups, and crosslinking the RG groups to form a crosslinked film on the surface of the substrate, or grafting an additional polymer layer onto the surface of the substrate through the activated RG groups or to both crosslinking and grafting. The method can include the step crosslinking the RG groups to form a crosslinked film on the surface of the substrate or grafting an additional polymer layer onto the surface of the substrate through the activated RG groups or crosslinking and grafting. In certain embodiments, the ECAG group is an electrochemically active aryl compound. In other embodiments, the electrochemically active aryl compound is selected from the group of nitrogen containing unsaturated ring compounds, sulfur containing unsaturated ring compounds, nitrogen and sulfur containing unsaturated ring compounds, and mixtures thereof. In other embodiments, the unsaturated ring compounds are aromatic ring compounds. In other embodiments, RG is a photo-reactive group and the activating step is irradiation by electromagnetic radiation. In other embodiments, the method can also include the step of prior to the electrochemically grafting step, treating the surface with an alpha thiol, omega ECAG' compound to form a self-assembly monolayer on the surface of the substrate, where the ECAG group electrochemically react with the ECAG' group and where the ECAG group and the ECAG group can be the same or different. The term repeat unit means the number of monomer units that link together to form Ⓟ.

Embodiments of the present invention provide a composition including a substrate including a coatings formed on a surface thereof where the coating comprising an electrochemically grafted composition comprising at least one compound of:

the general formula (I):

$$(ECAG\text{-}R)_i\text{-}(RG)_j \quad (I)$$

where ECAG is an electrochemically active group capable of electrochemically reacting with a surface of a substrate, RG is a reactive group capable of undergoing a chemical or photochemical reaction, R is carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms and where i and j are integers each independently having a value between about 1 and about 1000;

the general formula (II):

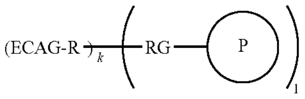

where ECAG is an electrochemically active group capable of electrochemically reacting with a surface of a substrate, RG is a reactive group capable of undergoing a chemical or photochemical reaction, R is a carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms and Ⓟ is a pre-formed oligomeric or polymeric moiety or group having between about 10 and about 100,000 repeat units and where k and l are integers each independently having a value between about 1 and about 1000; and/or the general formula (III):

$(ECAG)_n$-$(MM)_m$ where ECAG is an electrochemically active group capable of electrochemically reacting with a surface of a substrate, MM is macromolecule comprising a pre-formed oligomer or polymer with a reactive group or groups capable of reacting with the ECAG groups to from different molecular structures, where n and m are integers each independently having a value between about 1 and about 1000. The composition can include crosslinked RG group in the film on the surface of the substrate or grafting of an additional polymer layer onto the surface of the substrate through the activated RG groups or crosslinking and grafting. In certain embodiments, the ECAG group is an electrochemically active aryl compound. In other embodiments, the electrochemically active aryl compound is selected from the group of nitrogen containing unsaturated ring compounds, sulfur containing unsaturated ring compounds, nitrogen and sulfur containing unsaturated ring compounds, and mixtures thereof. In other embodiments, the unsaturated ring compounds are aromatic ring compounds. In other embodiments, RG is a photo-reactive group and the activating step is irradiation by electromagnetic radiation. In other embodiments, the method can also include the step of prior to the electrochemically grafting step, treating the surface with an alpha thiol, omega ECAG' compound to form a self-assembly monolayer on the surface of the substrate, where the ECAG group electrochemically react with the ECAG' group and where the ECAG group and the ECAG group can be the same or different. In certain embodiments, the values of k and l are between about 1 and about 100. In certain embodiments, the values of k and l are between about 1 and about 75. In other embodiments, the values of k and l are between about 1 and about 50. In other embodiments, the values of k and l are between about 1 and about 40. In other embodiments, the values of k and l are between about 1 and about 30. In other embodiments, the values of k and l are between about 1 and about 20. In other embodiments, the values of k and l are between about 1 and about 10. In certain embodiments, Ⓟ is a pre-formed oligomeric or polymeric moiety or group having between about 10 and about 10,000. In certain embodiments, the values of m and n are between about 1 and about 100. In certain embodiments, the values of m and n are between about 1 and about 75. In other embodiments, the values of m and n are between about 1 and about 50. In other embodiments, the values of m and n are between about 1 and about 40. In other embodiments, the values of m and n are between about 1 and about 30. In other embodiments, the values of m and n are between about 1 and about 20. In other embodiments, the values of m and n are between about 1 and about 10.

Embodiments of the present invention provide an electrochemically graftable, reactive composition comprising at least one compound of the general formula (I):

$(ECAG\text{-}R)_i$-$(RG)_j$ (I)

where ECAG is an electrochemically active group capable of electrochemically reacting with a surface of a substrate, RG is a reactive group capable of undergoing a chemical or photochemical reaction, R is carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", $NR''_2$, SR", $PR''_2$, or mixtures thereof and R" are alkyl, aryl, alkaryl or aralkyl groups having between 1-20 carbon atoms and where i and j are integers each independently having a value between about 1 and about 1000. In certain embodiments, the values of i and j are between about 1 and about 100. In certain embodiments, the values of i and j are between about 1 and about 75. In other embodiments, the values of i and j are between about 1 and about 50. In other embodiments, the values of i and j are between about 1 and about 40. In other embodiments, the values of i and j are between about 1 and about 30. In other embodiments, the values of i and j are between about 1 and about 20. In other embodiments, the values of i and j are between about 1 and about 10.

Embodiments of the present invention provide an electrochemically graftable compositions comprising at least one compound of the general formula (II):

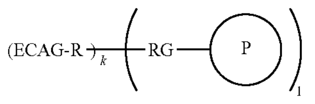

where ECAG is an electrochemically active group capable of electrochemically reacting with a surface of a substrate, RG is a reactive group capable of undergoing a chemical or photochemical reaction, R is a carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", $NR''_2$, SR", $PR''_2$, or mixtures thereof and R" are alkyl, aryl, alkaryl or aralkyl groups having between 1-20 carbon atoms and Ⓟ is a pre-formed oligomeric or polymeric moiety or group having between about 10 and about 100,000 repeat units and where k and l are integers each independently having a value between about 1 and about 1000. In certain embodiments, the values of k and l are between about 1 and about 100. In certain embodiments, the values of k and l are between about 1 and about 75. In other embodiments, the values of k and l are between about 1 and about 50. In other embodiments, the values of k and l are between about 1 and about 40. In other embodiments, the values of k and l are between about 1 and about 30. In other embodiments, the values of k and l are between about 1 and about 20. In other embodiments, the values of k and l are between about 1 and about 10. In certain embodiments, Ⓟ is a pre-formed oligomeric or polymeric moiety or group having between about 10 and about 10,000.

Embodiments of the present invention provide n electrochemically graftable composition comprising at least one compound of the general formula (III):

$(ECAG)_n$-$(MM)_m$ where ECAG is an electrochemically active group capable of electrochemically reacting with a surface of a substrate, MM is macromolecule comprising a pre-formed oligomer or polymer with a reactive group or groups capable of reacting with the ECAG groups to from different molecular structures, where n and m are integers each independently having a value between about 1 and about 1000. In certain embodiments, the values of m and n are between about 1 and about 100. In certain embodiments, the values of m and n are between about 1 and about 75. In other embodiments, the values of m and n are between about 1 and about 50. In other embodiments, the values of m and n are between about 1 and about 40. In other embodiments, the values of m and n are between about 1 and about 30. In other embodiments, the values of m and n are between about 1 and about 20. In other embodiments, the values of m and n are between about 1 and about 10.

BRIEF DESCRIPTION OF THE DRAWINGS

The invention can be better understood with reference to the following detailed description together with the appended illustrative drawings in which like elements are numbered the same:

FIG. 1 depicts a generalized embodiment of a method for preparing a photo-reactive initiator of this invention.

FIGS. 20A-C shows ultraviolet-visible spectrum of (A) PCTA1a and PCTA1b, (B) PCTA2a, and (C) PCTA3a.

FIG. 22 shows the chemical structures of the compositions and a diagram of their structural features.

FIGS. 41A-C depict XPS data for the CbzSH SAM. (A) Survey and high resolution scan in the (B) N 1s and (C) S 2p regions.

DETAILED DESCRIPTION OF THE INVENTION

Figure 2:
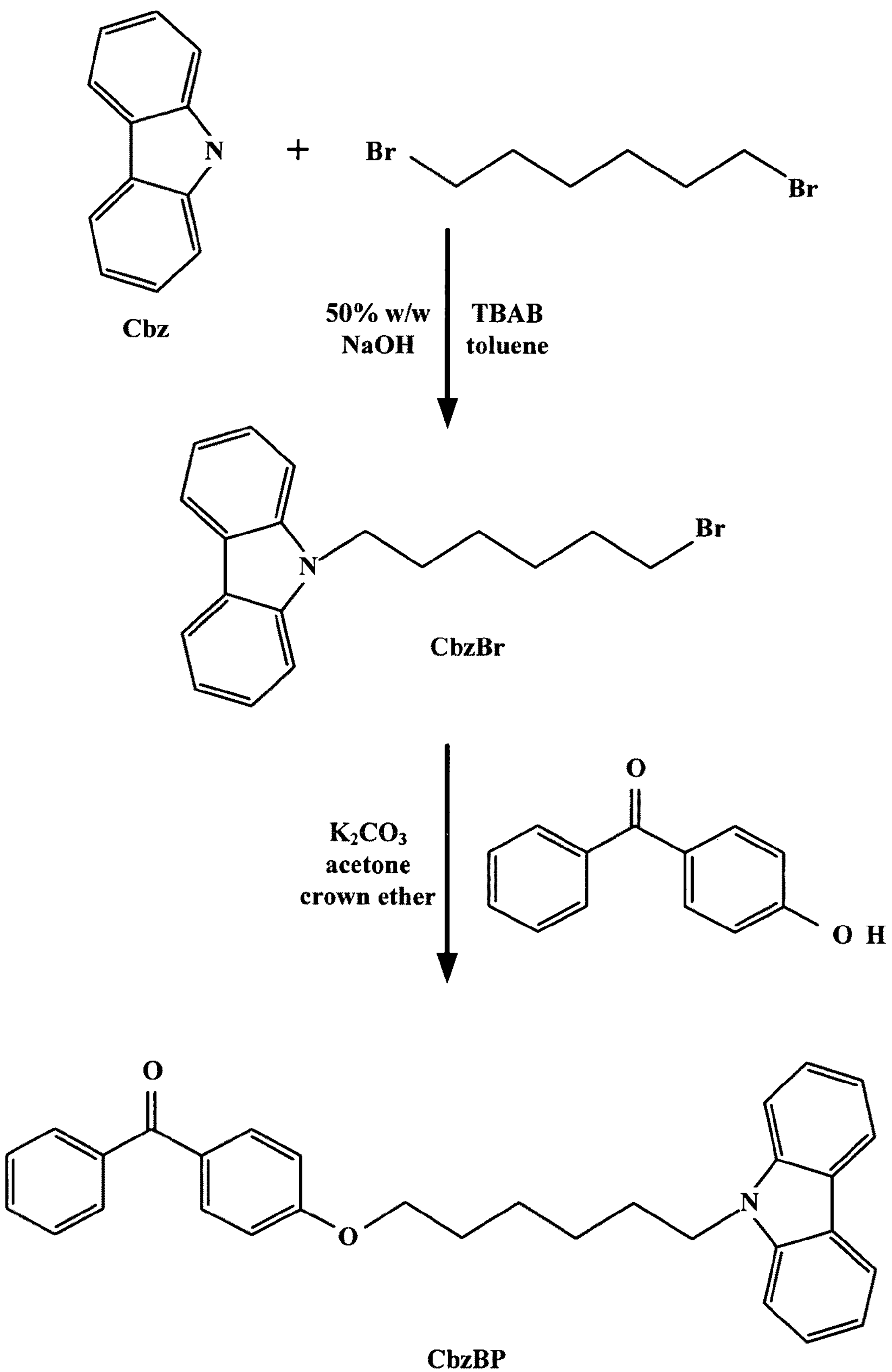
FIG. 2 depicts an embodiment of a synthetic scheme for preparing a (4-(6-(9H-carbazol-9-yl)hexyloxy)benzophenone (or CzBP) electrochemically polymerizable photo-reactive initiator of this invention.

The inventor have developed a new class of electrochemically graftable, photo-polymerizable initiators, which are ideally suited for forming polymer brushes on surface of substrates. The initiators include distinct functional groups or moieties: a electrochemically graftable group or moiety and a photo-polymerizable group or moiety. The inventors have illustrated this new class electrochemically graftable, photo-polymerizable initiators of present invention through the synthesis, characterization, and electrochemical grafting of a benzophenone-tethered carbazole monomer, (4-(6-(9H-carbazol-9-yl)hexyloxy)benzophenone (CzBP). The inventors also demonstrated that CzBP can be used for the subsequent grafting of polymers either from photoinitiated surface polymerization of monomers or photo-crosslinking of pre-formed polymers on a CzBP treated substrate surface. The inventors have also found that this approach can be used to electropolymerize other types of electroactive monomers tethered to a photo-initiator, as well as to co-electropolymerize two or more electroactive monomers to form conjugated and electrically conducting polymer films—prior to the photoreaction and grafting. The inventors have found that various types of pre-formed polymers or monomers for the photoactivated surface initiated polymerization reaction can be used.

Embodiment of the present invention broadly relate to a method for preparing thin coatings or film on substrate surfaces. The basic methodology includes three process steps: 1) electrochemical grafting a photo-reactive initiator onto electrically conducting surfaces such as, but not limited to, gold, silver, stainless steel, indium tin oxide, titania, and/or doped silicon surfaces, 2) irradiating or photo-activating the grafted initiator via UV irradiation, and 3) growing an additional layer comprising either crosslinking a preformed polymer onto the initiator layer to make polymer brushes or photo-polymerizing a monomer onto initiator layer to form a second polymer layer.

Embodiments of the present invention broadly relate to electrochemically graftable, reactive composition of the general formula (I):

$$(ECAG\text{-}R)_i\text{-}(RG)_j \qquad (I)$$

where ECAG is an electrochemically active group capable of electrochemically reacting with a surface of a substrate, RG is a reactive group capable of undergoing a chemical or photochemical reaction, R is carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms. It should be recognized that a surface of a substrate can be modified with one or a plurality of compositions of formula (I) and where i and j are integers each independently having a value between about 1 and about 10.

Embodiments of the present invention broadly relate to electrochemically graftable compositions of the general formula (II):

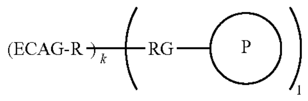

where ECAG is an electrochemically active group capable of electrochemically reacting with a surface of a substrate, RG is a reactive group capable of undergoing a chemical or photochemical reaction, R is a carbenzyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms and Ⓟ is a pre-formed oligomeric or polymeric moiety or group and where k and l are integers each independently having a value between about 1 and about 10. It should be recognized that a surface of a substrate can be modified with one or a plurality of compositions of formula (II). It should also be recognized that a surface of a substrate can be modified with one or a plurality of compositions of formula (I) and one or a plurality of compositions of formula (II).

Embodiments of the present invention broadly relate to electrochemically graftable compositions of the general formula (III):

$$(ECAG)_n\text{-}(MM)_m$$

where ECAG is an electrochemically active group capable of electrochemically reacting with a surface of a substrate, MM is macromolecule comprising a pre-formed oligomer or polymer with a reactive group or groups capable of reacting with the ECAG groups to from different molecular structures, where n and m are integers each independently having a value between about 1 and about 10. Exemplary examples of such structures are found FIG. 35.

Suitable Reagents for Use in the Invention

Suitable polymers for use in the construction of the initiators and/or films of this invention include, without limitation, elastomers, fibers, thermoplastic, thermoplastic elastomers, thermosetting polymers, ionomers, polyelectrolytes, amphiphiles and mixtures or combinations thereof. Exemplary examples of polymers that can be grated include, without limitation, polyacetals, polyacrylics, polycarbonates polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxane, polyolefins, fluoropolymers, liquid crystalline polymers, ionomers, or combinations comprising at least one of the foregoing polymers and wherein the copolymers are in the from of random copolymers, graft copolymers, block copolymers, star block copolymers, dendrimers, or mixtures or combinations comprising at least one of the foregoing copolymers.

Suitable conducting and pi-conjugated polymers derived from their corresponding electro-active monomers for use in the construction of the initiators and/or films of this invention include, without limitation, poly(aniline), substituted poly (aniline), poly(pyrrole), poly(thiophene), poly(acetylene), poly(ethylene dioxythiophene), a poly(p-phenylene vinylene), poly(3,4-ethylenedioxythiophene), poly(3,4-ethylenedithiathiophene), poly(isathianaphthene), poly(pyridothiophene), poly(pyrizinothiophene), poly(3,4-ethylenedioxypyrrole), poly(phenylenevinylene), poly(p-phenylene), poly(thionapthene), poly(benxofuran), poly(indole), poly (dibenzothiophene), poly(dibenxofuran), poly(carbazole), poly(bithiophene), poly(bifuran), poly(bipyrrole), poly (thienothiophene), poly(thienofuran), poly(thienopyrrole), poly(furanylpyrrole), poly(furanylfuran), poly(pyrolylpyrrole), poly(terthiophene), poly(terfuran), poly(terpyrrole), poly(dithienothiophene), poly(difuranylthiophene), poly (dipyrrolylthiophene), poly(dithienofuran), poly(dipyrrolylfuran), poly(dipyrrolylpyrrole), poly(phenyl acetylene), poly (biindole), poly(dithienovinylene), poly(difuranylvinylene), poly(dipyrrolylvinylene), poly(1,2-trans(3,4-ethylenedioxythienyl)vinylene), poly(1,2-trans(3,4-ethylenedioxyfuranyl)vinylene), poly(1,2-trans(3,4-ethylenedioxypyrrolyl)vinylene), poly(bis-thienylarylenes) and poly(bis-pyrrolylarylenes), poly(bis(3,4-ethylenedioxythienyl) arylenes, poly(dithienylcyclopentenone), poly(quinoline), poly(thiazole), poly(fluorene) poly(azulene), poly(2-substituted thieno[3,4-b]thiophenes), poly(6-substituted thieno[3, 4-b]thiophenes) or mixtures or combinations comprising at least one of the foregoing intrinsically conductive polymers.

Suitable substrates for deposition and grafting of the initiators of this invention to form coated substrates of this invention include, without limitation, non-metallic inorganic materials, metallic inorganic materials, other specific polymer materials, and mixtures or combinations thereof.

Exemplary examples of non-metallic inorganic materials include, without limitation, materials containing one or more of the following: metal oxides, including aluminum oxides and transition metal oxides (e.g., oxides of titanium, zirconium, hafnium, tantalum, molybdenum, tungsten, rhenium, and indium); silicon; silicon-based ceramics, such as those containing silicon nitrides, silicon carbides and silicon oxides (sometimes referred to as glass ceramics); calcium phosphate ceramics (e.g., hydroxyapatite); carbon; and carbon-based, ceramic-like materials such as carbon nitrides, and mixtures or combinations thereof.

Exemplary examples of metallic inorganic materials include, without limitation, metals (e.g., biostable metals such as gold, platinum, palladium, indium, osmium, rhodium, titanium, tantalum, tungsten, and ruthenium, and bioresorbable metals such as magnesium) and metal alloys, including metal alloys comprising iron and chromium (e.g., stainless steels, including platinum-enriched radiopaque stainless steel), alloys comprising nickel and titanium (e.g. Nitinol), alloys comprising cobalt and chromium, including alloys that comprise cobalt, chromium and iron (e.g., elgiloy alloys), alloys comprising nickel, cobalt and chromium (e.g., 3VIP 35N), alloys comprising cobalt, chromium, tungsten and nickel (e.g., L605), and alloys comprising nickel and chromium (e.g., inconel alloys) and mixtures or combinations thereof.

Exemplary examples of other specific polymer materials include, without limitation, polycarboxylic acid polymers and copolymers including polyacrylic acids; acetal polymers and copolymers; acrylate and methacrylate polymers and copolymers (e.g. n-butyl methacrylate); cellulosic polymers and copolymers, including cellulose acetates, cellulose nitrates, cellulose propionates, cellulose acetate butyrates, cellophanes, rayons, rayon triacetates, and cellulose ethers such as carboxymethyl celluloses and hydroxyalkyl celluloses; polyoxymethylene polymers and copolymers; polyimide polymers and copolymers such as polyether block imides and polyether block amides, polyamidimides, polyesterimides, and polyetherimides; polysulfone polymers and copolylers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones (cross-linked and otherwise); polymers and copolymers of vinyl monomers including polyvinyl alcohols, polyvinyl halides such as polyvinyl chlorides, ethylene-vinyl acetate copolymers (EVA), polyvinylidene chlorides, polyvinyl ethers such as polyvinyl methyl ethers, polystyrenes, styrene-maleic anhydride copolymers, vinyl-aromaticalkylene copolymers, including styrene-butadiene copolymers, styrene-ethylene-butylene copolymers (e.g., a polystyrene-polyethylene/butylene-polystyrene (SEBS) copolymer, available as Kraton® G series polymers), styrene-isoprene copolymers (e.g., polystyrene-polyisoprene-polystyrene), acrylonitrile-styrene copolymers, acrylonitrile-butadiene-styrene copolymers, styrene-butadiene copolymers and styrene-isobutylene copolymers (e.g., polyisobutylene-polystyrene and polystyrene-polyisobutylene-polystyrene block copolymers such as those disclosed in U.S. Pat. No. 6,545,097 to Pinchuk), polyvinyl ketones, polyvinylcarbazoles, and polyvinyl esters such as polyvinyl acetates; polybenzimidazoles; ethylene-methacrylic acid copolymers and ethylene-acrylic acid copolymers, where some of the acid groups can be neutralized with either zinc or sodium ions (commonly known as ionomers); polyalkyl oxide polymers and copolymers including polyethylene oxides (PEO); polyesters including polyethylene terephthalates and aliphatic polyesters such as polymers and copolymers of lactide (which includes lactic acid as well as d-, l- and meso lactide), epsilon-caprolactone, glycolide (including glycolic acid), hydroxybutyrate, hydroxyvalerate, para-dioxanone, trimethylene carbonate (and its alkyl derivatives), 1,4-dioxepan-2-one, 1,5-dioxepan-2-one, and 6,6-dimethyl-1,4-dioxan-2-one (a copolymer of poly(lactic acid) and poly(caprolactone) is one specific example); polyether polymers and copolymers including polyarylethers such as polyphenylene ethers, polyether ketones, polyether ether ketones; polyphenylene sulfides; polyisocyanates; polyolefin polymers and copolymers, including polyalkylenes such as polypropylenes, polyethylenes (low and high density, low and high molecular weight), polybutylenes (such as polybut-1-ene and polyisobutylene), polyolefin elastomers (e.g., santoprene), ethylene propylene diene monomer (EPDM) rubbers, poly-4-methyl-pen-1-enes, ethylene-alpha-olefin copolymers, ethylene-methyl methacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; thermoplastic polyurethanes (TPU); elastomers such as elastomeric polyurethanes and polyurethane copolymers (including block and random copolymers that are polyether based, polyester based, polycarbonate based, aliphatic based, aromatic based and mixtures thereof, examples of commercially available polyurethane copolymers include Bionate®, Carbothane®, Tecoflex®, Tecothane®, Tecophilic®, Tecoplast®, Pellethane®, Chronothane® and Chronoflex®); p-xylylene polymers; polyiminocarbonates; copoly(ether-esters) such as polyethylene oxide-polylactic acid copolymers; polyphosphazines; polyalkylene oxalates; polyoxaamides and polyoxaesters (including those containing amines and/or amido groups); polyorthoesters; biopolymers, such as polypeptides, proteins, polysaccharides and fatty acids (and esters thereof), including fibrin, fibrinogen, collagen, elastin, chitosan, gelatin, starch, glycosaminoglycans such as hyaluronic acid; as well as further copolymers and blends of the above, and mixtures or combinations thereof.

Suitable electrochemically active groups ECAG or ECAG' include, without limitation, any electrochemically active aryl compound including nitrogen containing unsaturated ring compounds, sulfur containing unsaturated ring compounds, nitrogen and sulfur containing unsaturated ring compounds, and mixtures thereof. In certain embodiments, the unsaturated ring compounds are aromatic ring compounds. Exemplary examples include, without limitation, carbazole, thiophene, fluorene, pyrrole, indole, isoindole, benzothiophene, quinoline, aniline, thiazole, benzothiazole, pyridine, isoquinoline, acridine, thiophene oligomers including 2 to 6 thiophene units, amino naphthylenes, other fused aromatics, other amino substituted aromatics, and mixtures or combinations thereof.

Section I

The electrochemically graftable, photo-polymerizable initiators of this invention are comprised of two key chemical entities: an electrochemically graftable moiety or group and a photo-polymerization moiety or group. The electrochemically graftable moiety or group anchors the initiator a substrate such as a metal surface through an electrochemical process, while the photo-polymerizable moiety or group polymerizes when irradiated or exposed to electromagnetic radiation. Such a design is suitable for either anodic electropolymerization using groups such as, but not limited to, acrylate, methacrylate, vinyl, olefins, and styrene, or for cathodic electropolymerization using groups such as, but not limited to, carbazole, thiophene, fluorene, pyrrole, and/or aniline.

The electrochemically graftable, photo-polymerizable initiators of this invention are a compound or a plurality of compounds of the general formula (V):

$$ArN—R—Ar'' \qquad (IV)$$

where ArN is a nitrogen containing aryl group, where the nitrogen atom is reactively available for chemical modification, Ar' is an arenyl linking group, Ar" is a photo reactive aryl group, R and R' are carbyl linking groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", $NR''_2$, SR", $PR''_2$, or mixtures thereof and R" are alkyl, aryl, alkaryl or aralkyl groups having between 1-20 carbon atoms.

Referring now to FIG. 1, an embodiment of a generalized synthetic scheme for preparing the electrochemically graftable, photo-polymerizable initiators of this invention is illustrated. The synthesis includes a first step where an aryl compound including an amino group either attached to the aryl group or occupying an reactively accessible ring position of the aryl group of general formula (V) is reacted with an alpha, omega dihalo-alkane of general formula (VI), where the halogen atoms can be the same or different. The reaction is carried out using an aqueous base, an organic solvent and a phase transfer catalyst. The first step reaction produces an N-(omega halo-alkyl)aryl compound of the general formula (VII). The N-(omega halo-alkyl)aryl compound (VII) is then reacted with a hydroxyaryl, aryl ketone of the general formula (VIII). The reaction is carried out using a weak base, a different organic solvent and a different phase transfer catalyst. The second step reaction produces an N-(alkyl-hydroxyaryl, aryl)aryl compound of the general formula (IX). The compound (IX) comprises electrochemically graftable, photo-polymerizable initiators of this invention including an electrochemically graftable moiety or group derived from the compound of formula (V), which can be electrochemically attached or anchored to a substrate surface and a photo-polymerizable moiety or group derived from the compound of formula (VIII) linked together by a tethering group derived from the compound of formula (VI). The photo-reactive initiator is attached onto a substrate via an electrochemical reaction, a process referred to herein as electropolymerization grafting. The electropolymerization grafting can be tailored by varying the concentration of the initiator, reaction conditions, electrolytes, solvents, and rate of electropolymerization. It should be recognized that there are many methods of electropolymerization: cyclic voltammetry, potentiostatic, chronoamperometric, pulsed voltammetry, and combined electrochemical conducting or current sensing microscopy methods. Note that it is possible to electrodeposit or electropolymerize these molecules by oxidative chemical methods using oxidants such as $FeCl_3$ and others. The attached initiator is then activated or irradiated with electromagnetic radiation such as UV radiation to undergo direct cross-linking, cross-linking to a preformed polymer or photo-induced polymerization of a monomer on the treated substrate surface.

Referring now FIG. 2, an embodiment of the preparation of a specific initiator of the general formula (IX) is illustrated. The figure illustrates the synthesis of a benzophenone-tethered carbazole monomer, (4-(6-(9H-carbazol-9-yl)hexyloxy) benzophenone (or CzBP). The first step in the synthesis involves the formation of the intermediary compound, bromohexylcarbazole, a compound of the general formula (VII). Carbazole is reacted with 1,6-dibromobutane in the presence of tertabutylammonium bromide in 100 mL toluene and a prepared solution of NaOH to form bromohexylcarbazole as shown in the first arrow. The second step in the synthesis involves the formation of (4-(6-(9H-carbazol-9-yl)hexyloxy) benzophenone (CzBP), a compound of the general formula (V). Bromohexylcarbazole is reaction with 4-hydroxybenzophenone in the presence of potassium carbonate, 18-crown-6 ether and acetone to product CzBP.

EXPERIMENTS OF SECTION I

Example 1

This examples illustrates the preparation of bromohexylcarbazole, a compound of the general formula (VII).

Carbazole (20.6 g, 0.124 mol), 1,6-dibromobutane (267 g, 1.10 mol), tertabutylammonium bromide (2.00 g, 0.00621 mol), 100 mL toluene and a prepared solution of 140 g of NaOH in 140 mL of water were mixed in a 1000-mL round bottom flask equipped with stirrer and condenser. The solution was stirred and heated at 45° C. for three hours and then stirred at room temperature overnight. The resulting solution was transferred into a separatory funnel and the bottom layer drained. The organic layer was washed with distilled water three times and once with brine solution. The solution was dried over anhydrous sodium sulfate and the solvent removed through a rotavap. The resulting mixture was then vacuum distilled to remove the excess alkyl bromide. The residue was dissolved in small amount of dichloromethane and added drop wise to 200 mL stirred ethanol. The resulting precipitate was vacuum filtered and washed with ethanol. The compound had an $^1$H NMR spectra in ($CDCl_3$) showing the following δ (ppm) values: 8.07 (d, 2H); 7.21-7.44 (m, 6H); 4.29 (t, 2H), 3.40 (t, 2H), 1.74-1.90 (m, 4H); 1.51-1.34 (m, 4H).

Example 2

This examples illustrates the preparation of (4-(6-(9H-carbazol-9-yl)hexyloxy)benzophenone (CbzBP), a compound of the general formula (IX).

Bromohexylcarbazole (1 g, 3.03 mmol), 4-hydroxybenzophenone (0.601 g, 3.03 mmol), potassium carbonate (0.527 g, 3.79 mmol), 18-crown-6 ether (0.200 g, 0.758 mmol) and 40 mL of acetone are mixed in a 100-mL round bottom flask with a stir bar. The reaction mixture is refluxed overnight. The mixture is then poured into 40 mL of water and extracted with ether three times. The resulting mixture is dried over anhydrous sodium sulfate and the solvent is removed in vacuo. The crude mixture is subjected to column chromatography via isocratic elution using 50% dichloromethane/hexanes as eluent. After purification, the white flaky crystals are recovered with a yield of 70.03% and an $R_f$ value of 0.41 (50% dichloromethane/hexanes). The compound had an $^1$H NMR spectra in ($CDCl_3$) showing the following δ (ppm) values: 8.10 (d, 2H); 7.89 (d, 2H); 7.83 (d, 2H); 7.66-7.49 (m, 7H); 7.31 (d, 2H); 6.07 (d, 2H); 4.43 (t, 2H); 4.07 (t, 2H); 2.02 (m, 2H); 1.87 (m, 2H), 1.59-1.53 (m, 4H). Elemental Analysis: 83.09%; C, 6.67%; H, 3.22%; N, and 7.02%; O.

Example 3

This examples illustrates the electrochemical grafting of the benzophenone-tethered carbazole monomer, (4-(6-(9H-carbazol-9-yl)hexyloxy)benzophenone (CbzBP) onto conducting surfaces.

Figure 3:
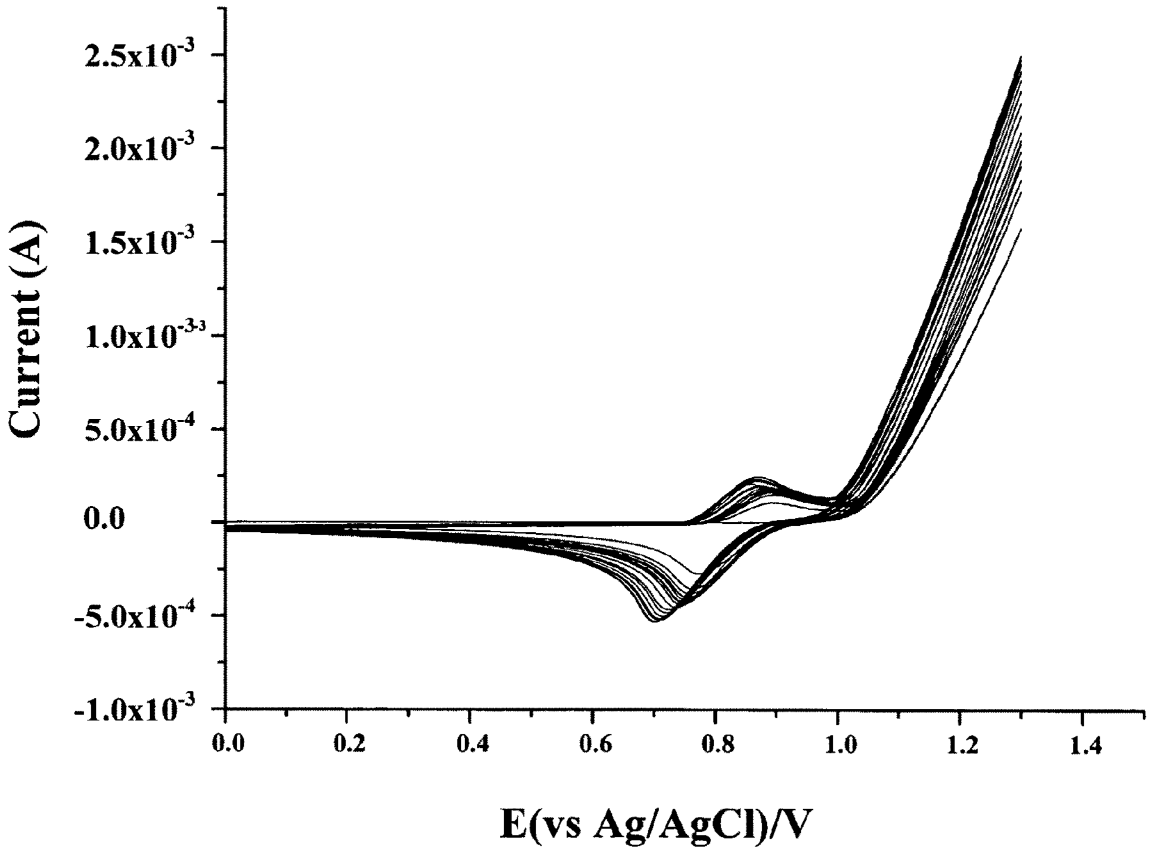
FIG. 3 depicts a representative cyclic voltammogram during the electrodeposition of (4-(6-(9H-carbazol-9-yl)hexyloxy)benzophenone.
Figure 4:
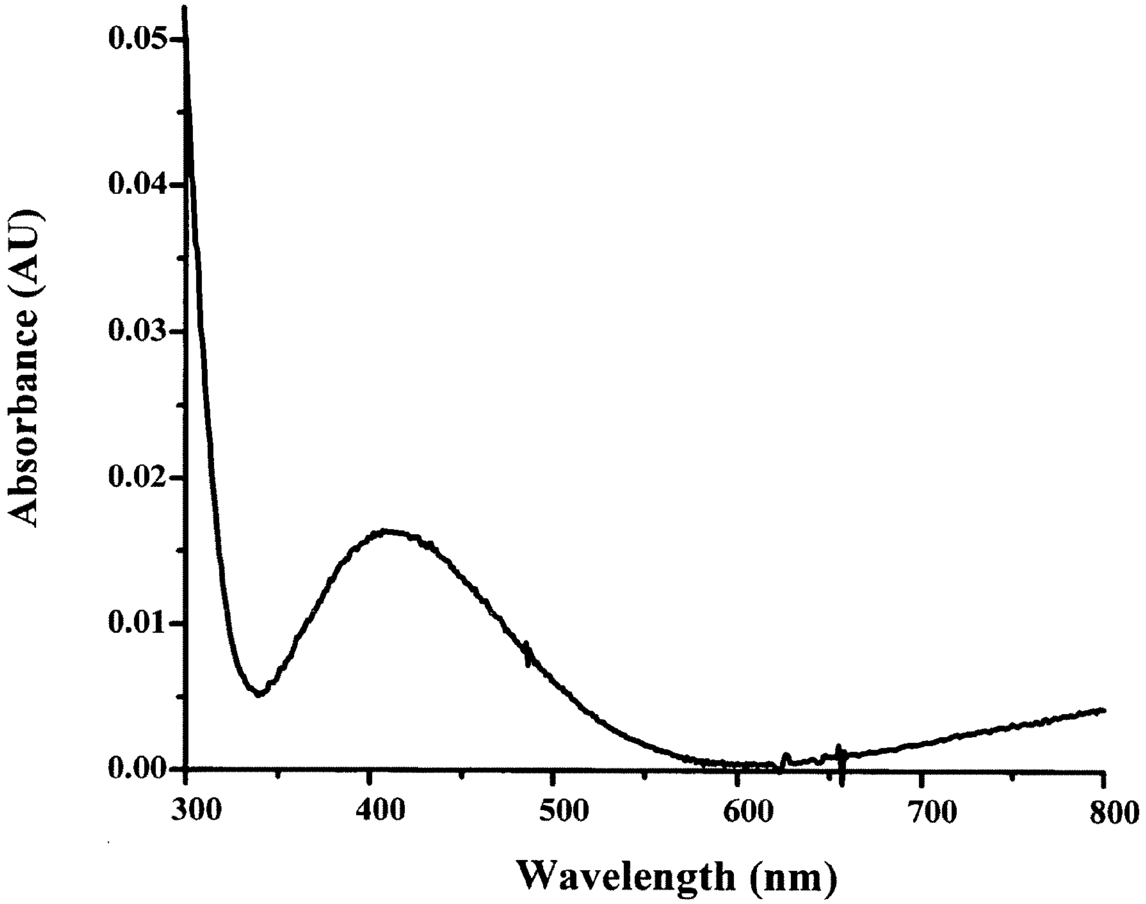
FIG. 4 depicts a UV-visible spectra of (4-(6-(9H-carbazol-9-yl)hexyloxy)benzophenone on ITO substrate.
Figure 5A:
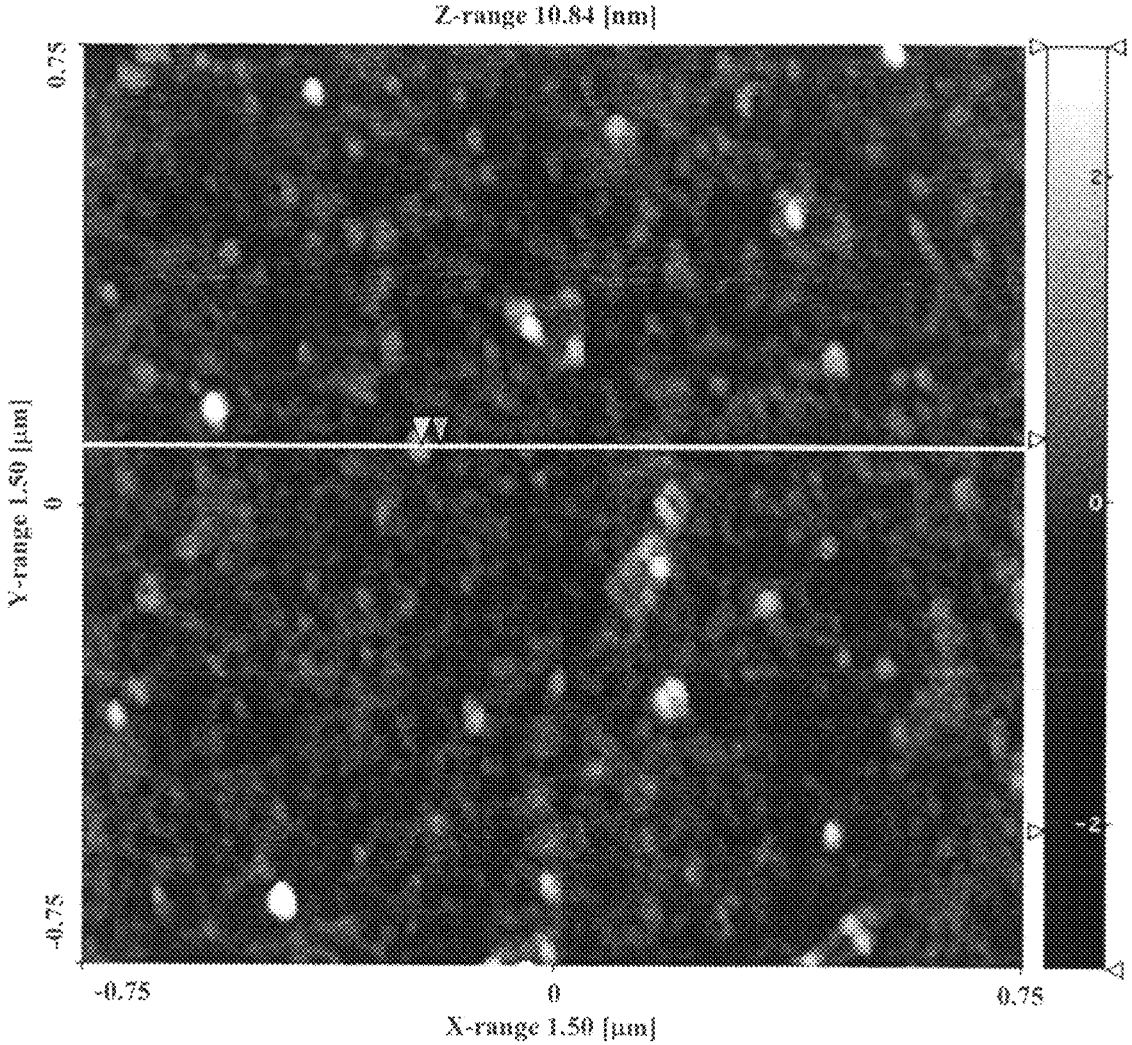
FIGS. 5A&B depicts the morphology of (4-(6-(9H-carbazol-9-yl)hexyloxy)benzophenone on ITO substrate observed by atomic force microscopy and a profilometry of the same, respectively.
Figure 5B:
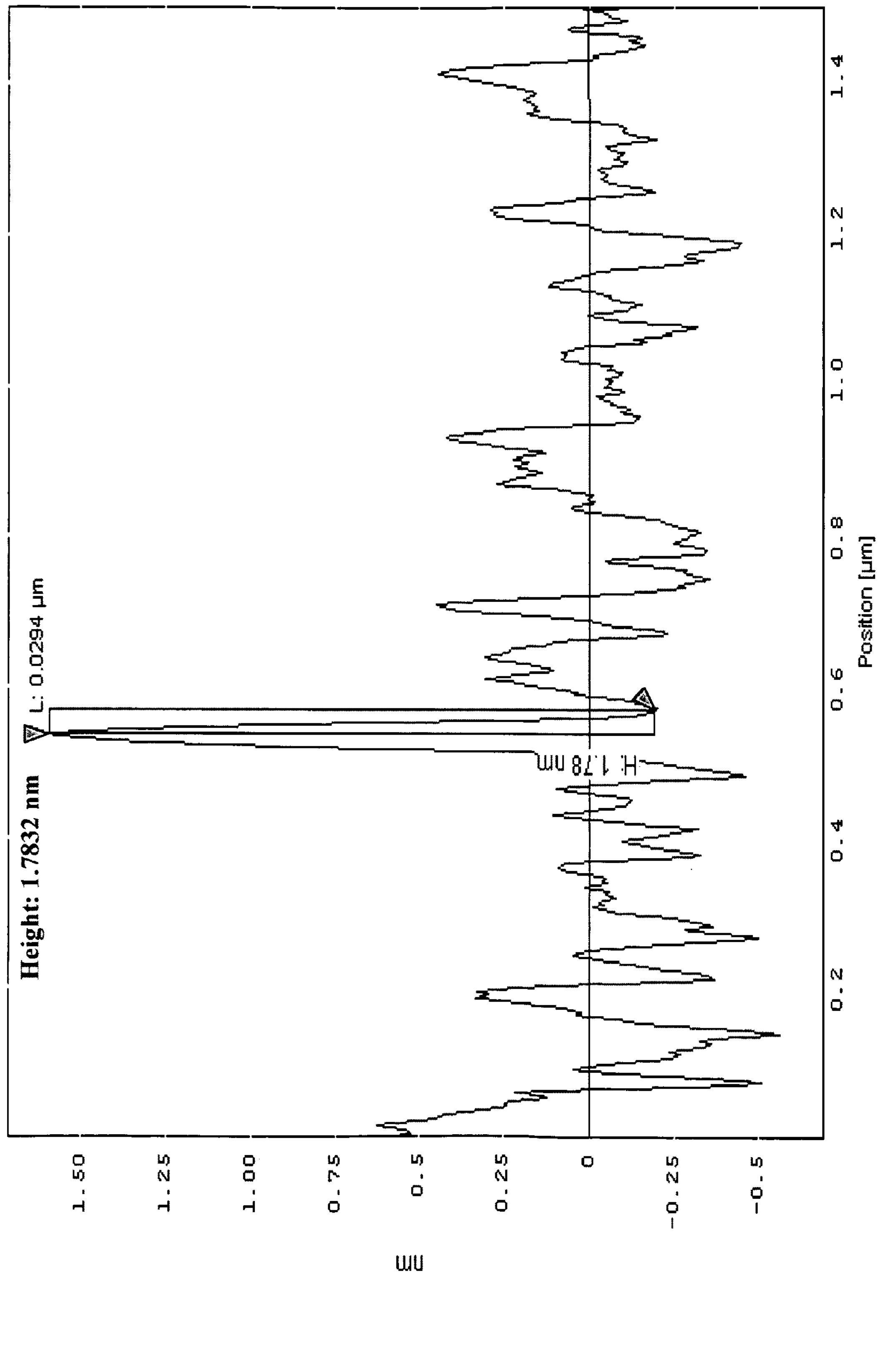

The electropolymerization of CbzBP was initially performed on indium titanium oxide (ITO) substrates by cyclic voltammetry. The electrodeposition was best performed at a scan rate of 50 mV/s, from 0 to 1.3V. The supporting electrolyte was 0.1M tetrabutylammonium hexafluorophosphate in acetonitrile. A representative cyclic voltammogram is shown in FIG. 3. For all the cyclic voltammetry scans, the first anodic scan show no peak, which indicated that the material is initially in its oxidized form. During the first cathodic scan, a reduction peak was observed at around 0.8 V. The subsequent cycles showed peaks at around 0.9 V, which was due to the oxidation of polycarbazole. The repeated cycles exhibited an increasing current peak which was attributed to the electropolymerization of the material onto the conducting surface. As the number of scans increased, the surface of the working electrode got coated with a dark green film while the solution became green, which was indicative of the formation of dimer, trimer, and so forth. The deposition of the (4-(6-(9H-carbazol-9-yl)hexyloxy)benzophenone on ITO surfaces was verified by UV-visible analysis as shown in FIG. 4. The peak at around 400 μm signified the formation of cross-linked carbazole units on the surface. This peak was red shifted compared to the carbazole monomer (300 nm). FIG. 5A showed the morphology profile obtained by atomic force microscopy (AFM). At 10 mM, the height of the material based on profilometry measurements was around 1.8 μm, which was consistent with the calculated height of a stretched structure of the monomer, which was about 2.4 nm as shown in FIG. 5B. Ellipsometric measurements confirmed the deposition of the material, where the height ranges from 0.64 nm to 1.89 nm for different trials, which was attributed to the changes in the orientation of the deposited material. The contact angle measurements are tabulated in Table 1.

TABLE 1

Contact Angle Measurements of Substation Before and After CbzPB Treatment

| Substrate | Contact Angle (°θ) Bare Substrate | After CbzPB Treatment |
|---|---|---|
| ITO | 7.32 | 39.75 |
| Gold | 48.82 | 74.1 |

The observed increase in the contact angle value from the bare substrates to the deposited films was consistent with the deposition of a more hydrophobic material onto the surface. Such an approach can be used for the electropolymerization of other types of electroactive monomers, as well as the co-electropolymerization of two or more electroactive monomers to form conjugated and electrically conducting or insulating polymer films—prior to photoreaction and grafting. Most known conducting polymers are prepared by oxidative electropolymerization (anodic). Most known insulating polymers are prepared by reductive electropolymerization (cathodic).

Example 4

This examples illustrates the subsequent UV irradiation of the coated (4-(6-(9H-carbazol-9-yl)hexyloxy)benzophenone.

UV irradiation of the coated (4-(6-(9H-carbazol-9-yl)hexyloxy)benzophenone was performed using an Oriel Hg—Xe lamp with a typical power of 50 mW/cm$^2$. As a result of the UV irradiation process, the benzophenone group, located on the outer layer of the electrodeposited coating, was converted into C—O radicals that are able to react with any C—H bonds within their vicinity, resulting in the formation of an alcohol C—O—H bond and a C—C bond. Such a process lead to the formation of an activated (4-(6-(9H-carbazol-9-yl)hexyloxy)benzophenone film. The subsequent UV irradiation of the coated (4-(6-(9H-carbazol-9-yl)hexyloxy)benzophenone.

Example 5

This examples illustrates the subsequent use of the activated (4-(6-(9H-carbazol-9-yl)hexyloxy)benzophenone film as a photocrosslinker to attach a preformed polymer to the substrate surface.

Figure 6:
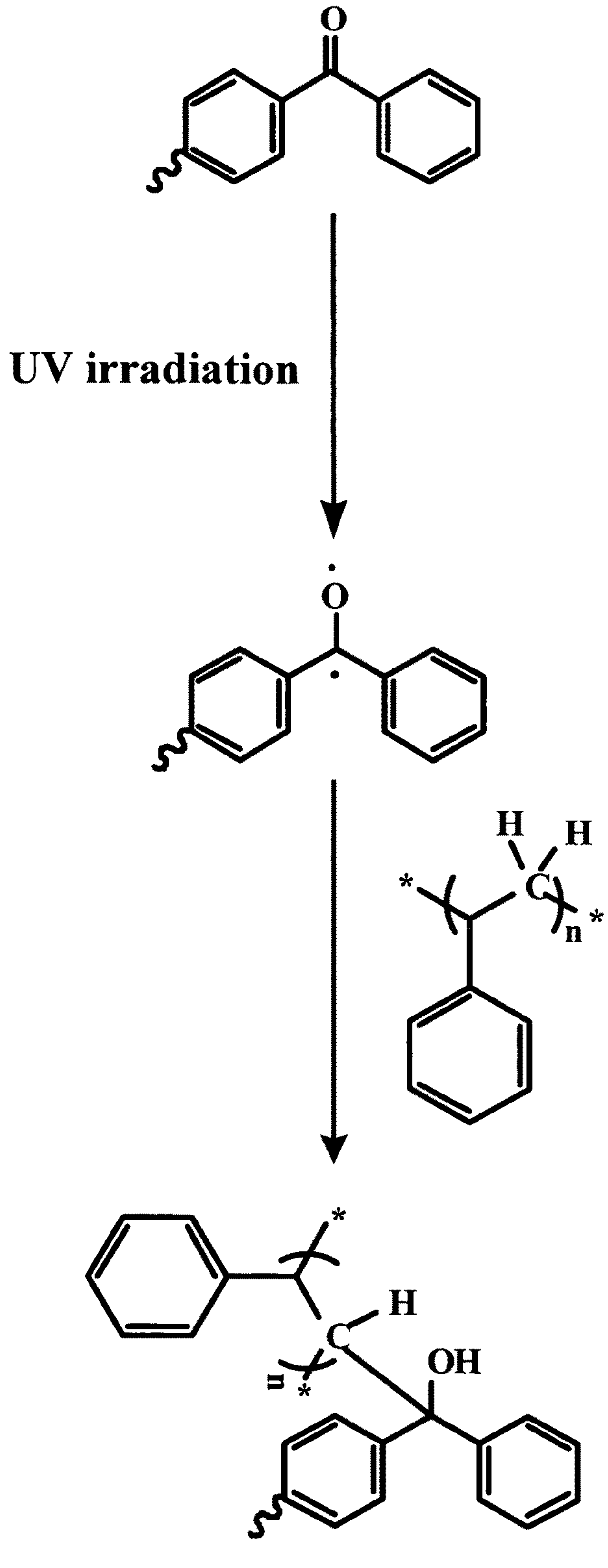
FIG. 6 depicts the reaction scheme for the photoactivation of benzophenone and subsequent photo-crosslinking with polystyrene.
Figure 7A:
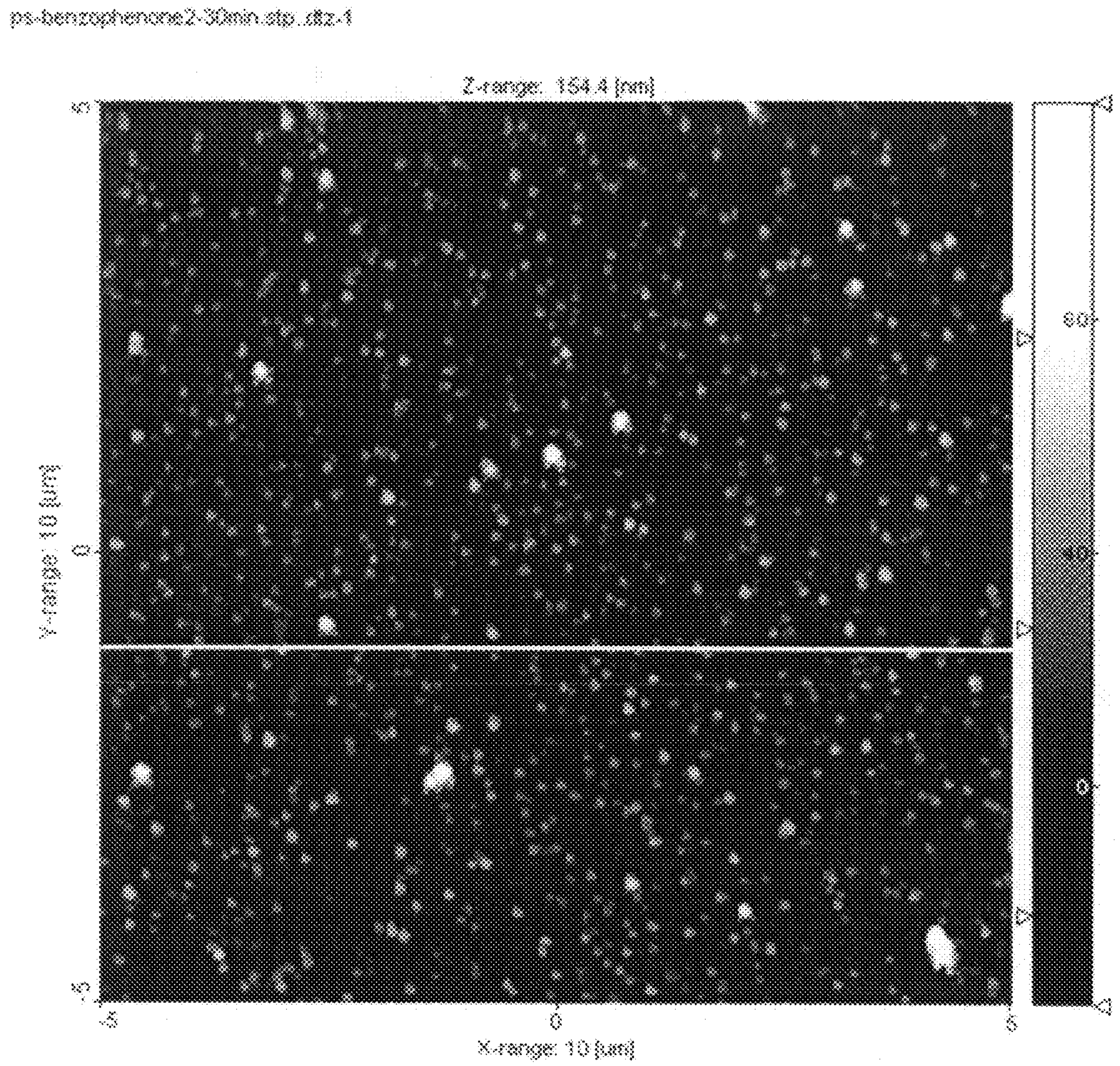
FIGS. 7A&B depict an AFM image and a profilometry of a coating composed of polystyrene crosslinked to an electrochemically grafted film of (4-(6-(9H-carbazol-9-yl)hexyloxy)benzophenone on a gold substrate, respectively.
Figure 7B:
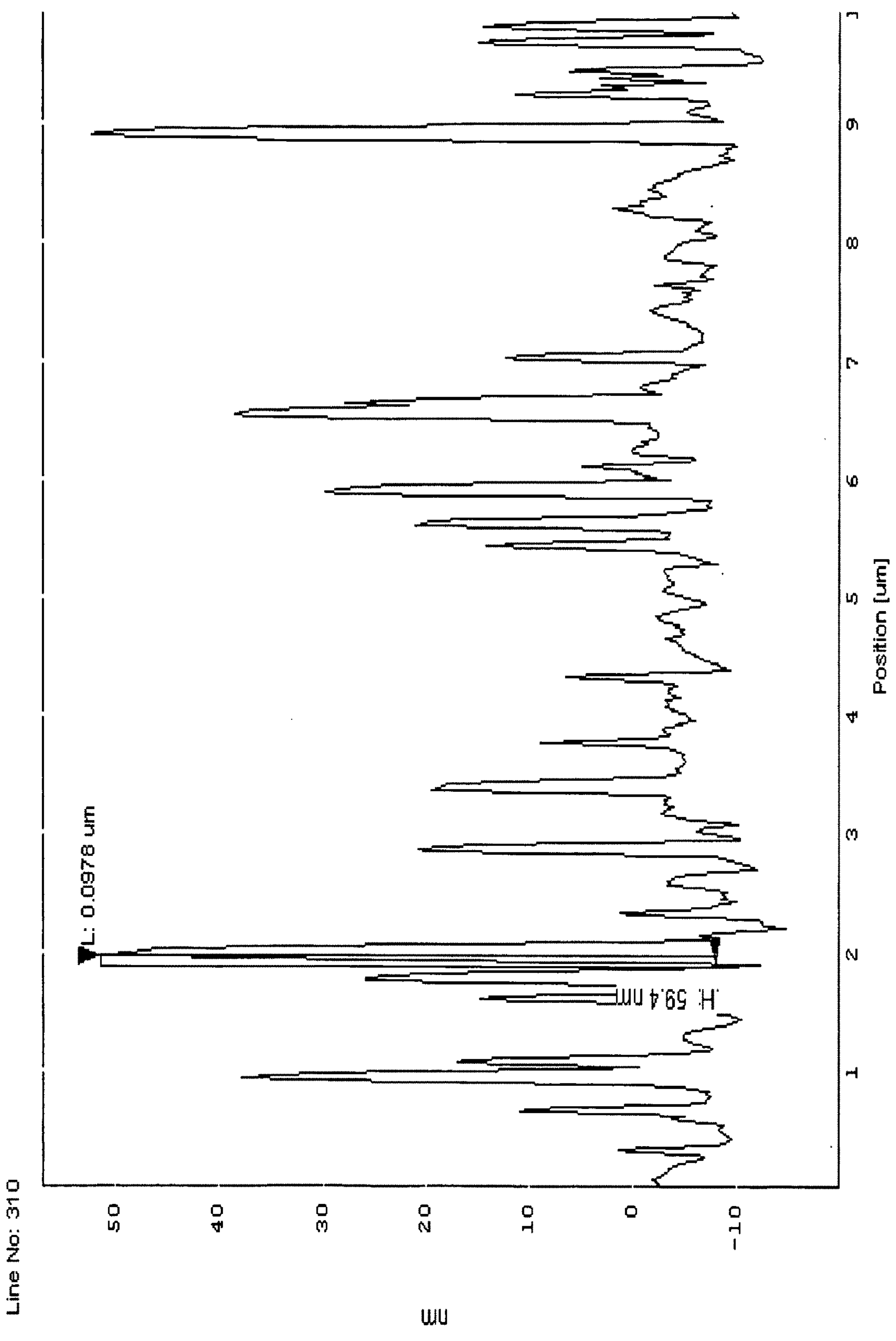

The activated (4-(6-(9H-carbazol-9-yl)hexyloxy)benzophenone film was used as a photocrosslinker to attach polysterene to the substrate surface. Photocrosslinking experiments were performed as follows. A solution of 10 mg/mL of polystyrene in toluene was spin-coated on the activated (4-(6-(9H-carbazol-9-yl)hexyloxy)benzophenone film. The polystyrene film was deposited at a speed of 2,000 rpm for one minute. The resulting coating was then irradiated for 30 minutes at 2 cm above the surface with a 50-W UV lamp source. It was then washed and sonicated in toluene. As a result of the UV irradiation process, the activated benzophenone groups, located on the outer layer of the electro-deposited coating, were converted into C—O radicals. The C—O radicals were able to react with any C—H bond of the polystyrene within their local vicinity resulting in the formation of an alcohol C—O—H bond and a C—C bond between the activated benzophenone and the polystyrene as illustrated in FIG. 6. The AFM image of the resulting coating is shown FIG. 7A. The AFM profilometry measurements showed that the height of the resulting coating is 59.4 nm as shown in FIG. 7B. Ellipsometry measurements showed a change in thickness from 1.89 nm to 23.25 nm. The difference in height between these two measurements was attributed to the lack of homogeneity of the film, suggesting the formation of aggregates.

Example 6

This examples illustrates the subsequent use of the activated (4-(6-(9H-carbazol-9-yl)hexyloxy)benzophenone film for the subsequent polymerization of a monomer into a polymer by photoactivated surface initiated polymerization.

Figure 8:
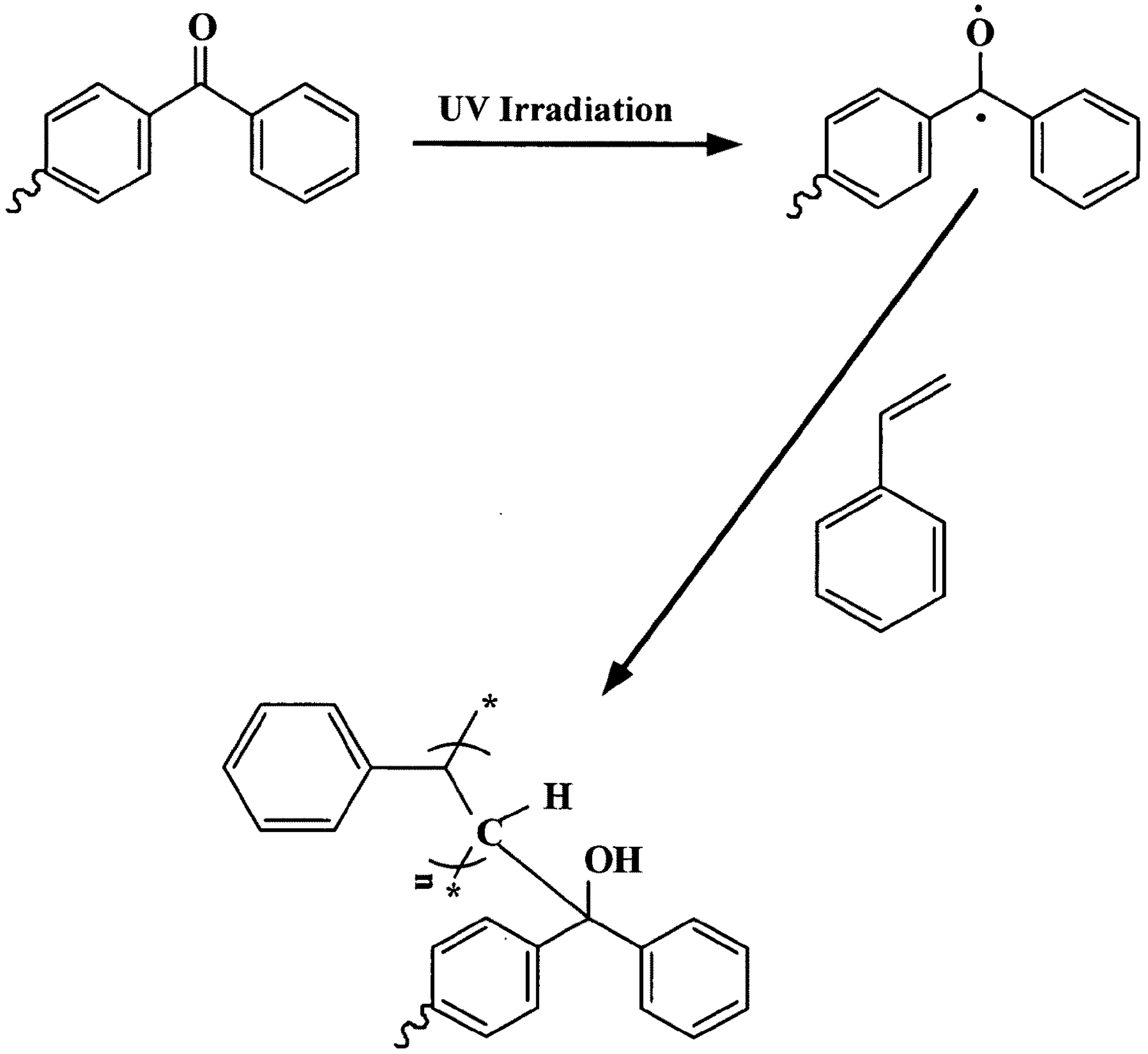
FIG. 8 depicts the reaction scheme for the photoactivation of benzophenone and subsequent photoinitiated polymerization of styrene to form polystyrene.
Figure 9A:
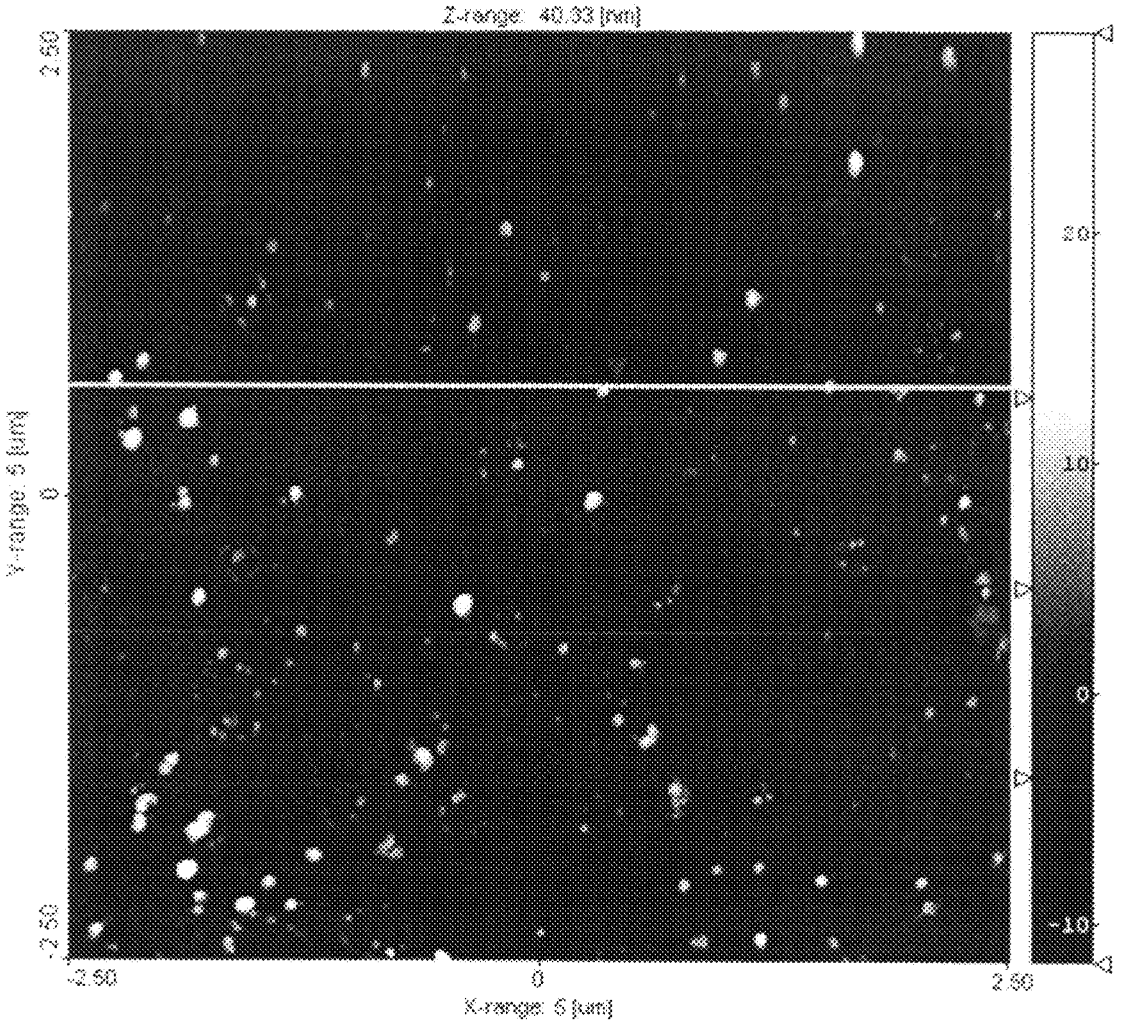
FIGS. 9A&B depict an AFM image and a profilometry of a coating composed of UV irradiated styrene film on an electrochemically grafted film of (4-(6-(9H-carbazol-9-yl)hexyloxy)benzophenone on a gold substrate, respectively.
Figure 9B:
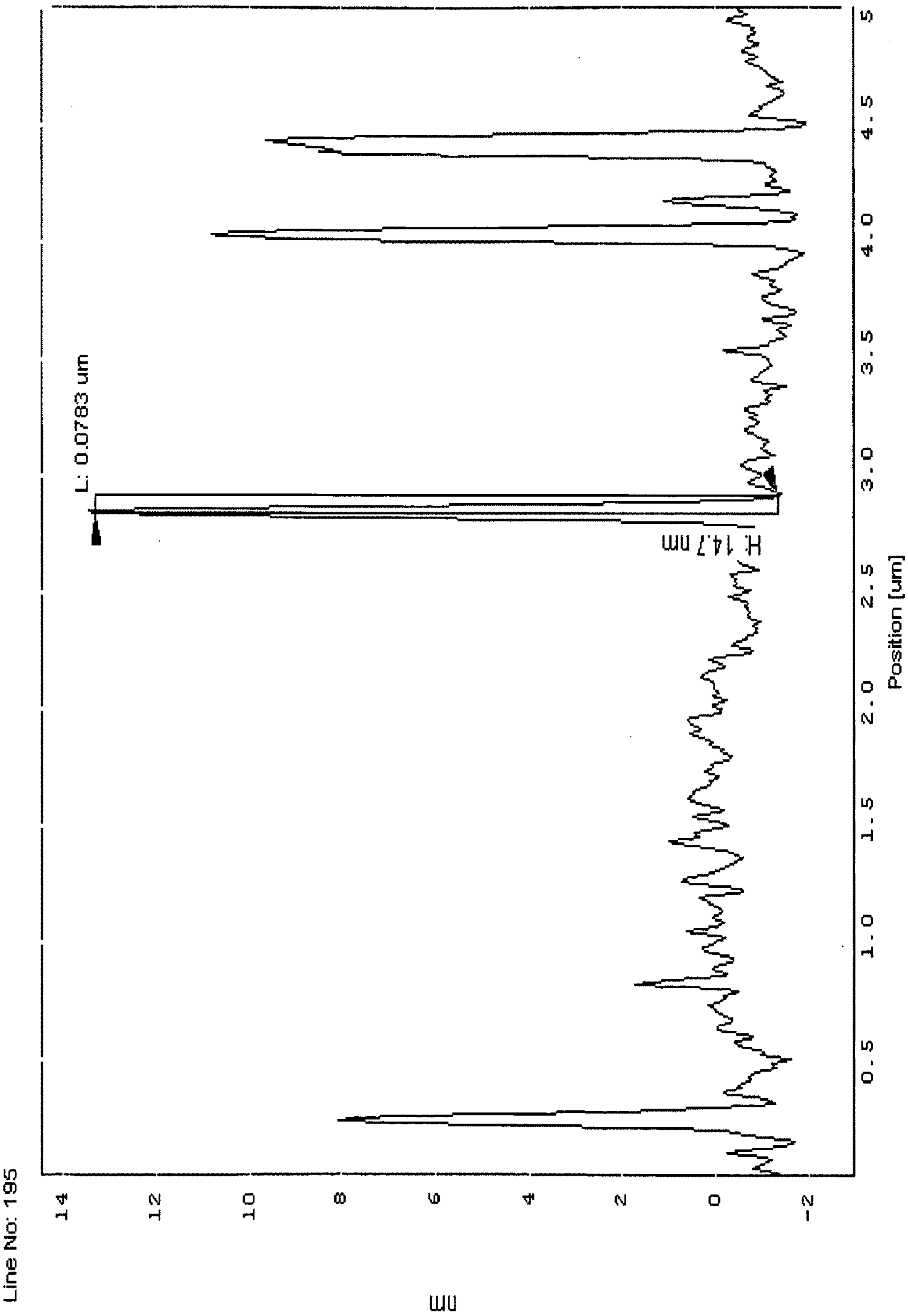

1M of styrene monomer in toluene was spin-coated on the grafted (4-(6-(9H-carbazol-9-yl)hexyloxy)benzophenone film at a rate of 2,000 rpm for one minute. Spin-coatings were repeated several times to ensure that enough monomer is available on the surface of the film. The film was subsequently irradiated for three hours, resulting in the polymerization of styrene into polysterene. As a result of the WV irradiation process, the activated benzophenone groups, located on the outer layer of the electrodeposited coating, were converted into C—O radicals and were able to initiate the polymerization of styrene to form polystyrene as illustrated in FIG. 8. The resulting film was washed and sonicated in toluene. The final coating was observed by AFM and the resulting chromatogram is shown in FIG. 9. The AFM profilometry measurements show that the height of the film is 14.7 nm. This is further supported by ellipsometric measurements where the film thickness is changed from 0.64 nm to 15.8 nm.

Figure 10:
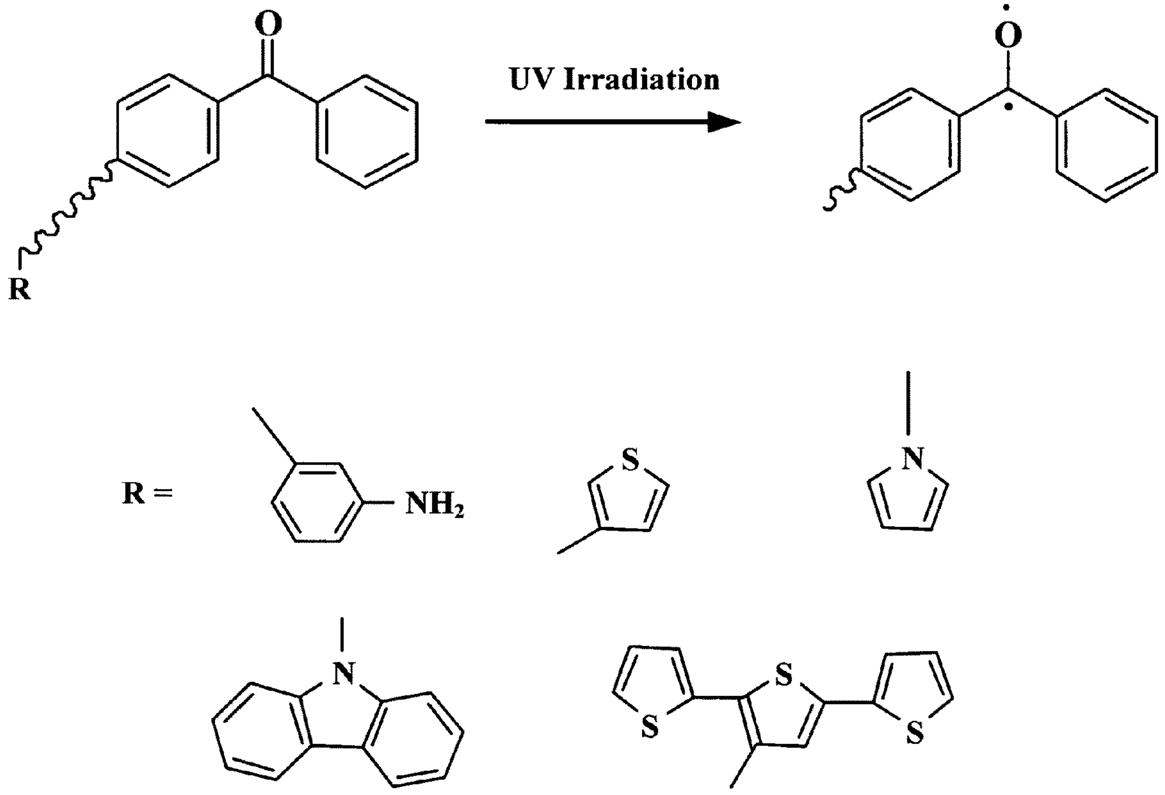
FIG. 10 depicts the electropolymerization of other types of electroactive monomers, as well as the co-electropolymerization of two or more electroactive monomers to form conjugated and electrically conducting or insulating polymer films—prior to photoreaction and grafting.

Referring now to FIG. 10, other types of photo-active monomers are shown that can be photo-polymerized analogously to the polymerization of styrene. The photo-polymerization can be adapted to photo-polymerize two or more photo-polymerization monomers to form conjugated and electrically conducting or insulating polymer films—prior to photoreaction and grafting.

Section II

Introduction

Tailored macromolecular architectures end-grafted on a solid substrate, known as polymer brushes, play an important role in controlling surface properties of relevance to fundamental science and technological applications. Such areas include biomaterials,[1] drug delivery,[2] adhesion and wettability,[3] lubrication,[4] and tribology.[5] Indeed, there is a valuable need in developing a facile, controlled and versatile methodology for grafting functional polymer brushes on a variety of solid support substrates. This application aims to provide a complimentary strategy to fabricating polymer brushes primarily on electrode surfaces.

Polymer brushes can be tethered onto a surface either by "grafting to" (GT) or "grafting from" (GF) (also referred herein to surface-initiated polymerization (SIP)) methods. GT approaches involve pre-forming of a polymer with an "anchor" group, which is either an end-group or a pendant group, which is subsequently attached to complementary reactive groups on the surface. This approach is generally straightforward and experimentally simple, but it poses some limitations: (1) it is difficult to obtain high grafting densities due to the sterically-hindered reactive sites occupied by the "already" adsorbed polymers; (2) the film thickness is limited by the molecular weight of the polymer in solution, thus formation of thick films is generally unattainable; and (3) the functional groups of the preformed polymer can compete with the anchor moieties for surface sites, hence limiting the choice of polymer type that can be attached on the surface.[6] These drawbacks can be circumvented by employing the GF technique where the polymer chains are directly grown from the surface using surface-bound initiators.[7] In this method, the functionality, density and thickness of the polymer brushes can be easily controlled. Also, higher grafting densities are obtained because no significant diffusion barrier exists, as only the monomers in solution have to reach the reactive site of the interface.

Over the past decade, the combination of SIP and controlled living radical polymerization (CLRP) has been widely explored due to its applicability in preparing polymer brushes with controlled brush density, polydispersity, and composition. Furthermore, the living character of the process enables the formation of block copolymers on the surface. The most recently developed CLRP technique is the reversible addition-fragmentation chain transfer (RAFT) polymerization.[8] It relies on the degenerative transfer mechanism, which involves the use of dithioester compounds, known as the chain transfer agent (CTA) or the RAFT agent. The transfer of the dithioester moiety between active and dormant species maintains the controlled character of the polymerization as shown in Scheme 1.[9] RAFT has emerged as a promising CLRP technique due to its versatility over a wide range of functional monomers amenable to radical polymerization and reaction conditions. In addition, the polymers formed are free from contamination of metal catalyst.[8]

carbazole group in this RAFT agent enables its immobilization on the electrode surface through electro-grafting as shown in Scheme 2. This method extends the scope of the application of SI-RAFT polymerization on any conducting substrates (e.g. gold, ITO-coated surface, platinum, carbon felt, glassy carbon, and steel). Because polymer brushes are used to improve the performance and properties of many devices (e.g. electrodes, windows, display devices, implants,[1] biosensors,[15] microelectromechanical systems (MEMS)[16]), a practical way of preparing polymer brushes on electrically conducting surfaces is valuable. To the best of our knowledge, the use of SI-RAFT in combination with electro-grafting has never been previously reported. In this application, we have developed an efficient method of preparing poly(methyl methacrylate) (PMMA) and poly(poly(ethylene glycol) methyl ether methacrylate) (PPEGMA) polymer brushes onto gold surface through electro-grafting followed by SI-RAFT polymerization.

Scheme 1

General Representation of RAFT Polymerization Mechanism

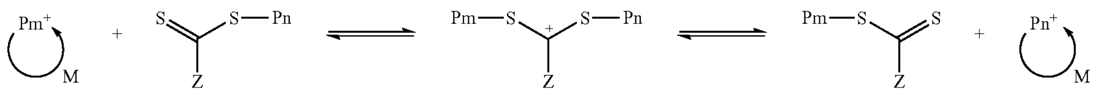

Surface-initiated RAFT (SI-RAFT) polymerization can be performed by the immobilization of the initiator onto the surface with the RAFT agent in solution.[9a,10] This approach requires the use of unbound initiator to act as a scavenger for the impurities that can terminate the active initiating sites on the surface.[9a] The consequence for this is the production of excess amounts of ungrafted polymer.[11] To eliminate this possibility, another method involves anchoring the CTA directly onto the surface. Immobilization of the CTA on the substrate can be accomplished by chemical modification of a functionalized surface.[12] For example, modifying the surface with an active halogen group followed by substitution reaction with the dithio moiety leads to the generation of a surface RAFT agent.[12a-f] This method is inconvenient because it necessitates careful handling techniques on the solid support in solution during the synthesis. An alternative way is to pre-form the RAFT agent followed by subsequent attachment onto the surface.[13] However, in both cases, most of the reported surface-bound RAFT agents are silane-coupled and consequently can only be grafted on hydroxyl-terminated substrates such as silicon wafers and silica particles.[12a-e,13a,b] Therefore, such methods are not applicable for other metal or metal oxide surfaces that are useful as metal or electrically conducting electrodes. Such surfaces are of high industrial importance as well as for biomedical applications.

To address this issue, we have used a preformed RAFT agent with an electrochemically active moiety to mediate SI-RAFT polymerization from electrode surfaces. In particular, we have used the first generation CTA (G1-CTA), which had been reported as set forth above to facilitate RAFT polymerization in solution.[14] The presence of the electro-active Scheme 2

Synthetic Route for the Preparation of the G1-CTA

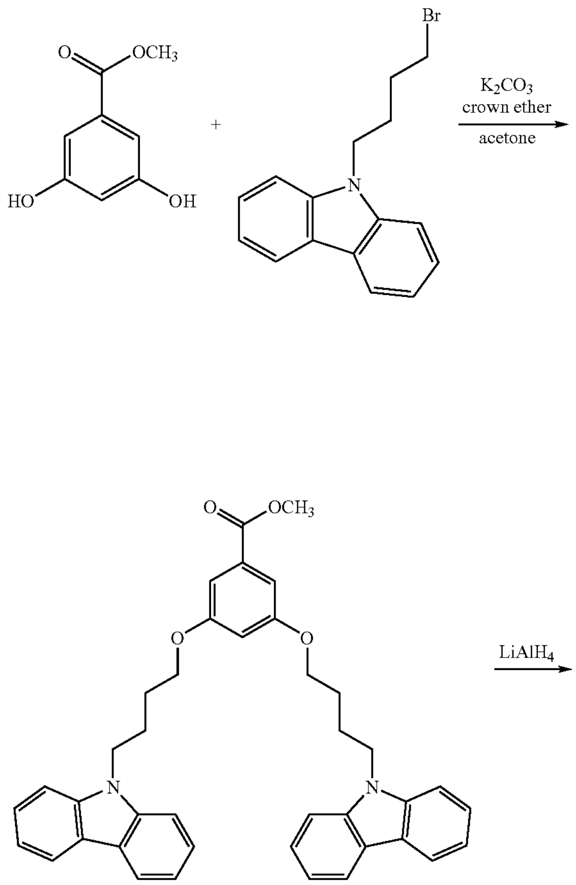

-continued

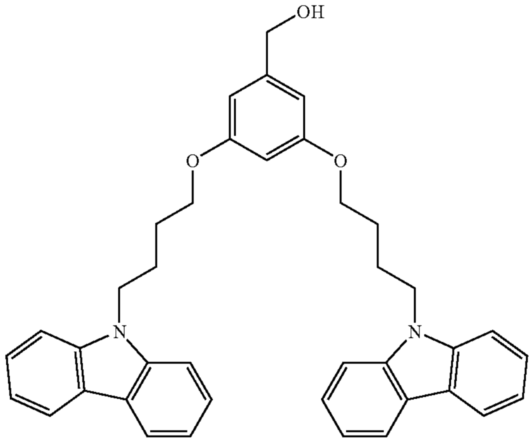

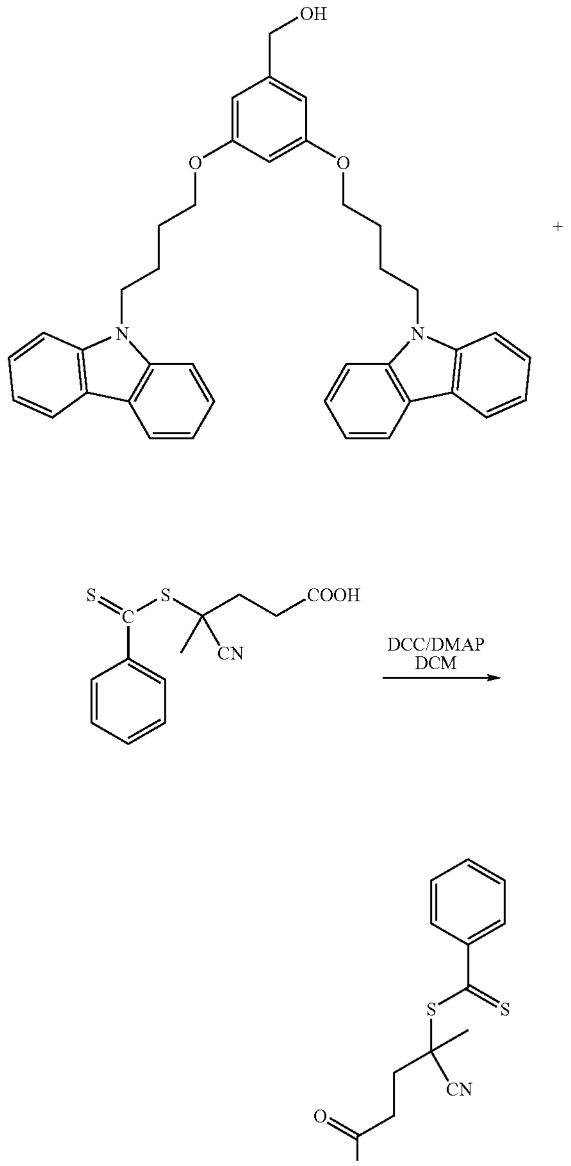

-continued

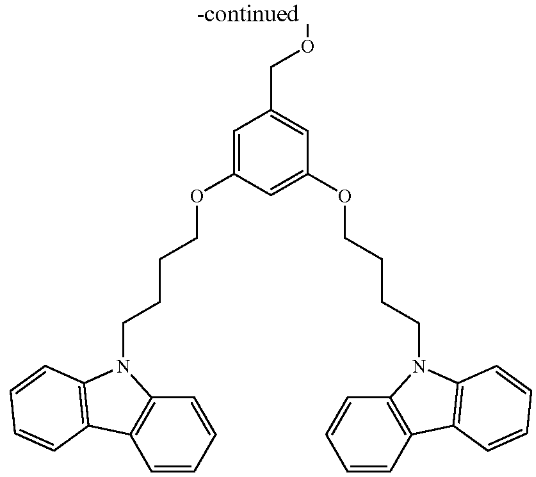

Results and Discussion

Electro-Grafting of G1-CTA

The mechanism of the anodic oxidation of carbazole and N-substituted carbazoles were studied previously.[17] During the anodic oxidation process, the carbazole monomer was first oxidized to form a very unstable cation radical, which readily couples with another cation radical to form the 3,3'-bicarbazyl species. This ring-ring coupling is suggested to be the major decay pathway, especially for the N-substituted derivatives where the 9-position is blocked. On the other hand, several groups reported the formation of longer chains of carbazole under appropriate conditions.[18]

In this application, the presence of the carbazole moieties in the G1-CTA was exploited to deposit this RAFT agent on the gold substrate electrochemically. Cyclic voltammetry (CV) was particularly employed as an electrochemical method to anodically oxidize the carbazole moieties onto the gold surface. CV experiments were carried out using a three-electrode set-up where gold substrate was used as the working electrode, Pt wire as the counter electrode and Ag/AgCl as the reference electrode. A solution of G1-CTA (0.5 mM) and the supporting electrolyte, tetrabylammonium hexafluorophosphate (TBAH) (0.1 M) in THF was used for preparing the electro-generated CTA film. A scan rate of 50 mV/s was employed for the 10-cycle CV run of the sample in a potential window of 0-1.4 V.

Figure 11:
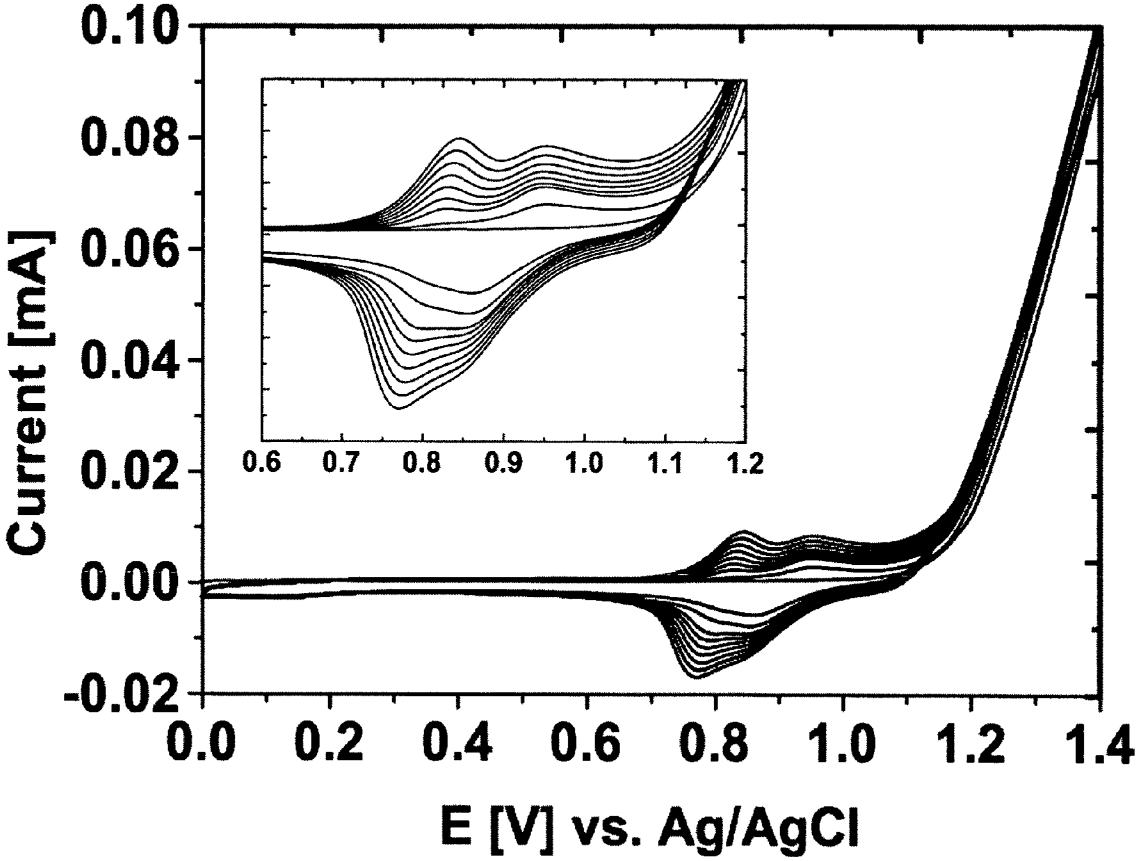
FIG. 11 depicts a CV curve for the electro-grafted G1-CTA on the gold substrate. Inset: Enlarged portion of the cyclic voltammogram.

FIG. 11 shows the cyclic voltammogram of the electrode-posited G1-CTA. Two peaks were observed for both the anodic (oxidation) and cathodic (reduction) scans, which can be attributed to the two redox processes that is typical for electrochemically reversible N-substituted carbazoles.[17] The oxidation peaks observed at ~0.88-0.95 V and the reduction peaks at ~0.78-0.85 V are attributed to the redox couples of the 3,6-bicarbazyl species. The two oxidation peaks observed in the CV curve represent the loss of the two electrons of the 3,6-bicarbazyl in a two reversible one-electron steps to yield a moderately stable dictation with extensive conjugation.[17] In addition, it was observed that the peak current increases as the number of cycles increases. This increase in current indicates the formation of the electro-generated film on the electrode.[19]

The thickness and contact angle of the electro-grafted film were obtained. Ellipsometric measurements showed an average thickness of 5.10±0.12 nm, measured at 3 different areas of the sample. A static water contact angle value of 72.50±2.230 was obtained, indicating the presence of the relatively hydrophobic film.

Figure 12A:
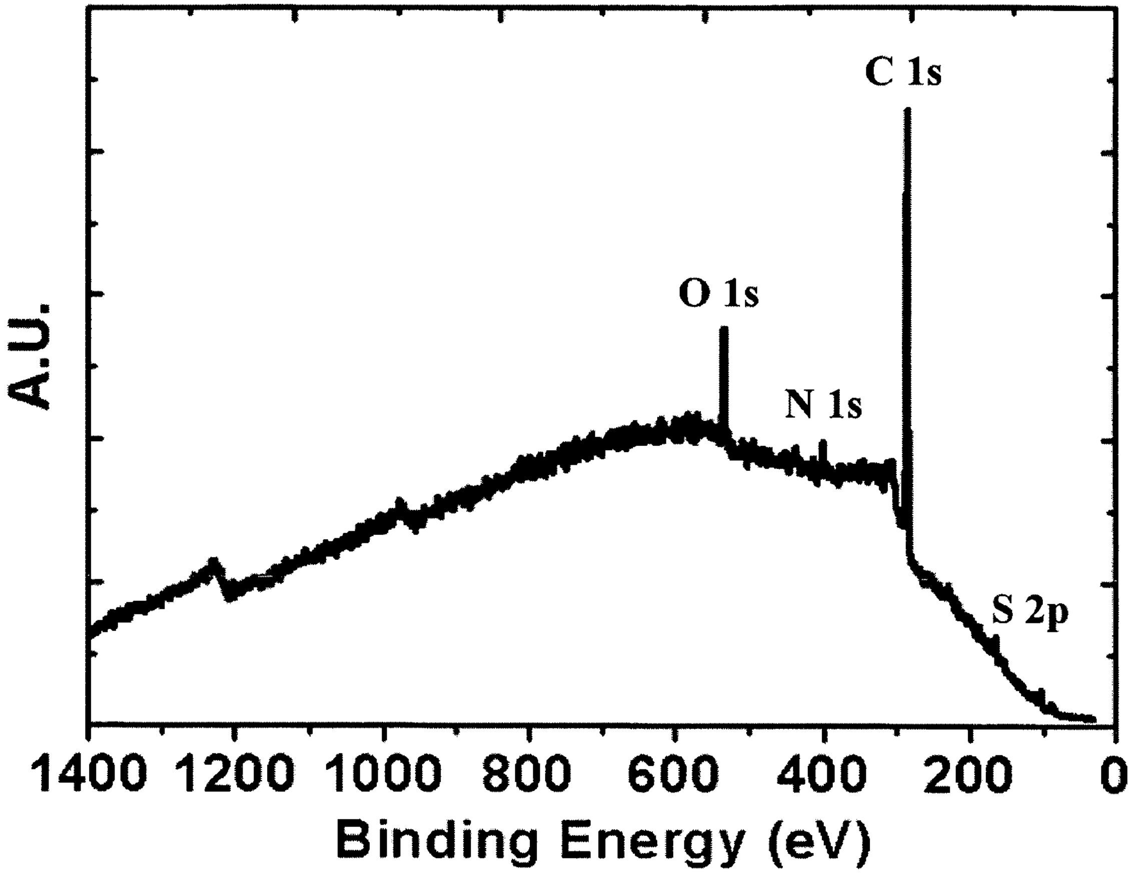
FIGS. 12A-C depict XPS data for the electro-grafted G1-CTA. (A) Survey and high resolution scan in the (B) N 1s (C) S 2p regions.
Figure 12B:
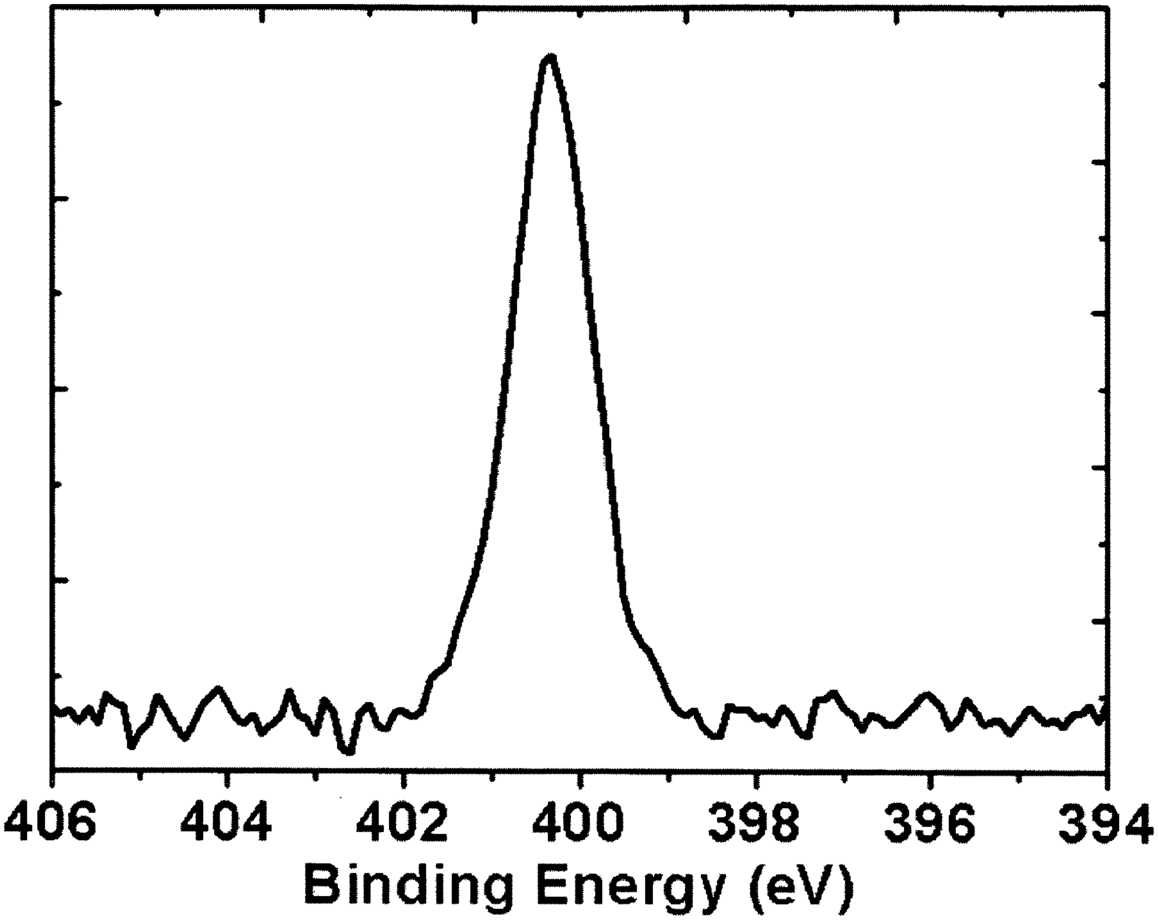
Figure 12C:
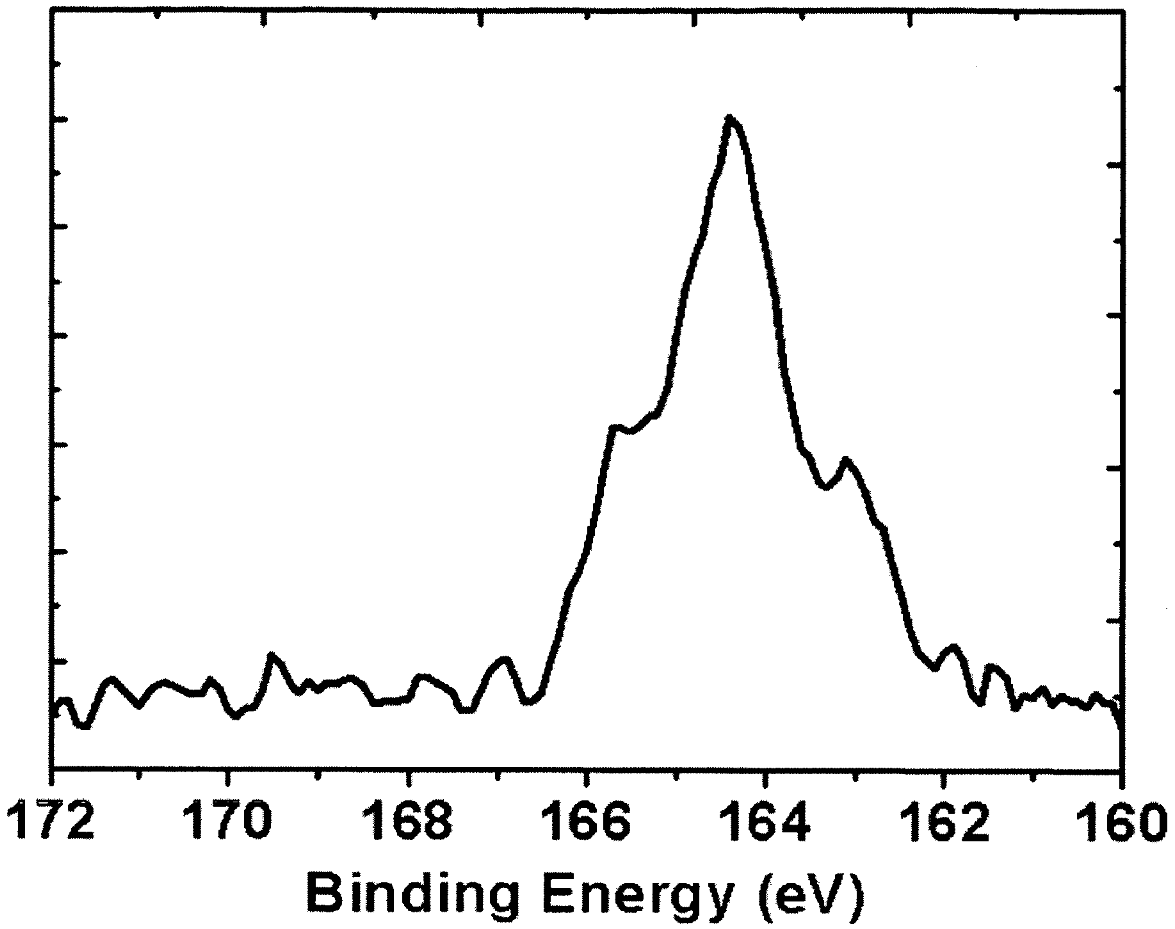

XPS analysis was also performed to further confirm the deposition of the G1-CTA on the gold substrate. XPS data of the electro-grafted film is shown in FIGS. 12A-C. XPS survey scan shows the presence of the expected C, N, O, and S signals. High-resolution N 1s data reveal an intense peak at 400.4 eV due to the nitrogen contributions from the carbazole ring[20] O and the cyano nitrogen.[21] The appearance of a broad signal at 164.4 eV in the S 2p region was attributed to the dithio moiety of the G1-CTA.[22] The relative atomic concentration of C, N, O and S obtained from the XPS were in close agreement with the expected atomic percentage of the electro-grafted RAFT agent as tabulated in Table 2.

TABLE 2

Experimental Atomic Percentages on Surface and Expected Atomic Percentages of the Elements in G1-CTA

| Element | Atomic percentage on surface | Expected atomic percentage |
|---|---|---|
| C | 78.11 | 78.59 |
| O | 5.4 | 5.29 |
| N | 8.85 | 8.05 |
| S | 7.64 | 8.07 |

SI-RAFT Polymerization.

To check for the ability of the CTA-modified gold surface to facilitate surface-initiated RAFT polymerization, the standard monomer methyl methacrylate (MMA), was used to grow the polymer from the surface. The CTA-modified gold slide was immersed in a degassed solution of the monomer, "free" CTA, and the AIBN initiator in THF for 24 hours at 60° C. Polymerization of MMA was initiated from the surface-bound CTA to generate a surface-grafted PMMA homopolymer brush. After polymerization, the PMMA-modified gold surface was subjected to Soxhlet extraction in THF for 24 hours to ensure the removal of any unbound polymers. On the other hand, the solution was precipitated in excess amount of hexanes to obtain the free polymer formed in the solution.

The molecular weight and polydispersity of the free polymer can be used for the estimation of the molecular weight and polydispersity of the grafted PMMA film as reported in literatures.[23] GPC analysis of the solution-formed polymer measured a number-average molecular weight ($M_n$) of 10,637 and a weight-average molecular weight ($M_w$) of 12,300. From these values, a molecular weight distribution ($M_w/M_n$) of 1.16 was obtained. This "very narrow" polydispersity value (<1.2) is expected for a controlled polymerization process.

Ellipsometric measurements of the resulting film after polymerization showed a significant change in thickness. The thickness of the film increased from 5.10±0.12 nm (initial G1-CTA film) to 15.88±1.37 nm, (resulting film after polymerization), signifying the growth of the PMMA brush on the surface.

In addition, the static contact angle in water of the resulting PMMA brush was found to be 66.16±0.980. This value is close to the reported contact angle value (61°) for PMMA on gold.[24] The slight discrepancy between the experimental and the literature values is possibly due to the incorporation of the hydrophobic G1-CTA to the PMMA. In comparison to the electro-grafted CTA film, the contact angle shifted to lower value after MMA polymerization, which is possibly due to the presence of more oxygen on the surface, rendering the film more polar after polymerization.

Figure 13A:
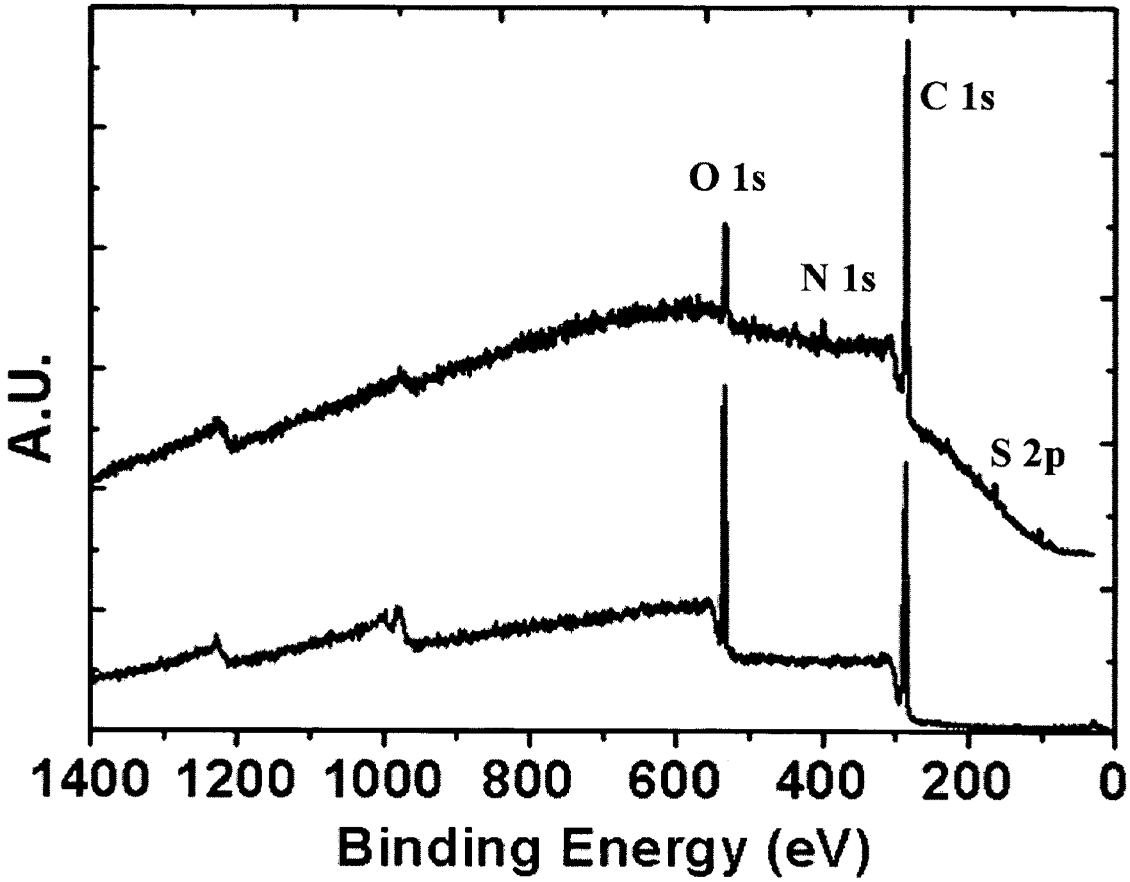
FIG. 13A-C depict (A) Survey spectra of the SI-RAFT polymerization of PMMA on gold. (black) Electro-grafted G1-CTA on gold prior to SI-RAFT of PMMA and (gray) after the growth of the PMMA homopolymer brush on the G1-CTA-modified gold. (B) O 1s data of (black) the electrografted G1-CTA and (gray) the PMMA brush after SI-RAFT. (C) C 1s data of the PMMA brush after SI-RAFT.
Figure 13B:
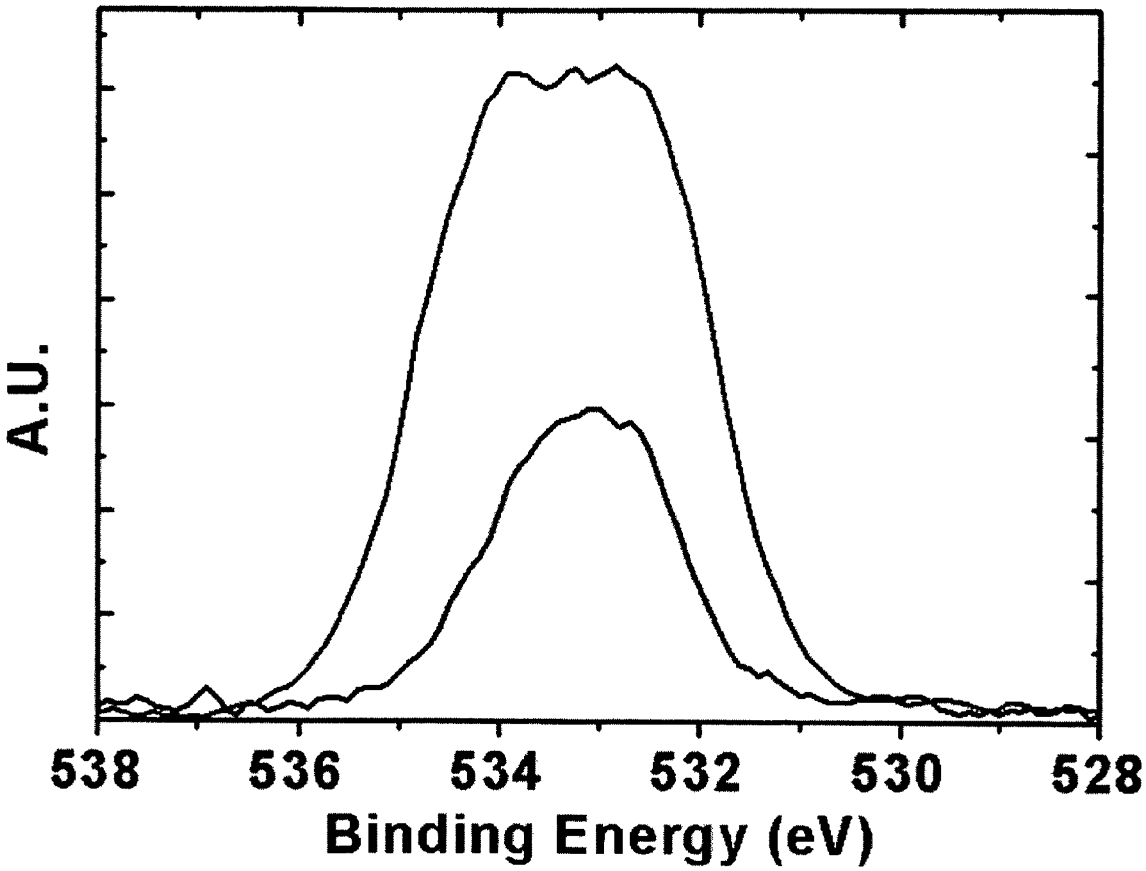
Figure 13C:
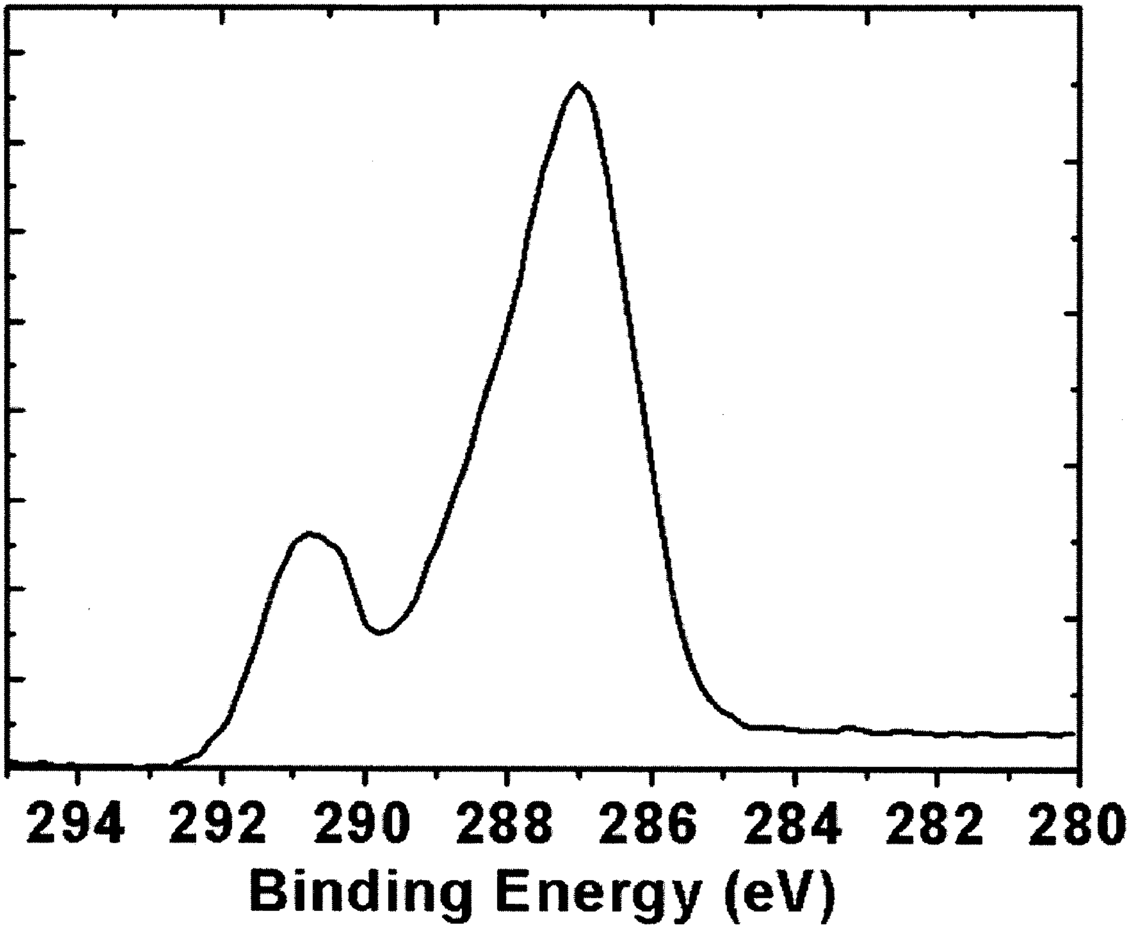

XPS analysis of the PMMA film showed a significant increase in the intensity of the O signal after the surface-initiated MMA polymerization, as compared to the electro-grafted RAFT agent as shown in FIG. 13A and FIG. 13B. This increase was expected due to the polymerization of the MMA, thus increasing the number of oxygen present on the surface. The observed O/C ratio after polymerization (29:70) correlates well with PMMA composition that is 2 O atoms to 5 C atoms.

After examining the capability of the CTA-modified gold substrate to mediate a RAFT surface-initiated polymerization through grafting PMMA film from the surface, the method was applied to prepare a potential non-specific protein-resistant surface. Poly(ethylene glycol) methyl ether methacrylate (PEGMA) contains the poly(ethylene glycol) (PEG) moiety, which is well-known to be a protein-resistant molecule,[25] and the methacrylate unit that is similar to the model monomer used, MMA. Similar processes were carried out for the SIP of the PEGMA on the gold surface. The polymerization time, however, was shorter than that of MMA as PPEGMA gels out rapidly with the same conditions employed with the MMA polymerization. GPC measurements rendered values of 11,062 and 12,968 for $M_n$ and $M_w$, respectively. A narrow molecular weight distribution of 1.17, similar to PMMA, was obtained, indicating a well-controlled polymerization process.

Similar surface characterizations were performed on the film after PEGMA polymerization. A thickness of 22.52±1.17 nm and a static water contact angle of 58.05±0.74° were recorded after the polymerization. The lower value of contact angle as compared to the film before the RAFT-mediated polymerization is due to the contribution of the hydrophilic PEG chains.

Figure 14A:
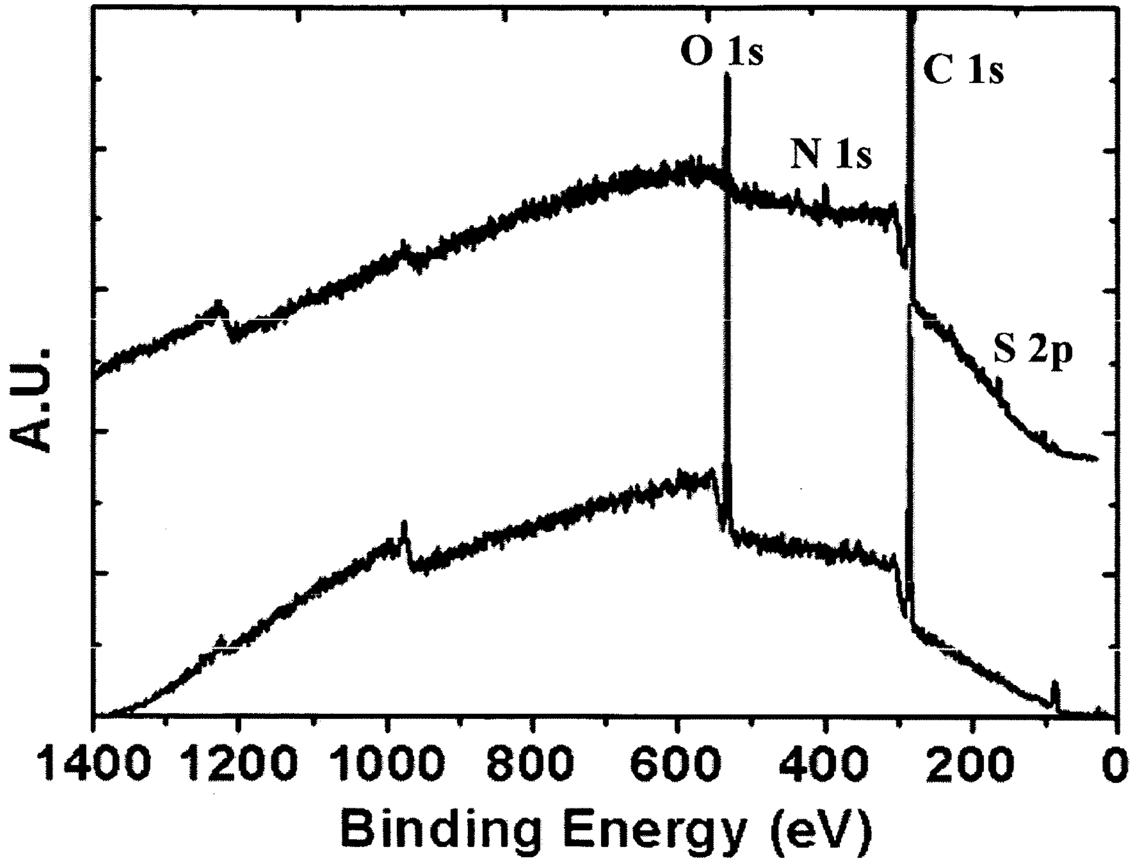
FIG. 14A-C depicts (A) Survey spectra of the SI-RAFT polymerization of PEGMA on gold. (black) Electro-grafted G1-CTA on gold prior to SI-RAFT of PEGMA and (gray) after the growth of the PPEGMA homopolymer brush on the G1-CTA-modified gold. (B) O 1s data of (black) the electrografted $G_1$-CTA and (gray) the PPEGMA brush after SI-RAFT. (C) C 1s data of the PPEGMA brush after SI-RAFT.
Figure 14B:
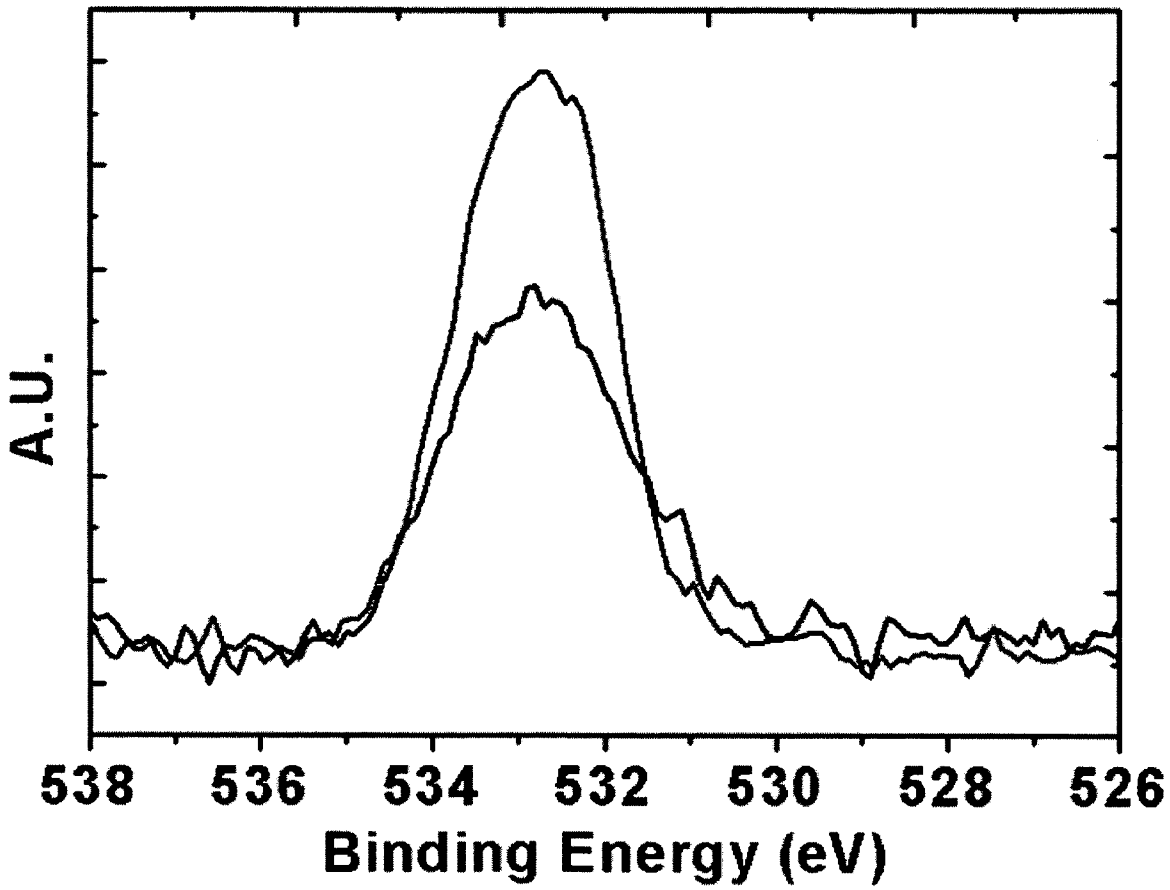
Figure 14C:
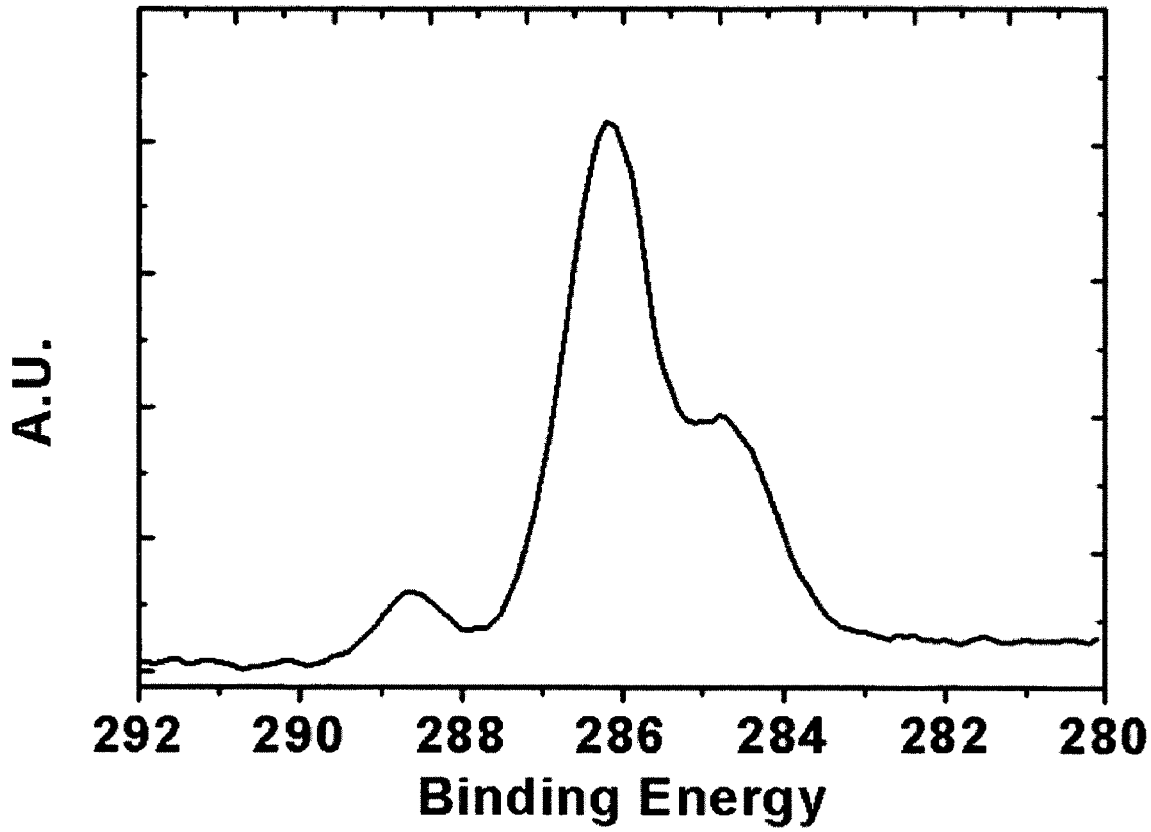

XPS results show the comparison of the survey scans before and after SI-RAFT polymerization of PEGMA on the surface as shown in FIGS. 14A-C. An increase in the O peak intensity was observed due to the growth of the PPEGMA brush on the surface. In addition, the O/C ratio after polymerization of PEGMA was 30:68 (0.44), close to the expected value for the PEGMA, that is 7 O atoms and 15 C atoms (0.47).

Conclusions

A new approach for preparing polymer brushes via combination of SI-RAFT and electro-grafting of CTA was demonstrated. The RAFT agent with an electro-active moiety was successfully grafted onto gold substrates using CV as observed from the XPS, ellipsometry and contact angle results of the electro-generated film. The stability and activity of the RAFT agent were confirmed by its ability to generate PMMA and PPEGMA brushes on the surface. The growth of the brushes was verified by the significant increase in thickness (i.e. from 5.10±0.12 nm to 15.88±1.37 nm for PMMA and from 5.10±0.12 to 22.52±1.17 nm for PPEGMA), accompanied by the change in contact angle and topography. Furthermore, the calculated O/C ratio from the XPS after the polymerization (0.41 for PMMA and 0.44 for PPEGMA) showed a strong correlation with the expected value for the PMMA (0.40) and PPEGMA (0.46) brushes. The inventors believe that the simplicity and efficiency of this approach will be a useful strategy in preparing various functional polymer brushes on electrode surfaces. The inventors also believe that the PPEGMA films are ideal to support protein adsorption or non-adherence depending on the head groups, to prepare stimuli-responsive block copolymers on the substrate and to generate polymer brushes on other conducting substrates. The method presented herein will be a very promising tool in creating well-designed polymer architectures on conducting surfaces.

REFERENCES CITED IN SECTION II

The following references were cited in Section II:

(1) (a) Tirrell, M.; Kokkoli, E.; Biesalski, M. *Surf. Sci.* 2002, 500, 61-83. (b) Elbert, D.; Hubbell, J. *Annu. Rev. Mater. Sci.* 1996, 26, 365-394. (c) Griffith, L. *Acta Mater.* 2000, 48, 263-277. (d) Klee, D.; Höcker, H. *Adv. Polym. Sci.* 1999, 149, 1-57.

(2) (a) Langer, R. *Acc. Chem. Res.* 2000, 33, 94-101. (b) Santini Jr., J.; Richards, A.; Scheidt, R.; Cima, M.; Langer, R. *Angew. Chem. Int. Ed.* 2000, 39, 94-101.

(3) (a) Lenz, P. *Adv. Mater.* 1999, 11, 1531-1534. (b) Raphaël, E.; de Gennes, P. *J. Phys. Chem.* 1992, 96, 4002-4007.

(4) Klein, *J. Annu. Rev. Mater. Sci.* 1996, 26, 581-612.

(5) Klein, J.; Kumacheva, E. *Science* 1995, 269, 816-819.

(6) Rühe, J.; Knoll, W. *J. Macromol. Sci., Polym. Rev.* 2002, C42, 91-138.

(7) (a) Prucker, O.; Rühe, *J. Macromolecules* 1998, 31, 592-601. (b) Prucker, O.; Rühe, *J. Macromolecules* 1998, 31, 602-613. (c) Prucker, O.; Rühe, *J. Langmuir* 1998, 14, 6893-6898.

(8) Chiefari, J.; Chong, Y.; Ercole, F.; Krstina, J.; Jeffrey, J.; Le, T.; Mayadunne, R.; Meijs, G.; Moad, C.; Moad, G.; Rizzardo, E.; Thang, S. *Macromolecules* 1998, 31, 5559-5562.

(9) (a) Baum, M.; Brittain, W. *Macromolecules* 2002, 35, 610-615. (b) Moad, G.; Rizzardo, E.; Thang, S. *Aust. J. Chem.* 2006, 59, 669-692.

(10) (a) Yu. W.; Kang, E.; Neoh, K. *Ind. Eng. Chem. Res.* 2004, 43, 5194-5202. (b) Yu. W.; Kang, E.; Neoh, K. *Ind. Eng. Chem. Res.* 2004, 43, 1673-1680. (c) Chen, Y.; Sun, W.; Chen, L. *J. Polym. Sci., Part A: Polym. Chem.* 2006, 44, 3071-3082.

(11) Edmondson, S.; Osborne, V.; Huck, W. *Chem. Soc. Rev.* 2004, 33, 14-22.

(12) (a) Tsujii, Y.; Ejaz, M.; Sato, K.; Goto, A.; Fukuda, T. *Macromolecules* 2001, 34, 8872-8878. (b) Ranjan, R.; Brittain, W. *Macromol. Rapid Commun.* 2008, 29, 1104-1110. (c) Peng, Q.; Lai, D.; Kang, E.; Neoh, K. *Macromolecules* 2006, 39, 5577-5582. (d) Lu, C.; Zhou, W.; Han, B.; Yang, H.; Chen, X.; Wang, X. *Anal. Chem.* 2007, 79, 5457-5461. (e) Konopacki, M.; Boyes, S. *Macromolecules* 2007, 40, 879-888. (f) Hong, C.; You, Y.; Pan, C. *Chem. Mater.* 2005, 17, 2247-2254. (g) Hong, C.; Li, X.; Pan, C. *J. Phys. Chem. C* 2008, 112, 15320-15324. (h) Chung, P.; Kumar, R.; Pruski, M.; Lin, V. *Adv. Funct. Mater.* 2008, 18, 1390-1398.

(13) (a) Li, C.; Benicewicz, B. *Macromolecules* 2005, 38, 5929-5936. (b) Li, C.; Han, J.; Ryu, C.; Benicewicz, B. *Macromolecules* 2006, 39, 3175-3183. (c) Zhang, B.; Pan, C.; Hong, C.; Luan, B.; Shi, P. *Macromol. Rapid Commun.* 2006, 27, 97-102.

(14) Patton, D.; Taranekar, P.; Fulghum, T.; Advincula, R. *Macromolecules* 2008, 41, 6703-6713.

(15) Sackmann, E. *Science* 1996, 271, 43-48.

(16) (a) Zhu, X. *Acta Phys. Chim. Sin.* 2002, 18, 855-. (b) Bumbu, G.; Kircher, G.; Wolkenhauer, M.; Berger, R.; Gutmann, *J. Macromol. Chem. Phys.* 2004, 205, 1713-1720.

(17) (a) Ambrose, J.; Nelson, R. *J. Electrochem. Soc.* 1968, 115, 1159-1164. (b) Ambrose, J.; Carpenter, L.; Nelson, R. *J. Electrochem. Soc.* 1975, 122, 876-894.

(18) (a) Mengoli, G.; Musiani, M.; Schreck, B. *J. Electroanal. Chem.* 1988, 246, 73-76. (b) Macit, H.; Sen, S.; Sacak, M. *J. Appl. Polym. Sci.* 2005, 96, 894-898. (c) Inzelt, G. *J. Solid State Electrochem.* 2003, 7, 503-510. (d) Abe, S.; Ugalde, L.; del Valle, M.; Tregouet, Y.; Bernede, J. *J. Braz. Chem. Soc.* 2007, 18, 601-606.

(19) Taranekar, P.; Fulghum, T.; Patton, D.; Ponnapati, R.; Clyde, G.; Advincula, R. *J. Am. Chem. Soc.* 1975, 122, 876-894.

(20) (a) Taoudi, H.; Bernède, J.; Bonnet, A.; Morsli, M.; Godoy, A. *Thin Solid Films* 1997, 304, 48-55. (b) Taoudi, H.; Bernede, J.; del Valle, M.; Bonnet, A.; Molinie, P.; Morsli, M.; Diaz, F.; Trégouët, Y.; Bareau, A. *J. Appl. Polym. Sci.* 2000, 75, 1561-1568. (c) Abé, S.; Bernède, J.; Ugalde, L.; Trégouët, Y.; del Valle, M. *J. Appl. Polym. Sci.* 2007, 106, 1568-1575.

(21) (a) McCoy, K.; Hess, D.; Henderson, C.; Tolbert, L. *J. Vac. Sci. Technol., B* 2004, 22, 3503-3508. (b) Tao, F.; Sim, W.; Xu, G.; Qiao, M. *J. Am. Chem. Soc.* 2001, 123, 9397-9403.

(22) Morf, P.; Raimondi, F.; Nothofer, H.; Schnyder, B.; Yasuda, A.; Wessels, J.; Jung, T. *Langmuir* 2006, 22, 658-663.

(23) (a) Pirri, G.; Chiari, M.; Damin, F.; Meo, A. *Anal. Chem.* 2006, 78, 3118-3124. (b) Rowe, M.; Hammer, B.; Boyes, S. *Macromolecules* 2008, 41, 4147-4157. (c) Matyjaszewski, K.; Miller, P.; Shukla, N.; Immarapom, B.; Gelman, A.; Luokala, B.; Siclovan, T.; Kickelcik, G.; Vallant, T.; Hoffman, H.; Pakula, T. *Macromolecules* 1999, 32, 8716-8724.

(24) Feng, J.; Haasch, R.; Dyer, D. *Macromolecules* 2004, 37, 9525-9537.

(25) (a) McPherson, T.; Kidane, A.; Szleifer, R.; Park, K. *Langmuir* 1998, 14, 176-186. (b) Harris, J.; Chess, R. *Nat. Rev. Drug Discovey* 2003, 2, 214-341. (c) Harder, P.; Grunze, M.; Dahint, R. *J. Phys. Chem. B* 1998, 102, 426-436.

Section III

The present invention discloses a new method for making polymer brushes based on the electropolymerization of electroactive monomers bearing initiators or EMIs for RAFT polymerization. Specifically, thiophene and terthiophene monomers bearing dithiobenzoate moieties, and carbazole monomer bearing dithiocarbamate moiety. This is achieved by the electro-deposition of thiophene and carbazole monomers onto flat surfaces, bearing the dithiobenzoate and dithiocarbamate, which are chain transfer agent (CTA) for RAFT polymerization. After attaching the initiators, RAFT polymerization was employed to obtain grafted polymer brushes. In this case, an electrically conducting polymer layer is deposited next to a conducting electrode followed with a layer of grafted polymer brush.

The present invention discloses a new method for making polymer brushes based on the electropolymerization of either thiophene and terthiophene bearing dithiobenzoate moieties, or carbazole monomer bearing dithiocarbamate moiety. We shall call these electroactive monomer initiators (EMI). This is achieved by the electro-deposition of the EMI onto the flat electrode surface, which leads to the attachment of a chain transfer agent (CTA). This was then followed by RAFT polymerization to form grafted polymer brushes.

To illustrate the disclosed method, several polymer brushes have been fabricated, namely polystyrene block polyt-butyl acrylate (PSty-b-PTBA) diblock copolymer brush, polycarbazole ethyl methacrylate (PCZEMA) telechelic polymer brush, PCzEMA homopolymer brush and polystyrene (PSty) polymer brush. This is achieved using the aforementioned electrodeposited RAFT CTAns. This leads to the formation of ultrathin film layer of conjugated polymers on flat indium tin oxide (ITO) and gold substrates with an outermost polymer brush layer (non-conducting).

Synthesis of EMIs

One embodiment of the invention includes the synthesis of the following EMIs which are also RAFT chain transfer agents (CTA): (thiophen-3-yl)ethyl-4-cyano-4-(phenylcarbonothioylthio)pentanoate, CTA 1,1,4-phenylenebis(methylene)bis(9H-carbazole-9-carbodithioate), CTA2, and 2-(thiophen-3-yl)ethyl 4-cyano-4-(phenylcarbono thioylthio)pentanoate 2-(2,5-Di(thiophen-2-yl)thiophen-3-yl)ethanol, CTA3. By virtue of the presence of thiophene, terthiophene, and carbazole monomers, these are also classified as EMI molecules.

Synthesis of Chain Transfer Agent (thiophen-3-yl)ethyl-4-cyano-4-(phenylcarbonothioylthio)pentanoate (or CTA 1)

Figure 15:
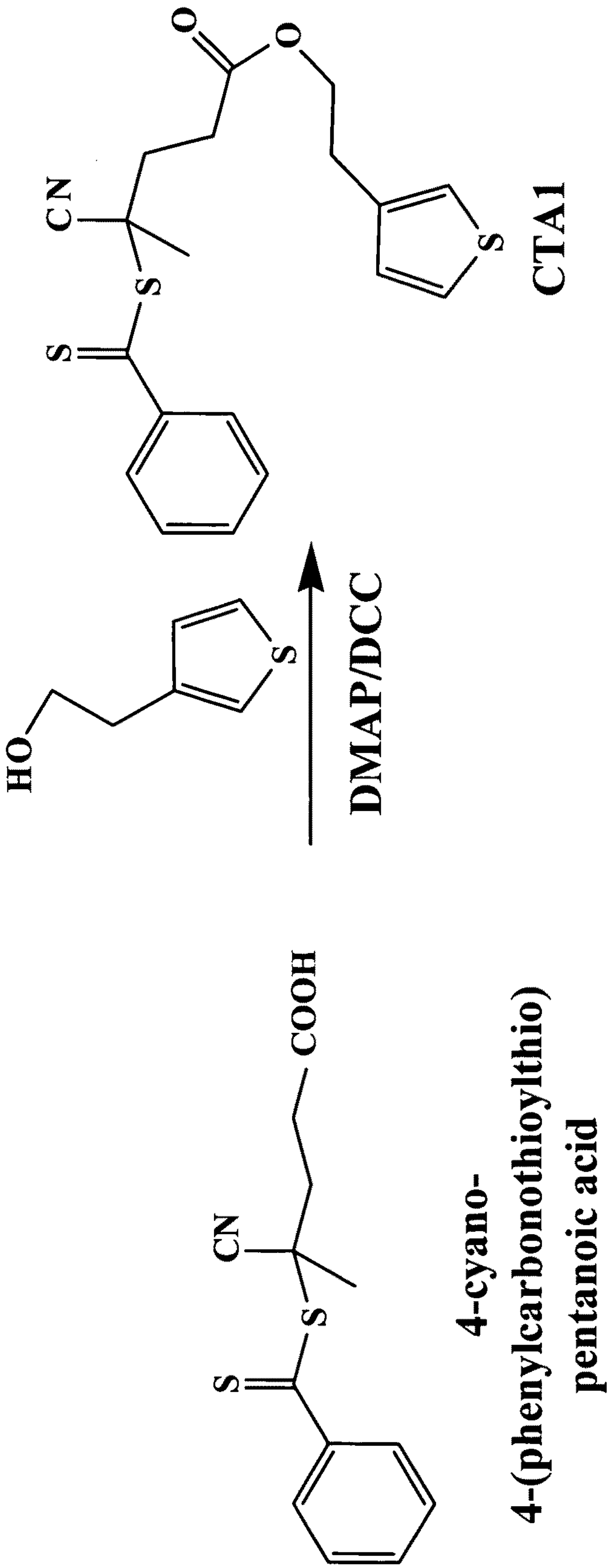
FIG. 15 shows the synthesis scheme for chain transfer agent (thiophen-3-yl)ethyl-4-cyano-4-(phenylcarbonothioylthio)pentanoate, or CTA1.

The synthesis scheme for (thiophen-3-yl)ethyl-4-cyano-4-(phenylcarbonothioylthio)pentanoate is shown in FIG. 15 and is performed as follows. First, the intermediary molecule, 4-Cyano-4-((thiobenzoyl)sulfanyl)pentanoic acid is synthesized by dissolving 4,4'-Azobis(4-cyanovaleric acid) (4.19 g, 0.0149 mol) and bis(thiobenzoyl)disulfide (3.07 g, 0.01 mol) in ethyl acetate (200 mL) in a 500 mL round-bottom flask equipped with a condenser. The mixture is degassed by bubbling with nitrogen and heated to reflux for 20 hours under nitrogen. The reaction is allowed to cool to room temperature, and the solvent is removed in vacuum. The crude product is purified by column chromatography (silica gel) using ethyl acetate:hexanes 2:3 as the eluent. After removal of solvent, the red fraction gives 4-cyano-4-((thiobenzoyl)sulfanyl)-pentanoic acid as a red oil. The product is solidified upon sitting at −20° C. $^1$H NMR ($CDCl_3$) δ (ppm): 1.93 (s, 3H, $CH_3$); 2.38-2.80 (m, 4H, $CH_2CH_2$); 7.42 (m, 2H, m-ArH); 7.56 (t, 1H, J=8 Hz p-ArH); 7.91 (d, 2H, J=7.3 Hz, o-ArH). $^{13}$C NMR ($CDCl_3$) δ (ppm): 24.1, 29.5, 32.9, 45.6, 118.4, 126.7, 128.6, 133.1, 144.4, 177.3, 222.1.

CTA1, that is 2-(thiophen-3-yl)ethyl 4-cyano-4-(phenylcarbono thioylthio)pentanoate, is then synthesized using a 100 mL round-bottom flask equipped with a stir bar and an addition funnel, where a solution of 4-cyano dithiobenzoate pentanoic acid (0.675 g, 2.42 mmol), 2-(thiophen-3-yl)ethanol (0.36 g, 2.90 mmol), and 4-(dimethylamino)pyridine (DMAP) (30 mg, 0.245 mmol) are mixed in 30 mL of dry $CH_2Cl_2$. The solution is cooled to 0° C. under nitrogen. Dicyclohecyl carbo diimide (DCC) (0.598 g, 2.89 mmol) is dissolved in 5 mL of $CH_2Cl_2$ and added dropwise to the reaction flask under stirring. After complete addition of DCC, the reaction is stirred for five minutes at 0° C. and then allowed to warm up to room temperature overnight. The solid is then removed by filtration, and the filtrate is washed with diluted aqueous sodium bicarbonate (20 mL) and water (2×20 mL) and finally dried over anhydrous $MgSO_4$. The solution is filtered and the solvent is removed to yield the crude product mixture as red oil, which is further purified by column chromatography on silica gel using 2:1 hexane/ethyl acetate as eluent. The final product is obtained as viscous red oil (0.342 g, 36.3% yield). $^1$H NMR ($CDCl_3$) δ (ppm): 1.91 (s, 3H, $CH_3$); 2.34-2.73 (m, 4H, $CH_2CH_2$); 2.98, (t, 2H, $CH_2$, J=8 Hz) 4.32 (t, 2H, —$OCH_2$, J=7.6 Hz); 6.97 (d, 1H, J=4 Hz, tiophene); 7.03 (s, 1H, tiophene); 7.28 (d, 1H, tiophene); 7.40 (t, 2H, J=8.6 Hz, m-ArH); 7.57 (t, 1H, p-ArH, J=8 Hz); 7.91 (d, o-ArH, 2H, J=9 Hz). $^{13}$C NMR δ (ppm) ($CDCl_3$): 24.0, 29.4, 29.8, 33.3, 45.6, 64.8, 118.4, 121.6, 125.7, 126.4, 126.6, 128.5, 133.0, 137.6, 144.5, 171.4, 222.2 Elemental analysis calculated for $C_{19}H_{19}NO_2S_3$: C, 58.58; H, 4.92; N, 3.60; 0, 8.21; S, 24.69. Found: C, 58.20; H, 4.99; N, 3.75; S, 24.23.

Synthesis of Chain Transfer Agent 1,4-phenylenebis(methylene)bis(9H-carbazole-9-carbodithioate) (or CTA2)

Figure 16:
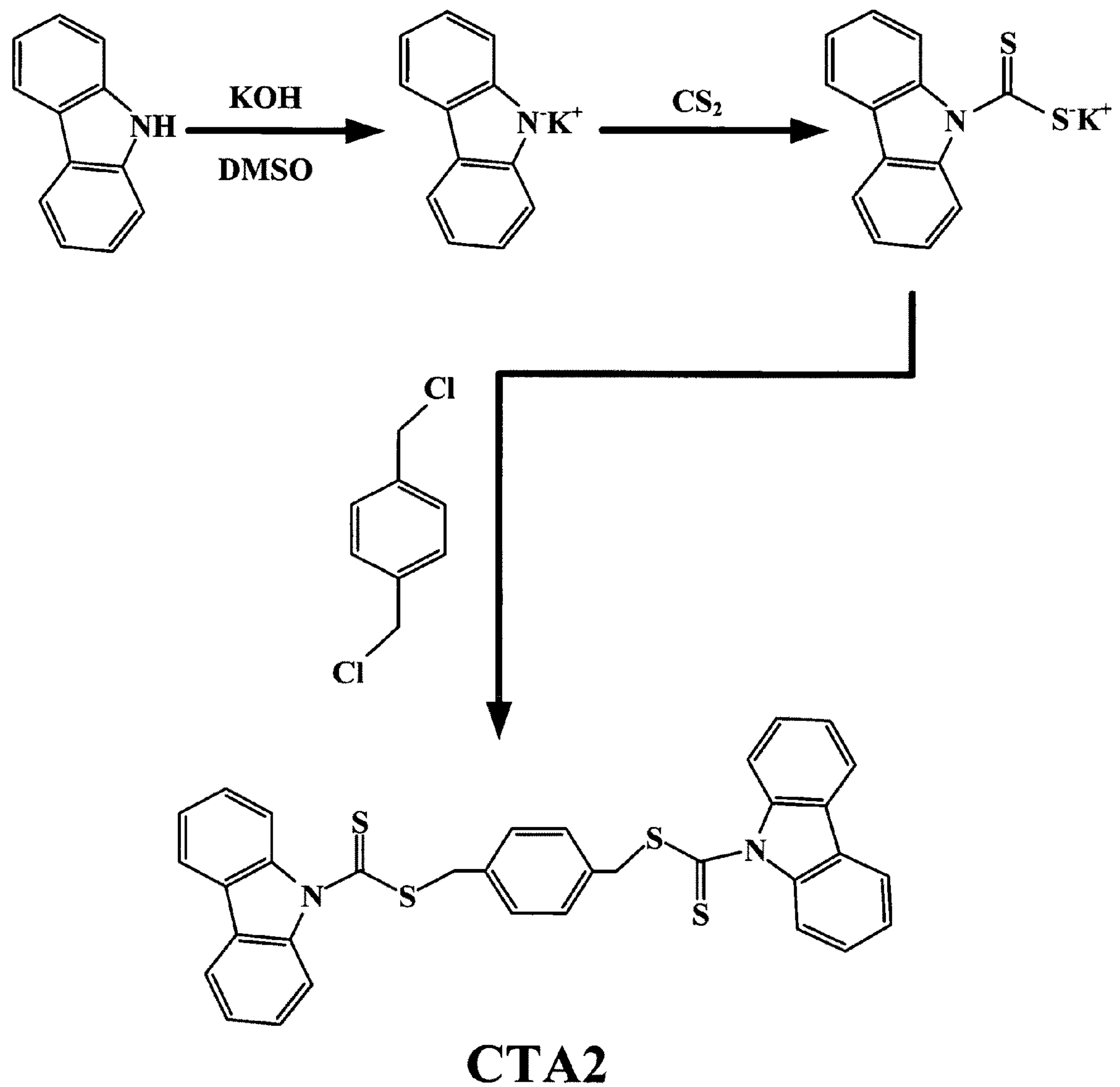
FIG. 16 shows the synthesis scheme for chain transfer agent 1,4-phenylenebis(methylene) bis(9H-carbazole-9-carbodithioate), or CTA2.

The synthesis scheme for 1,4-phenylenebis(methylene)bis(9H-carbazole-9-carbodithioate) is shown in FIG. 16 and is performed as follows. 3.34 g of 9H-carbazole (0.02 mol) is added to a suspension of DMSO (50 mL) and 1.02 g (0.02 mol) of KOH in a round bottom flask equipped with a stirring bar, stirred vigorous during two hours at room temperature. 1.42 g of $CS_2$ (0.02 mol) is added drop wise during fifteen minutes, and stirred vigorous for three hours more. 5.28 g (0.02 mol) of 1,4-bis(chloromethyl)benzene is added to the mixture of the 9H-carbazole-9-carbodithioate and a yellow solution is obtained. This solution is added to a large amount of water to form a yellow precipitate corresponding to the crude product of 1,4-phenylenebis(methylene)bis(9H-carbazole-9-carbodithioate). The crude product is recrystallized from a $CH_2Cl_2$/MeOH mixture twice, yielding 1.8 g (30.5% yield) of a yellow powder. $^1$H NMR ($CDCl_3$) δ (ppm): 4.72 (s, 4H, —$CH_2$); 7.46 (s, 4H, ph-H); 7.35 (td, carbazole, 4H, J=9 Hz, J=7.6 Hz, 4H, J=1 Hz); 7.44 (dd, carbazole, 4H, J=9 Hz, J=1 Hz), 8.02 (d, 4H, J=9 Hz, J=1.3 Hz), 8.47 (d, 4H, carbazole, J=9.3 Hz). $^{13}$C ($CDCl_3$): 42.6, 115.7, 120.3, 123.9, 126.3, 127.2, 130.4, 134.8, 140.3, 201.9. Elemental analysis calculated for $C_{34}H_{24}N_2S_4$: C, 69.35; H, 4.11; N, 4.76; S, 21.78. Found: C, 68.74; H, 4.06; N, 4.71; S, 21.42.

Synthesis of Chain Transfer Agent of 2-(thiophen-3-yl)ethyl 4-cyano-4-(phenylcarbono thioylthio)pentanoate 2-(2,5-Di(thiophen-2-yl)thiophen-3-yl)ethanol (CTA3)

Figure 17:
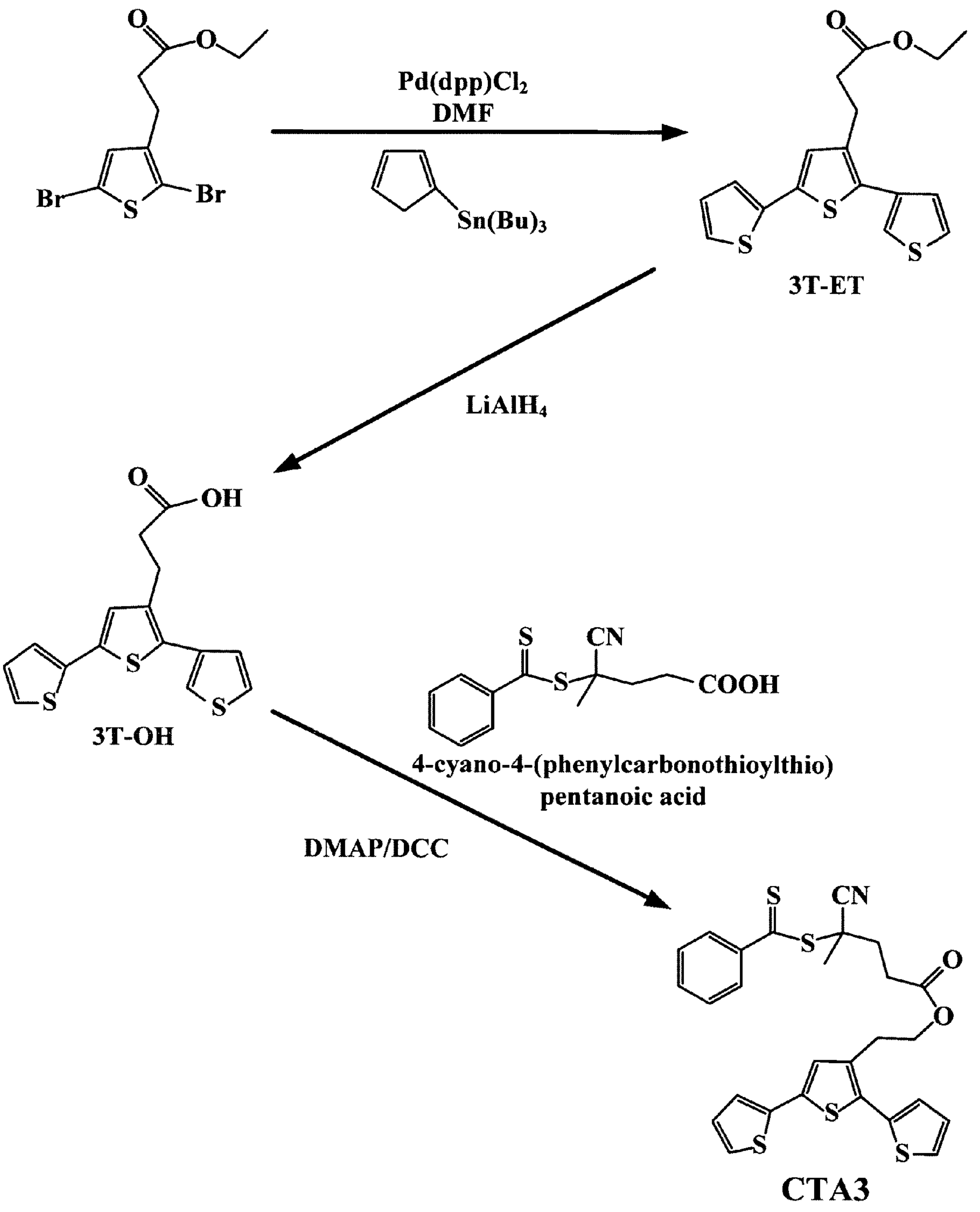
FIG. 17 shows the synthesis scheme for chain transfer reagent 2-(thiophen-3-yl)ethyl 4-cyano-4-(phenylcarbonothioylthio)pentanoate 2-(2,5-Di(thiophen-2-yl)thiophen-3-yl)ethanol, or CTA 3

The synthesis of 2-(thiophen-3-yl)ethyl 4-cyano-4-(phenylcarbono thioylthio)pentanoate 2-(2,5-Di(thiophen-2-yl)thiophen-3-yl)ethanol (or CTA 3) is performed as shown in FIG. 17 via the synthesis of two intermediary molecules: Ethyl 2-(2,5-Di(thiophen-2-yl)thiophen-3-yl)-acetate (3T-ET) and 2-(2,5-Di(thiophen-2-yl)thiophen-3-yl)ethanol (3TOH).

Synthesis of ethyl 2-(2,5-Di(thiophen-2-yl)thiophen-3-yl)-acetate (or 3T-ET)

The synthesis of 3T-ET is carried by first synthesizing ethyl 2-(2,5-dibromothiophen-3-yl)acetate using known methods and is performed as follows. Ethyl 2-(2,5-dibromothiophen-3-yl)acetate (6.4 g, 10 mmol) and 2-(tributylstannyl)thiophene (15 g, 20 mmol) are added to a 30 mL dry DMF solution of dichlorobis-(triphenylphosphine)palladium (1.3 g, 1.5 mmol). After three freeze thaw cycles, the mixture is heated at 100° C. for 48 hours. The mixture is cooled to room temperature and poured into a beaker containing 150 mL of water and subsequently extracted with $CH_2Cl_2$. The extracted $CH_2Cl_2$ mixture is dried with $Na_2SO_4$. After filtering and evaporation of solvent, the crude product is purified by chromatography on silica gel using toluene as eluent. The final product is obtained in 85% yield as pale yellow oil. The characterization of the compound is consistent with that published in the literature.

Synthesis of 2-(2,5-Di(thiophen-2-yl)thiophen-3-yl)ethanol (or 3TOH)

2-(2,5-Di(thiophen-2-yl)thiophen-3-yl)ethanol is synthesized according to the following procedure. Compound 3T-ET (2 g, 5.9 mmol) in 10 mL of THF is added dropwise under nitrogen to an ice-cooled 100 mL THF suspension of (0.32 g, 8.4 mmol) $LiAlH_4$. Upon addition, the color of the solution immediately turs red. After complete addition, the ice bath is removed, and the reaction is allowed to warm up to room temperature at a constant stirring for 12 hours. The reaction is quenched by adding water and is further neutralized by a 2 N HCl solution. The red solution immediately turns yellow upon neutralization. The solvent is evaporated, and the resulting mixture is extracted three times using $CH_2Cl_2$. The combined $CH_2Cl_2$ extracts are again washed with water, brine, and dried with $Na_2SO_4$. After filtering and evaporating $CH_2Cl_2$, the reaction mixture is chromatographed using (4:1) $CH_2Cl_2$/hexane as eluent. The final product is obtained in 90% yield as oil, which solidifies upon vacuum or even at room temperature if kept for a longer time. $^1H$ NMR in $CDCl_3$ δ (ppm): 7.31-7.04 (m, 7H), 3.88 (q, 2H, J=6.4 Hz), 3.01 (t, 2H, J=6.4 Hz). $^{13}C$ NMR: 136.8, 135.8, 135.7, 135.2, 131.2, 127.8, 127.5, 126.4, 126.3, 125.7, 124.6, 123.8, 62.7, 32.4.

Synthesis of CTA3

In a 100 mL round-bottom flask equipped with a stir bar and an addition funnel, a solution of 4-cyano dithiobenzoate pentanoic acid (0.300 g, 1 mmol), 2-(2,5-Di(thiophen-2-yl) thiophen-3-yl)ethanol (0.251 g, 1.1 mmol), and 4-(dimethylamino)pyridine (DMAP) (11.13 mg, 0.091 mmol) in 9 mL of dry $CH_2Cl_2$ is cooled to 0° C. under nitrogen. DCC (0.171 g, 1.1 mmol) is dissolved in 1.40 mL of $CH_2Cl_2$ and added dropwise to the reaction flask under stirring. After complete addition of DCC, the reaction is stirred for 5 minutes at 0° C. and then allowed to warm up to room temperature overnight. The solid is then removed by filtration, and the filtrate is washed with diluted aqueous sodium bicarbonate (20 mL) and water (2×20 mL) and finally dried over anhydrous $MgSO_4$. The solution is filtered and the solvent removed to yield the crude product mixture as a red oil, which is further purified by column chromatography on silica gel using 4:6 hexane/ethyl acetate as eluent. The final product is obtained as an orange solid (0.071 g, 12.8% yield). $^1H$ NMR ($CDCl_3$) δ (ppm): 1.88 (s, 3H, —$CH_3$); 2.34-2.67 (m, 4H, $CH_2CH_2$); 2.94-3.0 (t, 2H, —$CH_2$, J=7.6); 4.23-4.35 (t, 2H, —$OCH_2$, J=7.6); 6.98-7.35 (m, 7H. Tertiophene-H); 7.38-7.40 (d, 2H, $J_{cb}$=9 Hz, $J_{ca}$=1.5 Hz, m-ArH); 7.55 (tt, 1H, p-ArH); 7.89 (dd, o-ArH, 2H, $J_{ab}$=8 Hz, $J_{ac}$=1.5 Hz). $^{13}C$ NMR ($CDCl_3$) δ (ppm):24.0, 28.3, 29.8, 33.2, 45.6, 64.4, 118.4, 123.8, 124.6, 125.8, 126.1, 126.4, 126.6, 127.6, 127.9, 128.5, 131.3, 132.9, 134.6, 135.0, 136.6, 144.5, 171.3, 222.1 Elemental analysis calculated for $C_{19}H_{19}NO_2S_3$: C, 58.58; H, 4.92; N, 3.60; 0, 8.21; S, 24.69.

Synthesis of Polymer Brushes

Another embodiment of the present invention includes the synthesis of polymer brushes via RAFT polymerization from the electrodeposited EMIs.

Synthesis of Polystyrene (PSty) Brush via RAFT Polymerization

CTA1 (0.0323 g, $8\times10^{-5}$ mol), AIBN (0.0026 g, $1.6\times10^{-5}$ mol), and Sty (4.166 g, $4\times10^{-2}$ mol) are added to a 50 mL Schlenk Flask. Polymerizations are performed under homogeneous conditions with 5 mL of THF as solvent. The monomer mixture is degassed by bubbling pure nitrogen for 1 hour and transferred to a second Schlenk tube backfilled with nitrogen with the ITO CTA1 surface modified after electropolymerization via cannula. The flask is sealed with a septum rubber and placed in a thermostated oil bath to 60° C. After 20 hours, the slide is removed and the solution is quenched to 0° C. Untethered polymer is removed from the substrates via Soxhlet extraction overnight at 60° C. in THF. Free polymer from the polymerization solution is precipitated in Hexane. This procedure is repeated until no monomer signals are observed by $^1H$ NMR. The resulting polymer is dried in vacuum at room temperature until weight is stable. Free polymer is analyzed by gel permeation chromatography (GPC).

Synthesis of PTBA-b-PSty Diblock Brush Via RAFT Polymerization

CTA1 (0.0323 g, $8\times10^{-5}$ mol), AIBN (0.0026 g, $1.6\times10^{-5}$ mol), and TBA (5.1268 g, $4\times10^{-2}$ mol) are added to a 50 mL Schlenk Flask. Polymerizations are performed under homogeneous conditions with 5 mL of THF as solvent. The monomer mixture is degassed by bubbling pure nitrogen for 1 hour and transferred to a second Schlenk tube backfilled with nitrogen with the ITO CTA1 surface modified after electropolymerization via cannula. The flask is sealed with a septum rubber and placed in a thermostated oil bath to 60° C. After 23 hours, the slide is removed and the free polymers are quenched to 0° C. Untethered polymer is removed from the substrates via Soxhlet extraction overnight at 60° C. in THF. Free polymer from the polymerization solutions is precipitated in a MeOH/$H_2O$ mixture (50/50 v/v). This procedure is repeated until no monomer signals are observed by $^1$NMR. The resulting polymer is dried in vacuum at room temperature until weight is stable. Free polymer is analyzed by gel permeation chromatography (GPC).

Synthesis of PSty Telechelic Brush Via RAFT Polymerization

CTA2 (0.00875 g, $1.37\times10^{-5}$ mol), AIBN (0.00045 g, $2.74\times10^{-6}$ mol), and Sty (1.0 g, $9.60\times10^{-3}$ mol) are added to a 50 mL Schlenk Flask. Polymerizations are performed under homogeneous conditions with 5 mL of THF as solvent. The monomer mixture is degassed by bubbling pure nitrogen for 1 hour and transferred to a second Schlenk tube backfilled with nitrogen with the ITO CTA2 surface modified after electrocopolymerization with carbazole monomer, via cannula. The flask is sealed with a septum rubber and placed in a thermostated oil bath to 60° C. After 24 hours, the slide is removed and the solution is quenched to 0° C. Untethered polymer is removed from the substrates via Soxhlet extraction overnight at 60° C. in THF. Free polymer from the polymerization solution is precipitated in hexane. This procedure is repeated until no monomer signals are observed by $^1H$ NMR. The resulting polymer is dried in vacuum at room temperature until weight is stable. Free polymer is analyzed by gel permeation chromatography (GPC).

Synthesis of PCzEMA Telechelic Brush Via RAFT Polymerization

CTA2 (0.00527 g, $8.94\times10^{-6}$ mol), AIBN (0.0002936 g, $1.7\times10^{-6}$ mol), and PCzEMA (0.500 g, $1.79\times10^{-3}$ mol) are added to a 50 mL Schlenk Flask. Polymerizations are performed under homogeneous conditions with 1 mL of THF as solvent. The monomer mixture is degassed by bubbling pure nitrogen for 1 hour and transferred to a second Schlenk tube backfilled with nitrogen with the ITO CTA2 surface modified after electropolymerization via cannula. The flask is sealed with a septum rubber and placed in a thermostated oil bath to 60° C. After 15 hours, the slide is removed and the solution is quenched to 0° C. Untethered polymer is removed from the substrates via Soxhlet extraction overnight at 60° C. in THF. Free polymer from the polymerization solution is precipitated in MeOH. This procedure is repeated until no monomer signals are observed by $^1H$ NMR. The resulting polymer is dried in vacuum at room temperature until weight is stable. Free polymer is analyzed by gel permeation chromatography (GPC).

Synthesis of CzEMA Brush Via RAFT Polymerization

CTA3 (0.00247 g, $4.48\times10^{-6}$ mol), AIBN (0.000149 g, $8.96\times10^{-7}$ mol), and CzEMA (0.500 g, $1.79\times10^{-3}$ mol) are added to a 50 mL Schlenk Flask. Polymerizations are performed under homogeneous conditions with 5 mL of THF as solvent. The monomer mixture is degassed by bubbling pure nitrogen for 1 hour and transferred to a second Schlenk tube backfilled with nitrogen with the ITO CTA3 surface modified after electropolymerization via cannula. The flask is sealed with a septum rubber and placed in a thermostated oil bath to 60° C. After 18 hours, the slide is removed and the free polymers are quenched to 0° C. Untethered polymer is removed from the substrates via Soxhlet extraction overnight at 60° C. in THF. Free polymer from the polymerization solutions is precipitated in a $MeOH/H_2O$ mixture (50/50 v/v). This procedure is repeated until no monomer signals are observed by $^1H$ NMR. The resulting polymer is dried in vacuum at room temperature until weight is stable. Free polymer was analyzed by gel permeation chromatography (GPC).

Figure 18A:
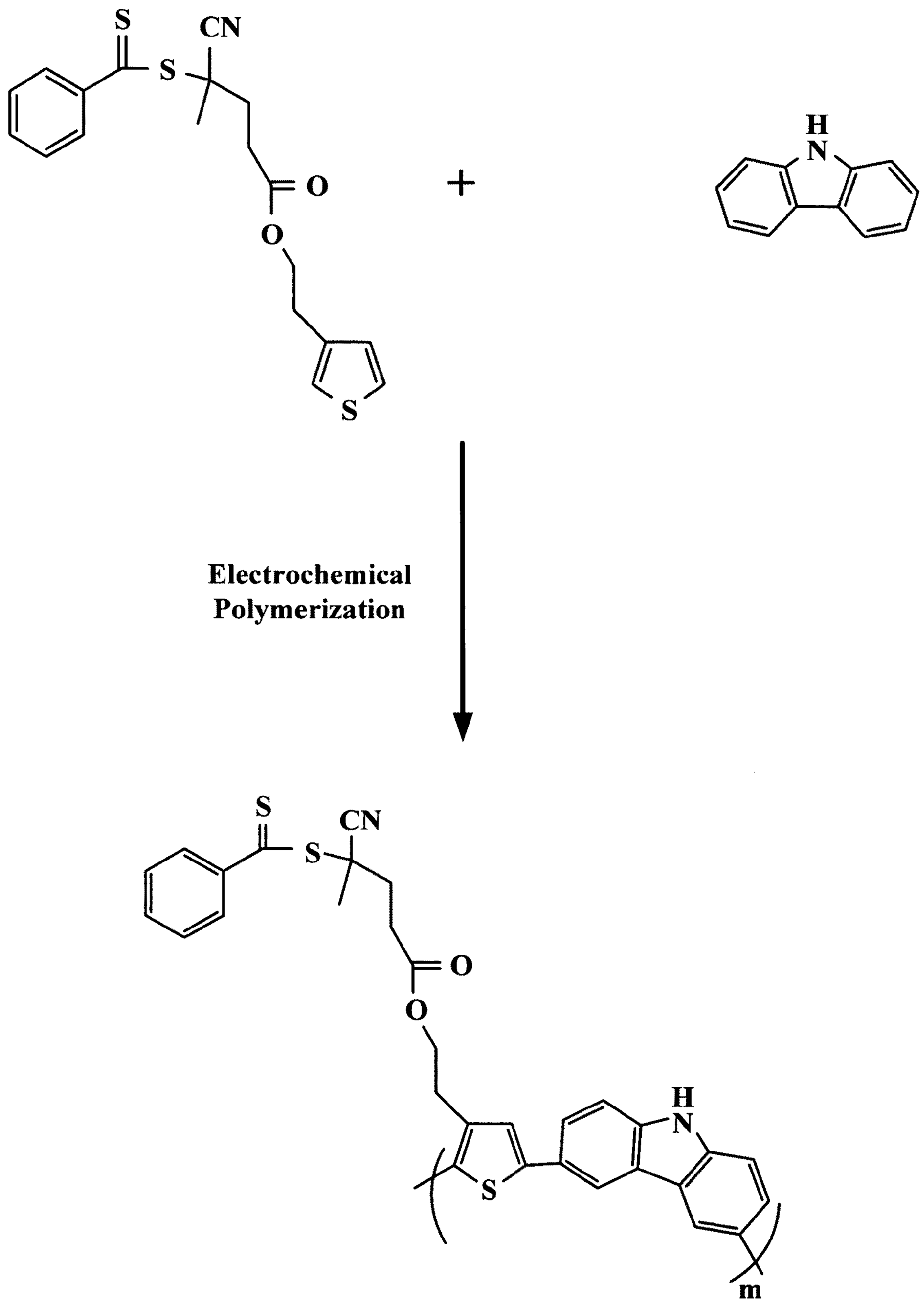
FIG. 18 shows the electropolymerization method for CTA 1 and CTA 2 where CTAs are cross-linked to carbazole units.
Figure 18B:
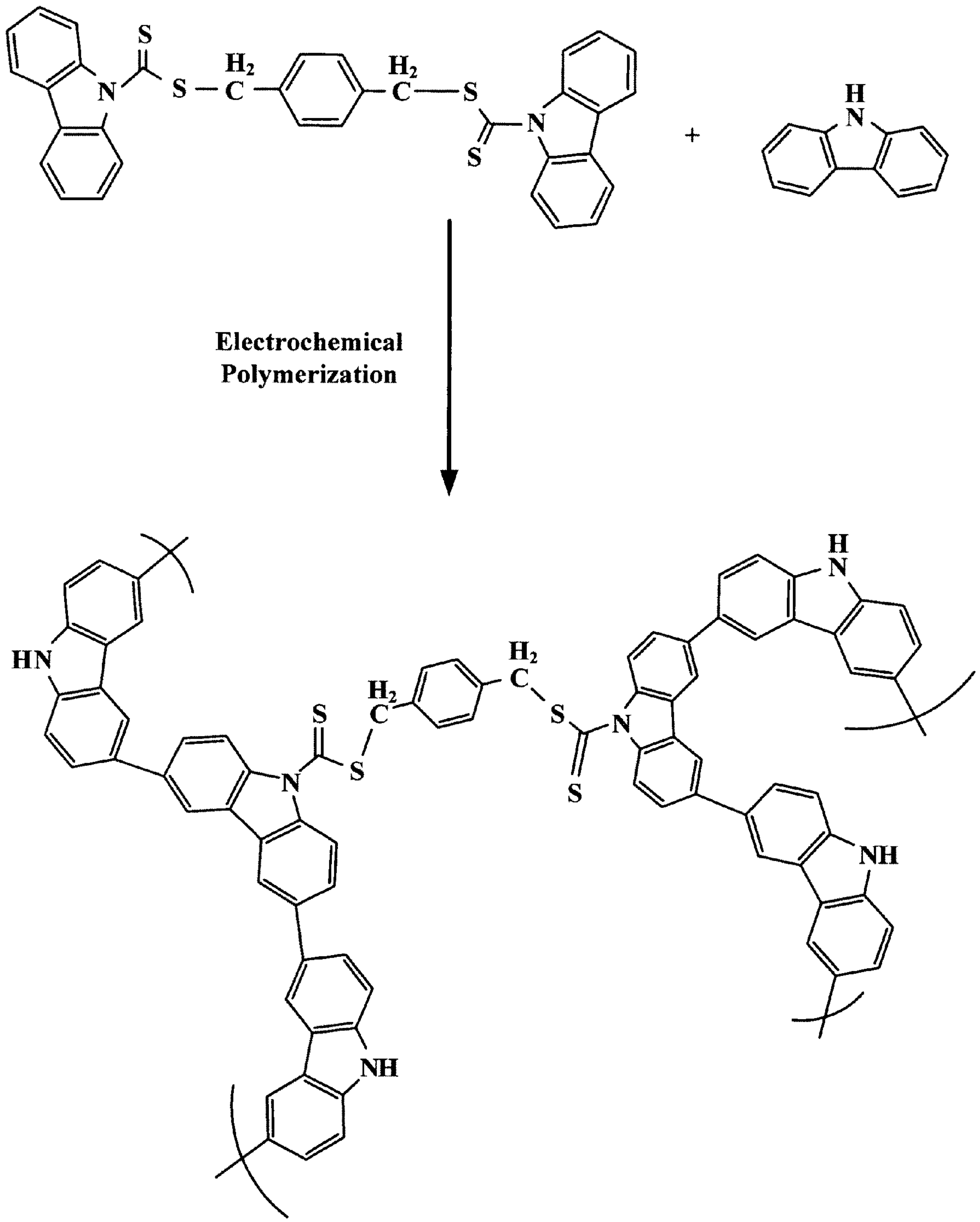

Electropolymerization of the EMI CTAs to Form a Conducting Polymer Initiator Layer Another embodiment of the invention includes the electropolymerization (also referred to as electro grafting or electrodeposition) of the chain transfer agents (also classified as EMI), namely CTA1, CTA2, and CTA3 to form thin films on either ITO or gold surfaces. CTA1 and CTA2 are electrodeposited in the presence of 9H-carbazole in order to decrease the overall potential of the oxidation coupling. The polymerization method is depicted in FIG. 18 and shows the reaction of the CTA1 and CTA2 to a carbazole unit.

FIGS. 19A-F shows results obtained from cyclic voltammetry of various electro copolymers: (A) Polythiophene (0.25 mM CTA 1 and 0.75 mM of carbazole monomer in $CH_2Cl_2$), or PCTA1, (B) Polythiophene (1.0 mM CTA 1 in $CH_2Cl_2$), or PCTA1b, (C) Polycarbazole (0.30 mM CTA2 and 0.70 mM of carbazole monomer in THF), or PCTA2a, (D) 1.0 mM CTA2 solution, or PCTA2b (E) Polythiophene (0.75 mM of CTA 3 in THF, after 30 cycles), or PCTA3a, (F) Polythiophene (0.75 mM in THF, after 50 cycles), or PCTA3b.

Figure 19A:
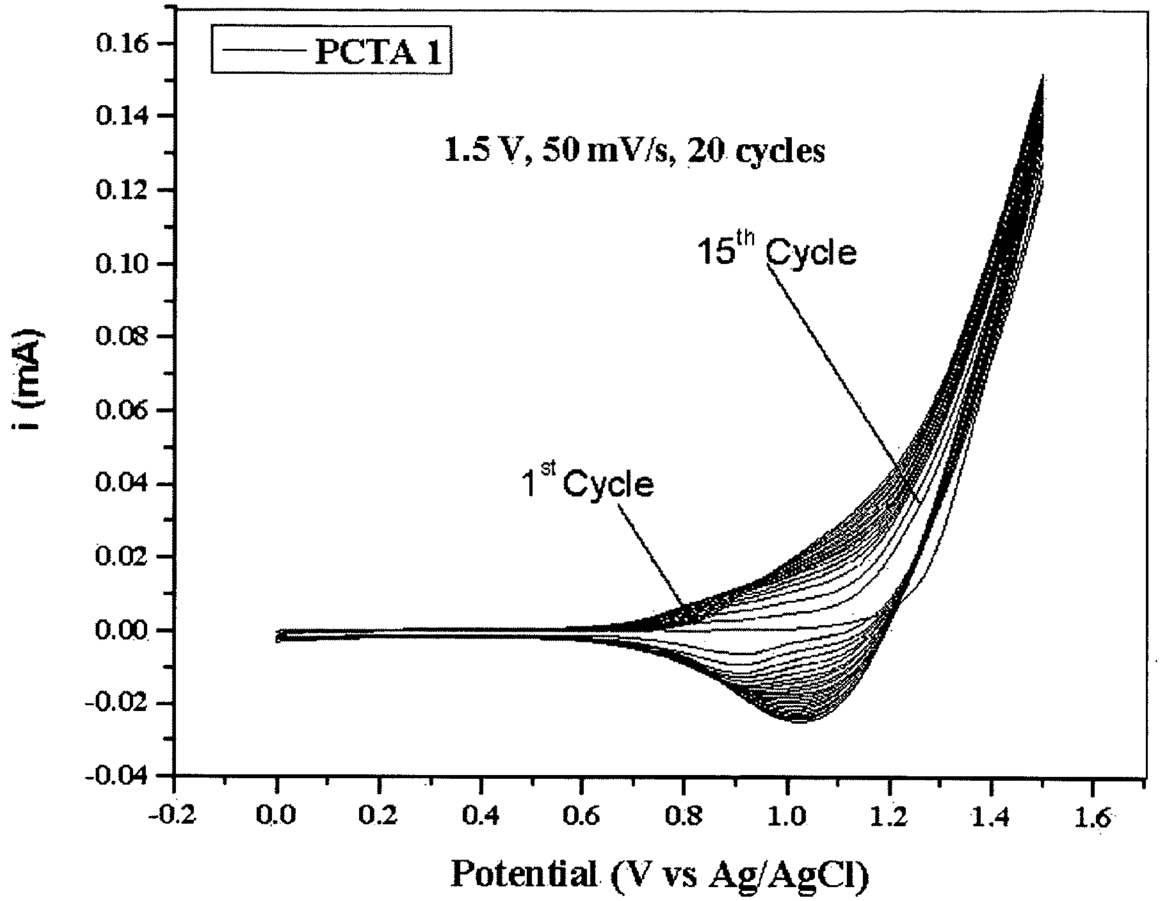
FIGS. 19A-F shows results obtained from cyclic voltammetry of various electro copolymers: (A) Polythiophene (0.25 mM CTA1 and 0.75 mM of carbazole monomer in $CH_2Cl_2$), or PCTA1, (B) Polythiophene (1.0 mM CTA1 in $CH_2Cl_2$), or PCTA1b, (C) Polycarbazole (0.30 mM CTA2 and 0.70 mM of carbazole monomer in THF), or PCTA 2a, (D) 1.0 mM CTA2 solution, or PCTA2b (E) Polythiophene (0.75 mM of CTA3 in THF, after 30 cycles), or PCTA3a, (F) Polythiophene (0.75 mM in THF, after 50 cycles), or PCTA3b.
Figure 19B:
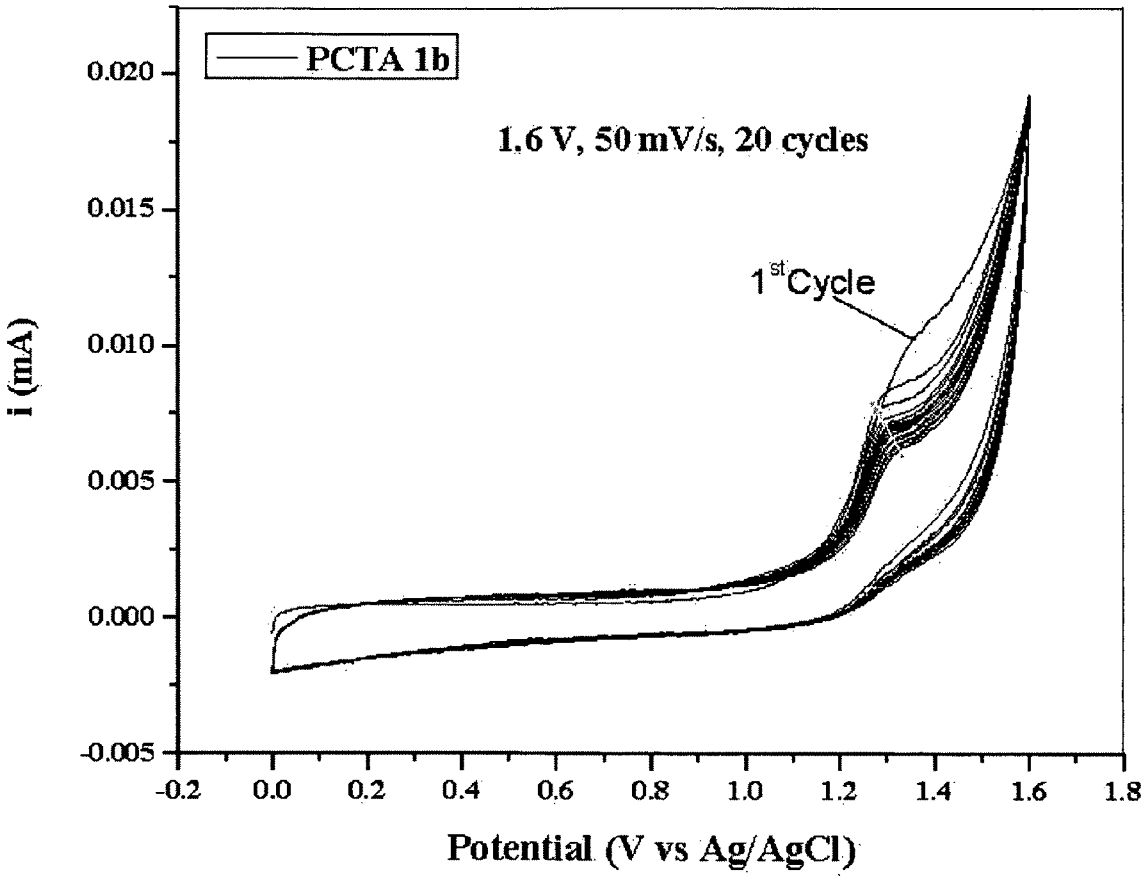

More specifically, FIG. 19A shows the cyclic voltammograms for CTA1 on ITO after 20 cycles at a scan-rate of 50 mV/s, sweeping the voltage from 0 to 1.5 V. The electrochemical polymerization is performed using 0.25 mM of CTA1 and 0.75 mM of carbazole monomer in $CH_2Cl_2$ containing 0.1 M TBAP as an electrolyte. The oxidation onset occurs at 0.60 V. Since carbazole has a lower oxidation potential (monomer) compared to thiophene, carbazole first initiates radical cations in any given solution composition. The thiophene onset oxidation potential in FIG. 5*b* is 0.9 V, confirming the formation of polythiophene. Initially, the oxidation potential peak occurs at 1.35 V, but once the electrochemical reaction occurs, the oxidation peak shifts to 1.38 V, which consistent with the presence of conjugated structures.

Note that this procedure of employing carbazole with the CTA1 demonstrates that it is possible to form copolymers with the EMI using other monomers and co-deposit them electrochemically.

Figure 19C:
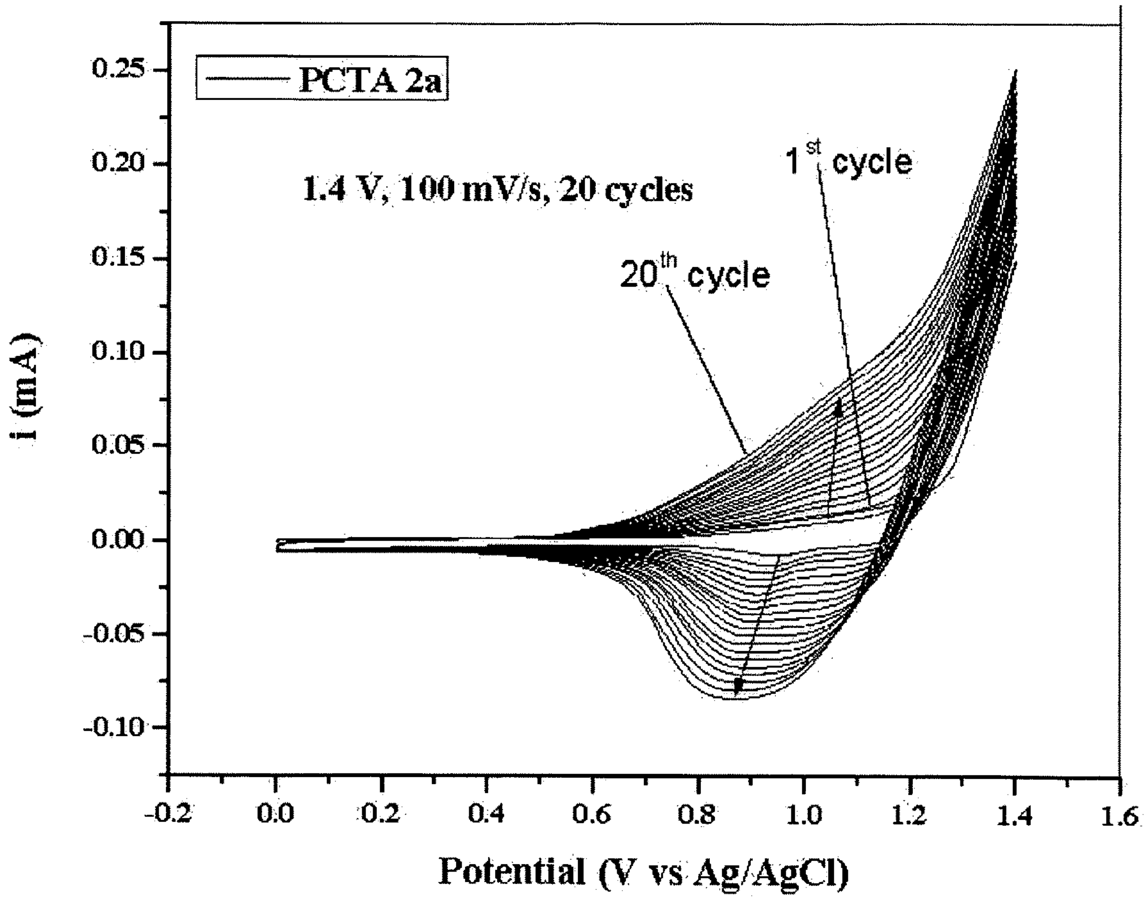

FIG. 19C shows the electrochemical reaction between CTA2 and the carbazole monomer (0.30 mM and 0.70 Mm in THF, respectively). The oxidation onset occurs at 0.50 V, and the oxidation peak at 1.0 V, with a constant increase in the oxidation current peak, which is consistent with polymerization taking place on the substrate.

Figure 19D:
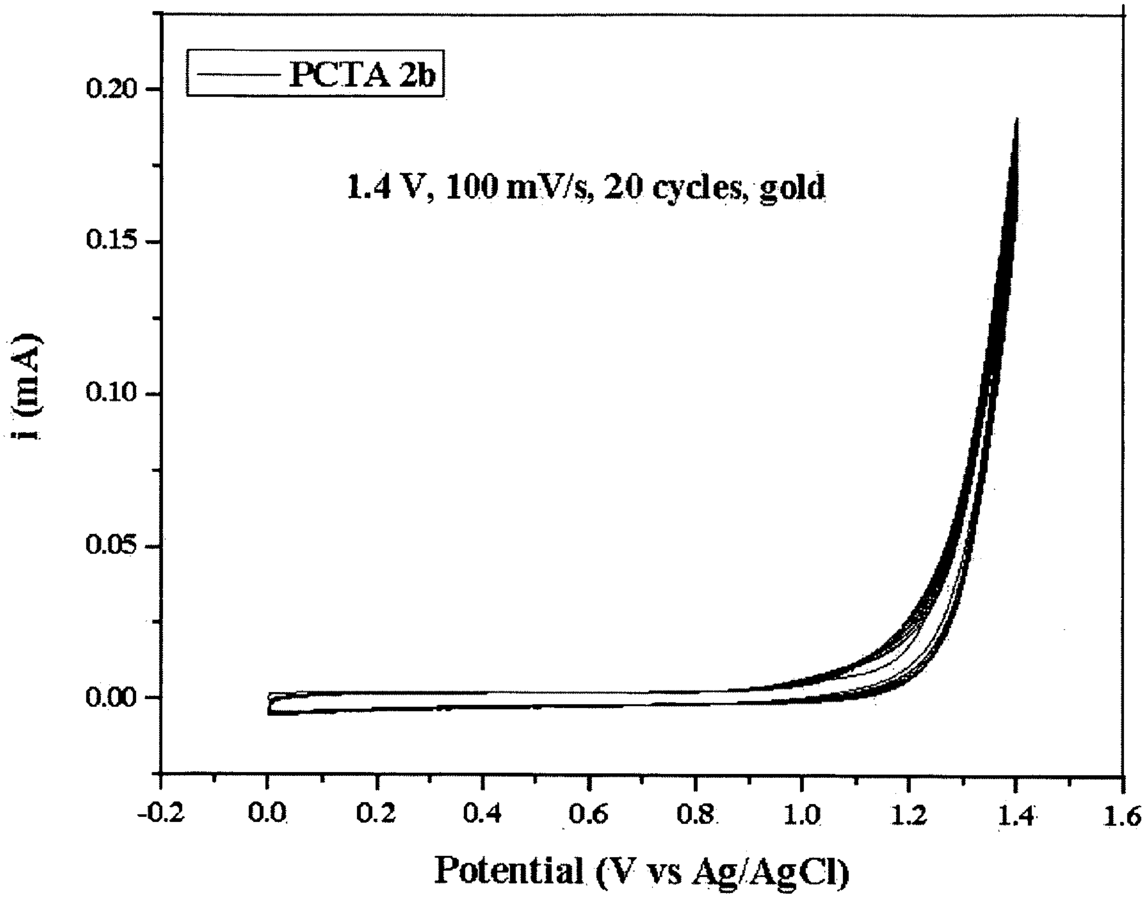

FIG. 19D is the cyclic voltammogram for CTA2 (1 mM) on a gold substrate when the potential is ramped from 0 to 1.4 V. No reaction is observed because of the deactivation of the electro active positions in the carbazole by the electro withdrawal dithioester moiety. In addition, no reduction peak for gold is observed, confirming that the oxidation and reduction peaks observed during the electropolarization reaction are exclusively due to the formation of polycarbazole. Carbazole monomer decreases the overall oxidation potential of the polymer while increasing the planarity and the conjugation of the thiophene. For CTA1, a high feed ratio of carbazole to thiophene (75:25 ratios) is required in order to enhance the electropolymerization process. Two anodic oxidation peaks, $E_{pa1}$ and $E_{pa2}$ are observed with CTA1, at 0.80 V and 1.1 V, respectively. However, just one reduction cathodic peak $E_{pc}$ is observed at 1.03 V. After five cycles, a broad peak between the two potentials constantly grows, suggesting the formation of the copolymer.

Figure 19E:
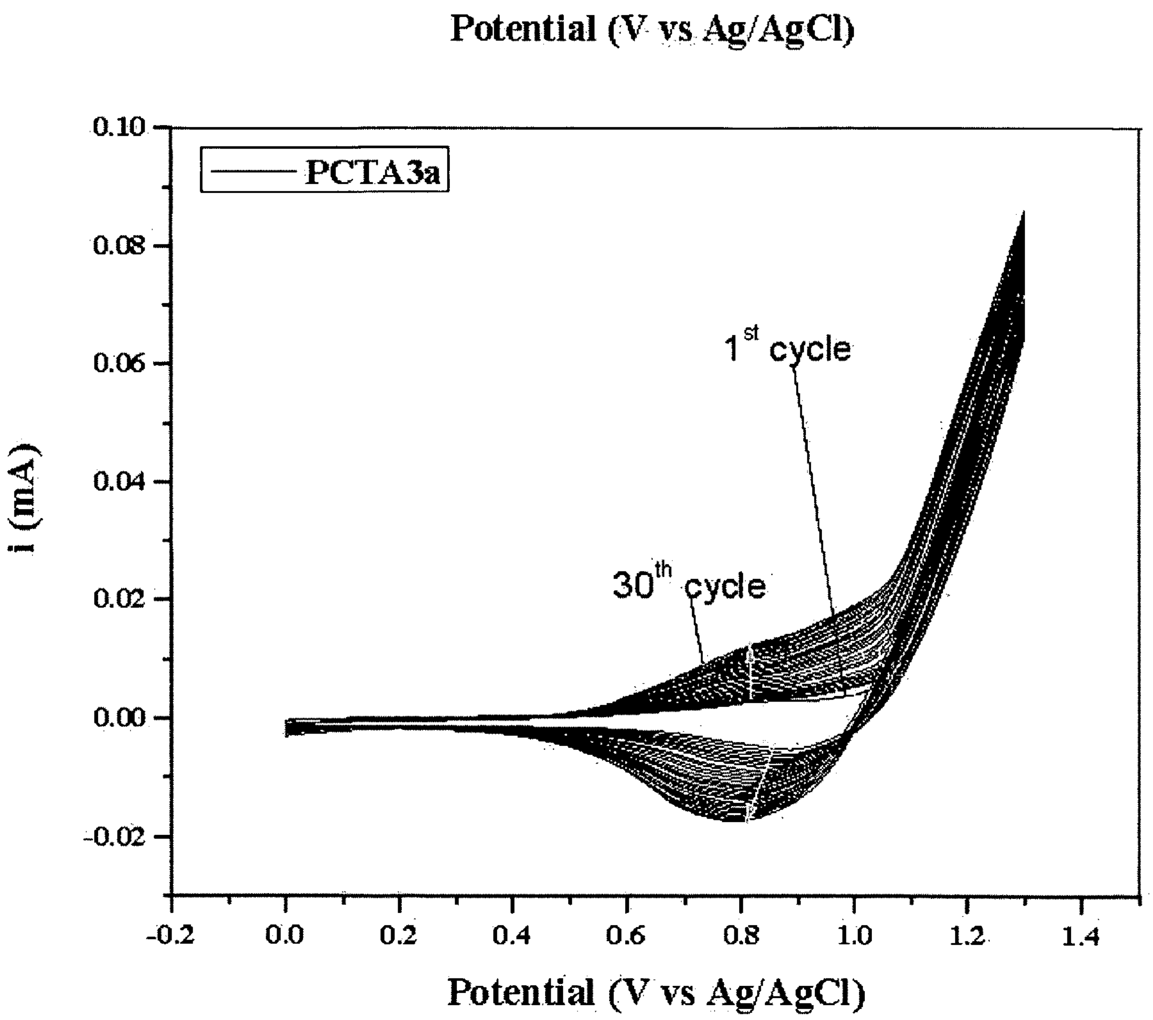
Figure 19F:
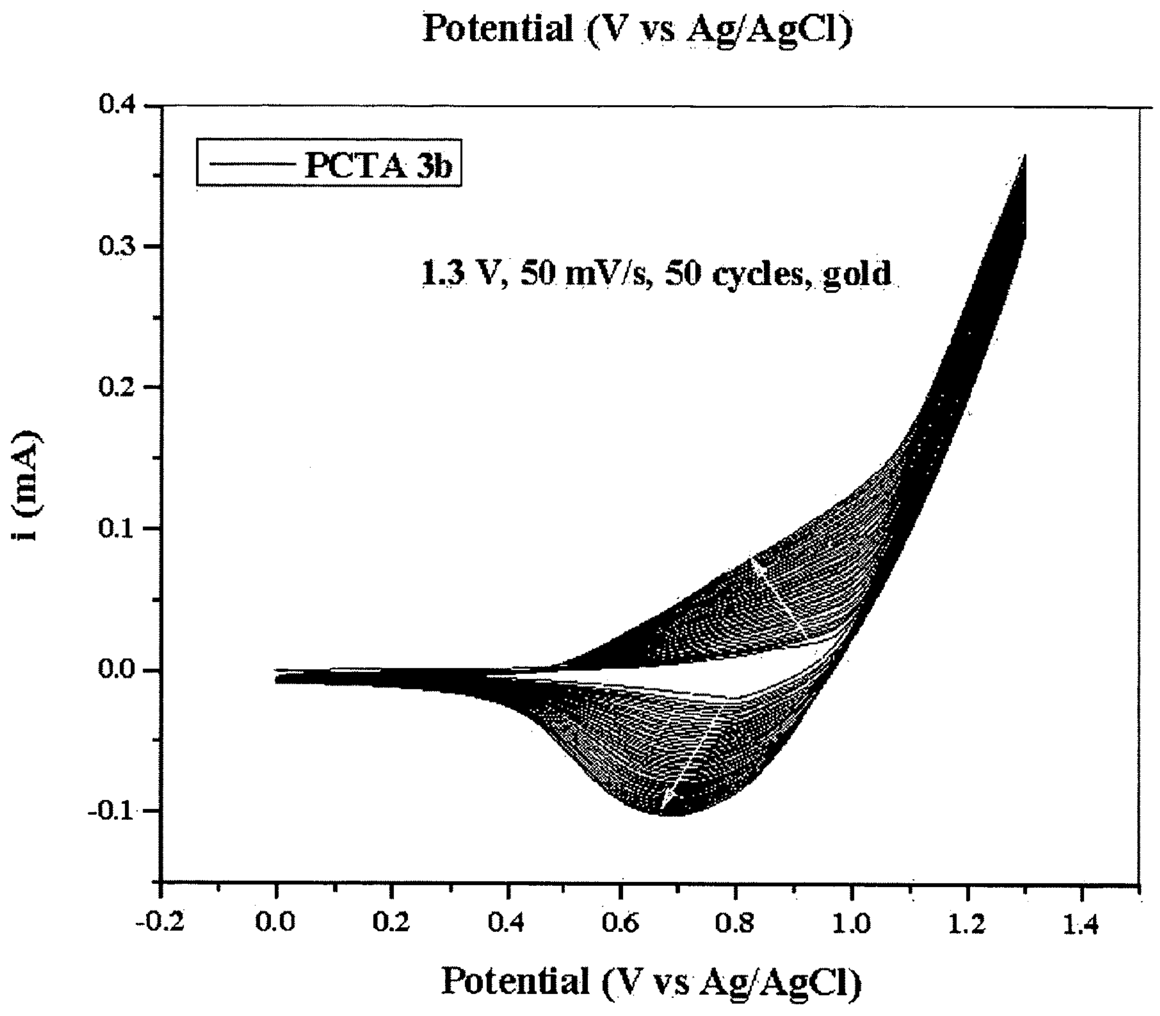

FIGS. 19E and 19F shows the cyclic voltammograms of polythiophene from the terthiophene CTA3. Oxidation onsets are observed at 0.57 V and 0.53 V respectively, meaning that terthiophene has a slightly lower oxidation onset than that of carbazole and thiophene monomers. The extended conjugation of this compound allows for an easy oxidation coupling. The current peaks grow as the number of cycles increases, while the reduction peak shifts from 0.79 V at the first cycle to 0.64 V after 50 cycles (FIG. 19F), confirming the formation of polythiophene. In the case of the CTA3, the presence of carbazole during the polymerization reaction is unnecessary since the extended conjugation of the monomer decreases the overall oxidation potential of the thiophene monomer.

Optical Properties of the EMIs Immobilized on ITO Substrates

Figure 20A:
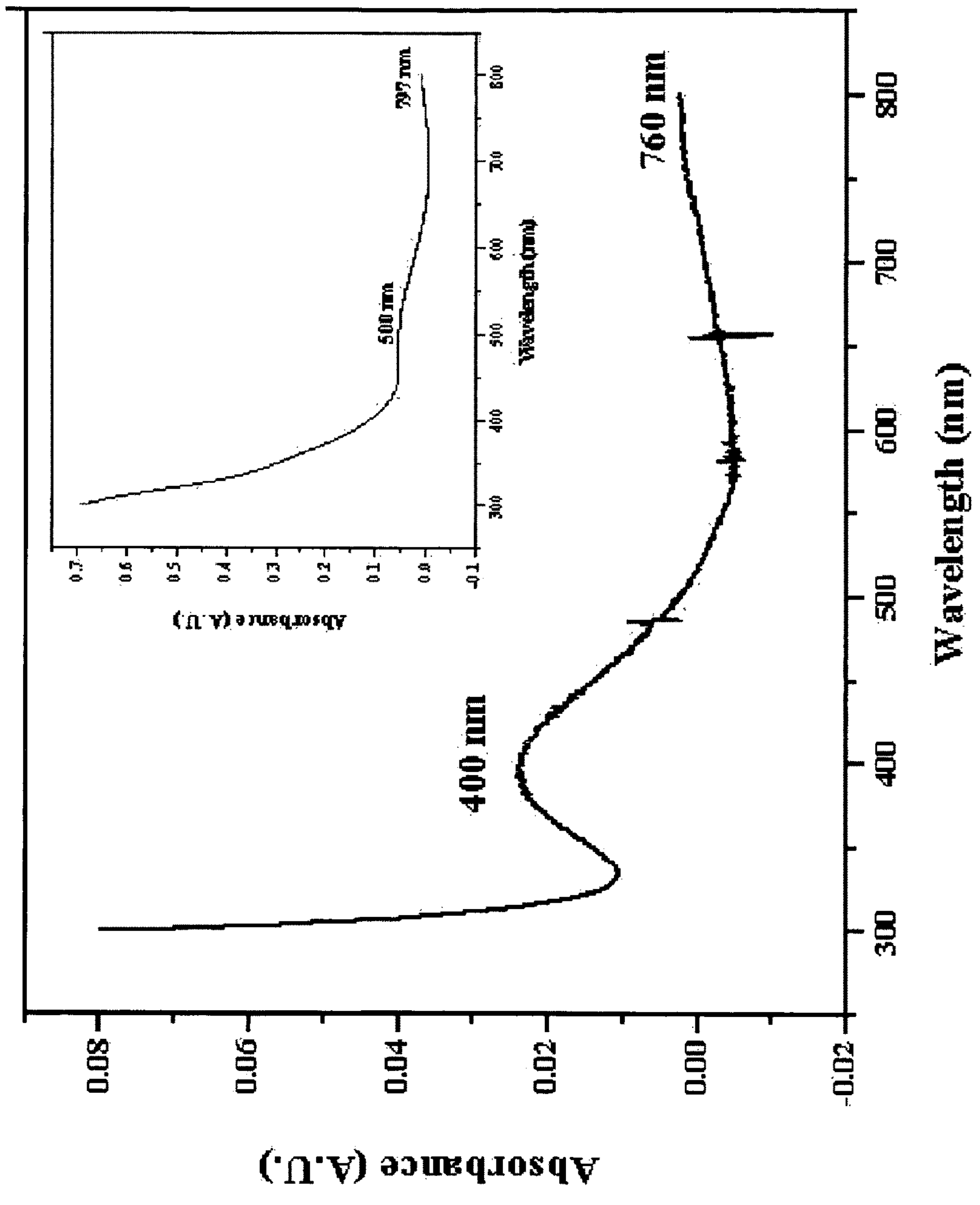
Figure 20B:
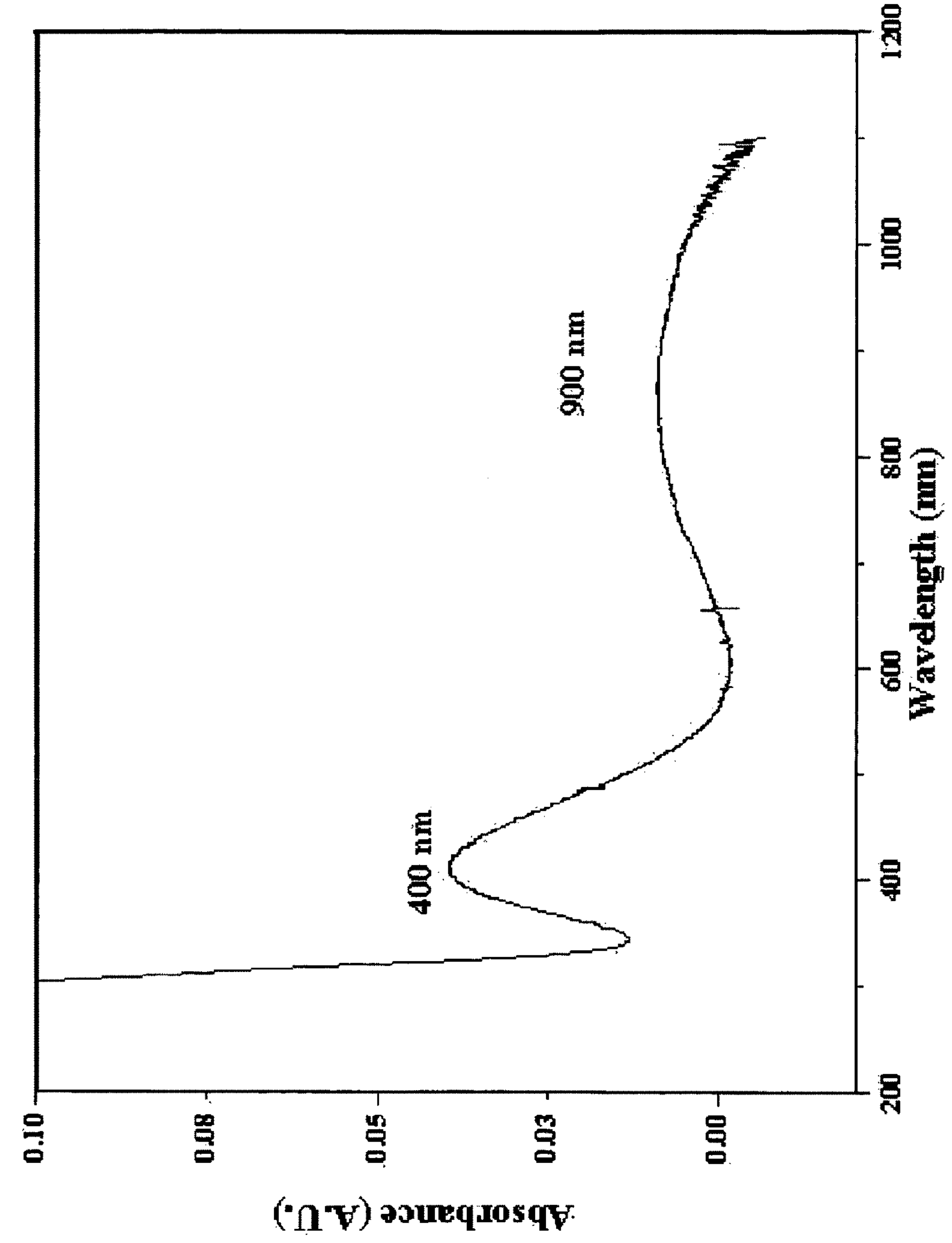
Figure 20C:
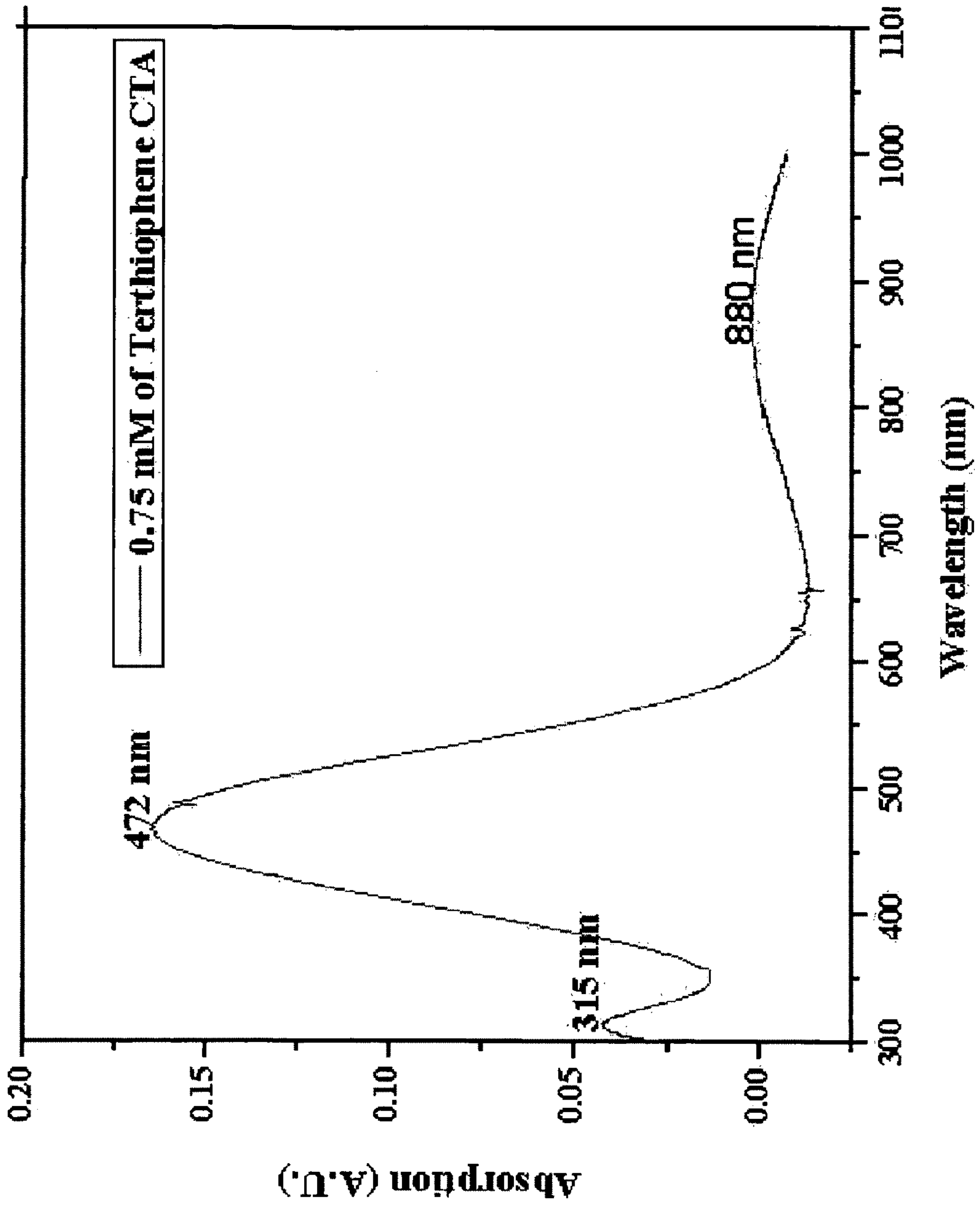
Figure 21A:
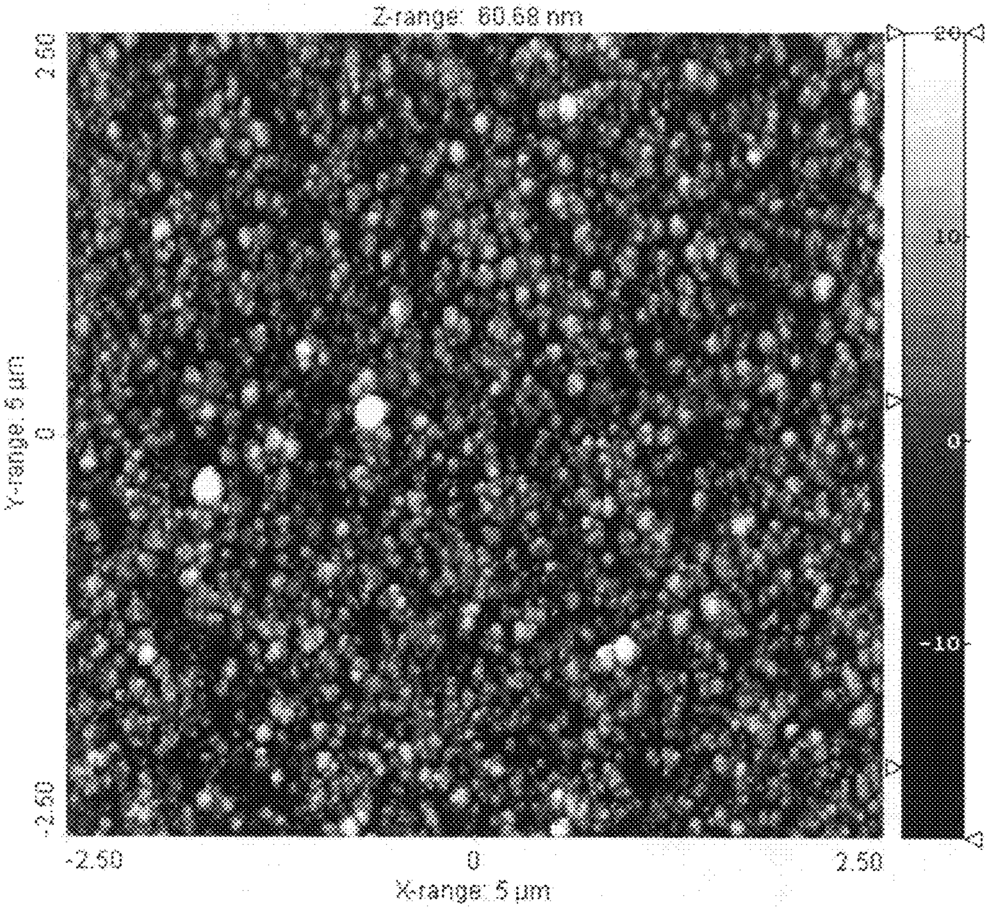
FIGS. 21A-F show AFM images of polymers PCTA1, PCTA2 and PCTA3 obtained after electropolymerization. PCAT1 is formed on ITO surface, while PCTA2 and PCTA3 are formed on gold surfaces.
Figure 21B:
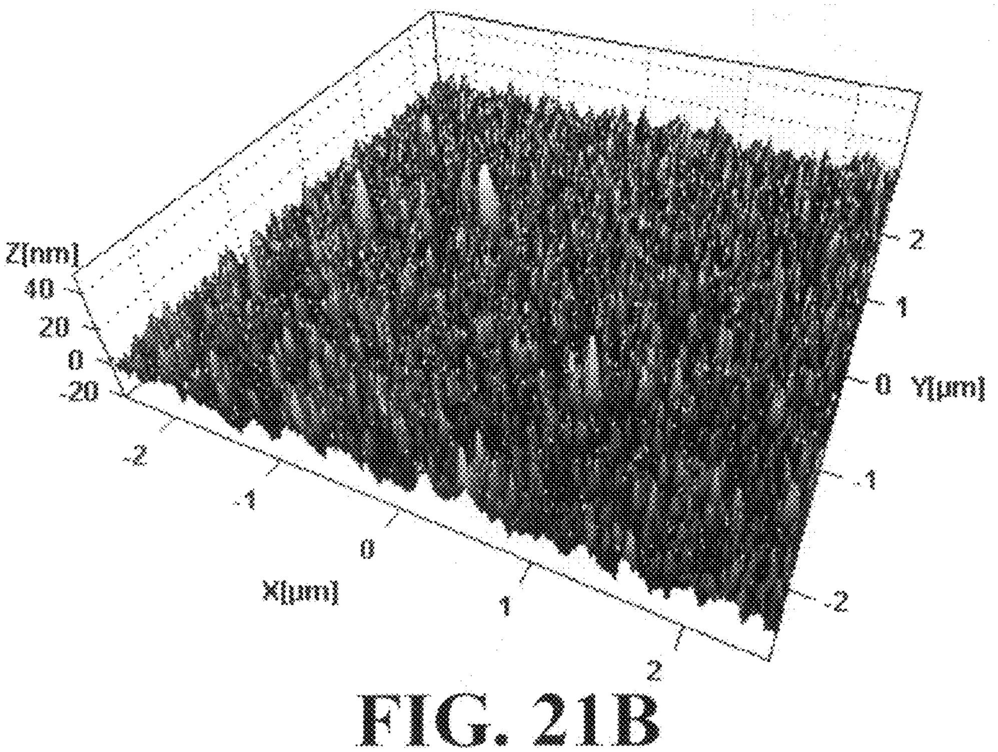
Figure 21C:
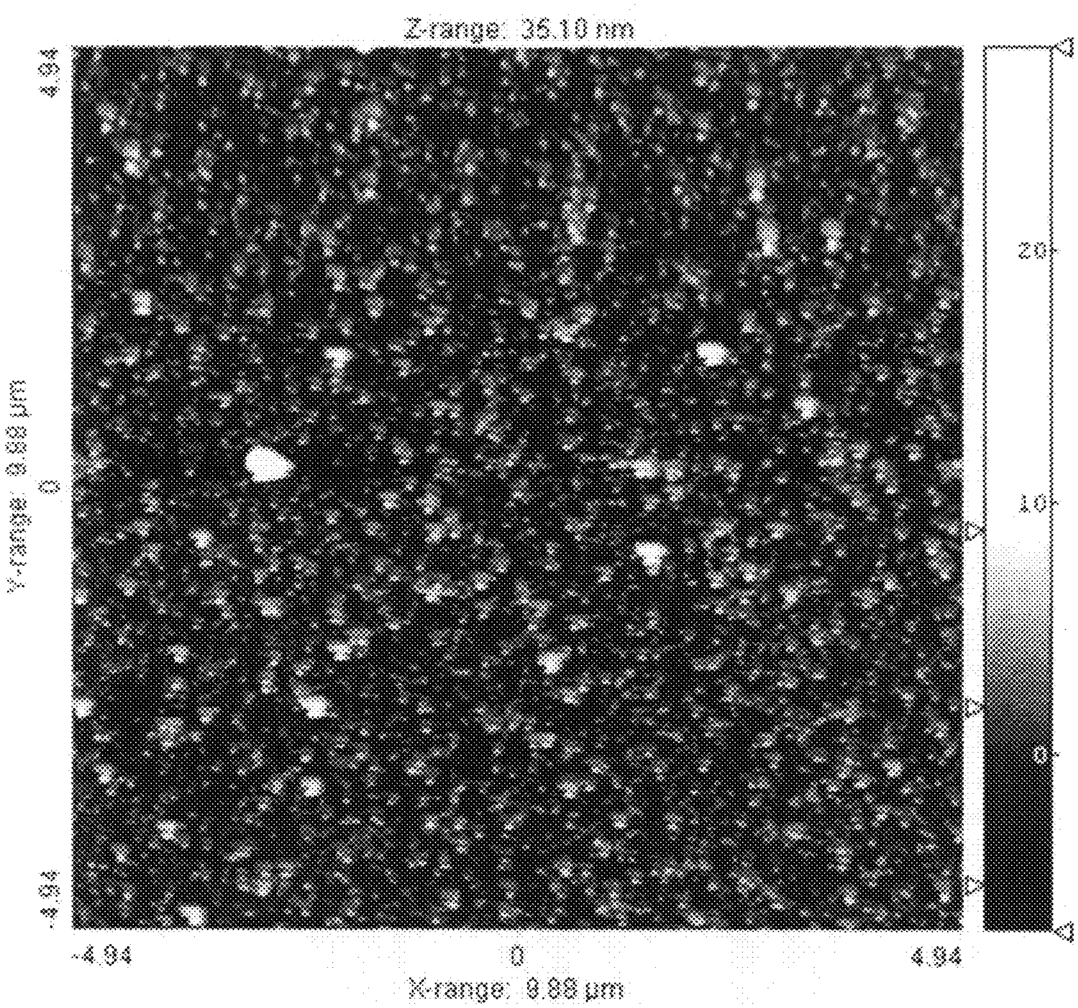
Figure 21D:
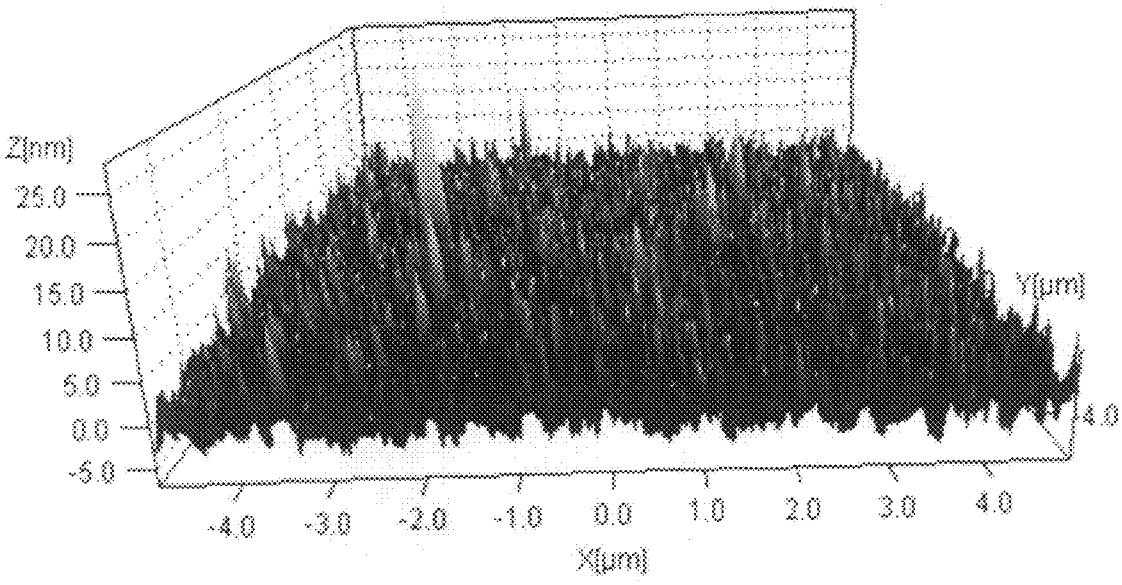
Figure 21E:
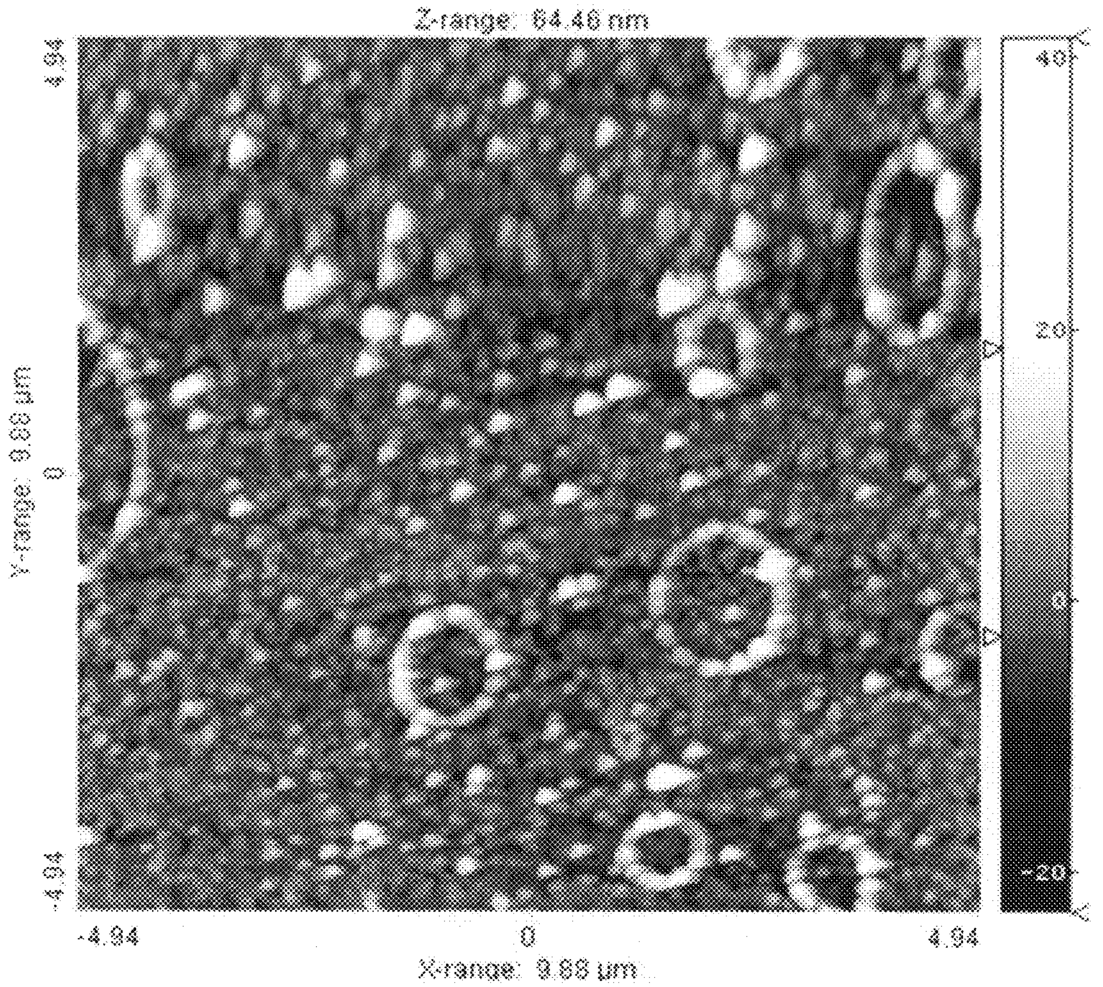
Figure 21F:
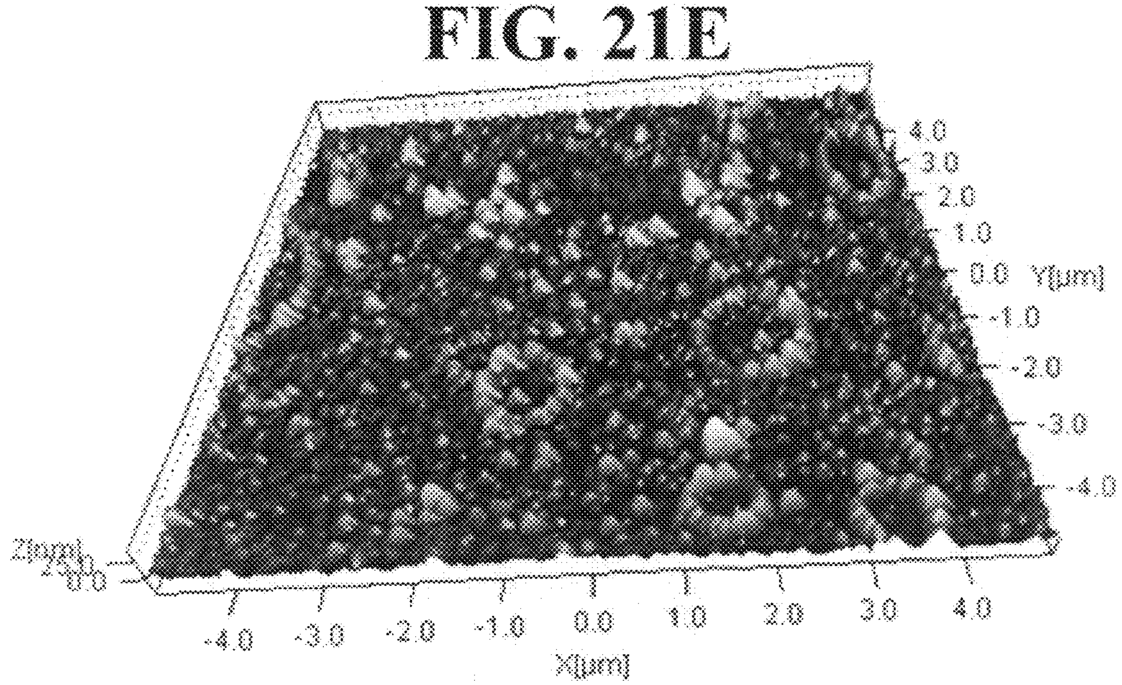

Another embodiment of the present invention includes the optical properties of the electropolymerized CTAs once immobilized on ITO substrates. Note that this has resulted in the formation of conjugated polymer species which have different electro-optical properties from the original EMI. FIGS. 20A-C shows the UV-Vis spectrum of the CTAs electropolymerized on ITO substrates. FIG. 20A shows that the absorbance peak for PCTA1a are 400 nm and 768 nm, which is the typical of polycarbazole. FIG. 20B shows absorbance peaks for PCTA2a at 400 nm and 900 nm, which corresponds to the polaron and bipolaron formation and band gap of polycarbazole due to the formation of polycarbazole. FIG. 20C shows the UV-vis for PCTA3a. Three absorption bands are observed at 315, 472 and 880 nm corresponding to band gap, polaron and bipolaron transitions of polythiophene.

Surface Initiated Polymerization to Form Polymer Brushes as the Topmost Layer

Another embodiment of the present invention includes the surface initiated polymerization (SIP) from the electrodeposited EMI chain transfer agents (CTAs) once they are immobilized on a substrate such as ITO. This process results in the formation of polymer brushes. To this end, PSty homopolymer brush and PSty-b-PTBA diblock copolymer brush are synthesized. Free CTA and free initiator are also introduced to ensure a controlled polymerization process and to estimate the molecular weight of the polymer brushes.

PSty Homopolymer Brush

PSty homopolymer brushes are formed using a 5:1 molar ratio between CTA1 to initiator in THF at 60° C. for 20 hours, and a molar ratio of 500:1 of monomer to CTA. The formation of the PSty homopolymer brush is confirmed by AFM images as evidenced by the data shown in Table 3. The formation of the polymer is observed by an increase in height.

TABLE 3

| Thickness (Ellipsometry) and Normal Contact Angle Values of Polymer Brushes of this Invention | | |
|---|---|---|
| Surface Structure | Thickness (nm) | Normal Contact Angle (°) |
| CTA Modified Gold | 22.4 | 75 |
| PS Gold | 36.1 | 97 |
| PS-b-PTBA Gold | 98.2 | 91 |

Moreover, contact angle measurements show a slight increase in the normal contact angle in water, that is from 82° to 85° due to a slightly more hydrophobic character of the polymer film. The film thickness as calculated from ellipsometry measurements (FIGS. 21A-F). The presence of free CTA in solution increases the probability that a radical on the surface reacts with a free CTA rather than a surface immobilized CTA, reducing the amount of radical-radical coupling probability. The molecular weight (MW) of the homopolymer brush is estimated by using the free homopolymer in the solution, resulting as 9502 g $mol^{-1}$, with a narrow polydispersity index or PDI of 1.05.

In addition, it is possible to carry out the deposition of the EMI by chemical oxidation methods. Oxidative chemical polymerization is another alternative to anodic electropolymerization. Chemical oxidative polymerization will involve spin-coating the EMI as a thin film on the substrate and dipping the spin-coated film onto a solvent bath containing a solution of a chemical oxidant such as $FeCl_3$ followed by solvent washing to remove excess $FeCl_3$. This solvent should not dissolved the EMI spin-coated film prior to polymerization. Note that it is also possible to demonstrate copolymers with the EMI polymerization using other monomers and co-deposit them using this chemical oxidative method.

PSty-b-PTBA Diblock Copolymer Brush

PSty-b-PTBA diblock copolymer brush is synthesized as follows. The PSty was first grafted on the electrodeposited CTA1 on the ITO surface, as described in the previous paragraph. This therefore acts as a macroCTA (a polymer in which a CTA group is attached) to synthesize the PSty-b-PTBA diblock copolymer brush on ITO substrates. Free CTA is used to estimate the molecular weight and PDI of the PTBA obtained from the solution. The average molecular weight of the PTBA polymer is estimated to be $M_n$=12,701 $gmol^{-1}$ and the PDI 1.07. The contact angle measurements in water for PSty-b-PTBA diblock copolymer brush showed a decrease from 85° to 81° which is expected due to the slightly more hydrophilic character of the poly tert-butyl acrylate block. The polymerization process to form a diblock is well controlled as evidenced by the narrow polidispersities (solution GPC) and the high level of homogeneity as observed by AFM imaging (FIG. 21A-F).

PCzEMA Telechelic Homopolymer and PSty-b-PCbzEMA-b-PSty Triblock Copolymer

CTA 2 was also evaluated for electropolymerizability and utility for polymer brush formation. In this manner, the PCzEMA telechelic homopolymers and PSty-b-PCbzEMA copolymer brushes can be formed from the CTAs electrografted onto ITO or gold surfaces.

The polymerization of Sty and CzEMA monomers were first used to study the reactivity of different kinds of monomers for this electrografted CTA. CTA2 was first electrografted on ITO as previously described. Polymer brushes were grown as previously described. A homopolymer brush of CzEMA monomer was first studied. The molar ratios between monomer, initiator and CTA2 are 200:0.2:1 in THF at 60° C. during 15 hours. From the free polymerization in solution, the MW estimated from the free polymer is 312,857 $gmol^{-1}$ and the PDI is 1.79 for PCzEMA. The styrene monomer was also studied in order to see the controllability of the process, using 400:0.2:1 monomer, initiator and CTA2 ratios. From the free polymerization in solution, a MW of 10.949 $gmol^{-1}$ and PDI of 1.201 was obtained.

The results showed the poor ability to control the polidispersity in the methacrylate monomer CzEMA which can be attributed to the stability and greater reactivity of the tertiary radical to these monomers, and the stability of the radical of the transfer agent formed after the initiation step in the reaction. In the Sty reaction, the molecular weight and PDI shows a more controlled reaction.

Ellipsometric measurements were done to determine the dimensions of the layers that were electrografted for the CTAs and the polymer brushes grown. The thickness for the polycarbazole (CTA2 electrografted) was obtained giving a 23 nm thickness, and after RAFT with CzEMA process the thickness was measured again, giving a 31 nm or a net thickness change of 8 nm. Note that in this case, the corresponding thickness increase is low compared with the 312,857 $gmol^{-1}$ molecular weight obtained in solution. Normal contact angle measurements showed values of 83° on CTA2 modified gold substrate and 86° after the PCzEMA telechelic brush has been formed. It should be noted that the structure of CTA2 is different from CTA1 and CTA3 in that it has a symmetrical thiocarbamate structure allowing electrochemical reactivity on the two carbazole groups. This leads to an electrochemical crosslinking rather than a linear polymerization process.

This can also explain the reason for a different reactivity compared to CTA1.

The CTA3 (polythiophene bearing a dithiobenzoate moiety) modified surface was also used to grow some PCzEMA polymer brushes in order to analyze their availability as CTAs for SIP-RAFT polymerization. The molar ratio between monomer, initiator and CTA3 were 100:0.2:1 and the reaction was performed during 9 hours, at 60° C. Free CTA and polymer were used in order to estimate Mn and PDI of the polymer brushes, obtaining 67,719 $gmol^{-1}$ as a molecular weight and 1.15 as a PDI, showing a good control over polymerization reaction on this CTA. The structure of the CTA 3 is shown in FIG. 17. Ellipsometric measurements show an increase on the thickness from 18 nm to 28 nm, demonstrating the formation of the polymer brushes on top of the electrografted CTA. Contact angle measurements showed and increase since 70° to 77° after RAFT homopolymer brush modification on the electrografted CTA on ITO surfaces.

The EMI initiators can be constructed to be active for free-radical polymerization or grafting, anionic polymerization or grafting, cationic polymerization or grafting, metathesis polymerization or grafting as long as the initiator is first electrochemically deposited to the surface. Representative examples of EMI initiators are shown in FIG. 22, where each example includes a reactive group that can function as a monomer for the given polymerization conditions.

Section IV

Embodiments of the present invention also provided new methods for the grafting of complex polymer coatings onto conducting surfaces. These methods offer a new and convenient approach for the preparation of polymer coatings using electrochemically grafted macro monomers. Macromonomers are comprised of two main parts: a) an electrochemically active side-group and/oror end-group that can be electrodeposited onto a conducting surface, and b) a macromolecule such as but not limited to a polymer that provides the outer layer with desirable biological and materials properties for a variety of surface mediated applications. These films are improved compositions and methods for preparing such polymers for chemical and biological applications.

Embodiments of this invention also provide a method for preparing polymer coatings comprising the steps of: 1) synthesizing a preformed polymer or macromonomer with electrochemically active groups on a macromolecule (such as, but not limited to a polymer), 2) electrochemically depositing this macromonomer on an electrode surface, and 3) testing the function of the grafted polymer coating. The electropolymerizable moiety is reacted through electrochemical polymerization and/or crosslinking onto an electrode surface. Such polymer coatings are particularly relevant for applications including but not limited to anti-corrosion, non bio-fouling, anti-reflection surfaces, electrochromic coatings, water resistant coatings, packaging, and displays.

The present invention discloses the synthesis, characterization, and electrochemical grafting of carbazole containing polyethylene glycol (PEG) macromonomers and its use as precursor (or pre-formed polymer) to form a polymer brush through an electrochemical polymerization and crosslinking reaction. While PEG is the macromolecule described in this approach, other pre-formed macromolecules can also be utilized provided it has the basic design including a reactive electropolymerizable group. Specifically, the present invention offers a method for the attachment of tetra(ethylene glycol) (TEG) G1 carbazole (Cbz) dendron and poly(ethylene glycol) (PEG) $G_1$ carbazole (Cbz) dendrons on conducting surfaces. The carbazole group provides electrochemical functionality, while the PEG provides the polymer brush functionality. In addition, the present invention discloses a method for combining the attachment of these macromonomers with self-assembled monolayer (SAM) in order to create surfaces that are highly resistant to protein adsorption. This process results in a two-layer structure where one layer is attached to the electrode surface by electrodeposition of a carbazole group, and a second layer, attached to the first one, contains the polymer brush made of PEG. Other types of chemical structures for the electropolymerizable monomers include but are not limited to pyrrole, thiophene, and aniline for anodic electropolymerization; or acrylate, styrene, and other vinyl derivatives for cathodic electropolymerization. Two or more electroactive monomers can also be combined as a copolymer to form various conjugated and electrically conducting polymer films via anodic or cathodic polymerization.

The present invention refers to the preparation of thin polymer coatings based on a three-step process involving: 1) synthesizing a preformed polymer or macromonomer with electrochemically active groups on a macromolecule (such as but not limited to a polymer), 2) electrochemical (or oxidative chemical) deposition of the resulting macromonomer on an electrode surface, and 3) testing the function of the grafted polymer coating for the prevention of protein absorption. The electrochemically active macromonomer is comprised of two chemical entities: 1) an electropolymerizable moiety that can be anchored to an electrode metal or metal oxide surface through an electrochemical process, and 2) a preformed macromolecule that gives the coating the desired functionality when exposed to the environment. Such a design is suitable for either anodic electropolymerization (or oxidative chemical polymerization) using groups such as, but not limited to carbazole, thiophene, fluorene, pyrrole, or aniline or for cathodic polymerization using groups such as, but not limited to methacrylate and styrene, and other vinyl containing monomers.

Figure 23:
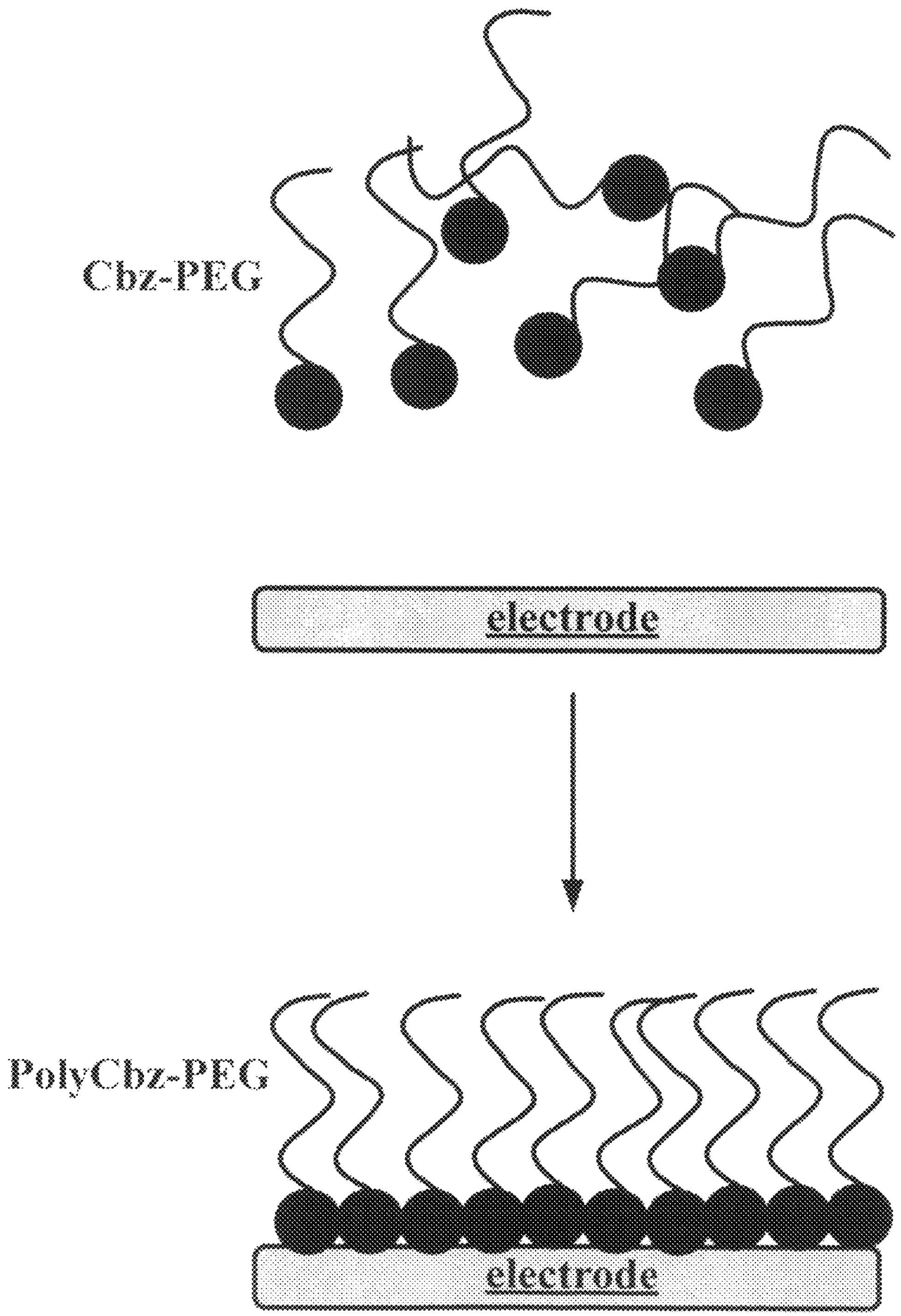
FIG. 23 depicts a schematic of a grafting method of this invention used to prepare electrochemically deposited macromonomer onto an electrode surface.

FIG. 23 illustrates the steps involved in the grafting of an electrochemically active macromonomer comprising of an electropolymerizable head moiety (e.g., carbazole group, or Cbz), and a macromolecule tail moiety (e.g., poly ethylene glycol, or PEG). The macromonomer is attached onto a substrate via an electrochemical reaction, a process referred to as electropolymerization grafting or electrodeposition or electrochemical crosslinking. The electropolymerization grafting can be tailored by varying the concentration of the macromonomer, electrolyte composition, solvent, and rate of electropolymerization. It should be recognized that there are many methods of electropolymerization: cyclic voltammetry, potentiostatic, chronoamperometric, pulsed voltammetry, and combined electrochemical conducting or current sensing microscopy methods.

In addition, it is possible to carry out the deposition of the EMI by chemical oxidation methods. Oxidative chemical polymerization is another alternative to anodic electropolymerization. Chemical oxidative polymerization will involve spin-coating the EMI as a thin film on the substrate and dipping the spin-coated film onto a solvent bath containing a solution of a chemical oxidant such as $FeCl_3$ followed by solvent washing to remove excess $FeCl_3$. This solvent should not dissolve the EMI spin-coated film prior to polymerization. It should be recognized that it is also possible to demonstrate copolymers with the EMI polymerization using other monomers and co-deposit them using this chemical oxidative method. It should be recognized that other chemical oxidants are also possible involving a radical cation formation.

Figure 24A:
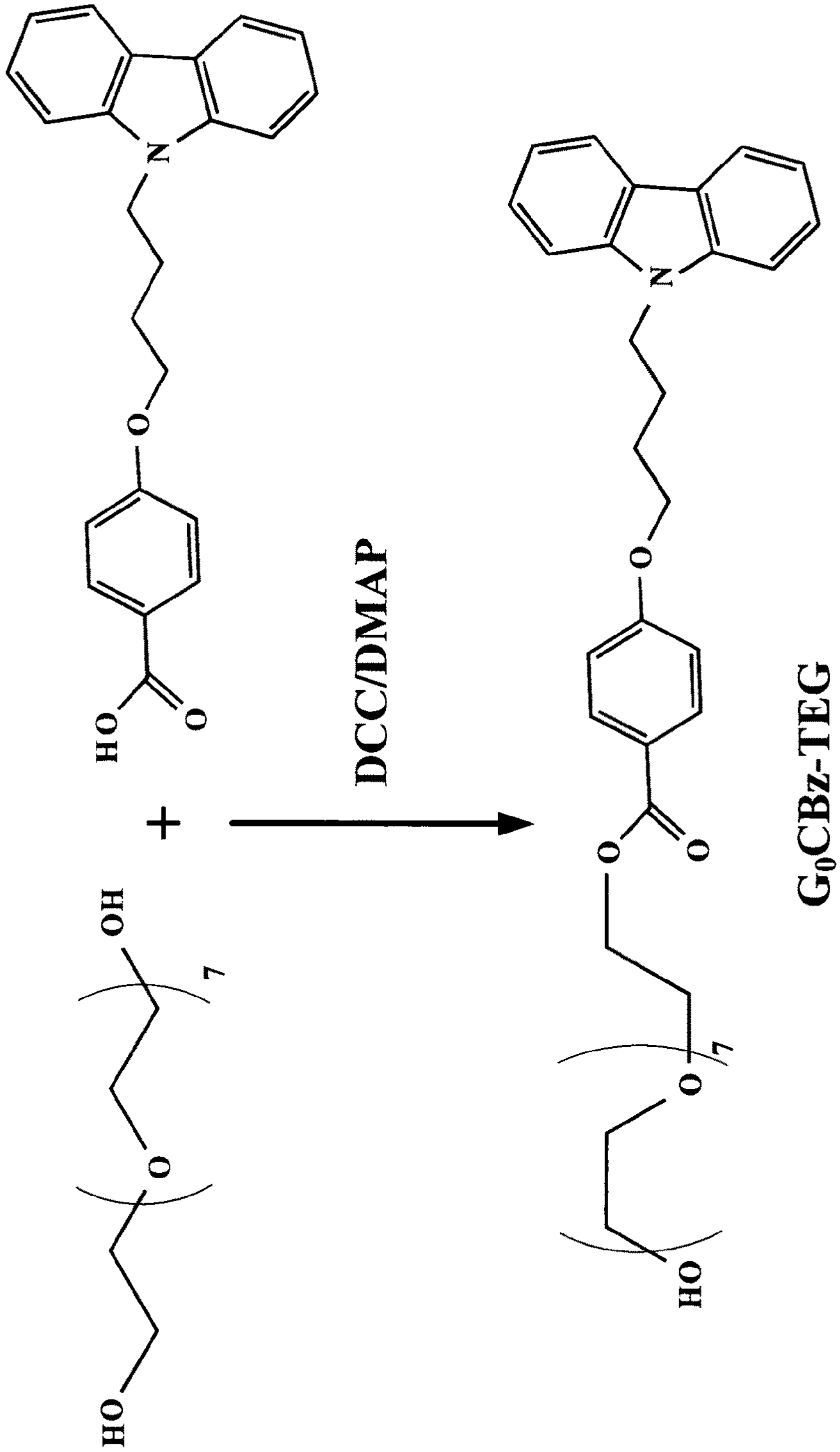
FIGS. 24A-C depict synthetic schemes of the invention used to prepare electrochemically active macromonomers by attaching an electroactive group to a preformed polymer.
Figure 24B:
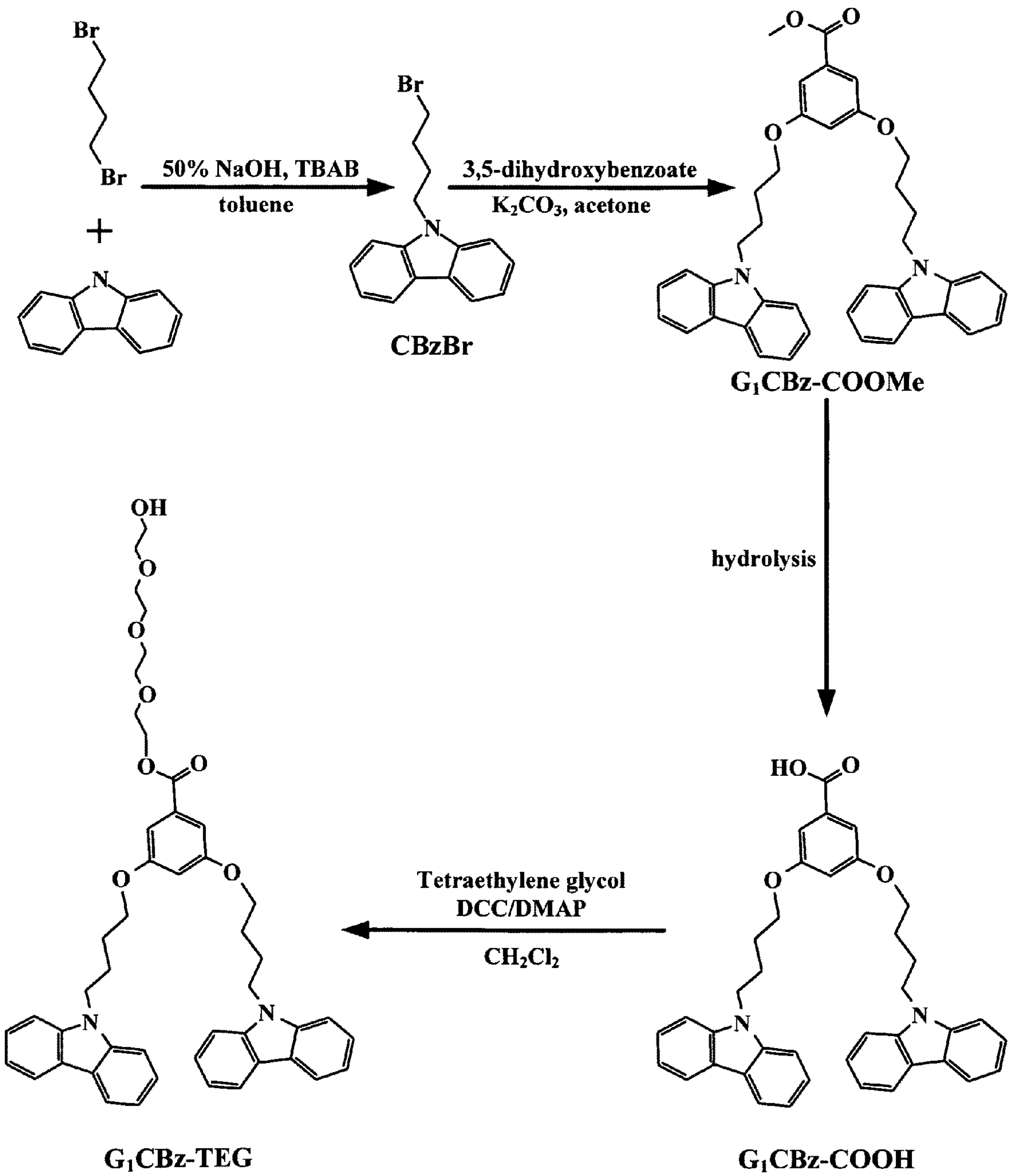
Figure 24C:
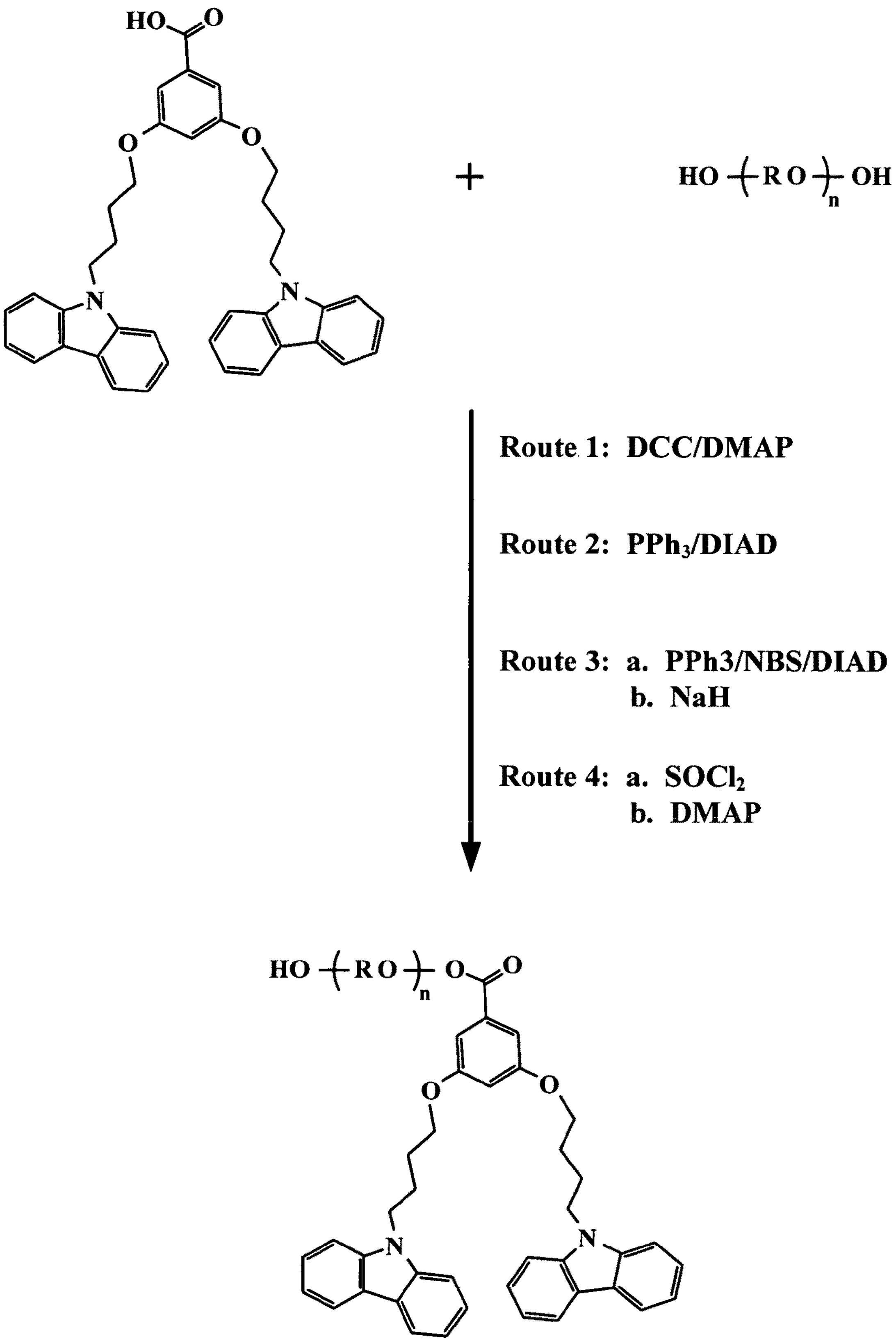

One embodiment of the present invention includes the synthesis and characterization of a series of carbazole electroactive anchoring groups and a PEG oligomer or polymer according to the synthesis scheme presented in FIGS. 24A-C. The synthesis of PEG monosubstituted with carbazole and $G_1$Cbz-TEG are performed through DCC/DMAP coupling as shown in FIG. 24A and FIG. 24B, respectively. However, other esterification routes are also possible as shown in FIG. 24C.

Synthesis of 9-(4-bromobutyl)-9H-carbazole [Cbz-Br]

The synthesis of Cbz-Br is done by combining carbazole (20.64 g, 0.1236 mol), 1,4-dibromobutane (132 mL, 1.095 mol), tetrabutylammonium bromide (4 g, 0.0124 mol), toluene (200 mL), and 50% NaOH (200 mL). The resulting mixture is stirred at 45° C. for 3 hours and continuously stirred at room temperature overnight. The clear, yellow organic layer is then washed with 4 times 100 mL portions of water followed by 100 mL of brine solution. The resulting solution is dried over anhydrous $Na_2SO_4$. The solvent is removed via rotary evaporator and the excess of 1,4-dibromobutane is removed via vacuum distillation. The resulting cream-like solid residue is slowly dissolved in small portions of $CH_2Cl_2$. The yellow-brown solution is recrystallized using $CH_3CH_2OH$. The resulting white solid residue is dried under vacuum overnight. $^1$H NMR (δ ppm in $CDCl_3$): 8.12 (d, 2H), 7.22-7.48 (m, 6H), 4.36 (t, 2H), 3.38 (t, 2H), 1.95-2.07 (m, 4H).

Synthesis of methyl 4-(4-(9H-carbazol-9-yl)butoxy)benzoate [$G_0CbzCOOCH_3$]

The synthesis of compound $G_0CbzCOOCH_3$ is done by combining CbzBr (5.69 g, 0.0263 mol), methyl-4-hydroxybenzoate (2.00 g, 0.01315 mol), and 18-crown-6 (0.695 g) in acetone. To the mixture is added $K_2CO_3$ (10.91 g) and is left at reflux for one day. The solvent is then removed using a rotary evaporator. Water is added to the cream solid residue and the desired compound is extracted with dichloromethane. The organic layer is subjected to rotary evaporation until 20 to 25 mL is left just to dissolve the solid residue. To this is added ethyl acetate to precipitate out the desired white solid compound. $^1H$ NMR (δ ppm in $CDCl_3$): $^1H$ NMR (δ ppm in $CDCl_3$): 8.10 (d, 2H, J=7.8), 7.96 (d, 2H, J=6.8), 7.49-7.20 (m, 6H), 6.84 (d, 2H, J=9.6), 4.40 (t, 2H, J=7.1), 3.97 (t, 2H, J=6.0), 3.87 (s, 3H) 2.12-2.06 (m, 2H), 1.88-1.83 (m, 2H).

Synthesis of methyl 3,5-bis(4-(9H-carbazol-9-yl)butoxy)benzoate [$G_1CbzCOOCH_3$]

The synthesis of compound $G_1CbzCOOCH_3$ is done by combining CbzBr (27.93 g, 0.0923 mol), methyl-3,5-dihydroxybenzoate (6.49 g, 0.0386 mol), and 18-crown-6 (2.416 g) in acetone. To the resulting yellow solution mixture is added $K_2CO_3$ (29.46 g) and is left at reflux for three days. The mixture is continuously stirred for two days. The solvent is then removed using a rotary evaporator. Water is added to the cream solid residue and the desired compound is extracted with dichloromethane. The organic layer is subjected to rotary evaporation until 20 to 25 mL is left just to dissolve the solid residue. To this is added ethyl acetate to precipitate out the desired white solid compound. $^1H$ NMR (δ ppm in $CDCl_3$): $^1H$ NMR (δ ppm in $CDCl_3$): 8.20 (d, 4H), 7.49-7.12 (m, 16H), 6.54 (s, 1H), 4.40 (t, 4H), 3.95 (t, 4H), 3.88 (s, 3H) 2.11-2.04 (m, 4H), 1.87-1.82 (m, 4H).

Synthesis of methyl 3,5-bis(4-(9H-carbazol-9-yl)butoxy)benzyl alcohol [$G_1CbzOH$]

The synthesis of compound $G_1CbzOH$ is carried out by first dissolving $G_1CbzCOOCH_3$ (10.5 g, 0.01719 mol) in dry THF. Into a 3-necked flask flowed with nitrogen is placed 100 mL THF. The mixture is cooled in an ice bath. Approximately 1 g $LiAlH_4$ is put into the flask and the $G_1CbzCOOCH_3$ solution is added drop by drop through a dropping funnel. The resulting mixture is then stirred overnight. After which, the reaction is quenched by adding water until all $LiAlH_4$ is consumed. The solution is then acidified using concentrated HCl and extracted with dichloromethane. The organic layer is further washed with water for several times and then dried with $Na_2SO_4$. The dicholoromethane is evaporated using a rotary evaporator and the desired white solid compound is further dried under vacuum. $^1H$ NMR (δ ppm in $CDCl_3$): 8.09 (d, 4H, J=7.5), 7.47-7.18 (m, 12H), 6.43 (s, 2H), 6.27 (s, 1H), 4.57 (d, 2H, J=5.7), 4.38 (t, 4H, J=6.9), 3.90 (t, 4H, J=5.9), 2.09-2.01 (m, 4H), 1.84-1.79 (m, 4H).

Synthesis of methyl 3,5-bis(3,5-bis(4-(9H-carbazol-9-yl)butoxy)benzyloxy)benzoate [$G_2CbzCOOCH_3$]

The synthesis of compound $G_2CbzCOOCH_3$ is done by dissolving $G_1$-OH (14.00 g, 0.0240 mol), methyl-3,5-dihydroxybenzoate (1.83 g, 0.0109 mol), and $PPh_3$ (6.87 g, 3.12 mol) in THF under nitrogen. The mixture is sonicated to ensure dissolution. It is then cooled to 4° C., after which a solution of DIAD (5.96 g, 0.0295 mol) in THF is added slowly. The solution is continuously stirred for 3 days. The desired compound is extracted with dichloromethane and purified with 4:1 $CH_2Cl_2$/hexane affording a white solid product. $^1H$ NMR (δ ppm in $CDCl_3$): $^1H$ NMR (δ ppm in $CDCl_3$): 8.07 (d, 8H, J=6.9), 7.46-7.17 (m, 26H), 6.72 (t, 1H, J=2.4), 6.48 (d, 4H, J=2.1), 6.28 (t, 2H, J=1.8), 4.92 (s, 4H), 4.36 (t, 8H, J=6.7), 3.90-3.84 (m, 12H), 2.07-1.99 (m, 8H), 1.84-1.76 (m, 8H).

Synthesis of 4-(4-(9H-carbazol-9-yl)butoxy)benzoic acid [$G_0CbzCOOH$]

$G_0$-$COOCH_3$ (2 g, mol) is dissolved in THF. Ethanol (50 mL) is then added to the solution. To this is added KOH (10 eq). The solution is then refluxed for 2 days. After which, the reaction mixture is cooled down and acidified to pH=2-3 affording white solid product. $^1H$ NMR (δ ppm in $CDCl_3$): $^1H$ NMR (δ ppm in $CDCl_3$): 8.11 (d, 2H, J=8.4), 8.00 (d, 2H, J=6.8), 7.45-7.19 (m, 6H), 6.86 (d, 2H, J=6.8), 4.41 (t, 2H, J=6.9), 3.98 (t, 2H, J=6.3), 2.12-2.07 (m, 2H), 1.89-1.83 (m, 2H).

Synthesis of 3,5-bis(4-(9H-carbazol-9-yl)butoxy)benzoic acid [$G_1CbzCOOH$]

$G_1CbzCOOCH_3$ (2 g, mol) is dissolved in THF. Ethanol (50 mL) is then added to the solution. To this is added KOH (10 eq). The solution is then refluxed for 2 days. After which, the reaction mixture is cooled down and acidified to pH=2-3. It is then extracted with dichloromethane and the solution is washed with $NaHCO_3$. After drying with $Na_2SO_4$, the desired product is precipitated in hexane. $^1H$ NMR (δ ppm in $CDCl_3$): $^1H$ NMR (δ ppm in $CDCl_3$): 8.09 (d, 4H, J=7.8), 7.46-7.14 (m, 14H), 6.55 (s, 1H), 4.39 (t, 4H, J=6.7), 3.93 (t, 4H, J=6.0), 2.08-2.03 (m, 4H), 1.84-1.82 (m, 4H).

Synthesis of 3,5-bis(3,5-bis(4-(9H-carbazol-9-yl)butoxy)benzyloxy)benzoic acid [$G_2CbzCOOH$]

$G_2CbzCOOCH_3$ (1 g, mol) is dissolved in THF. Ethanol (20 mL) is then added to the solution. To this is added KOH (10 eq.). It is then refluxed for 2 days. After which, the reaction mixture is cooled down and acidified to pH=2-3. It is then extracted with dichloromethane and precipitated with hexane. $^1H$ NMR (δ ppm in $CDCl_3$): $^1H$ NMR (δ ppm in $CDCl_3$): 8.06 (d, 8H, J=7.5), 7.45-7.16 (m, 26H), 6.77 (t, 1H, J=2.2), 6.48 (d, 4H, J=1.8), 6.29 (t, 2H, J=2.1), 4.92 (s, 4H), 4.35 (t, 4H, J=6.9), 3.87 (t, 4H, J=6.0), 2.06-2.01 (m, 8H), 1.84-1.76 (m, 8H).

Synthesis of 2-(2-(2-(2-hydroxy)ethoxy)ethoxy) ethyl-4-(4-(9H-carbazol-9-yl)butoxy)benzoate [$G_0CbzTEG$]

In a one-necked flask are combined $G_0CbzCOOH$ (100 mg, 0.2915 mmol), tetraehylene glycol (170 mg, 0.8762 mmol), and 4-DMAP. The mixture is dissolved in minimal amount of dichloromethane, bubbled with nitrogen, and placed in an ice bath. After which, a solution of dicyclohexylcarbodiimide (47.94 mg, 0.2327 mmol) in dichloromethane is added dropwise to the reaction mixture. The solution is then stirred vigorously for 30 minutes, warmed to room temperature and stirred at reflux for two days. The solid byproduct is filtered off and the filtrate is washed with water (5 times) and brine solution (2 times). The mixture is then subjected to column chromatography using 1% $MeOH/CH_2Cl_2$. The desired product is further purified by precipitating out other byproducts with ethyl acetate. The supernatant is then concentrated and dried under vacuo. $^1H$ NMR (δ ppm in $CDCl_3$): $^1H$ NMR (δ ppm in $CDCl_3$): 7.92 (d, 2H, J=7.5), 7.81 (d, 2H, J=2.4), 7.28-7.02 (m, 6H), 6.65 (d, 2H, J=6.9), 4.28-4.18 (m, 4H), 3.77 (t, 2H, J=6.0), 3.64-3.38 (m, 14H), 1.95-1.85 (m, 2H), 1.71-1.61 (m, 2H).

Synthesis of 2-(2-(2-(2-hydroxy)ethoxy)ethoxy) ethyl-3(4-(9H-carbazol-9-yl)butoxy)-5-(4-(9H-carbazol-9-yl)butoxy))benzoate [$G_1$CbzTEG]

In a one-necked flask are combined $G_1$CbzCOOH (100 mg, 0.1676 mmol), tetraehylene glycol (97.53 mg, 0.5027 mmol), and 4-DMAP (2.909 mg, 0.0238 mmol). The mixture is dissolved in minimal amount of dichloromethane, bubbled with nitrogen, and placed in an ice bath. After which, a solution of dicyclohexylcarbodiimide (47.94 mg, 0.2327 mmol) in dichloromethane is added dropwise to the reaction mixture. This is then stirred vigorously for 30 minutes, warmed to room temperature and stirred at reflux for two days. The solid byproduct is filtered off and the filtrate is washed with water (5 times) and brine solution (2 times). The mixture is then subjected to column chromatography using 1% MeOH/$CH_2Cl_2$. The desired product is further purified by precipitating out other byproducts with ethyl acetate. The supernatant is then concentrated and dried under vacuo. $^1$H NMR (δ ppm in $CDCl_3$): $^1$H NMR (δ ppm in $CDCl_3$): 7.90 (d, 4H, J=7.5), 7.29-7.00 (m, 12H), 6.95 (d, 2H, J=3.0), 6.34 (t, 1H, J=2.1), 4.27-4.17 (m, 6H), 3.75 (t, 2H, J=6.1), 3.62-3.32 (m, 14H), 1.93-1.83 (m, 4H), 1.69-1.60 (m, 4H).

Synthesis of 2-(2-(2-(2-hydroxy))ethoxy))ethoxy)) ethyl-3-(3,5-bis(4-(9H-carbazol-9H-carbazol-9-yl) butoxy)benzyloxy-5-(3,5-bis(4-(9H-carbazol-9-yl) butoxy)benzyloxy))benzoate [$G_2$CbzTEG]

In a one-necked flask are combined $G_2$CbzCOOH (200 mg, 0.1558 mmol), tetraehylene glycol (90.80 mg, 0.4675 mmol), and 4-DMAP (2.909 mg, 0.0238 mmol). The mixture is dissolved in minimal amount of dichloromethane, bubbled with nitrogen, and placed in an ice bath. After which, a solution of dicyclohexylcarbodiimide (47.94 mg, 0.2327 mmol) in dichloromethane is added dropwise to the reaction mixture. This is then stirred vigorously for 30 minutes, warmed to room temperature and stirred at reflux for five days. The solid byproduct is filtered off and the filtrate is washed with water (5 times) and brine solution (2 times). The mixture is then subjected to column chromatography using 1% MeOH/$CH_2Cl_2$. The desired product is further purified by precipitating out other byproducts with ethyl acetate. The supernatant is then concentrated and dried under vacuo. $^1$H NMR (δ ppm in $CDCl_3$): $^1$H NMR (δ ppm in $CDCl_3$): 8.06 (d, 8H, J=7.2), 7.44-7.10 (m, 26H), 6.72 (s, 1H), 6.45 (d, 4H, J=7.2), 6.29 (s, 2H), 4.91 (s, 4H), 4.37-4.20 (m, 18H), 3.89-3.47 (t, 14H), 2.06-1.99 (m, 8H), 1.81-1.73 (m, 8H).

Another embodiment of the present invention includes the electrochemical grafting of the electroactive macromonomers via electropolymerization. Electropolymerization of the macromonomers are performed as follows. The tetra(ethylene glycol) (TEG) G1 dendron and poly(ethylene glycol) (PEG) G1 dendron are electropolymerized on ITO conducting substrates. The electropolymerization by cyclic voltammetry (CV) are done with a potenstiostat (AMEL Instruments, model 2049) using the conventional three electrode set-up wherein the gold substrate served as the working electrode, platinum wire as counter electrode, and Ag/AgCl as reference electrode. The solution for electropolymerization is prepared in dichloromethane (10 μM) with tetrabutylammonium hexafluorophosphate ($TBAF_6$) as supporting electrolyte. Various types of scanning rates and concentrations are used to optimized the electrodeposition.

Figure 25:
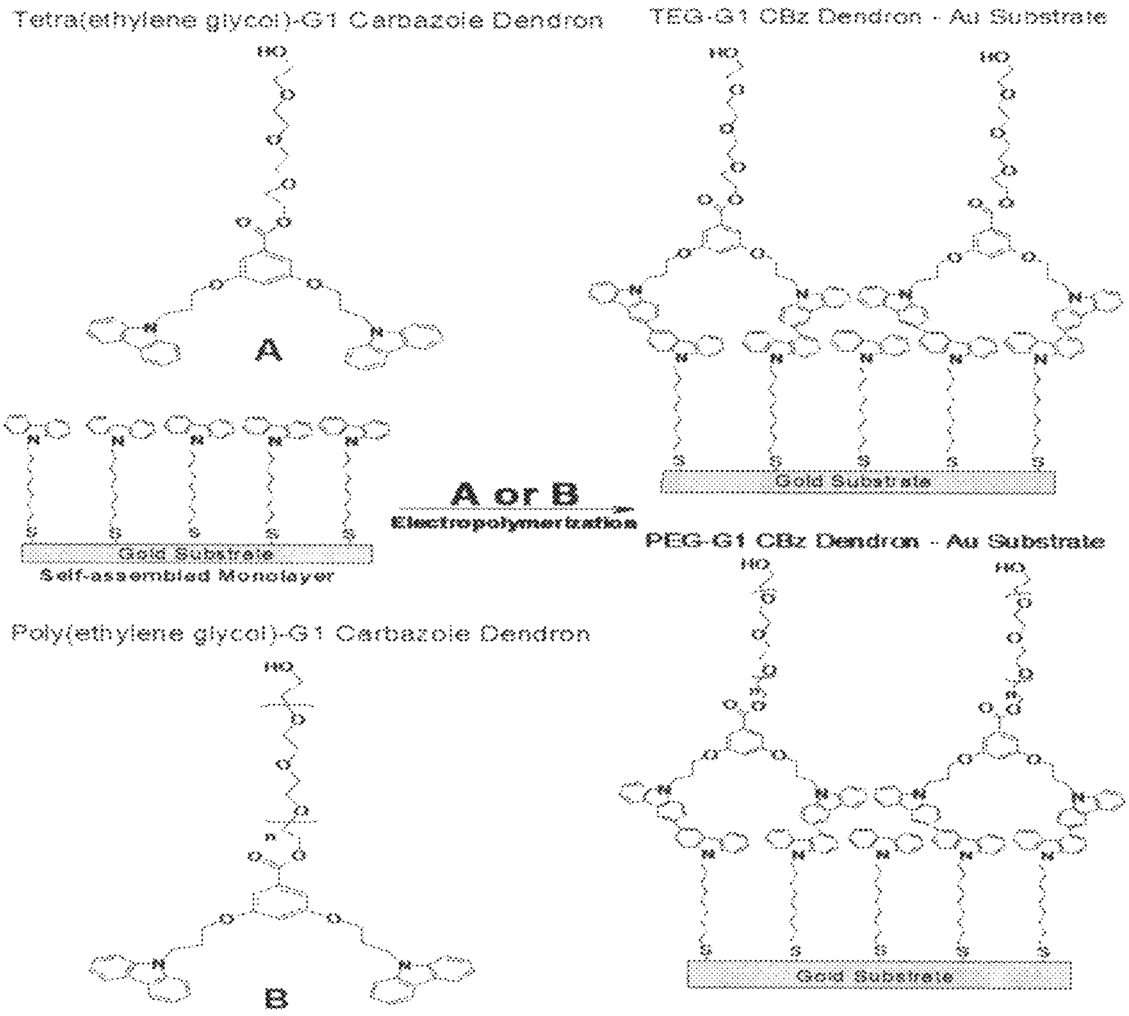
FIG. 25 depicts a grafting method of this invention used to prepare electrochemically deposited macromonomers onto an electrode surface modified with a self-assembled monolayer (SAM).

Electropolymerization can be performed on gold substrates with or without self-assembled monolayers containing carbazole units as depicted in FIG. 25. The gold substrates are prepared by thermally evaporating gold (about 45 nm) under high vacuum ($10^{-6}$ bar) into the LaSFN9 glass slide with 1-2 nm thick chromium adhesion layer. Self-assembled monolayers (SAMs) are prepared by immersing a gold coated glass slide into the solutions (1 mM) of the different commercially available thiols and thiol-functionalized polymers using Milli-Q water or dichloromethane as solvent, for at least 12 hours. The SAM layer is used to improve adhesion on the gold substrate and at the same time to provide surface-bound electropolymerizable groups for the macromonomer to react.

Electropolymerization by Cyclic Voltammetry (CV) on ITO

Example 7

Electropolymerization of 1 μM PEG-$G_1$ Cbz solution is electropolymerized on ITO substrates with two different scan rates: 20 mV/s and 50 mV/s. The oxidation peak is observed at around 0.8 V. The first scan has the highest current density. The current decreases as the number of scans increase. After a few scans, the subsequent curves remain unchanged.

Example 8

Figure 26A:
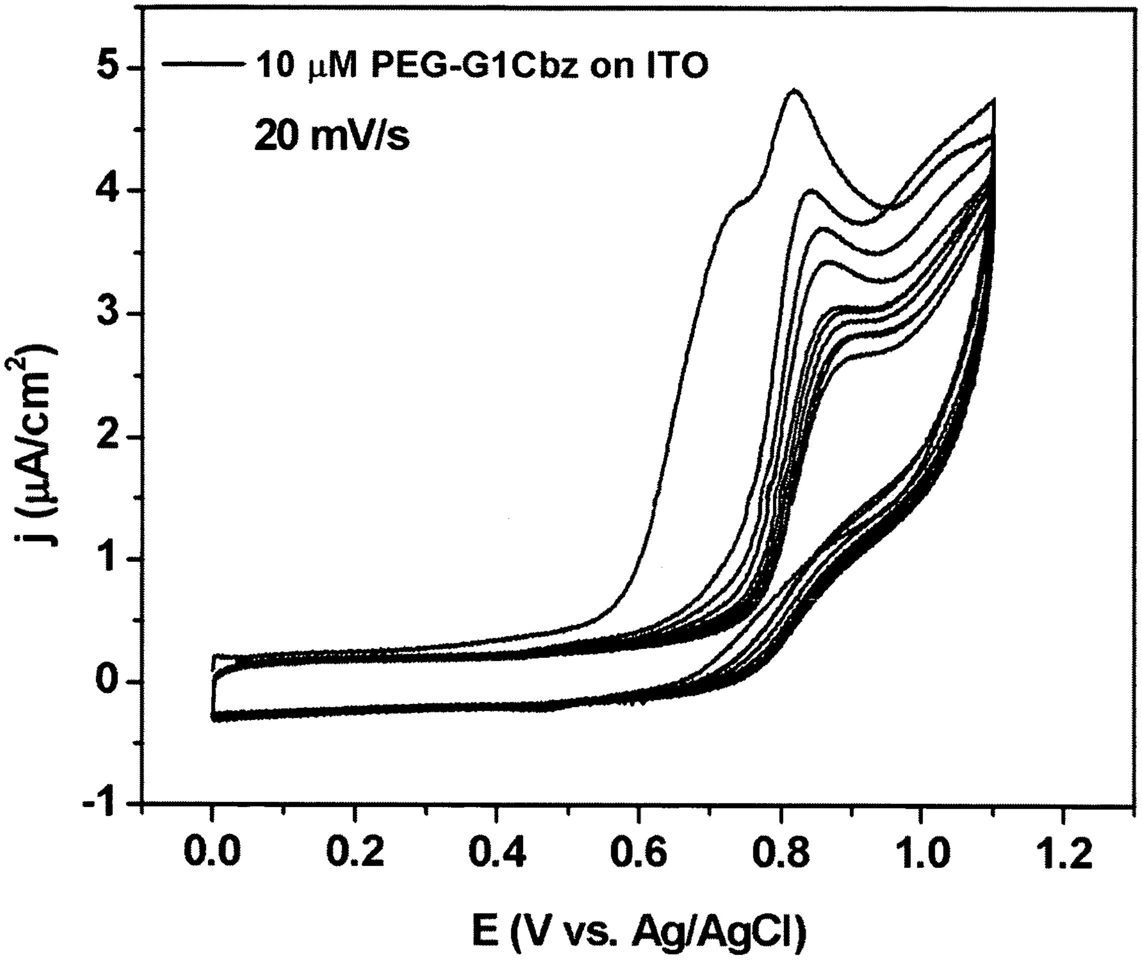
FIGS. 26A&B show representative electrochemical cyclic voltammetry results for grafting of macromonomers of this invention (PEG-$G_1$Cbz) on an ITO surface at 20 mV/s and 50 mV/s, respectively.

10 μM PEG-$G_1$Cbz is electropolymerized on ITO substrates with two different scan rates: 20 mV/s and 50 mV/s as shown FIG. 26A. The trend is similar to that obtained in Example 7, however the current density is higher due to a higher concentration of macromonomers.

Example 9

Figure 26B:
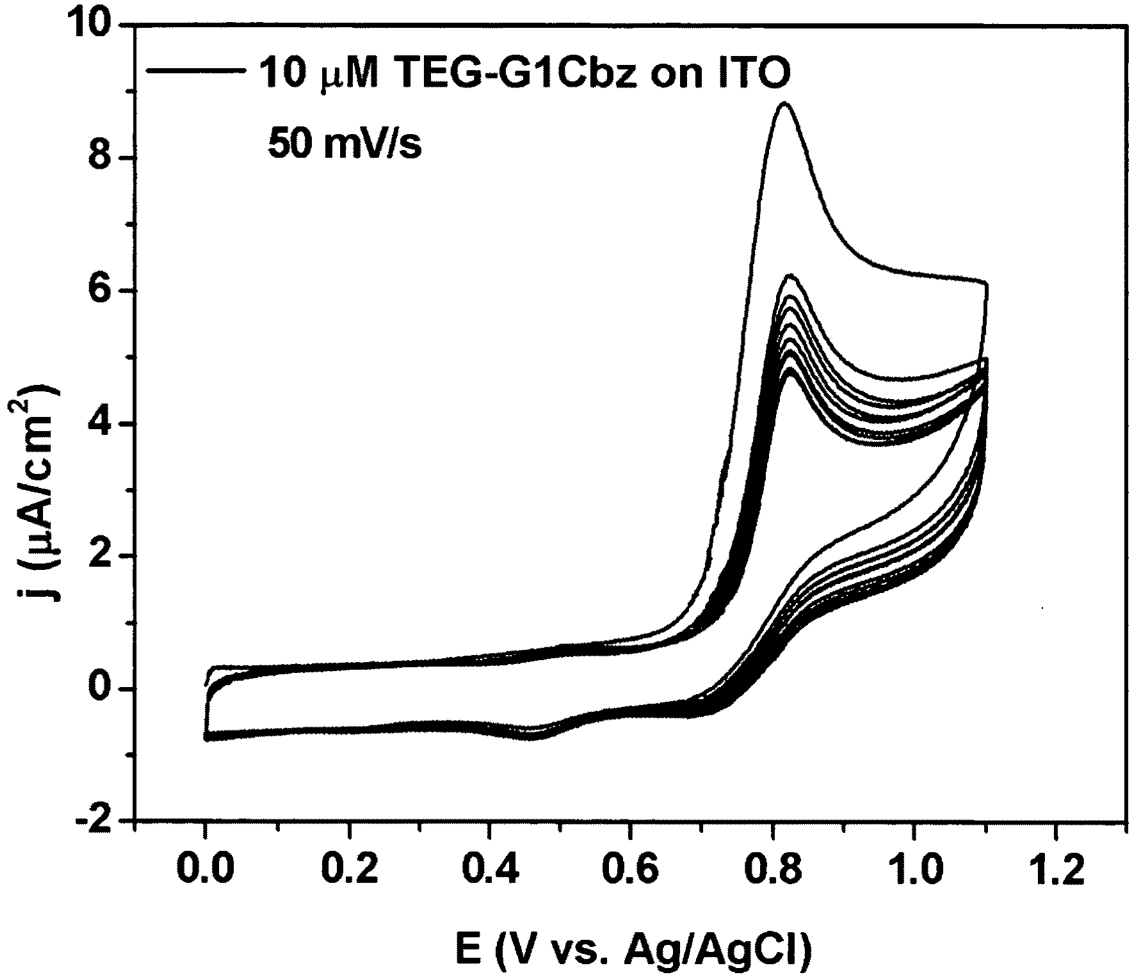

1 μm TEG-$G_1$Cbz is electropolymerized on ITO substrates with two different scan rates: 20 mV/s and 50 mV/s as shown in FIG. 26B. The oxidation peak is observed at around 0.8 V. The first scan has the highest current density. With continuous scanning, the current decreases until it remains unchanged.

Example 10

10 μm TEG-$G_1$Cbz is electropolymerized on ITO substrates with two different scan rates: 20 mV/s and 50 mV/s. The oxidation peak is around 0.8 V. The first scan has the highest current density. With continuous scanning, the current decreases until it remains constant.

The same procedure is applicable to other types of electroactive monomers or a mixture of two or more electroactive monomers to form different conjugated and electrically conducting or insulating polymer films. Oxidative chemical polymerization is another alternative to anodic electropolymerization. Chemical oxidative polymerization will involve spin-coating the electroactive macromonomer as a thin film on the substrate and dipping the spin-coated film onto a solvent bath containing a solution of a chemical oxidant such as $FeCl_3$ followed by solvent washing to remove excess $FeCl_3$. This solvent should not dissolve the macromolecule spin-coated film prior to polymerization. Note that it is also possible to demonstrate copolymers with the electroactive monomer polymerization using other monomers and co-deposit them using this chemical oxidative method.

Figure 27A:
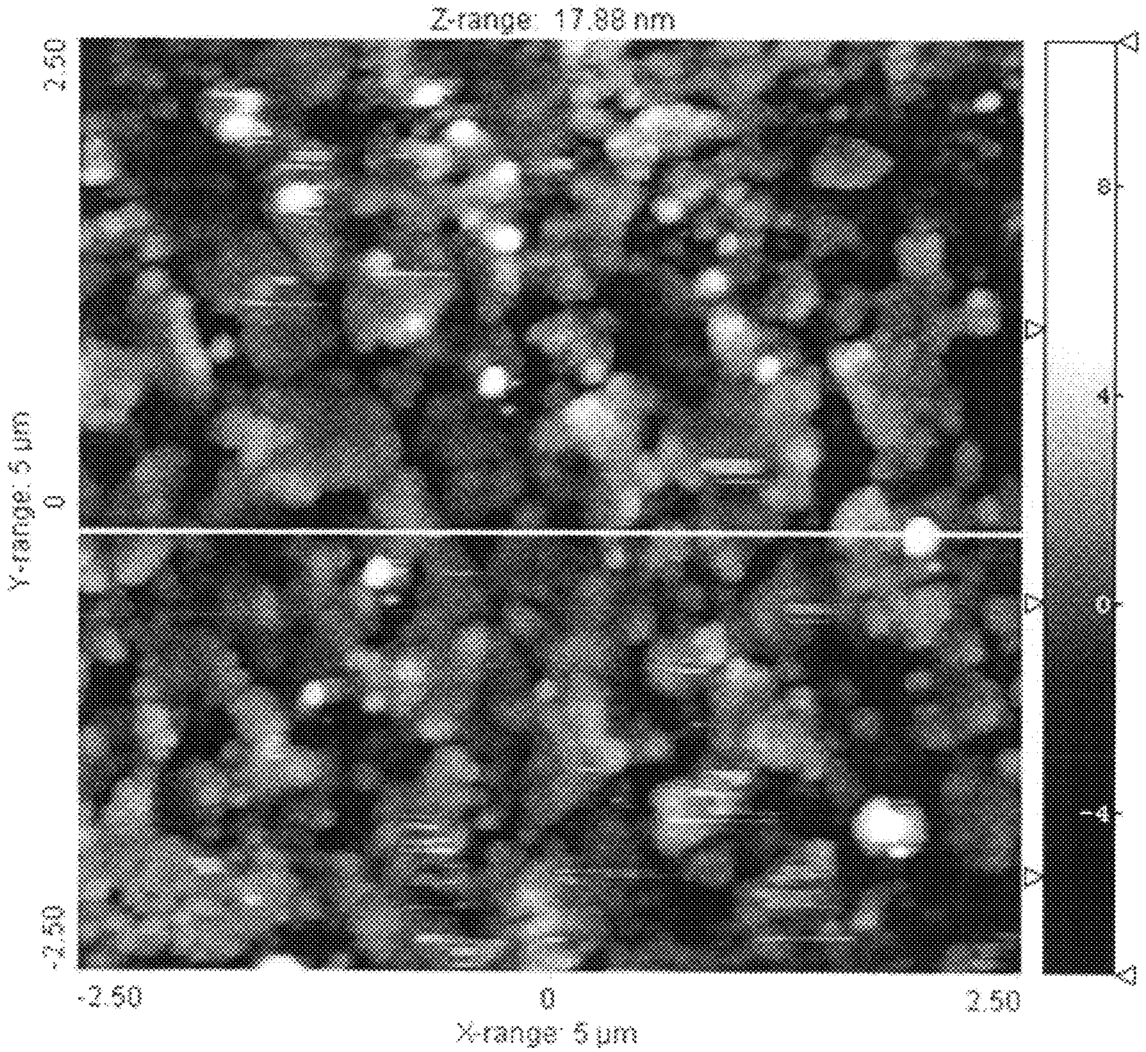
FIGS. 27A-C show a comparison of the morphology of two electrochemically grafted macromonomers of this invention on ITO observed by atomic force microscopy compared to bare ITO.
Figure 27B:
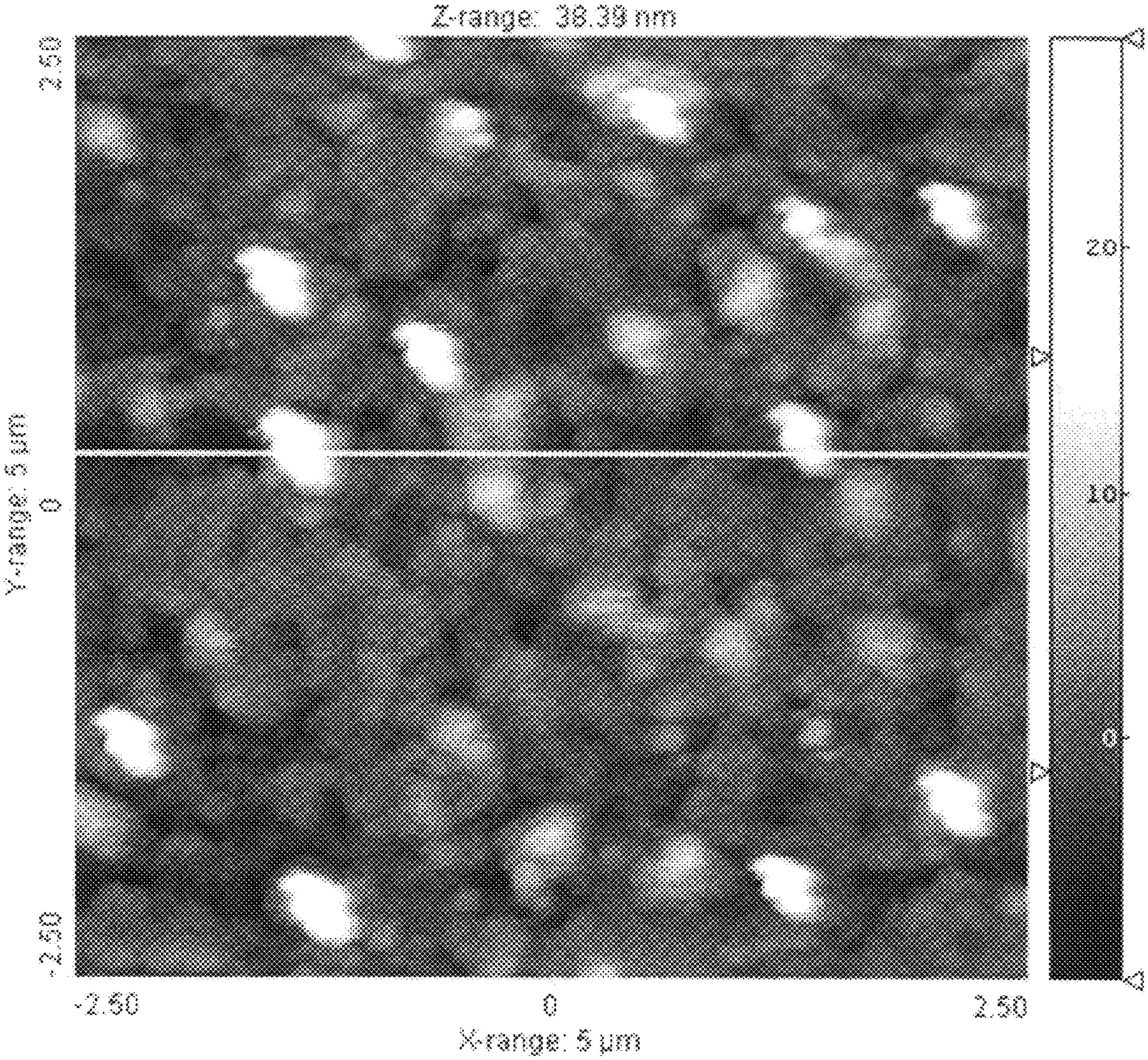
Figure 27C:
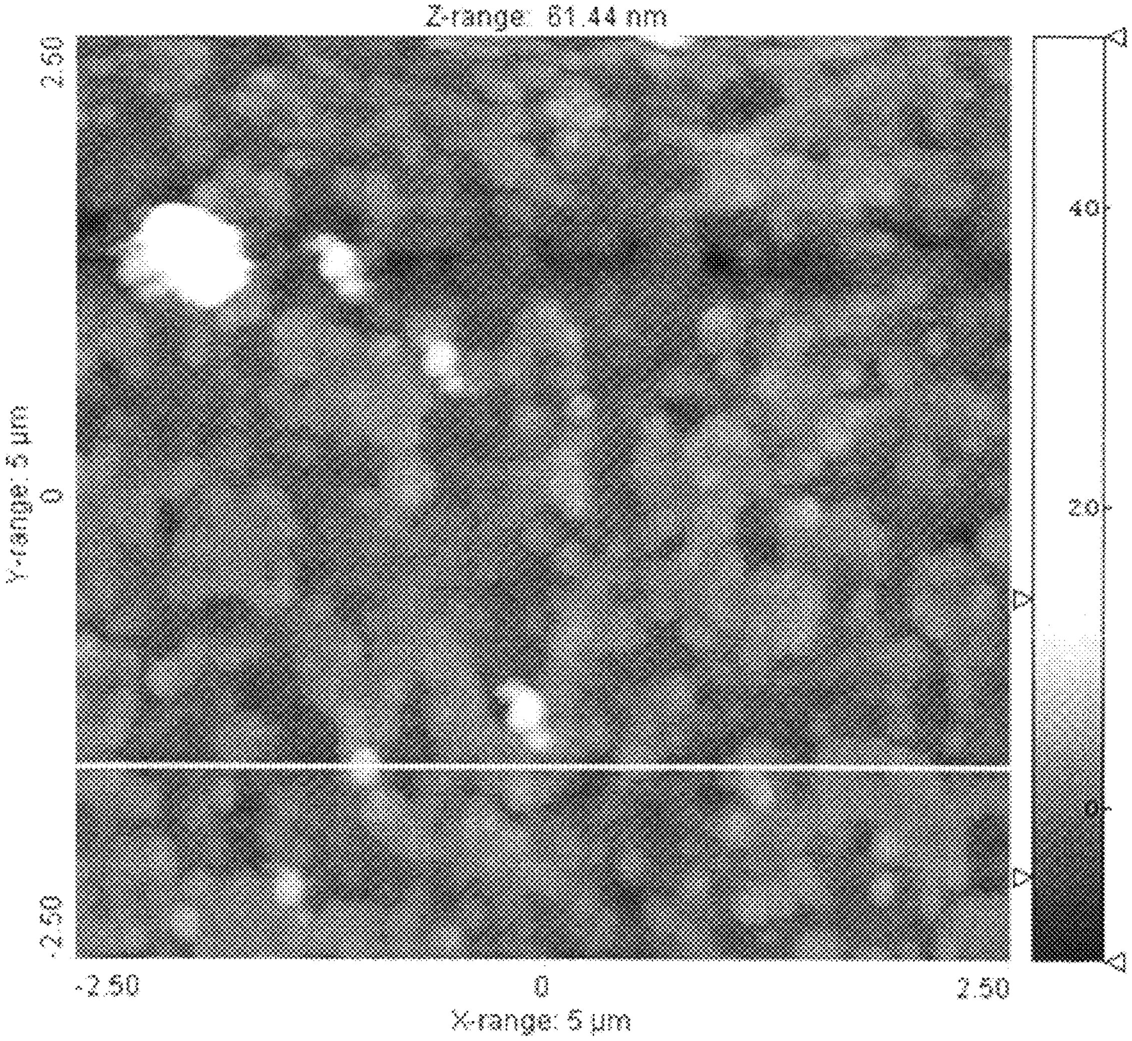

FIGS. 27A-C shows the morphology of films observed by atomic force microscopy after the electropolymerization of 10 μM of PEG-$G_1$Cbz and 10 μM of TEG-$G_1$Cbz on ITO substrates as compared to bare ITO. Atomic force microscopy (AFM) imaging is examined in ambient conditions with a PicoSPM II (PicoPlus, Molecular Imaging) in the Magnetic AC mode (MAC mode) using a magnetic field to drive a magnetically coated cantilever in the top-down configuration. Type II MAC levers with a spring constant of 2.8 nN/M with about 10 nm tip radius are used for all scans.

Examples of CV Dlectropolymerization on Gold Substrates with SAM-Cbz

Example 11

Figure 28A:
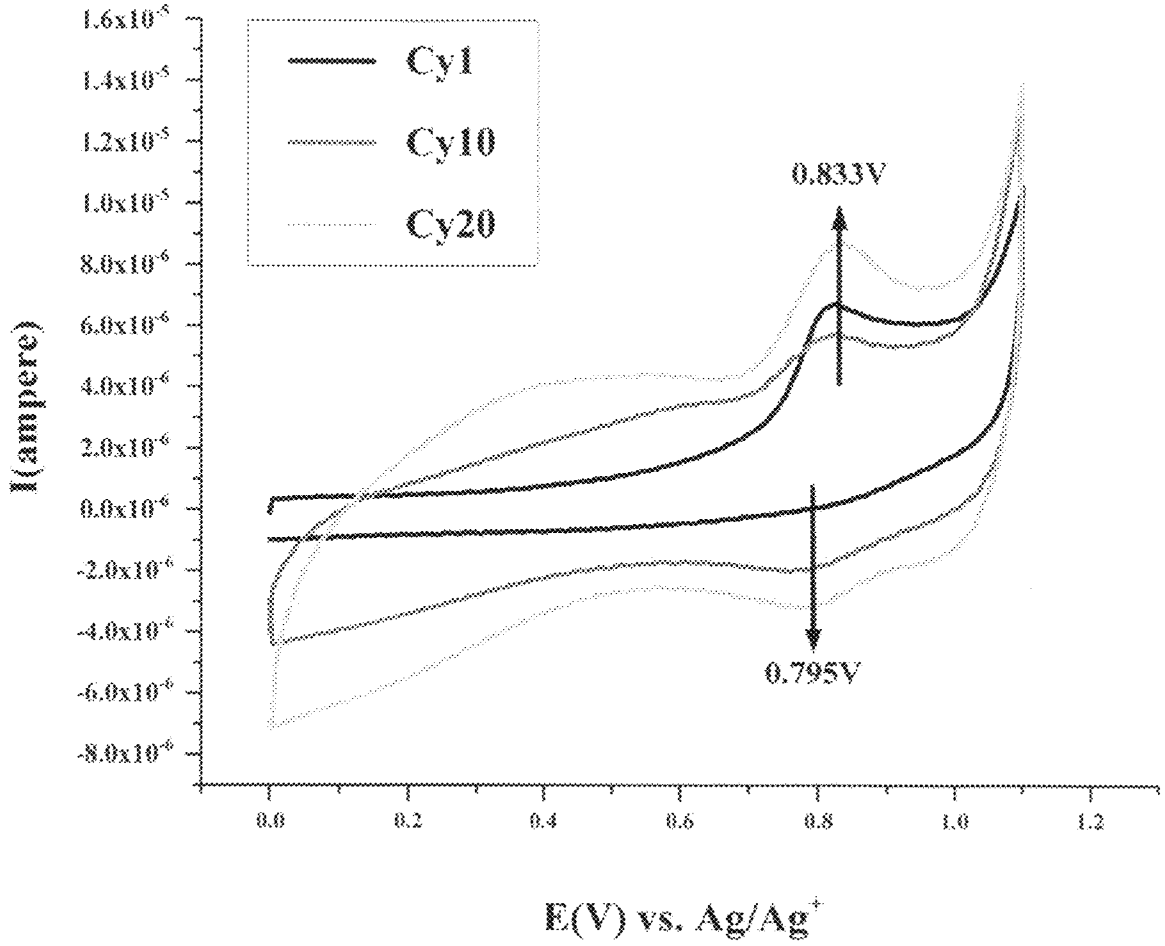
FIGS. 28A-C show representative electrochemical cyclic voltammetry results for the grafting of macromonomers on gold substrates modified with self-assembled monolayer (SH-Cbz), $G_1$Cbz-TEG, $G_1$Cbz-TEG and $G_2$Cbz-TEG, respectively.

Electropolymerization of 1 μM, 5 μM, and 10 μM of TEG-$G_0$Cbz solution on SAM carbazole coated gold substrates: 20 cycles, 50 mV/sec, 0 to 1.1 V. The oxidation peak is observed at around 0.83 V and the reduction peak is seen at 0.78 V. The first scan has the lowest current density. The current increases as the number of scans increase up to the $20^{th}$ cycle. FIG. 28A shows the CV spectrum for the electro polymerization of 10 μM of TEG-$G_0$Cbz solution on SAM carbazole coated gold substrates.

Example 12

Figure 28B:
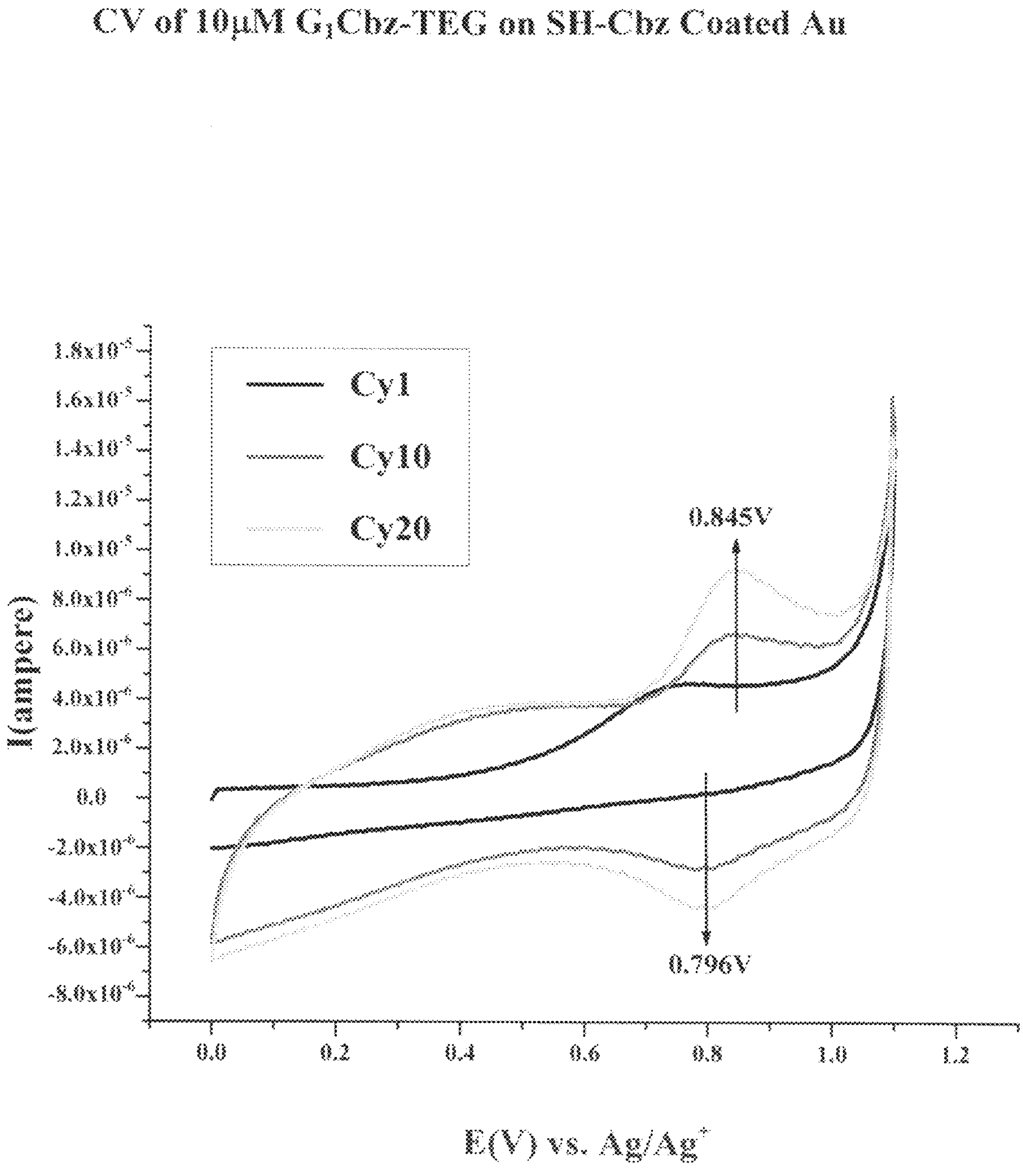

Electropolymerization of 1 μM, 5 mM, and 10 mM of TEG-$G_1$Cbz solution on SAM carbazole coated gold substrates: 20 cycles, 50 mV/sec, 0 to 1.1 V. The oxidation peak is observed at around 0.84 V and reduction peak is seen at 0.78 V. The first scan has the lowest current density. The current increases as the number of scans increase up to the $20^{th}$ cycle. FIG. 28B shows the CV spectrum for the electro polymerization of 10 μM of TEG-$G_1$Cbz solution on SAM carbazole coated gold substrates.

Example 13

Figure 28C:
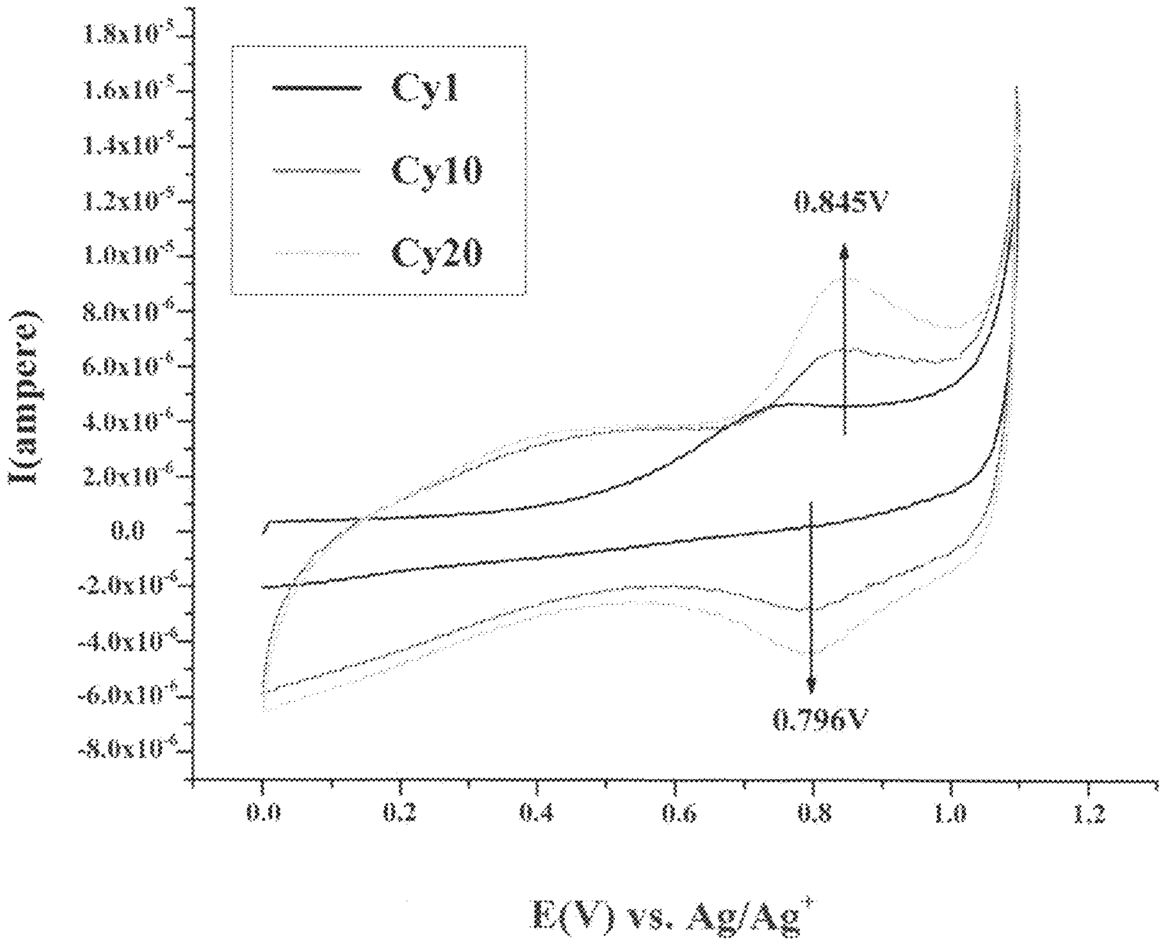

Electropolymerization of 1 μM, 5 μM, and 10 μM of TEG-$G_2$Cbz solution on SAM carbazole coated gold substrates: 20 cycles, 50 mV/sec, 0 to 1.1V. The oxidation peak is observed at around 0.86 V and the reduction peak is seen at 0.78 V. The first scan has the lowest current density. The current increases as the number of scans increases, up to the $20^{th}$ cycle. FIG. 28*c* shows the CV spectrum for the electro polymerization of 10 μM of TEG-$G_2$Cbz solution on SAM carbazole coated gold substrates.

The oxidation peaks are sharper in case of $G_0$ than $G_1$ and $G_2$. The $E_{pa}$ values are higher with increase of number of cycles (Cy1-Cy10-Cy20). The reduction peaks are sharper in case of $G_2$ than $G_0$ and $G_1$. The $i_c$ values are higher for $G_2$ compared to G0 and $G_1$. Thicknesses are higher for $G_2$ compared to G0 and $G_1$.

A compilation of the results obtained for the cyclic voltammetry electropolymerization grafting of $G_0$CBZTEG, $G_1$CBZTEG, and $G_2$CBZTEG are shown in Table 4.

TABLE 4

Cyclic Voltammetry Electropolymerization Data

| Conc. of $G_n$CbzTEG | $E_{pa}$ (V) | $i_p$ (μA) | $E_{pc}$ (V) | $i_c$ (μA) | ΔE (V) | Thickness (Å) |
|---|---|---|---|---|---|---|
| 1 μM $G_0$CbzTEG | 0.84 | 10.79 | 0.79 | −3.43 | 0.04 | 9.3 |
| 5 μM $G_0$CbzTEG | 0.83 | 1.49 | 0.79 | −4.33 | 0.04 | 8.5 |
| 10 μM $G_0$CbzTEG | 0.83 | 8.69 | 0.79 | −3.12 | 0.06 | 3 |
| 1 μM $G_1$CbzTEG | 0.84 | 12 | 0.78 | −1.87 | 0.05 | 14.4 |
| 5 μM $G_1$CbzTEG | 0.85 | 9.44 | 0.8 | −3.37 | 0.05 | 10.5 |
| 10 μM $G_1$CbzTEG | 0.85 | 9.18 | 0.8 | −4.47 | 0.06 | 1.1 |
| 1 μM $G_2$CbzTEG | 0.86 | 10.6 | 0.8 | −6.24 | 0.06 | 24.7 |
| 5 μM $G_2$CbzTEG | 0.86 | 10.42 | 0.8 | −8.43 | 0.06 | 14.1 |
| 10 μM $G_2$CbzTEG | 0.86 | 14.73 | 0.79 | −10.71 | 0.07 | 0.5 |

The films are also characterized by thickness and contact angle measurements are reported in Table 5.

TABLE 5

Thickness and Contact Angle Measurements for $G_n$CbzTEG

| | Thickness Å | | | Contact Angle BK7 | | | Contact Angle Brink man Disk | | | |
|---|---|---|---|---|---|---|---|---|---|---|
| Conc. of $G_n$ | Au | SH-Cbz | Film | Au | SH-Cbz | Film | SH-Cbz | Film | PBS | Fb absorbed |
| 1 μM $G_0$ | | | 9.3 | | | 57 | 76.57 | — | 69.69 | 71.65 |
| 5 μM $G_0$ | | | 8.5 | | | 62.89 | 73.49 | 61.42 | 66.32 | 71.85 |
| 10 μM $G_0$ | | | 3 | | | 61.93 | 84.15 | 67.4 | 62.92 | 79 |
| 1 μM $G_0$Cbz | | | | | | | 80.66 | 77.53 | 63.24 | 74.32 |
| | | | | | | | 82.04 | 75.46 | 67.05 | 72.39 |
| | 450 | 0.9 | | | | | | | | |
| 1 μM $G_1$ | | | 14.4 | | | 63.87 | 81.95 | 71.38 | 71.67 | 67.8 |
| | | | | | | 63.42 | | | | |
| 5 μM $G_1$ | | | 10.5 | 18.33 | 67.47 | 57.93 | 86.37 | 74.76 | — | 81.51 |
| | | | | 27.40 | 83.83 | 66.07 | 78.24 | 71.17 | 78.17 | 72.92 |
| 10 μM $G_1$ | | | 1.1 | | | 54.86 | — | — | — | — |
| | | | | | | 61.50 | | | | |
| 1 μM $G_1$Cbz | | | | | | | 80.41 | 80.52 | 64.77 | 73.09 |
| | | | | | | | 82.71 | 85.57 | 80.51 | 76.46 |
| 1 μM $G_2$ | | | 24.7 | | | 59.74 | 80.58 | 62.45 | 67.5 | 62.9 |
| 5 μM $G_2$ | | | 14.1 | | | 57.74 | 72.84 | 65.26 | 57.29 | 70.37 |

TABLE 5-continued

| Thickness and Contact Angle Measurements for $G_n$CbzTEG | | | | | | |
|---|---|---|---|---|---|---|
| 10 μM $G_2$ | 0.5 | 61.46 | 79.67 | 68.22 | — | 57.31 |
| | | | 76.46 | 73.47 | 56.95 | 64.82 |
| 1 μM $G_2$Cbz | | | 82.73 | 84.83 | 63.9 | 92.58 |

| Au | PEG5000 SH | TEGSH |
|---|---|---|
| 10.41 | 32.96 | 39.66 |

Contact angle goniometry is conducted using a KSV CAM 200 instrument (KSV ltd.) using the bubble drop method with water. Contact angle of the electropolymerized film increases from 1 to 5 μM for each generations of CBZ.

Another embodiment of the invention is the use of these films for the prevention of protein adsorption on surfaces.

Figure 29:
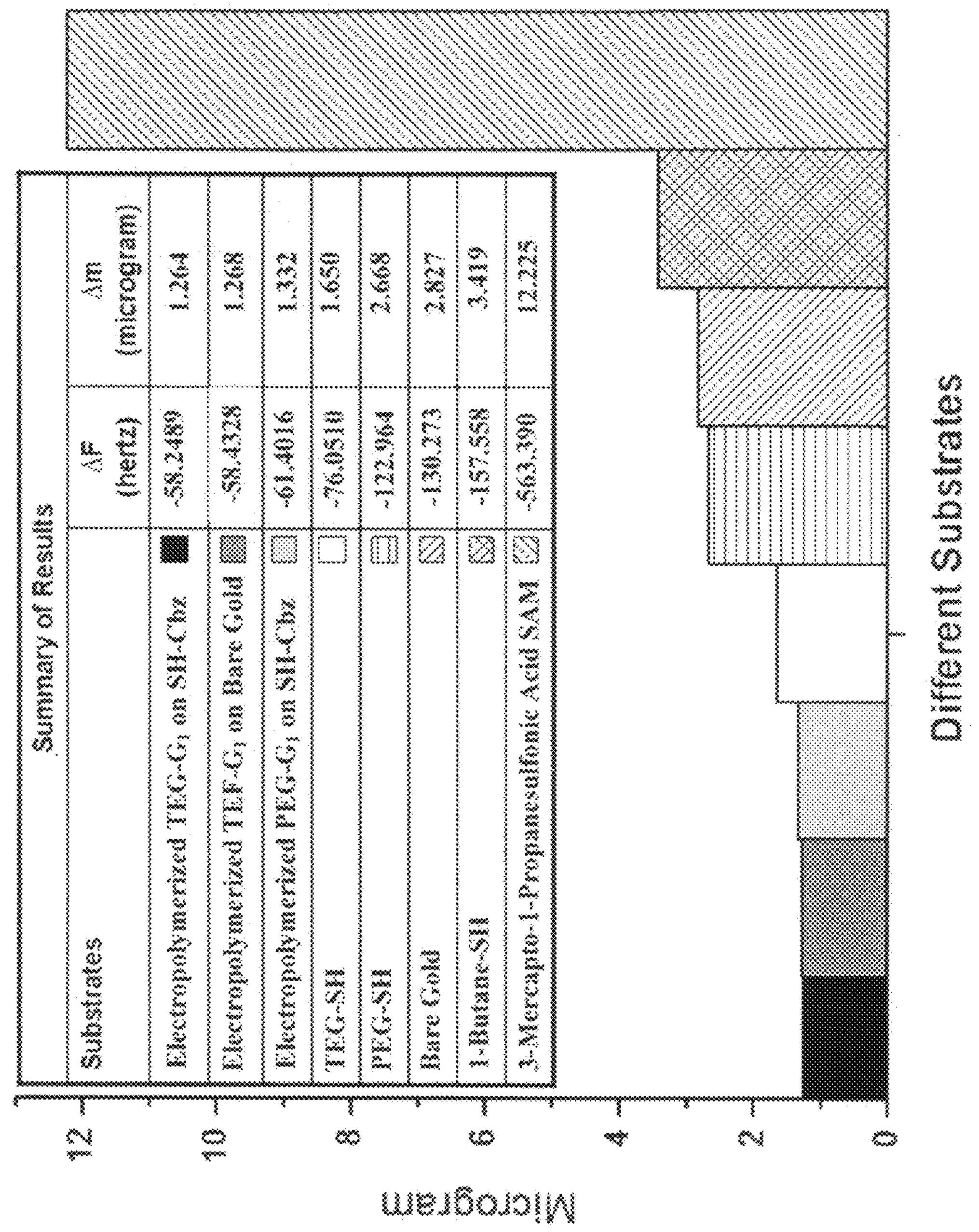
FIG. 29 shows the amount of protein adsorbed on the different surfaces-modified gold QCM crystals.

The amount of protein adsorbed into the various surface modified substrates is determined using the quartz crystal microbalance method (QCM) by subtracting the ΔF of the empty QCM crystal (air baseline) to the ΔF after protein adsorption when the crystal is totally dried. By using the Sauerbrey equation, the calculated ΔF associated with the amount of protein adsorbed can be easily converted into mass (nanograms scale). Electropolymerized surface-modified substrates show superior protein resistance compared to those prepared from self-assembled monolayers. Among the different controlled films that are fabricated using self-assembled monolayers, TEG-thiol and PEG-thiol show outstanding performance to inhibit the adsorption of protein. The results are summarized in FIG. 29.

Figure 30:
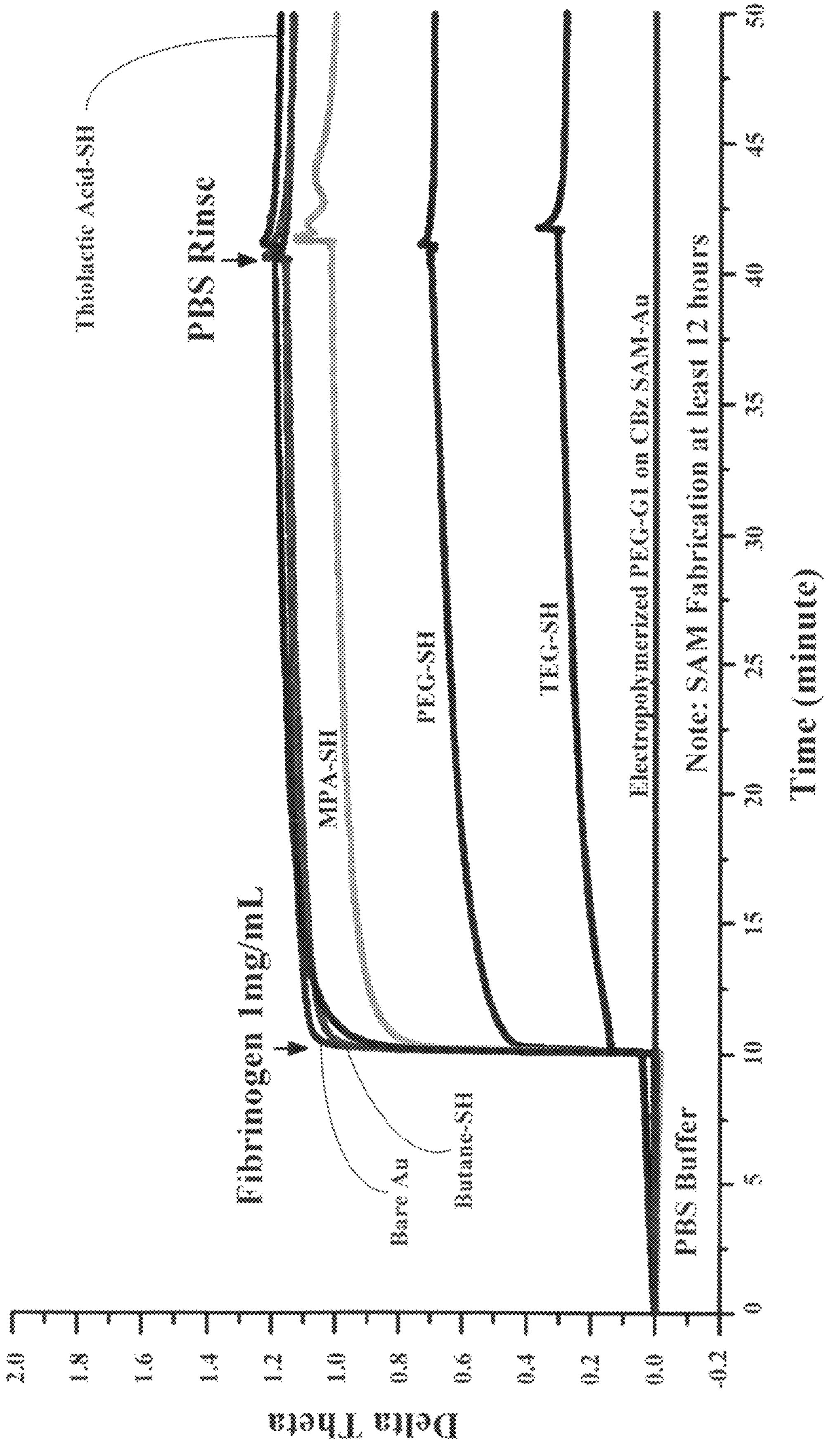
FIG. 30 shows surface plasmon reasonance spectroscopy kinetic measurements of protein adsorption on various surface-modified films.
Figure 31A:
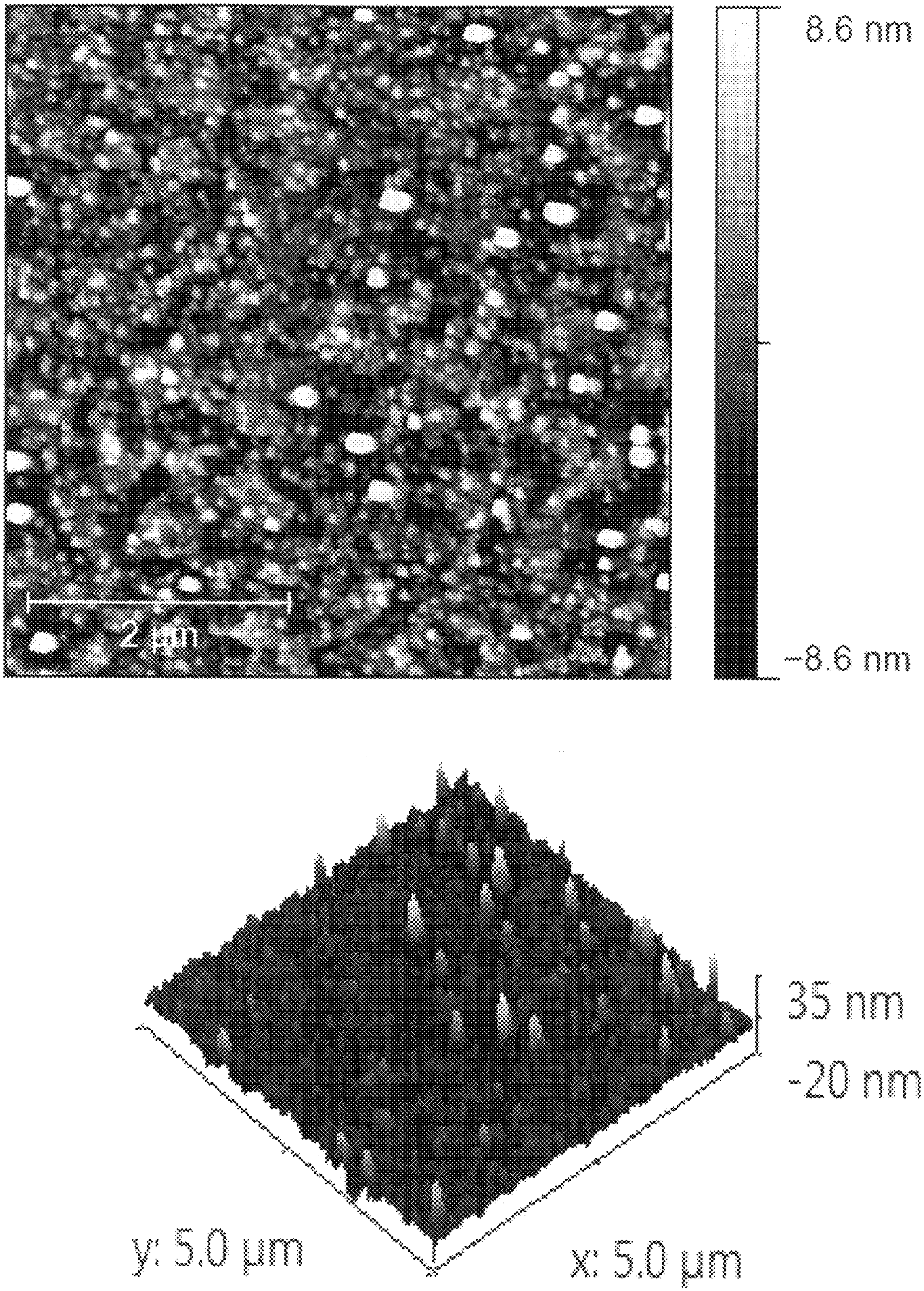
FIGS. 31A-D show AFM analysis of gold QCM crystals after protein adsorption. (A) AFM image of the electropolymerized TEG-$G_1$ SAM CBz before protein adsorption, and (B) after protein adsorption. (C) Bare gold and (D) SAM 1-Butanethiol after protein adsorption.
Figure 31B:
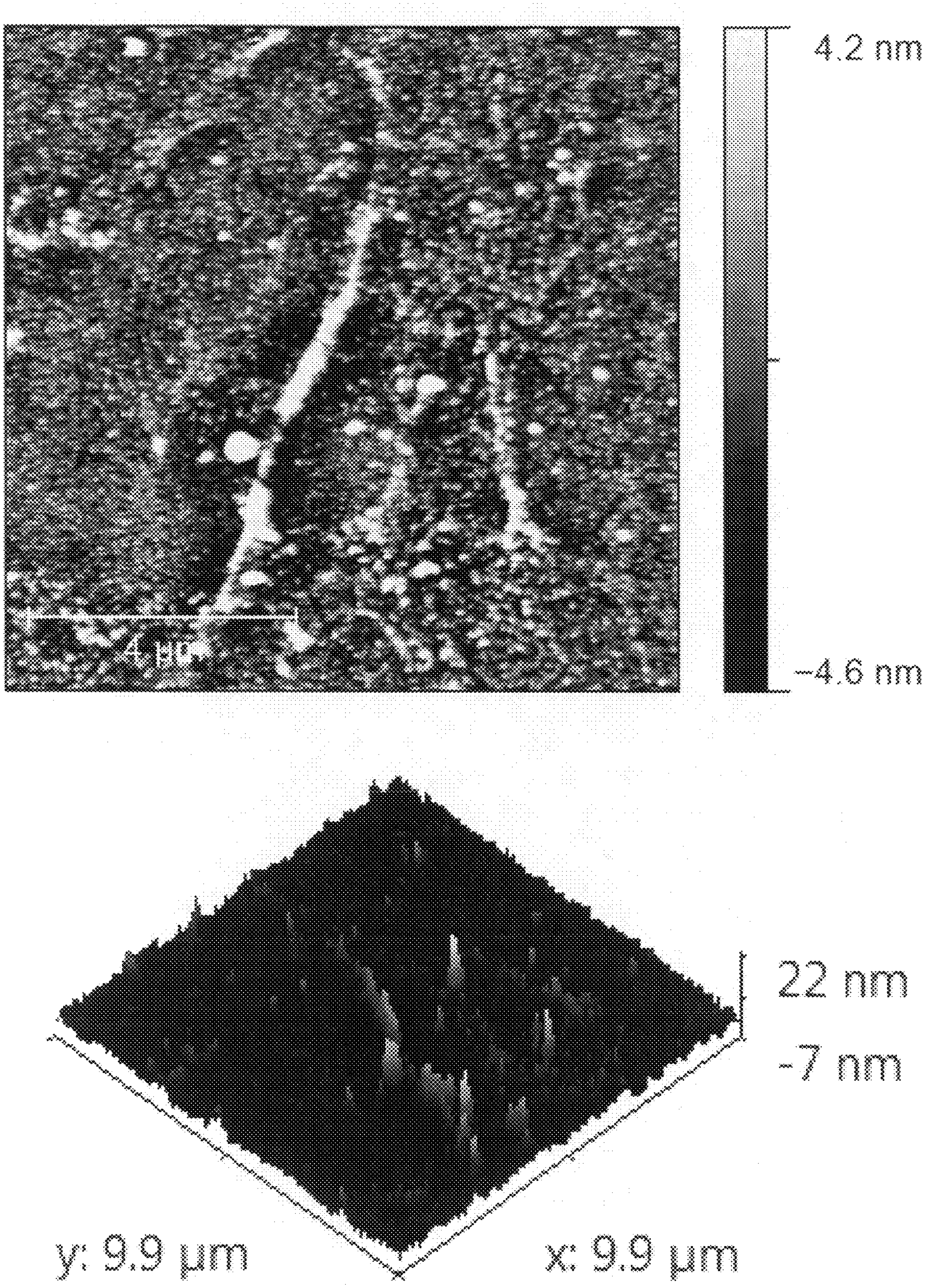
Figure 31C:
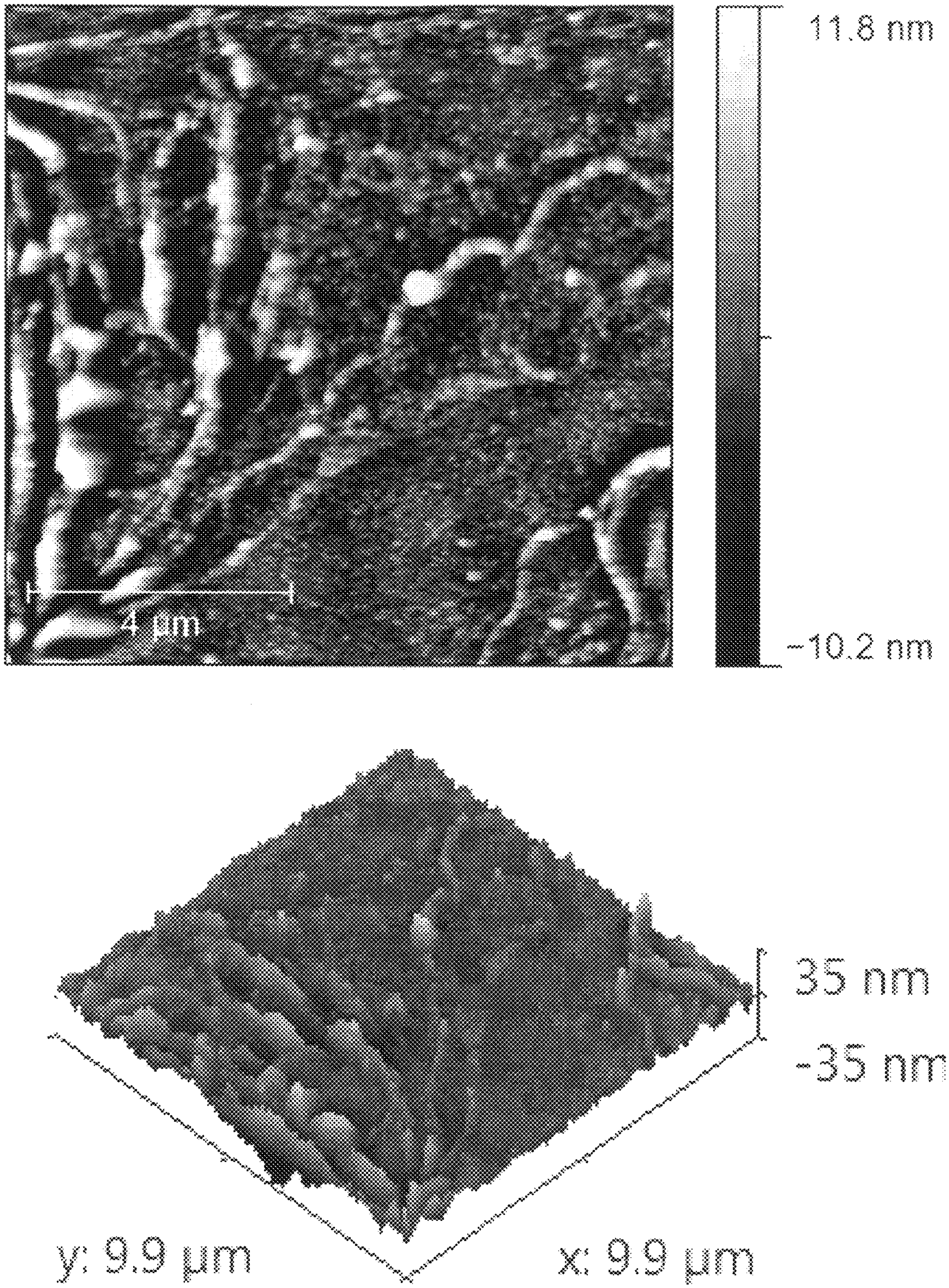
Figure 31D:
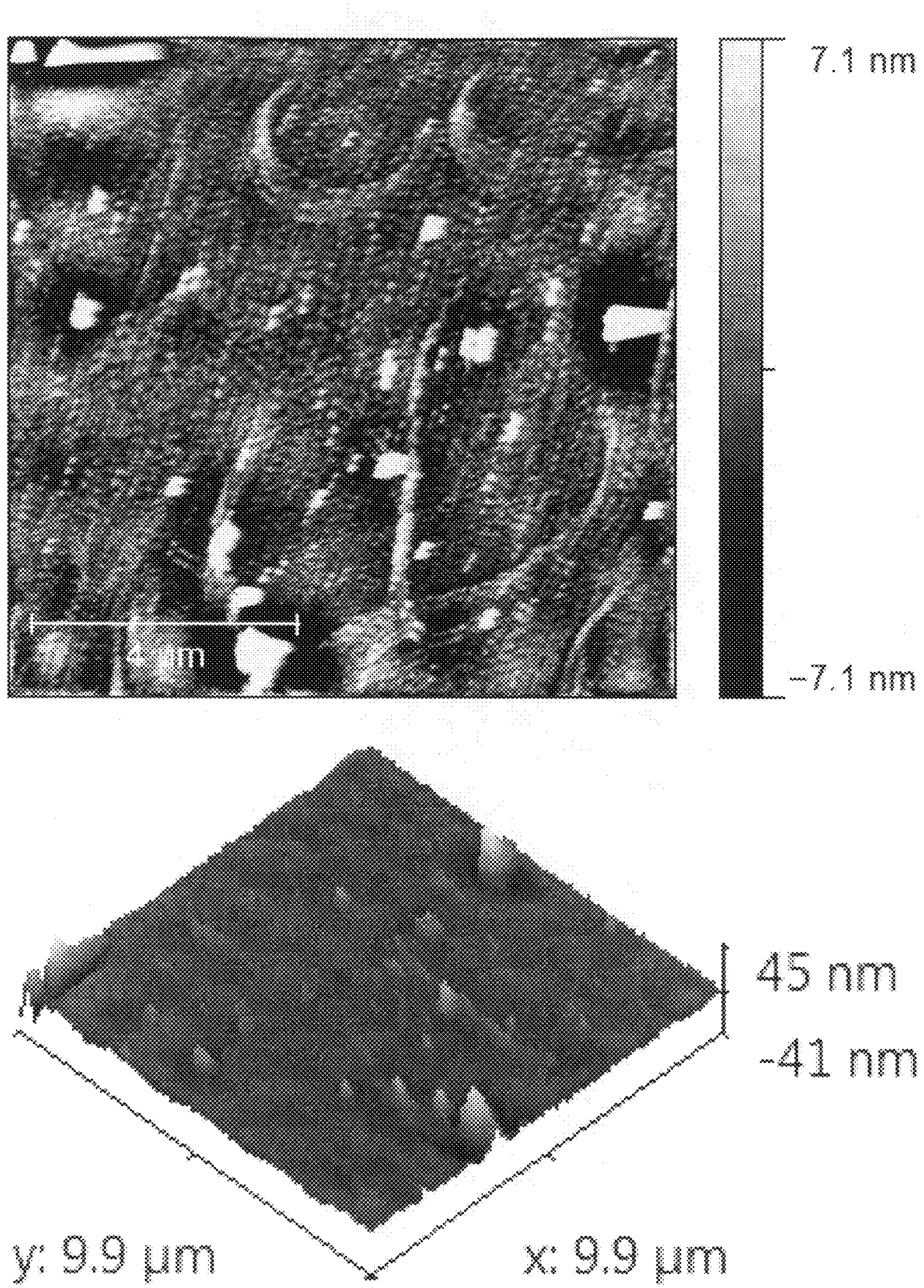

FIG. 30 shows the results obtained by surface plasmon resonance spectroscopy (SPR) kinetic measurements. SPR is used to monitor in-situ protein adsorption at the surface. A quick response from SPR is observed with the delta theta (Δθ) (the change in the minimum of the SPR angle), after injecting the fibrinogen into the different substrates. The equilibrium of adsorption is reached in about 30 minutes. The slight increase of the Δθ at the start of the rinsing is due to the heterogeneous mixing of the solution inside the SPR cell. Within 10 minutes, the signal returns back to the level prior to rinsing. The PEG-$G_1$ CBz SAM substrate demonstrates the least amount of increase in the θ after protein adsorption.

FIG. 31 shows the electropolymerized substrates has less protein adsorbed compared to the SAM fabricated layers. FIG. 31A shows the AFM image of the electropolymerized TEG-G1 SAM CBz film before protein adsorption, while FIG. 31B shows results after protein adsorption. FIG. 31C is obtained on bare gold, while FIG. 31D is obtained with SAM 1-Butanethiol after protein adsorption.

Figure 32:
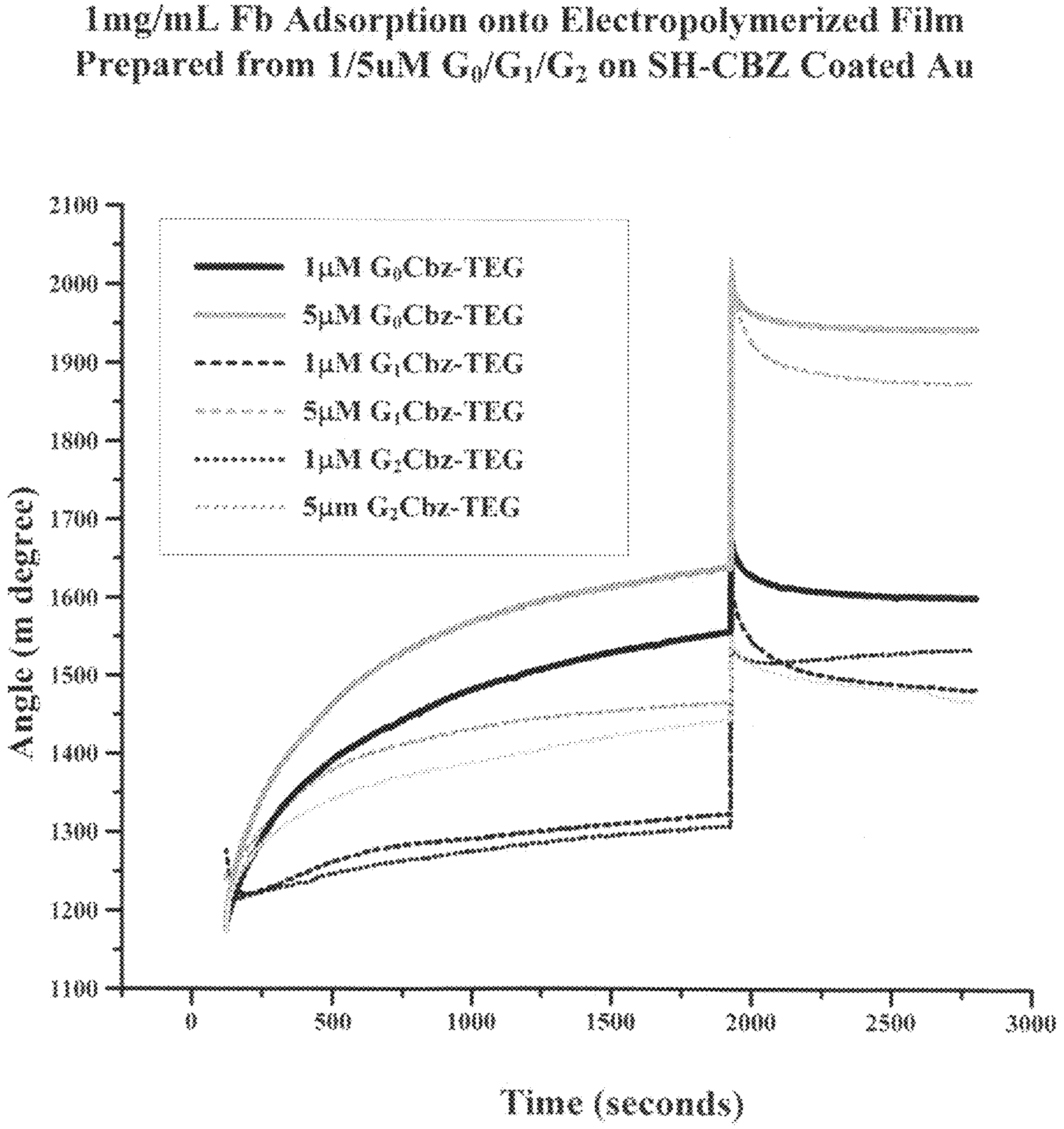
FIG. 32 shows the kinetics and relative amounts of Fb protein adsorbed on the different electrodeposited $G_0$, $G_1$, $G_2$ on surface-modified gold by surface plasmon resonance.

FIG. 32 shows adsorption studies conducted with Fibrinogen (Fb) performed on electropolymerized films of the G0, G1, G2 macromonomers on SAM modified gold substrates. These films are prepared as shown in FIG. 3 and the cyclic voltammetry results and characterization are described in FIGS. 6 to 8. The protein resistance properties are monitored in-situ using SPR as shown in FIG. 32. Among three generations of CBZ, G2 is the most protein resistant, followed by G1 and G0.

Films prepared from 1 μM of CBZ offers the best protein resistance, regardless of the CBZ generation level. In higher generations of CBZ (such as G2CBZTEG), the TEG chain does not collapse on the surface due to steric hindrance, which makes it the best protein resistant film. Moreover, the increased intramolecular crosslinking in higher generations of CBZ leads to a higher surface coverage, which hinders the collapsing of TEG chains on the surface. As a result, these films show a higher resistance to protein absorption. This indicates for these systems, optimization can be done to achieve the desired properties based on a number of properties including: structure of the macromolecule, concentration, electrochemical conditions, and copolymerization.

Figure 33:
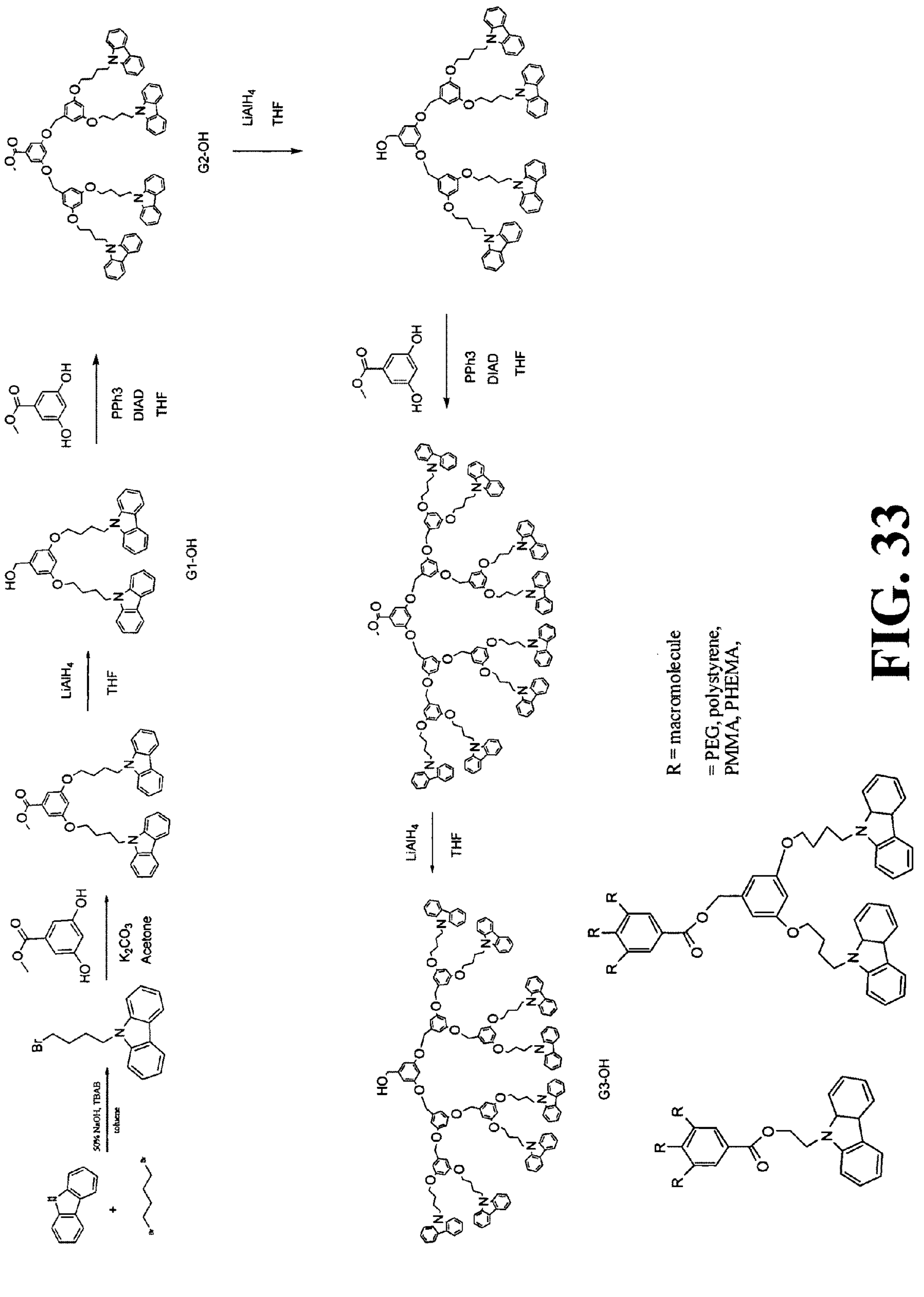
FIG. 33 shows the chemical structures of various electropolymerizable active groups and the variation on the number of macromolecules that can be attached.
Figure 34:
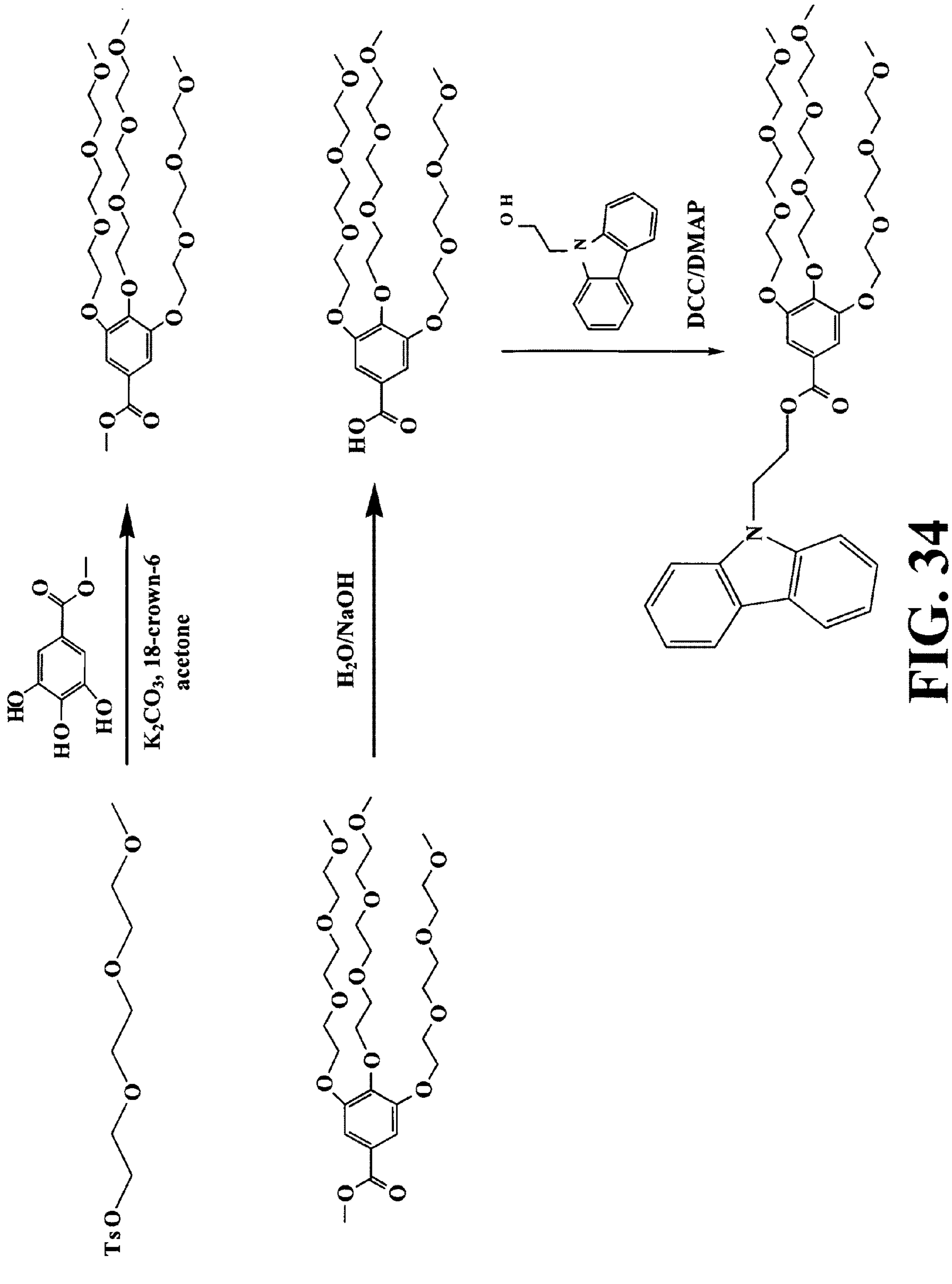
FIG. 34 shows the synthesis scheme for the attachment of a tri-macromolecule (TEG) branch on a G1 or dicarbazole group (electroactive group) forming a macromonomer variant.

Another embodiment of the present invention includes the synthesis of new electroactive macromonomers with different structures comprising of different amounts of electropolymerizable groups and macromolecular chains. For example, the functional end-group can be multiplied to have hyperbranched structures as shown in FIG. 33. This allows the incorporation of three polymer chains branching from a common focal point, represented by the R group, which can be a PEG, polystyrene, polymethylmethacrylate (PMMA), polyhydroxyethylemethacrylate (PHEMA), and other polymers that can be attached to a common focal point. For example, the synthesis scheme for the attachment of a tri-oligoethylene branched alcohol to the acidic —COOH, G1 carbazole is shown in FIG. 34.

Figure 35:
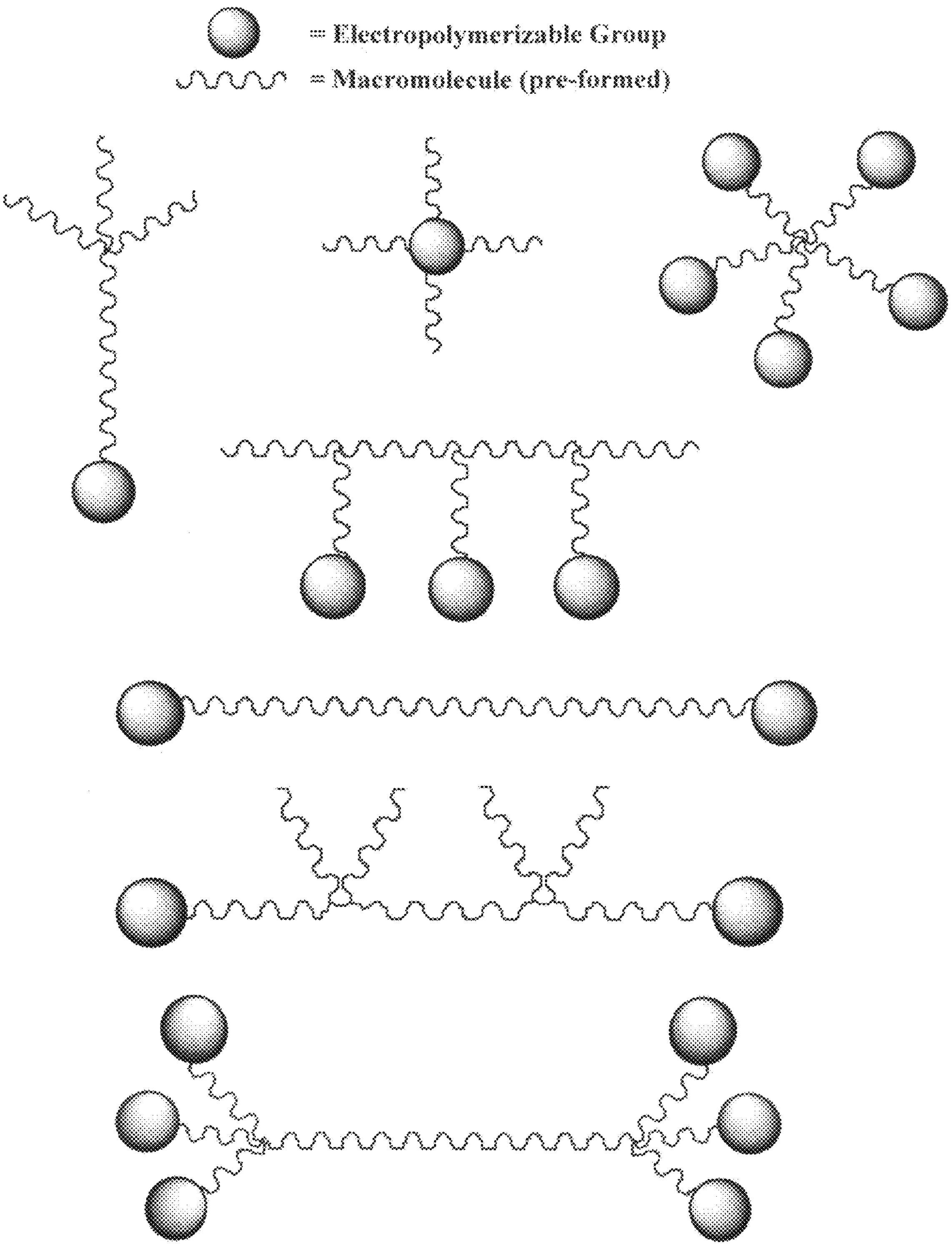
FIG. 35 shows the various designs of a electroactive macromonomer variant.

Other possible electroactive macromonomer structures can be in the form of graft homopolymers, copolymers, hyperbranched, and dendrimeric architectures. A variety of the possible structures are shown in FIG. 35. This can be designed and synthesized based on the parameters needed to obtain an optimized design for a combination of electroactive monomer groups and the macromolecule desired (preformed). What is important is that the macromolecule can be functionalized with the electroactive monomer with an organic reaction of high yield.

Section V

Introduction

Figure 36:
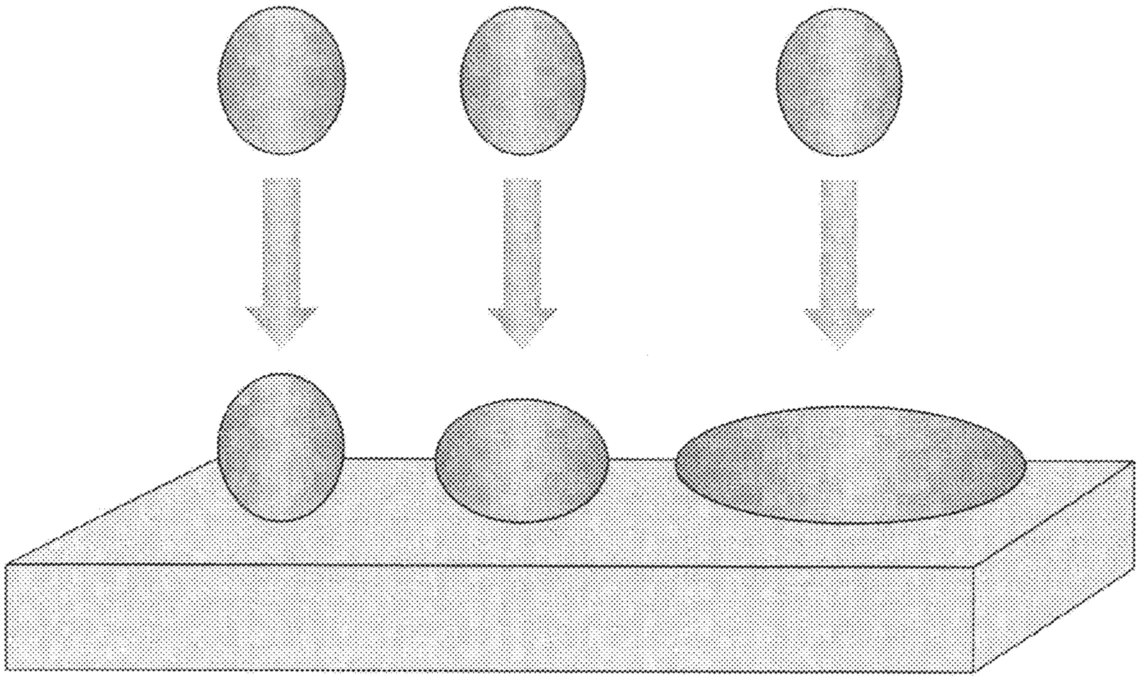
FIG. 36 illustrates protein non-specific adsorption on a surface of a substrate.

The tendency of biomolecules such as proteins to physically adsorb onto solid substrates without specific receptor-recognition interaction is known as non-specific adsorption as shown in FIG. 36. This nonspecific binding can reduce the functionality of an interface that is potentially useful in biorecognition by producing high background noise or "false positives". Moreover, complications arising from protein adsorption to surfaces such as catheters, implants, or artificial organs introduced into the human body may lead to irritations, chronic infections, or thrombosis.[1-6] As a result, it is the aim of this study to create surfaces that resist non-specific protein adsorption. Specifically, in this application, the inventor aimed at presenting an alternative and versatile approach in fabricating a bioinert surface that offers unprecendented nanoscale control over the thin film architecture. The present methodology provides a novel and unique opportunity to engineer surfaces at the molecular level by introducing PEGylated carbzole dendron macromolecules.

Figure 37:
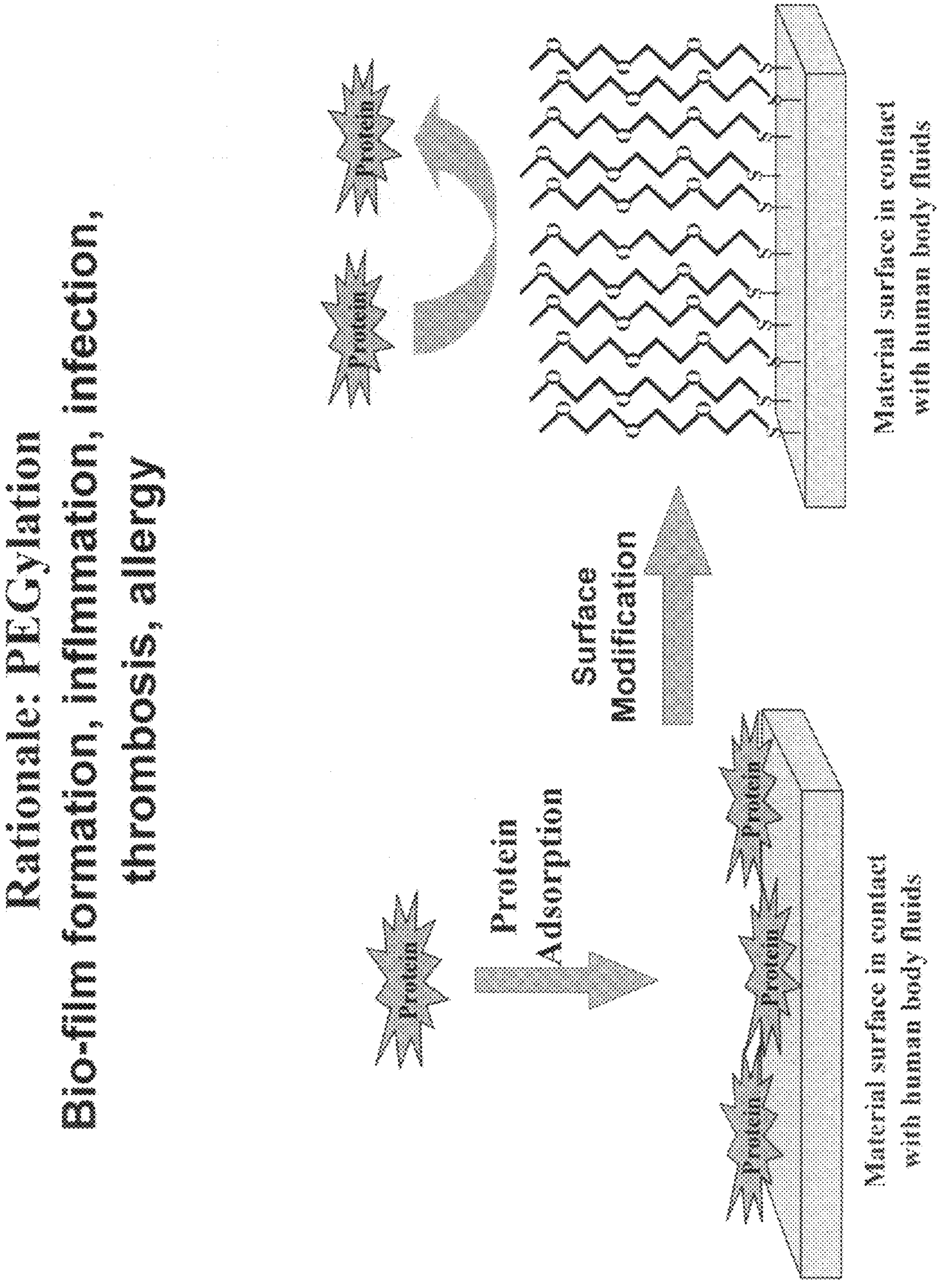
FIG. 37 illustrates protein adsorption on a surface before and after thiol terminated PEG SAM layer formed on the surface of the substrate.

Protein adsorption on artificial surfaces is an important property to take into consideration when evaluating their biocompatibility. The control of protein adsorption is crucial for tailoring molecular recognition events at surfaces in biosensing as well as for designing protein-resistant surfaces in biomedical applications. A well-established strategy to improve the biocompatibility of the surface is grafting poly (ethylene glycol) (PEG).[6-15] This resistant material is typically applied onto a desired surface via self-assembled monolayer (SAMs), chemical grafting, or polymerization methods as shown in FIG. 37. However, potential problems with incomplete, non-uniform surface coverage, possible multiple synthetic steps, and the restriction of SAMs to silicon or gold substrates greatly limit these techniques for creating bioinert coatings.

The nonfouling properties of PEG toward proteins have been the subject of considerable research interest. Oligo(ethylene glycol) as short as three repeating units in helical or amorphous forms was shown to resist non-specific protein adsorption.[18] Understanding the molecular mechanisms leading to PEG's protein resistance has gained attention since it seems that different molecular mechanisms may be at work. Prime and Whitesides[15] demonstrated that both hydroxyl- and methoxy-terminated oligo(ethylene glycol) SAMs on Au begins to exhibit at 35% surface coverage. These researchers illustrated that the presence of flexible PEG strands is necessary for protein resistance. This phenomenon is explained by the prevention of the direct interaction between the surface and the protein by forming a stable solid-liquid interface involving tightly bound water. Quantum calculations by Grunze$_{16}$ also suggested that the densely-packed all-trans phase of PEG terminated SAM cannot form a stable solvation layer, while the helical structure stabilizes such a layer. On the other hand, Schleifer[17] showed that the presence of a dense and inert film prevents contact between the substrate and the protein rendering the film protein-resistant.

From the above theories, it is clear that grafting density and intrinsic hydration of PEG determine protein resistance. Recently, however, Hess argued that the distribution of the PEG polymer chains is close to random as opposed to the assumptions of the previous theories that the polymer chains are evenly distributed across the surface, with a constant spacing determined by the grafting density. The manipulation of the architecture of a resistant film is necessary then to effectively control the degree of intrinsic hydration of the PEG chains.

One possible way of controlling the spaces of the PEG chains is to introduce dendronized moiety on the backbone of the PEGylated material. The predictable shape of each dendron generation provides a new approach in studying the PEG conformation at the surface.

The PEGylated dendrons of this invention represent a new class of electrograftable compositions of the general formula (X):

$$(ArN{-}R{\leftarrow})_n Ar'({-}R'O{\rightarrow})_m H$$

where ArN is a nitrogen containing aryl group, where the nitrogen atom is reactively available for chemical modification, Ar' is an arenyl linking group, R is a carbyl linking group having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", NR"$_2$, SR", PR"$_2$, or mixtures thereof and R" are alkyl, aryl, alkaryl or aralkyl groups having between 1-20 carbon atoms and where R'O is an alkenyloxide group, where R' carbyl group having between 1 and 20 carbon atoms. It should be recognized that a surface of a substrate can be modified with one or a plurality of compositions of formula (X). If should also be recognized that the $(R'O)_m$ moiety is a specific choice of the circle P of formula (II) above.

Figure 38A:
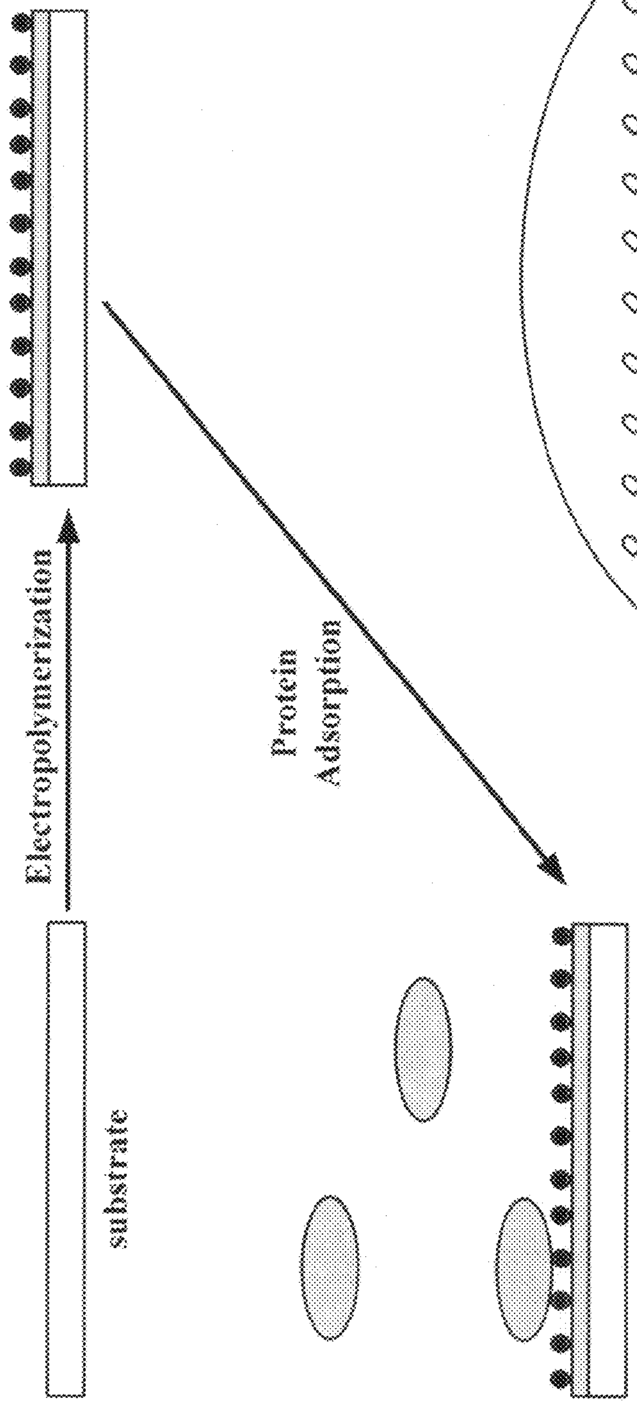
FIG. 38A depicts a target PEGylated linear-carbazole monodendron of this invention deposited on the surface via eletropolymeration showing protein association after treatment.
Figure 38B:
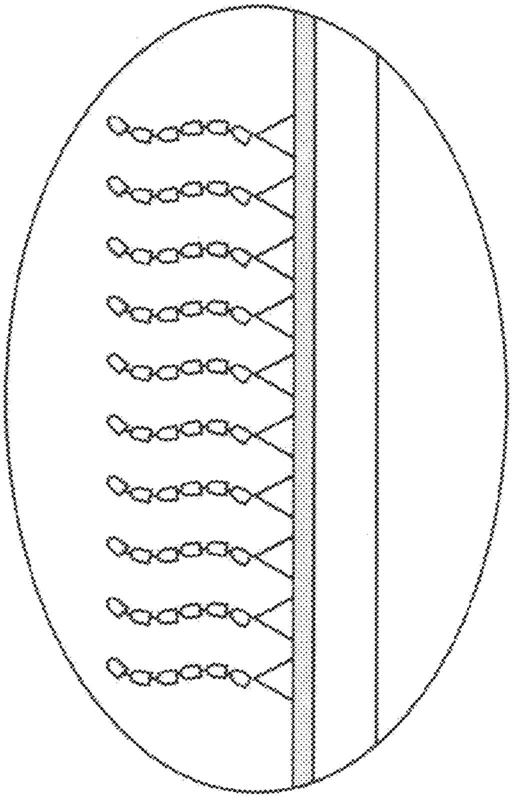
FIG. 38B depicts an enlarge portion of the PEGylated linear-carbazole monodendron extending from the surface.

We have created biocompatible surfaces by modifying the surface with PEGylated dendron macromolecules that can be electrochemically grafted on different substrates suited for biomedical applications as shown in FIGS. 38A&B.

Figure 38C:
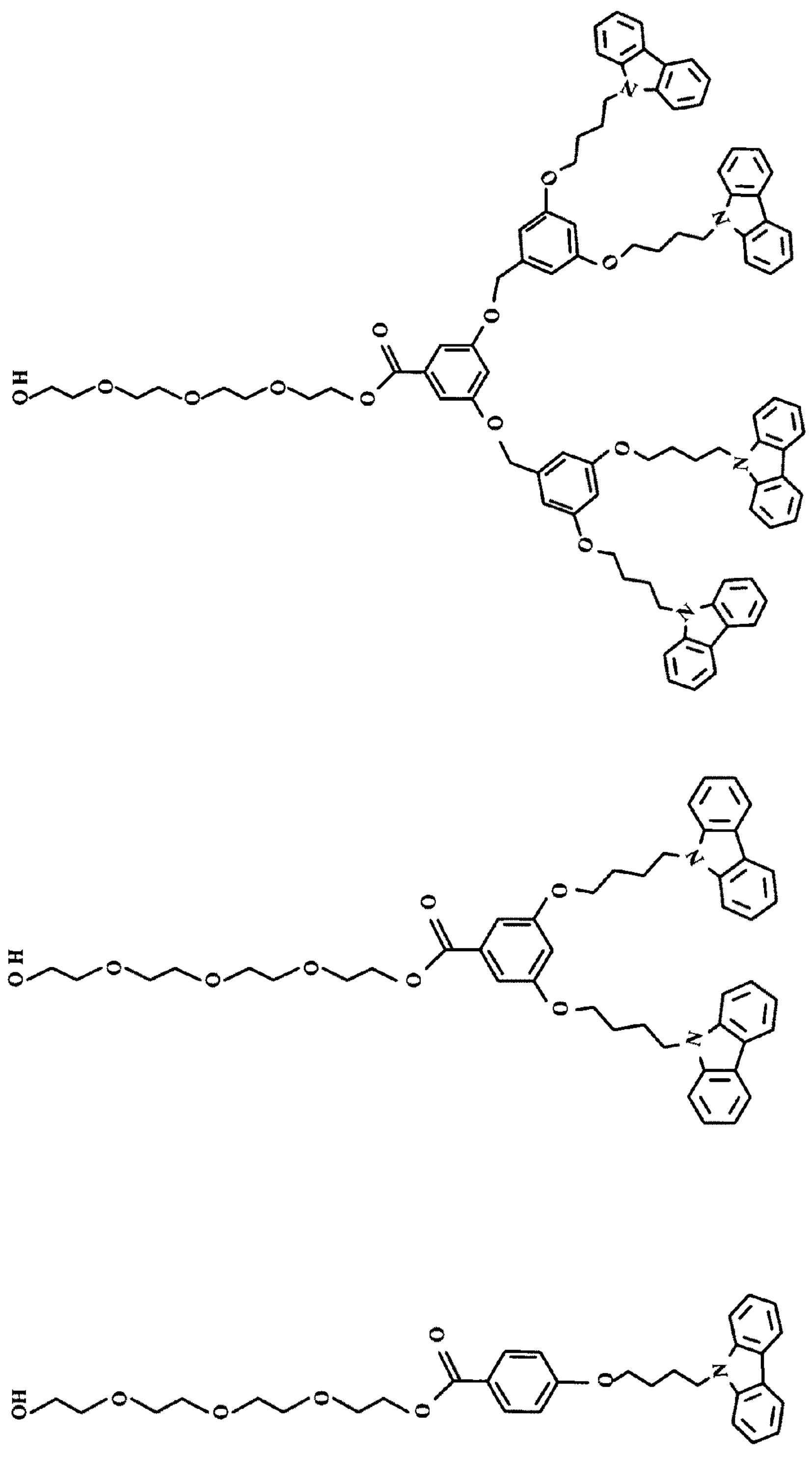
FIG. 38C depicts three embodiments of the PEGylated linear-carbazole dendrons of this invention.

Three different embodiments of the PEGylated dendrons of formula (X) comprising PEGylated carbazole dendrons designated $G_0$CBztEG, $G_1$CBztEG and $G_2$CBztEG were synthesized and evaluated for their protein resistance as compared to monothiolated tetraethylene glycol as shown in FIG. 38C. Their main structural features include: (a) dendronized carbazole moiety which can be electrografted on the surface and (b) peripheral hydroxyl groups for further modification. This application provides a novel way of manipulating the architecture of a protein-resistant film at the molecular level.

Results and Discussion

Figure 39A:
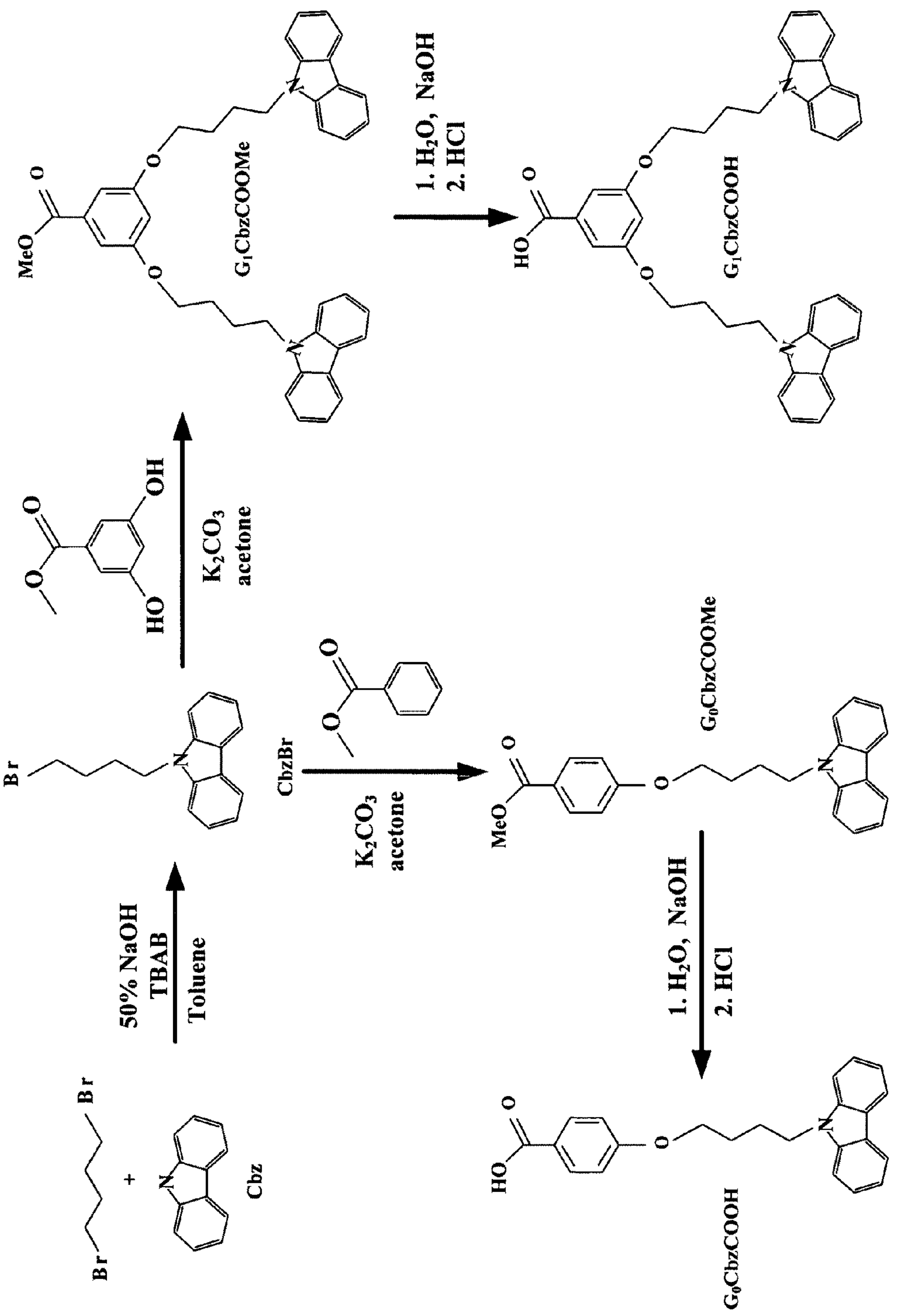
FIG. 39A depicts generalized synthetic Scheme 3A for preparing two carbazole dendrons of this invention.
Figure 39B:
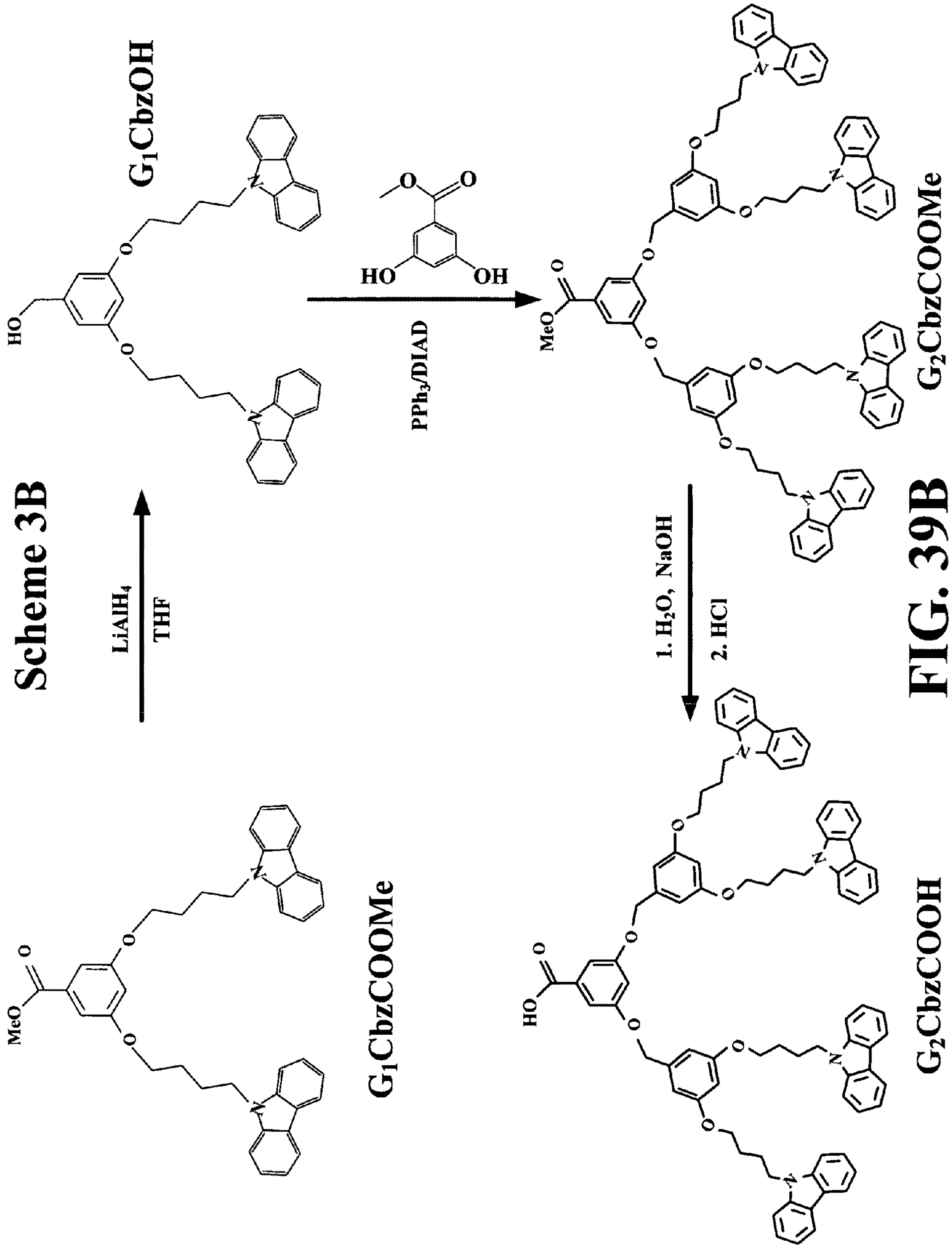
FIG. 39B depicts generalized synthetic Scheme 3B for preparing another carbazole dendron of this invention.

The synthesis of the target PEGylated carbazole dendrons started by preparing the three different generations of carbazole-terminated dendrons utilizing a sonochemical method as previously reported.[21] Two stepwise syntheses of the carbazole dendrons Schemes 3A&B shown in FIGS. 39A&B.

Figure 39C:
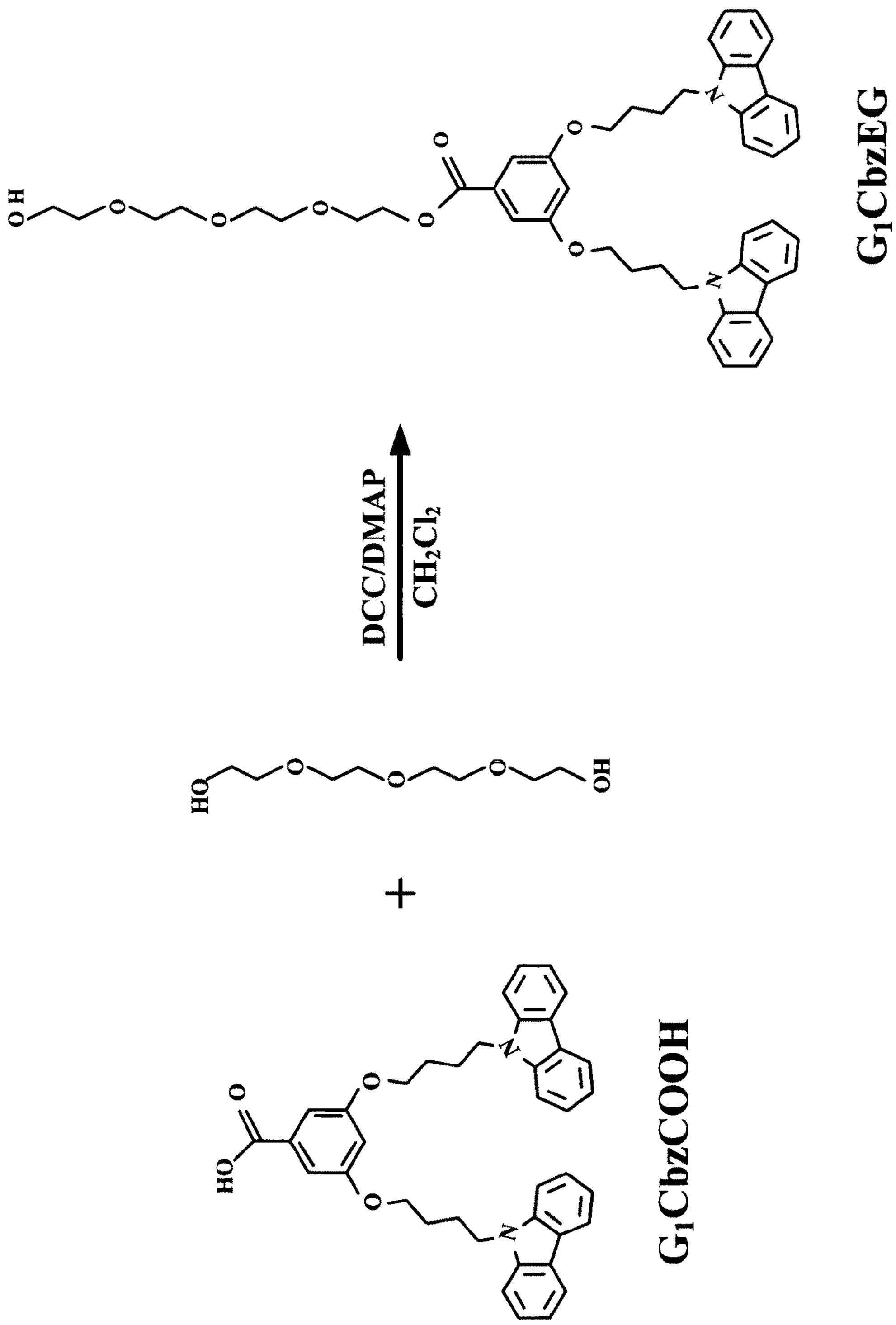
FIG. 39C depicts a generalized synthetic Scheme 3C for preparing PEGylated carbazole dendrons of this invention.

The corresponding acid for each generation was afforded via the hydrolysis of the ester group following a previous procedure by Bo et al.[20] The substituted acid was then coupled with excess tetraethylene glycol via dicyclohexylcarbodiimide coupling to afford the target PEGylated dendrons, $G_0$CBztEG, $G_1$CBztEG and $G_2$CBztEG as shown in FIG. 39C. The crude product was further purified using chromatographic methods to remove the excess DCC and urea byproducts yielding the desired monoadditive products in quantitative yields. $_1$H NMR confirmed the structures of the desired PEGylated carbazole dendrons. The characteristic peaks found at 3.7-3.3 ppm are assigned to the addition of the ethylene glycol (EG) units to the carbazole dendrons. The peaks assigned to EG units were consistent with reported values in the literature.[23-25]

Electrografting Studies

The PEG was designed to have the carbazole dendrons to offer electropolymerizability. Several studies on the electrochemical oxidation of carbazole have been reported.[26-33] Ambrose et. al. investigated the anodic oxidation of carbazole and its N-substituted derivatives.[27,28] They suggested that the formation of the dicarbazyl dictation at the 3- and 3'-positions is the predominant pathway during anodic oxidation. On the other hand, several groups reported the electrodeposition of longer polycarbazole film under suitable conditions.[29]

Each of the PEGylated carbazole dendrons was electrochemically deposited on a modified Au substrate. This allows the evaluation of in situ protein adsorption using Surface Plasmon Resonance (SPR) spectroscopy. The Au substrates were modified by dipping into a 5 mM 4-(9H-carbazol-9-yl) butane-1-thiol (CbzSH) solution at room temperature for a period of 18 hours. The synthesis of CbzSH was done following an adapted procedure.[23] The CV of the 1 μM solution of each of the PEGylated dendrons was performed in a three-electrode cell containing 0.1 M tetrabutylammonium hexafluorophosphate in acetonitrile as the supporting electrolyte. The electrodeposition was performed by sweeping the voltage at a scan rate of 50 mV/s from 0 to 1.1V against a Ag/AgCl as a reference electrode and Pt was used as a counterelectrode. Electrodeposition on the films were done in 20 cycles.

Figure 40A:
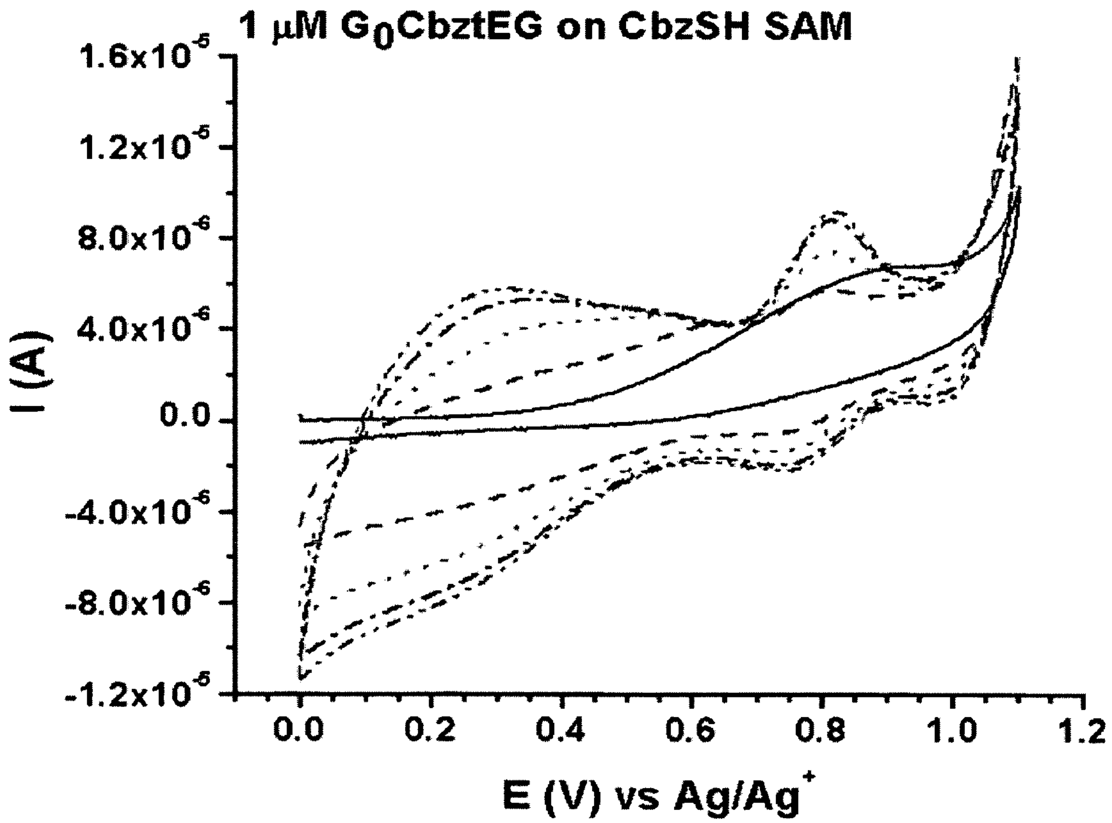
FIGS. 40A-C depict CV of 1 μM solutions of (A) $G_0$CbztEG; (B) $G_1$CbztEG; and (C) $G_2$CbztEG in AcN.
Figure 40B:
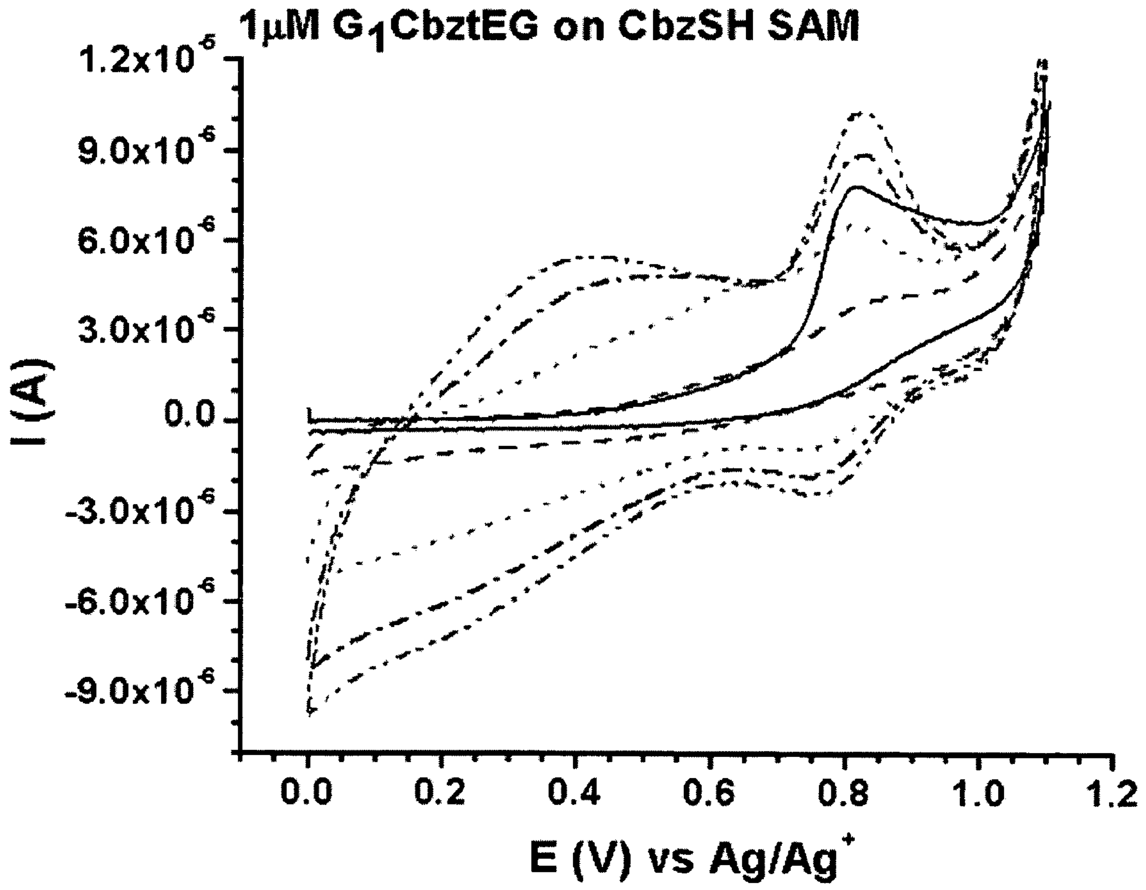
Figure 40C:
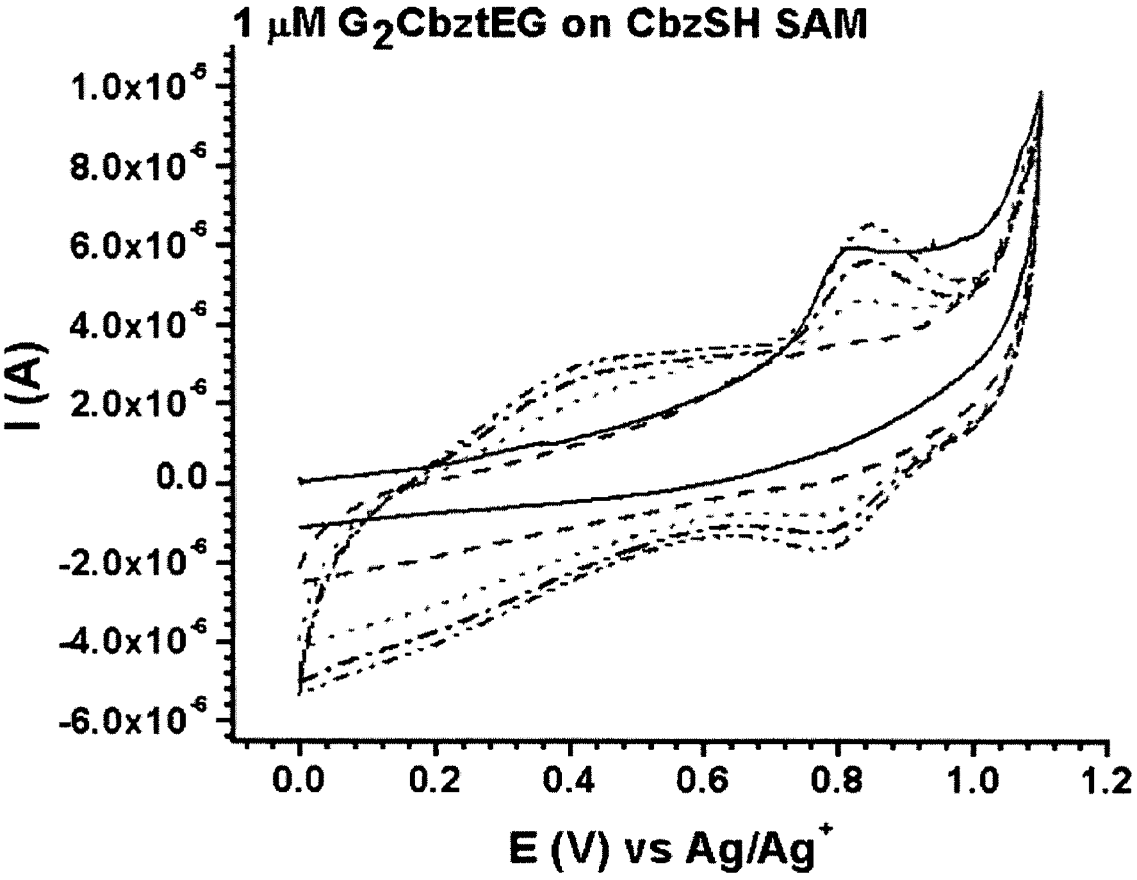

The CV traces of each $G_0$, $G_1$, and $G_2$ generations of the PEGylated carbazole dendrons are shown in FIGS. 40A-C, respectively. As shown, the strong peaks at 0.84-0.86 V (vs $Ag/Ag_+$) for all the generations are due to the oxidation of the dicarbazyl species.$_{27-33}$ The redox process is quasi-reversible for all the generations, giving a corresponding reduction peaks at 0.78-0.80 V (vs $Ag/Ag_+$). The CV gives clear evidence of the electrochemical oxidation of the carbazole units. Furthermore, it was observed that as the polymerization progresses, the peak current increases in the successive cycles. This clearly indicates the growth of the polymer film on the electrode.[21]

Water contact angle measurements were carried out to investigate the grafting of the PEGylated carbazole dendrons. As shown in Table 6, a significant decrease in static contact angle for all the generations is observed as compared to the water contact angle of the CbzSH SAMs. The decrease in contact angle reflects the hydrophilic nature imparted by the PEG chains and therefore indicates a successful electrografting of the PEGylated carbazole dendrons on the electrodes. These contact angle values were also comparable with that measured by Bartz, et al on the gold-coated glass slides after adsorption with the monothiol derived from tetraethylene glycol yielding an advancing contact angle of 65.1° and a receding contact angle of 59.5°,[23]

TABLE 6

Static Contact Angle Measurements of $G_0$CBztEG, $G_1$CBztEG, and $G_2$CBztEG

| | Contact Angle | | Thickness Å |
|---|---|---|---|
| Generation | CbzSH SAM | CbzSH SAM + $G_n$CbztEG | $G_n$CbztEG |
| $G_0$CbztEG | 76.57 | 57.00 | 9.3 |
| $G_1$CbztEG | 81.95 | 63.64 | 14.4 |
| $G_2$CbztEG | 80.58 | 57.04 | 28 |

Figure 41B:
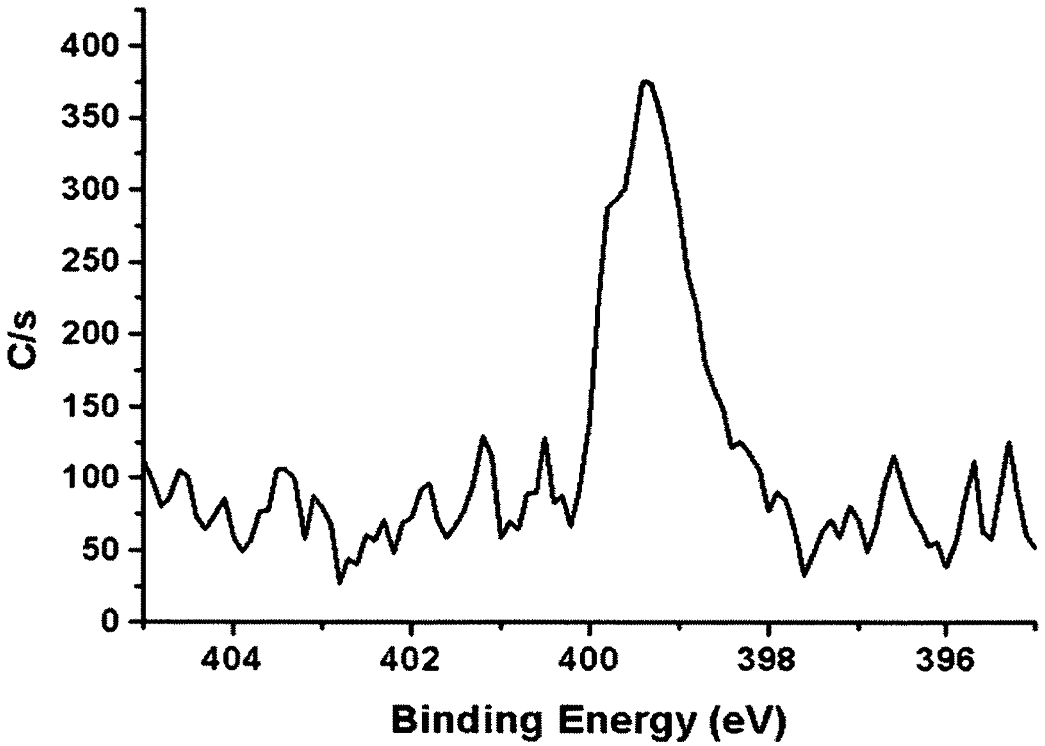
Figure 41C:
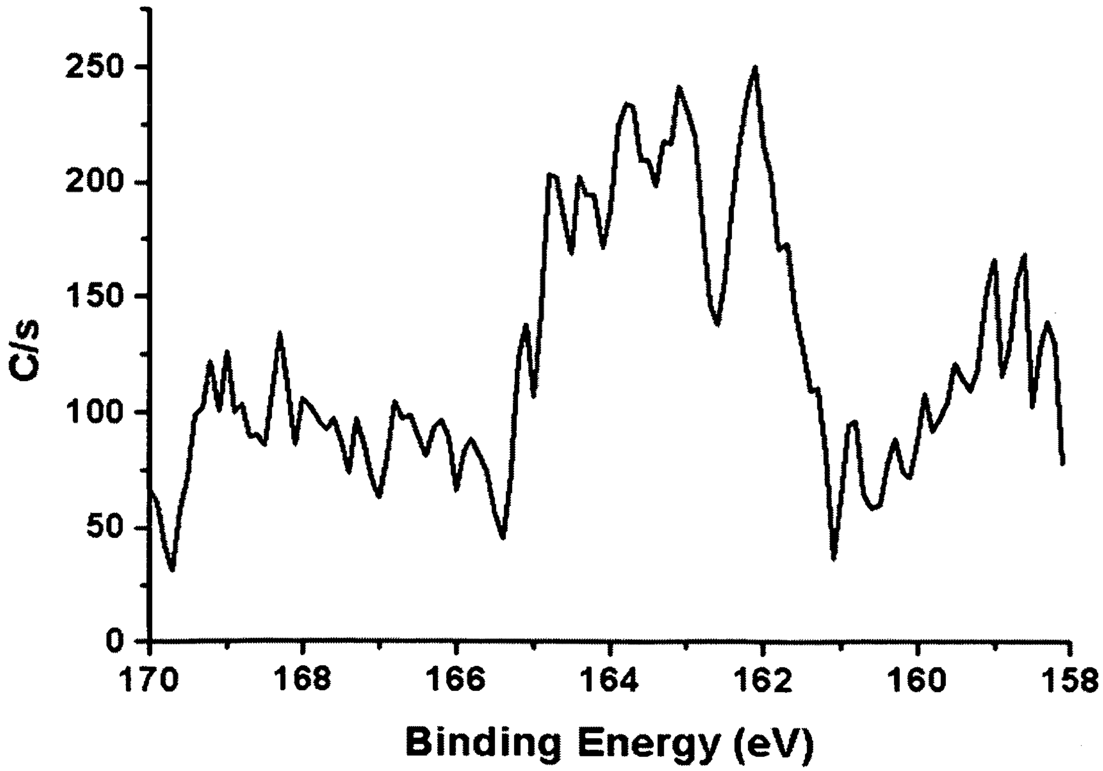

The successful electrografting of the GnCbztEG series over a CbzSH-coated Au was confirmed by X-ray Photoelectron Spectroscopy (XPS). FIGS. 41A-C show the XPS data for the CbzSH SAM. The XPS survey scan shows the presence of the expected N, C, and S peaks. The high resolution XPS data shows an intense peak at ~399 eV (FIG. 41B) corresponding to the N is peak of the carbazole ring. The S 2p photoelectron peak at 162 eV signify the presence of gold-bound sulfur atoms (Au—S). In addition, the presence of unbound thiol group was also observed at ~163-165 eV.

Figure 42A:
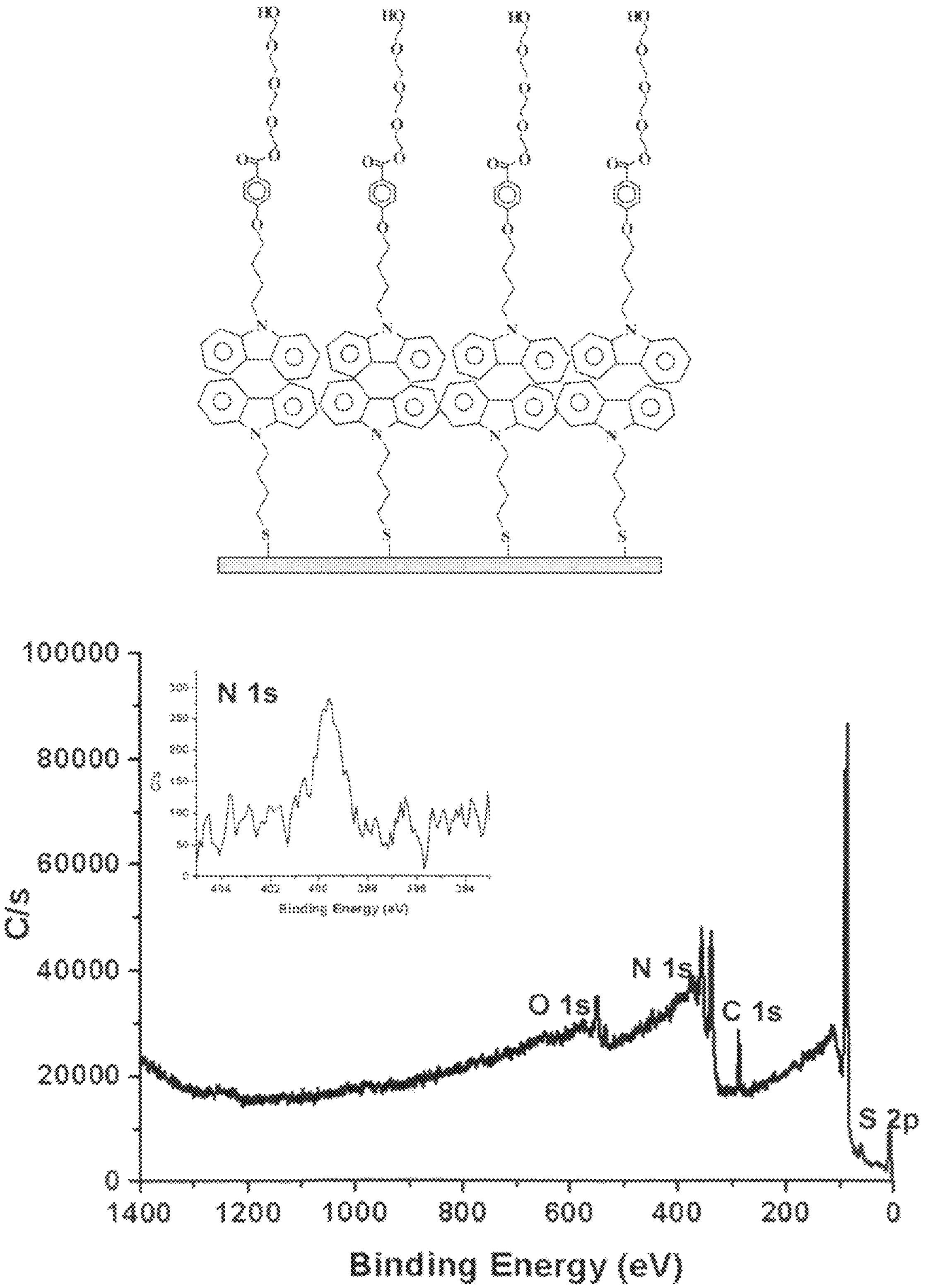
FIGS. 42A&B depicts XPS data for the $G_n$CbztEG series. (A) Survey of $G_1$CbztEG and (B) plot of the % N vs thickness of the different $G_1$CbztEG generations.
Figure 42B:
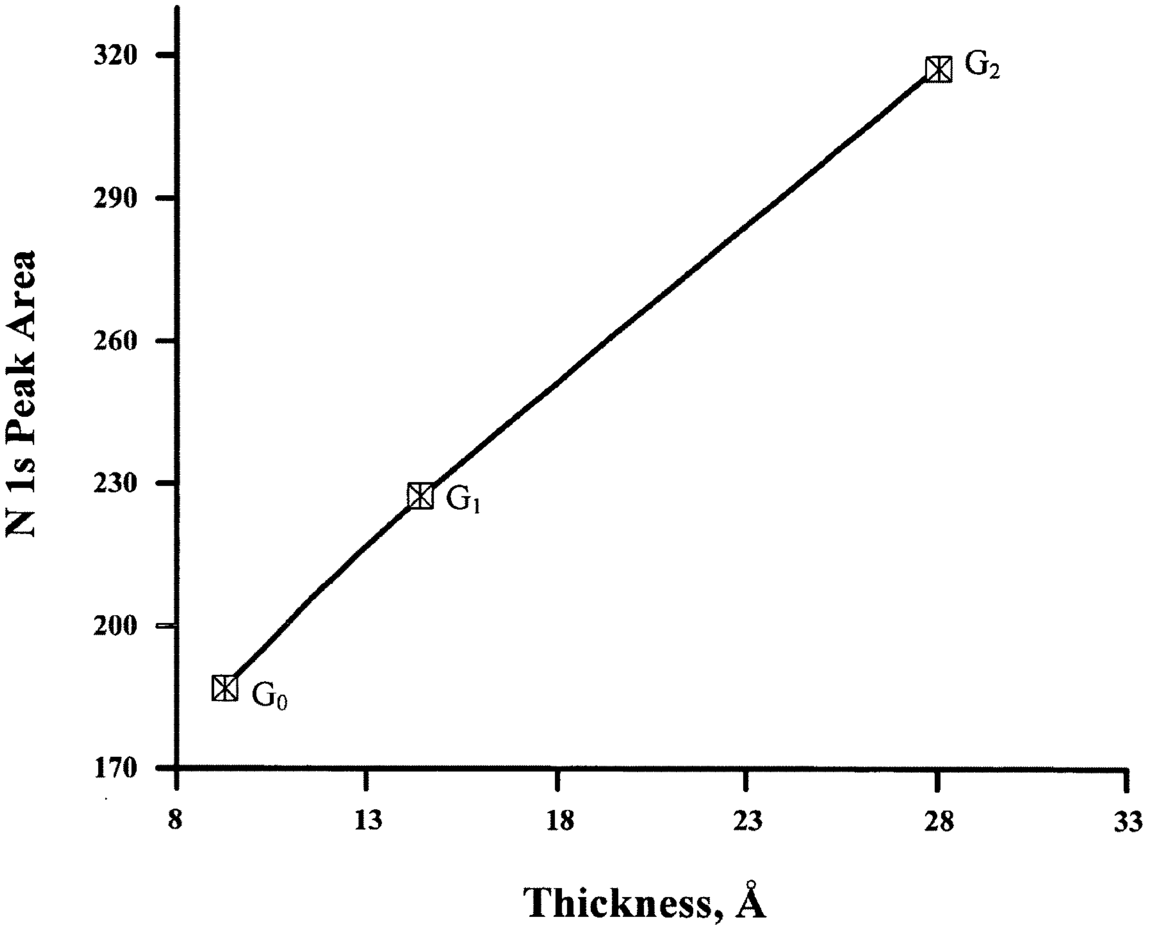

High resolution XPS data of the electrografted PEGylated carbazole dendrons showed significant attenuation of the N 1s peak as compared to that of CbzSH SAM. This data confirmed the addition of the GnCbztEG series over the CbzSH SAM. A representative data for the electrografted PEGylated carbazole dendrons is shown in FIG. 42A. A linear relationship was also observed for the thickness and the % N for the PEGylated carbazole dendrons as shown in FIG. 42B. The % N increases from $G_0$ to $G_1$ to $G_2$ of the PEGylated carbzole dendrons. Thickness measurements also showed an increase in the film thickness from $G_0$ to $G_1$ to $G_2$. This observation suggests that the molecular conformation of the PEG chain is greatly influenced by the dendron generation.

Protein Adsorption Studies

Most of the protein resistance studies were done using self-assembled monolayers. In this system, the intra- and inter-chain interactions among the molecules determine the conformation of the individual chains within the assembly and the packing and ordering with respect to each other.[37] Since PEG units are connected to different dendron generations, this study provides a new insight in the molecular conformation of the oligo(ethylene glycol) units on the surface.

In the development of protein-resistant surfaces, nonspecific protein adsorption is evaluated by R spectroscopy. This technique allows for real-time and label-free detection of protein adsorption and its kinetics with high sensitivity.[34] The choice of the model protein, fibrinogen (Fg), was prompted by the fact that it is one of the major constituents of human blood plasma and plays a very important role in device rejection.[35]

Figure 43:
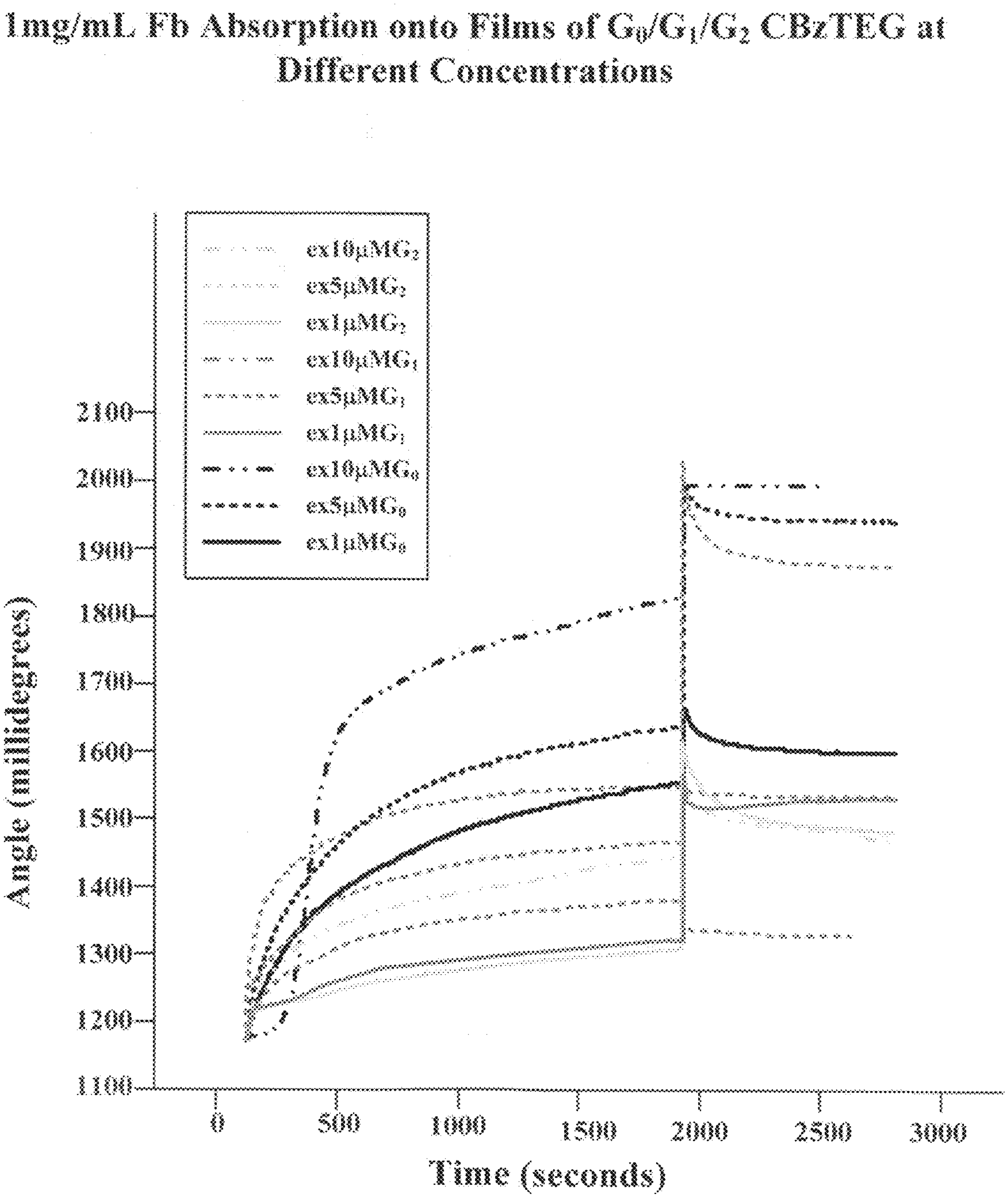
FIG. 43 depicts SPR sensogram for Fg adsorption on $G_0$CbztEG, $G_1$CbztEG, and $G_2$CbztEG surfaces.

SPR kinetic measurements were performed using an Autolab Springle system. Initially, the surface with the electrodeposited film was stabilized with the phosphate buffer saline (PBS). After establishing a stable baseline, the surface with the film was exposed to 1 mg/mL Fg in PBS for 30 mins. Then the surface was washed with the PBS buffer for 10 mins. In SPR analysis, the adsorbed amount of material onto the Au layer is a linear function of SPR angle shift.[36] FIG. 43 shows the SPR sensogram for Fg adsorption on the different PEGylated carbazole dendron generations at three different concentrations: 1 μM, 5 μM, and 10 μM.

From the SPR data, it was shown that the film prepared from the highest generation $G_2$CbztEG dendron showed the best protein-resistant film as compared to $G_0$CbztEG and to $G_1$CbztEG. These data suggest that the dendron size dictates the orientation of the PEG chains available for intrinsic hydration that is responsible for protein repulsion. The possibility of greater intra-molecular cross-linking in higher carbazole generations allows the coverage of a greater area of the substrate that probably hinders the collapse of the hydrophilic PEG moiety on the hydrophobic carbazole surface leading to a more protein-resistant film.

Figure 44:
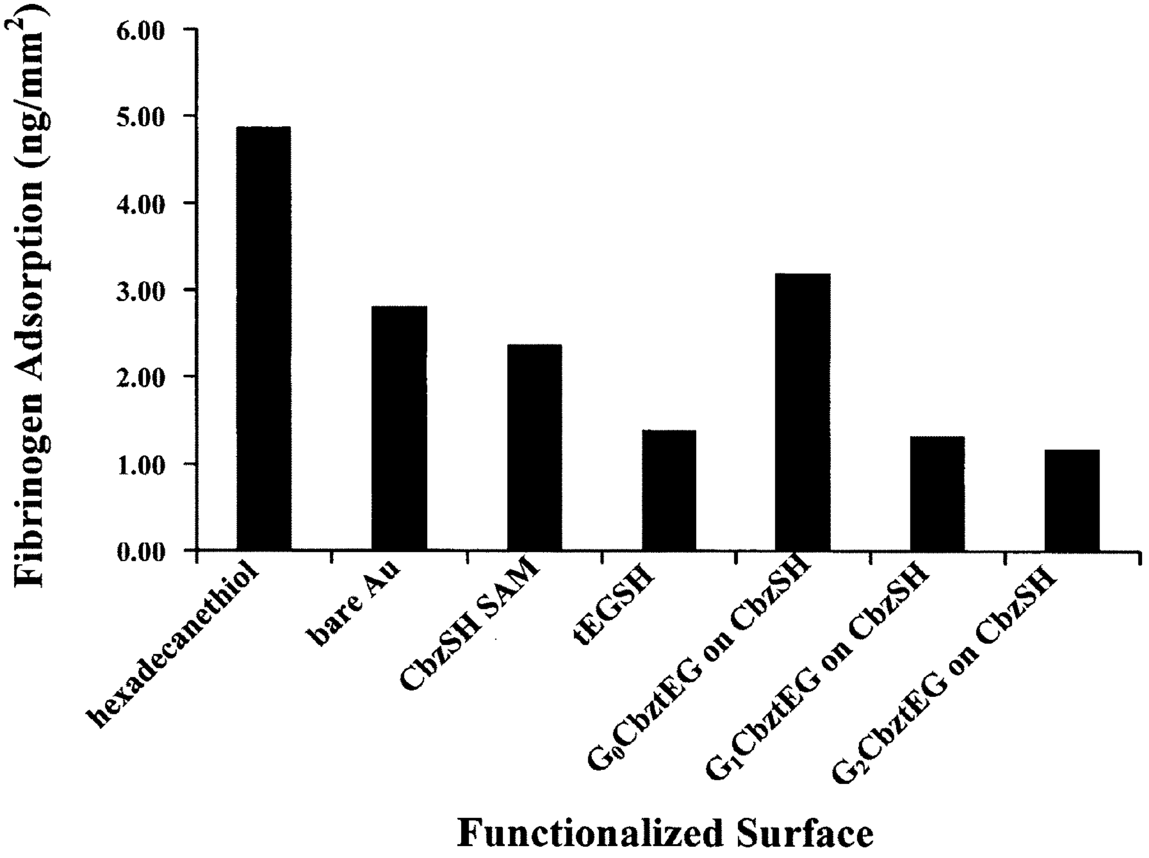
FIG. 44 depicts comparison of 1 mg/mL Fb adsorption on differentially-functionalized surfaces.

A change in SPR angle shift of 120 millidegree corresponds to a protein coverage change of 1 $ng/mm^2$.[36] FIG. 44 shows the estimated amount of Fg adsorption on different functionalized surfaces. As shown, all the PEGylated dendrons show a decreased protein adsorption as compared to hexadecanethiol-coated Au surface. However, the ability of the various $G_n$CbztEG-functionalized surfaces to resist protein adsorption differs remarkably. Both $G_1$CbztEG and $G_2$CbzTEG coated films showed a lower protein adsorption as compared to monothiolated tetraethylene glycol (tEGSH) while $G_0$CbztEG showed a higher protein adsorption.

To determine whether the degree of adsorption is influenced by the nature of the protein, SPR measurements were also performed with Lysozyme (Lys, MW=14.7 kDa) and Bovine serum albumin (BSA, MW=67 kDa), both of which are smaller proteins relative to Fb (MW=340 kDa).[38-39] In addition, under the conducted experimental conditions, Fb (pI=5.5) and BSA (pI=4.8) are negatively-charged while Lys (pI=11.1) is positively charged. These proteins are expected to respond differently to the PEG-functionalized dendronized surfaces.

Figure 45:
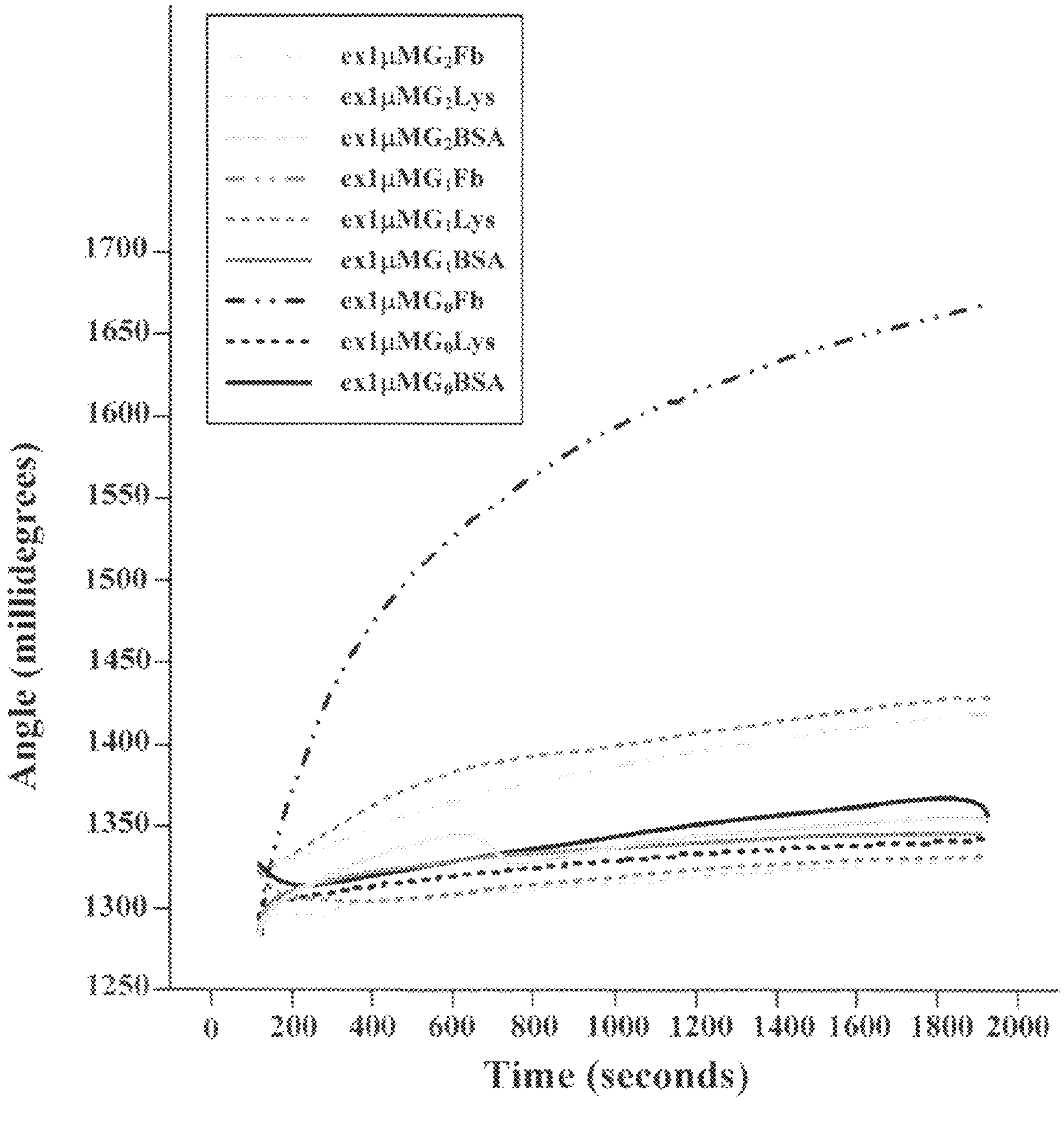
FIG. 45 depicts SPR sensogram for adsorption of Fg, BSA, and Lys on $G_1$CbztEG, $G_1$CbztEG, and $G_2$CbztEG surfaces.

From the SPR sensograms in FIG. 45, $G_2$CbztEG showed enhanced protein resistance over $G_0$CbztEG and $G_1$CbztEG for Fg, Lys, and BSA. Moreover, all three generations showed better resistance for Lys and BSA than Fg. Overall, these results show that grafting the PEGylated carbazole dendrons improves repulsion against small proteins while only higher dendron generations showed resistance against Fg. Efforts in this direction are underway.

Conclusions

A new series of PEGylated carbazole dendrons were synthesized. The successful fabrication of protein-resistant films from these PEGylated carbazole dendrons through electrochemical deposition was confirmed by CV, contact angle, SPR spectroscopy, and XPS. In situ protein studies with SPR showed that the film prepared from the higher dendron generation demonstrates the highest protein resistance against Fg. This observation suggests that the different carbazole dendron generations greatly influence the conformation of the PEG chains which is important in the intrinsic hydration of the PEG that is responsible for protein repulsion. In addition, the films prepared from all the PEGylated carbazole dendron generations effectively prevented nonspecific binding of smaller proteins, Lys and BSA. This study provides a novel way of manipulating the architecture of PEGylated species which can give a new insight in the fundamental understanding of protein resistance at the molecular level. Furthermore, these linear-dendron macromolecules provides a novel method of grafting PEGylated materials on different surfaces through electrochemical deposition.

The different dendrons of this invention can also be used to orient PEG chains, such as forming Langmuir-Blodgett films and other type of well organized films. Thus, the compositions of this invention can be used to form randomized coatings, semi-randomized coatings, organized coatings, semi-organized coatings or substrates having a mixture or combination of any one of these coating types.

Figure 46:
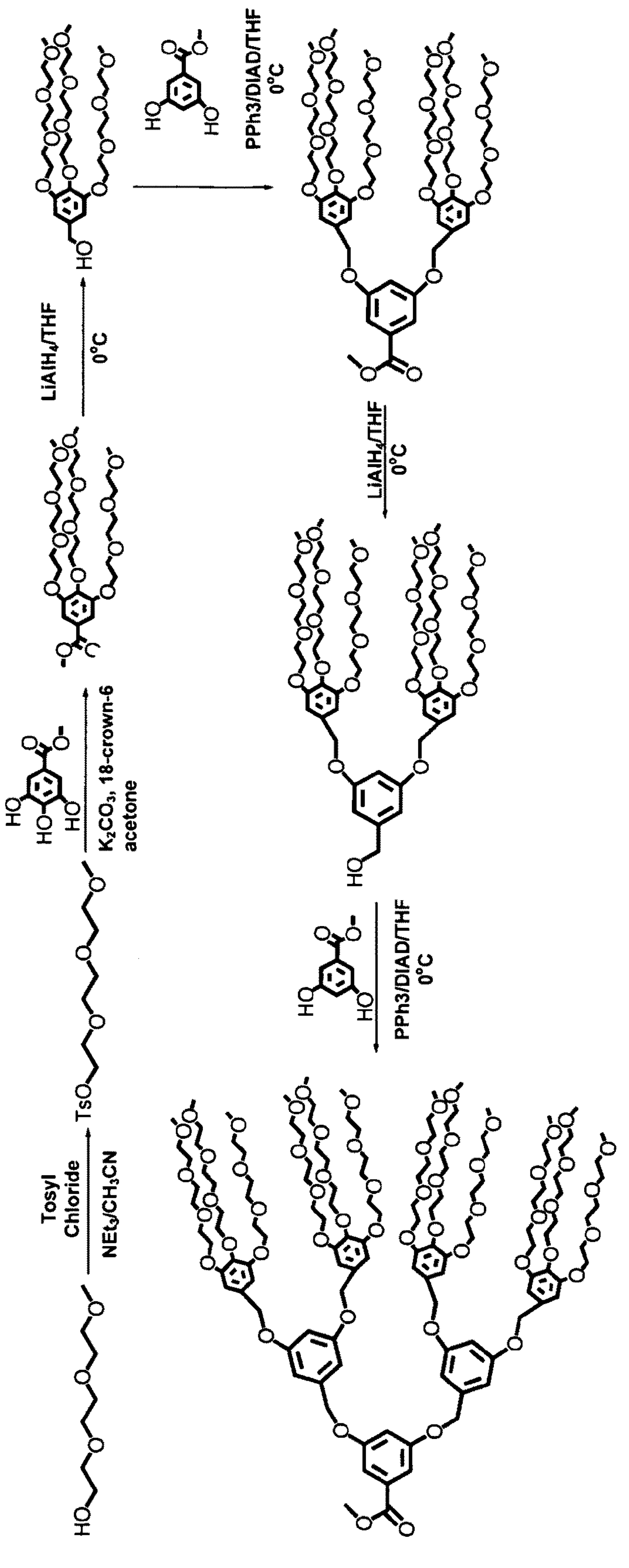
FIG. 46 depicts a generalized Scheme 4 for the preparation of dendronic PEG head groups for use in making electrograftable compositions having a dendronic electro active tail group and a dendronic polymeric head group.

While the electrograftable portion of the compositions of this invention can be of a dendronic nature, it is also possible to form dendronic structure for the pre-formed polymeric portion of the compositions. In one such embodiment, highly flexible and hydrophilic groups combined with highly branched architecture can be constructed using PEG dendrons that can lead to films having good protein resistance. The PEG dendrons can be synthesized separately and then coupled to electroactive species such as terthiophene dendron. The synthesis of the PEG dendrons is outlined in Scheme 4 shown in FIG. 46.

REFERENCES CITED IN THIS SECTION

The following references were cited in Section II:

(1) Senaratne, W.; Andruzzi, L.; Ober, C. K. *Biomacromolecules* 2005, 6, 2427-2448.
(2) Ademovic, Z.; Holst, B.; Kahn, R. A.; Jorring, I.; Brevig, T.; Wei, J.; Hou, X.; Winter-Jensen, B.; Kingshott, P. *J. Mater. Sci. Mater. Med.* 2006, 17, 203-211.
(3) Ratner, B. D. *J. Biomed. Mater. Res.* 1993, 27, 837-850.
(4) Ratner, B. D. *J. of Mol. Recognit.* 1996, 9, 617-625.
(5) Gombotz, W. R.; Guanghui, W.; Horbett, T. A.; Hoffman, A. S. *J. Biomed. Mater. Res.* 1991, 25, 1547-1562.
(6) Shen, M.; Pan, Y. V.; Wagner, M.; Hauch, K.; Castner, D.; Ratner, B.; Horbett, T. *J. Biomat. Sci., Polym. Ed.* 2001, 12, 961-978.
(7) Zalipsky, S. *Bioconjugate Chem.* 1995, 6, 150-165.
(8) Elbert, D. L.; Hubbell, J. A. *Annu. Rev. Mater. Sci.* 1996, 26, 365-394.
(9) Zhou, C.; Khlestkin, V. K.; Braeken, D.; Laureyn, W.; Engelborghs, Y.; Borghs, G. *Langmuir* 2005, 21, 5988-5996.
(10) Jeon, S. I.; Andrade, J. D. *J. Colloid Interface Sci.* 1991, 142, 159-166.
(11) Wang, R. C.; Kreuzer, H. J. *J. Phys. Chem. B.* 1997, 101, 9767-9773.
(12) Herrwerth, S.; Eck, W.; Reinhardt, S.; Grunze, M. *J. Am. Chem. Soc.* 2003, 125, 9359-9366.
(13) Kingshott, P.; Thissen, H.; Griesser, H. *J. Biomaterials* 2002, 23, 2043-2056.
(14) Prime, K. L.; Whitesides, G. M. *Science* 1991, 252, 1164-1167.
(15) Prime, K. L.; Whitesides, G. M. *J. Am. Chem. Soc.* 1993, 115, 10714-10715.
(16) Harder, P.; Grunze, M.; Dahint, R. *J. Phys. Chem. B* 1998, 102, 426-436.
(17) Szleifer, I. *Curr. Opin. Solid State Mater. Sci.* 1997, 2, 337-344.
(18) Zhu, X-Y.; Jun, Y; Staarup, D. R.; Major, R. S.; Danielson, S.; Boiadjiev, V.; Gladfelter, W. L.; Bunker, B. C.; Guo, A. *Langmuir* 2001, 17, 7798-7803.
(19) Raman, A.; Gawalt, E. *Langmuir* 2007, 23, 2284-2288.
(20) Schuler, M., Trentin, D.; Textor, M. *Namomedicine* 2006, 1, 449-463.
(21) Taranekar, T.; Fulghum, T.; Patton, D.; Ponnapati, R.; Clyde, G.; Advincula, R. C. *J. Am. Chem. Soc.* 2007, 129, 12537-12548.
(22) Bo, Z.; Zhang, W.; Zhang, X.; Zhang, C.; Shen, *J. Macromol. Chem. Phys.* 1999, 199, 1323-1327.
(23) Bartz, M.; Kuther, J.; Nelles, G.; Weber, N.; Seshadri, R.; Tremel, W. *J. Mater. Chem.* 1999, 9, 1121-1125.
(24) Newkome, G. R.; Kotta, K.; Mishra, A.; Moorefield, C. N. *Macromolecules* 2004, 37, 8262-8268.
(25) Ding, L.; Chang, D.; Dai, L. *Macromolecules* 2005, 38, 9389-9392.
(26) Xia, C.; Advincula, R. C. *Chem. Mater.* 2001, 13, 1682-1691.
(27) Ambrose, J. F.; Nelson, R. F. R. *J. Electrochem. Soc.* 1968, 115, 1159-1164.
(28) Ambrose, J. F.; Carpenter, L. L.; Nelson, R. F. R. *J. Electrochem. Soc.* 1975, 122, 876-894.
(29) Mengoli, G.; Musiani, M. M.; Schreck, B. *J. Electroanal. Chem.* 1988, 246, 73-76.
(30) Macit, H.; Sen, S.; Sacak, M. *J. App. Polym. Sci.* 2005, 96, 894-898.
(31) Inzelt, G. *J. Solid State Electrochem.* 2003, 7, 503-510.
(32) Abe, S. Y.; Ugalde, L.; del Valle, M. A.; Tregouet, Y.; Bernede, J. C. *J. Braz. Chem. Soc.* 2007, 18, 601-606.
(33) Kaewtong, C.; Jiang, G.; Felipe, M. J.; Pulpoka, B.; Advincula, R. *ACS Nano* 2008, 1533-1542.
(34) Li, L.; Chen, S.; Zheng, J.; Ratner, B.; Jiang, S. *J. Phys. Chem. B.* 2005, 109, 2934-2941.
(35) Ratner, B. D; Hoffman, A. S.; Schoen, F. J.; Lemons, J. E. *Biomaterials Science. An introduction to materials in medicine*; Academic Press: San Diego, Calif., 1996.
(36) Stamm, M. *Polymer Surfaces and Interfaces: Characterization, Modification and Applications*; Springer: Germany, 2008.
(37) Sellers, H.; Ulman, A.; Shnidman, Y.; Eilers, J. *J. Am. Chem. Soc.* 1993, 115, 9389-9401.
(38) Garrett, R.; Grisham, C. *Biochemistry*; Thomson Brooks/Cole: California, 2008.
(39) Hu, W.; Li, C. M.; Cui, X.; Dong, H.; Zhou, Q. *Langmuir* 2007, 23, 2761-2767.
(40) Benhabour, S.; Sheardown, H.; Andronov, A. *Macromolecules* 2008, 41, 4817-4823.
(41) Siegers, C.; Biesalski, M.; Haag, R. *Chem. Eur. J.* 2004, 10, 2831-2838.
(42) Zhao, Y.; Zhu, B.; Kong, L.; Xu, Y. *Langmuir* 2007, 23, 5779-5786.

All references cited herein are incorporated by reference. Although the invention has been disclosed with reference to its embodiments, from reading this description those of skill in the art may appreciate changes and modification that may be made which do not depart from the scope and spirit of the invention as described above and claimed hereafter.

I claim:

1. A method for making polymer coatings comprising the steps of:

anionic electrochemically polymerizing on a surface of a substrate at least one anionic electrochemically polymerizable, reactive compound of the general formula (I):

$$(ECAG\text{-}R)_i\text{-}(G)_j \quad (I)$$

where:

ECAG comprises an electrochemically active group including an electrochemically active aryl compound capable of electrochemically reacting with and polymerizing onto a surface of a substrate, G is a reactive group capable of undergoing a chemical or photochemical reaction selected from the group consisting of a free-radical polymerizing moiety, a free-radical crosslinking moiety, a free-radical grafting moiety, a living free-radical polymerizing moiety, a living free-radical crosslinking moiety, a living free-radical grafting moiety, an anionic polymerizing moiety, an anionic crosslinking moiety, an anionic grafting moieties, a cationic polymerizing moiety, a cationic grafting moiety, a metathesis polymerizing moiety, a metathesis grafting moiety, a photopolymerizing moieties, photocrosslinking moiety, a photografting moiety, a reversible addition fragmentation chain transfer (RAFT) polymerizing moiety, a RAFT crosslinking moiety, a RAFT grafting moiety, an atom transfer radical polymerization (ATRP) moiety, an ATRP crosslinking moiety, an ATRP grafting moiety, a group transfer polymerizing moiety, a group transfer crosslinking moiety, a group transfer grafting moiety, a ring-opening polymerizing moiety, a ring-opening crosslinking moiety, a ring-opening grafting moiety, and mixtures or combinations thereof, R is carbenyl group having between 4 and 20 carbon atoms and linking the ECAG groups to the G groups, where one or more of the carbon atoms can be substituted by B, N, O, P, S, Si, Ge, or mixtures thereof and one or more of the hydrogen atoms can be substituted by F, Cl, Br, I, CONR", COOR", $NR"_2$, SR", $PR"_2$, or mixtures thereof and R" groups are alkyl, aryl, alkaryl or aralkyl groups having between 1-20 carbon atoms and where i and j are integers each independently having a value between about 1 and about 1000 to form an electrochemically polymerized layer on the surface of the substrate, and the R groups are bonded to the G group through a —C— linkage, an —O— linkage, a —OC(O)—, or a —S— linkage;

activating the G groups in the electrochemically polymerized layer to form an activated layer, and simultaneously crosslinking the activated layer through the activated G groups and polymerizing polymer brushes extending out from the activated layer through the G groups, where brushes comprise oligomers or polymers of a polymerizable monomer or macromonomer to form a coating comprising a conductive layer comprising the electropolymerized ECAG groups and a non-conductive layer comprising the polymer brushes and has a thickness of less than 100 nm on the surface of the substrate, where the electropolymerizing occurs in the presence of a cross-linking agent comprising 2-(thiophen-3-yl)ethyl-4-cyano-4-(phenylcarbonothioylthio)pentanoate-2-(2,5-di(thiophen-2-yl)thiophen-3-yl)ethanol.

2. The method of claim 1, wherein each ECAG group is independently selected from the group consisting of nitrogen containing unsaturated ring compounds, sulfur containing unsaturated ring compounds, nitrogen and sulfur containing unsaturated ring compounds, and mixtures thereof for anodic electropolymerization.

3. The method of claim 2, wherein the unsaturated ring compounds are aromatic ring compounds and mixtures or combinations thereof.

4. The method of claim 2, wherein the G group is a photopolymerization, crosslinking, or grafting moiety and the activating step is irradiation by electromagnetic radiation.

5. The method of claim 1, further comprising the step of:

prior to the anionic electrochemically polymerizing step, treating the surface with an alpha thiol, omega ECAG' compound to form a self-assembly monolayer on the surface of the substrate, where the ECAG groups anionic electrochemically reacts with the ECAG' groups in the anionic electrochemically polymerizing step and where the ECAG' groups and the ECAG groups are the same or different so that the anionic electrochemically polymerized layer is separated from the substrate surface by the self-assembly monolayer, where each ECAG' group is independently selected from the group consisting of aryl compounds including nitrogen containing unsaturated ring compounds, sulfur containing unsaturated ring compounds, nitrogen and sulfur containing unsaturated ring compounds, and mixtures or combinations thereof for anodic electropolymerization.

6. A method for making polymer coatings comprising the steps of:

anionic electrochemically polymerizing on a surface of a substrate at least one anionic electrochemically polymerizable, reactive compound of:

the general formula (II):

(II)

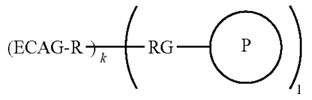

where:

ECAG is an electrochemically active group including an electrochemically active aryl compound capable of electrochemically reacting with and polymerizing onto a surface of a substrate, G is a reactive group capable of undergoing a chemical or photochemical reaction selected from the group consisting of a free-radical polymerizing moiety, a free-radical crosslinking moiety, a free-radical grafting moiety, a living free-radical polymerizing moiety, a living free-radical crosslinking moiety, a living free-radical grafting moiety, an anionic polymerizing moiety, an anionic crosslinking moiety, an anionic grafting moieties, a cationic polymerizing moiety, a cationic grafting moiety, a metathesis polymerizing moiety, a metathesis grafting moiety, a photopolymerizing moieties, photocrosslinking moiety, a photografting moiety, a reversible addition fragmentation chain transfer (RAFT) polymerizing moiety, a RAFT crosslinking moiety, a RAFT grafting moiety, an atom transfer radical polymerization (ATRP) moiety, an ATRP crosslinking moiety, an ATRP grafting moiety, a group transfer polymerizing moiety, a group transfer crosslinking moiety, a group transfer grafting moiety, a ring-opening polymerizing moiety, a ring-opening crosslinking moiety, a ring-opening grafting moiety, and mixtures or combinations thereof, R is a carbenyl groups having between 4 and 20 carbon atoms, where one or more of the carbon atoms can be substituted by B, N, O, P, S, Si, Ge, or mixtures thereof and one or more of the hydrogen atoms can be substituted by F, Cl, Br, I, CONR", COOR", $NR''_2$, SR", $PR''_2$, or mixtures thereof and R" are alkyl, aryl, alkaryl or aralkyl groups having between 1-20 carbon atoms, the R groups are bonded to the G group through a —C— linkage, an —O— linkage, a —OC(O)—, or a —S— linkage; and Ⓟ is a pre-formed oligomeric or polymeric moiety or group having between about 10 and about 100,000 repeat units, and k and l are integers each independently having a value between about 1 and about 1000;

and/or the general formula (III):

$$(ECAG)_n\text{-}(MM)_m \quad \text{(III)}$$

where:

ECAG is an anionic electrochemically active group capable of electrochemically reacting with a surface of a substrate, MM is macromolecule comprising a pre-formed oligomer or polymer linked to the ECAG groups via an —O— linkage through the hydroxyl group of a 4-hydroxybenzoate group, via an —O— linkage through the hydroxyl groups of a 3,5-dihydroxybenzoate group, via an —O— linkage through the hydroxyl groups of a 3,5-dihydroxybenyloxyl, and via an —O— linkage through the acid group of a 3,4,5-substituted benzoate group, and n and m are integers each independently having a value between about 1 and about 1000 to form an electrochemically polymerized ultra thin film having a thickness of less than 100 nm on the surface of the substrate, activating the G groups in the electrochemically polymerized layer to form an activated layer, crosslinking the activated layer through the activated G groups and polymerizing polymer brushes extending out from the activated layer through the G groups, where brushes comprise oligomers or polymers of a polymerizable monomer or macromonomer to form a coating on the surface of the substrate, where the coating comprises a conductive layer comprising the electropolymerized ECAG groups and anon-conductive layer comprising the Ⓟ and the MM groups and has a thickness of less than 100 nm on the surface of the substrate, Ⓟ where the pre-formed Ⓟ groups and the MM groups are selected from the group consisting of elastomer oligomers or polymers, fibers, thermoplastic oligomers or polymers, thermoplastic elastomer oligomers or polymers, thermosetting polymers, ionomers, polyelectrolytes, amphiphiles, glycol oligomers or polymers, and mixtures or combinations thereof, and where the electropolymerizing occurs in the presence of a cross-linking agent comprising 2-(thiophen-3-yl)ethyl-4-cyano-4-(phenylcarbonothioylthio)pentanoate-2-(2,5-di(thiophen-2-yl)thiophen-3-yl)ethanol.

7. The method of claim 6, further comprising the steps of:

simultaneously polymerizing polymer brushes extending out from the activated layer through the activated G groups to form polymerized brushes extending out from the the G groups, where the polymerized brushes form a part of the non-conductive layer.

8. The method of claim 6, wherein each ECAG group is selected from the group of nitrogen containing unsaturated ring compounds, sulfur containing unsaturated ring compounds, nitrogen and sulfur containing unsaturated ring compounds, and mixtures thereof for anodic electropolymerization.

9. The method of claim 8, wherein the unsaturated ring compounds are aromatic ring compounds.

10. The method of claim 8, wherein the G group is photopolymerization, crosslinking, or grafting moiety and the activating step is irradiation by electromagnetic radiation.

11. The method of claim 6, further comprising the step of:

prior to the anionic electrochemically polymerizing step, treating the surface with an alpha thiol, omega ECAG' compound to form a self-assembly monolayer on the surface of the substrate, where the ECAG group anionic electrochemically react with the ECAG' group and where the ECAG group and the ECAG' group are the same or different so that the electrochemically polymerized film is separated from the substrate surface by the self-assembly monolayer, where each ECAG' group is independently selected from the group consisting of aryl compounds including nitrogen containing unsaturated ring compounds, sulfur containing unsaturated ring compounds, nitrogen and sulfur containing unsaturated ring compounds, and mixtures or combinations thereof for anodic electropolymerization.

12. The method of claim 1, wherein the electrochemically polymerizing is performed at a voltage between −1.5 V and +1.5 V.

13. The method of claim 6, wherein the electrochemically polymerizing is performed at a voltage between −1.5 V and +1.5 V.

14. The method of claim 1, wherein the G groups are selected from the group consisting of: (a) a 4-oxybenzophenone moiety for radical polymerization, crosslinking, or grafting, (b) a vinyl ether moiety for cationic polymerization, crosslinking, or grafting, (c) an acrylic acid moiety for anionic polymerization, crosslinking, or grafting, (d) a methacrylic acid moiety for anionic polymerization, crosslinking, or grafting, (e) a norbornenyl moiety for metathesis polymerization, crosslinking, or grafting, (f) a 2-bromo-2-methylpropanoyl moiety for living free radical or atom transfer radical polymerization, crosslinking, or grafting, (g) 1,1-diphenylethylenyl moiety for anionic polymerization, crosslinking, or grafting, (h) a 4-cyano-4-(phenylcarbonothioylthio)pentanoyl moiety for RAFT polymerization, crosslinking, or grafting, and (i) mixtures or combinations thereof.

15. The method of claim 6, wherein the G groups are selected from the group consisting of: (a) a 4-oxybenzophenone moiety for radical polymerization, crosslinking, or grafting, (b) a vinyl ether moiety for cationic polymerization, crosslinking, or grafting, (c) an acrylic acid moiety for anionic polymerization, crosslinking, or grafting, (d) a methacrylic acid moiety for anionic polymerization, crosslinking, or grafting, (e) a norbornenyl moiety for metathesis polymerization, crosslinking, or grafting, (f) a 2-bromo-2-methylpropanoyl moiety for living free radical or atom transfer radical polymerization, crosslinking, or grafting, (g) 1,1-diphenylethylenyl moiety for anionic polymerization, crosslinking, or grafting, (h) a 4-cyano-4-(phenylcarbonothioylthio)pentanoyl moiety for RAFT polymerization, crosslinking, or grafting, and (i) mixtures or combinations thereof.

16. The method of claim 5, wherein the ECAG or ECAG' groups are selected from the group consisting of carbazole, thiophene, fluorene, pyrrole, indole, isoindole, benzothiophene, quinoline, aniline, thiazole, benzothiazole, pyridine, isoquinoline, acridine, thiophene oligomers including 2 to 6 thiophene units, amino naphthylenes, other fused aromatics, other amino substituted aromatics, and mixtures or combinations thereof for anodic electropolymerization.

17. The method of claim 11, wherein the ECAG or ECAG' groups are selected from the group consisting of carbazole, thiophene, fluorene, pyrrole, indole, isoindole, benzothiophene, quinoline, aniline, thiazole, benzothiazole, pyridine, isoquinoline, acridine, thiophene oligomers including 2 to 6 thiophene units, amino naphthylenes, other fused aromatics, other amino substituted aromatics, and mixtures or combinations thereof for anodic electropolymerization.

18. The method of claim 1, wherein the polymer brushes are selected from the group consisting of polyglycols, polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxane, polyolefins, fluoropolymers, liquid crystalline polymers, ionomers, or combinations comprising at least one of the foregoing polymers and wherein copolymers including monomers of the polymer brushes, where the copolymers are in the from of randomcopolymers, graft copolymers, block copolymers, star block copolymers, dendrimers, or mixtures or combinations comprising at least one of the foregoing copolymers.

19. The method of claim 6, wherein the pre-formed Ⓟ groups and the MM groups are selected from the group consisting of polyglycols, polyacetals, polyacrylics, polycarbonates, polystyrenes, polyesters, polyamides, polyamideimides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxane, polyolefins, fluoropolymers, liquid crystalline polymers, ionomers, or combinations comprising at least one of the foregoing polymers and wherein copolymers including monomers of the polymer brushes, where the copolymers are in the form of random copolymers, graft copolymers, block copolymers, star block copolymers, dendrimers, or mixtures or combinations comprising at least one of the foregoing copolymers.

20. The method of claim 1, wherein the polymer brushes are selected from the group consisting of polycarboxylic acid polymers and copolymers including polyacrylic acids; acetal polymers and copolymers; acrylate and methacrylate polymers and copolymers including n-butyl methacrylate polymers, cellulosic polymers and copolymers, including cellulose acetates, cellulose nitrates, cellulose propionates, cellulose acetate butyrates, cellophanes, rayons, rayon triacetates, and cellulose ethers including carboxymethyl celluloses and hydroxyalkyl celluloses; polyoxymethylene polymers and copolymers; polyimide polymers and copolymers including polyether block imides and polyether block amides, polyamidimides, polyesterimides, and polyetherimides; polysulfone polymers and copolymers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones; polymers and copolymers of vinyl monomers including polyvinyl alcohols, polyvinyl halides including polyvinyl chlorides, ethylene-vinyl acetate copolymers (EVA), polyvinylidene chlorides, polyvinyl ethers including polyvinyl methyl ethers, polystyrenes, styrene-maleic anhydride copolymers, vinyl-aromaticalkylene copolymers including styrene-butadiene copolymers, styrene-ethylene-butylene copolymers including polystyrene-polyethylenelbutylene-polystyrene (SEBS) copolymers, styrene-isoprene copolymers including polystyrene-polyisoprene-polystyrenes, acrylonitrife-styrene copolymers, acrylonitrile-butadiene-styrene copolymers, styrene-butadiene copolymers and styrene-isobutylene copolymers including polyisobutylene-polystyrenes and polystyrenepolyisobutylene-polystyrene block copolymers, polyvinyl ketones, polyvinylcarbazoles, and polyvinyl esters including polyvinyl acetates; polybenzimidazoles; ethylene-methacrylic acid copolymers and ethylene-acrylic acid copolymers, where some of the acid groups can be neutralized with either zinc or sodium ions; polyalkyl oxide polymers and copolymers including polyethylene oxides (PED); polyesters including polyethylene terephthalates; polymers and copolymers of lactide including polylactic acid polymers, d-,l- and meso polylactides, epsiloncaprolactones, glycolides including polyglycolic acid polymers, hydroxybutyrate polymers, hydroxyvalerate polymers, paradioxanone polymers, trimethylene carbonate polymers and their alkyl derivatives, 1,4-dioxepan-2-one polymers, 1,5-dioxepan-2-one polymers, and 6,6-dimethyl-1,4-dioxan-2-one polymers, copolymers of lactic acid and caprolactone, polyether polymers and copolymers including polyarylethers including polyphenylene ethers, polyether ketones, polyether ether ketones; polyphenylene sulfides; polyisocyanates; polyolefin polymers and copolymers, including polyalkylenes including polypropylenes, low and high density, low and high molecular weight polyethylenes, polybutylenes including polybut-1-ene and polyisobutylene, polyolefin elastomers, ethylene propylene diene monomer (EPDM) rubbers, poly-4-methyl-pen-1-enes, ethylene-alpha-olefin copolymers, ethylene-methyl methacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; thermoplastic polyurethanes (TPU); elastomers including elastomeric polyurethanes and polyurethane copolymers including block and random copolymers that are polyether based, polyester based, polycarbonate based, aliphatic based, aromatic based and mixtures thereof; p-xylylene polymers; polyiminocarbonates; copoly(ether-esters) including polyethylene oxide-polylactic acid copolymers; polyphosphazines; polyalkylene oxalates; polyoxaamides and polyoxaesters including polyoxaamides and polyoxaesters containing amines and/or amido groups; polyorthoesters; biopolymers including polypeptides, proteins, polysaccharides and fatty acids and esters thereof including fibrin, fibrinogen, collagen, elastin, chitosan, gelatin, starch, glycosaminoglycans including hyaluronic acid; and mixtures or combinations thereof.

21. The method of claim 6, wherein the pre-formed Ⓟ groups and the MM groups are selected from the group consisting of polycarboxylic acid polymers and copolymers including polyacrylic acids; acetal polymers and copolymers; acrylate and methacrylate polymers and copolymers including n-butyl methacrylate polymers, cellulosic polymers and copolymers, including cellulose acetates, cellulose nitrates, cellulose propionates, cellulose acetate butyrates, cellophanes, rayons, rayon triacetates, and cellulose ethers including carboxymethyl celluloses and hydroxyalkyl celluloses; polyoxymethylene polymers and copolymers; polyimide polymers and copolymers including polyether block imides and polyether block amides, polyamidimides, polyesterimides, and polyetherimides; polysulfone polymers and copolymers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones; polymers and copolymers of vinyl monomers including polyvinyl alcohols, polyvinyl halides including polyvinyl chlorides, ethylene-vinyl acetate copolymers (EVA), polyvinylidene chlorides, polyvinyl ethers including polyvinyl methyl ethers, polystyrenes, styrene-maleic anhydride copolymers, vinyl-aromaticalkylene copolymers including styrene-butadiene copolymers, styrene-ethylene-butylene copolymers including polystyrene-polyethylenelbutylene-polystyrene (SEBS) copolymers, styrene-isoprene copolymers including polystyrene-polyisoprene-polystyrenes, acrylonitrife-styrene copolymers, acrylonitrile-butadiene-styrene copolymers, styrene-butadiene copolymers and styrene-isobutylene copolymers including polyisobutylene-polystyrenes and polystyrenepolyisobutylene-polystyrene block copolymers, polyvinyl ketones, polyvinylcarbazoles, and polyvinyl esters including polyvinyl acetates; polybenzimidazoles; ethylene-methacrylic acid copolymers and ethylene-acrylic acid copolymers, where some of the acid groups can be neutralized with either zinc or sodium ions; polyalkyl oxide polymers and copolymers including polyethylene oxides (PED); polyesters including polyethylene terephthalates; polymers and copolymers of lactide including polylactic acid polymers, d-,l- and meso polylactides, epsiloncaprolactones, glycolides including polyglycolic acid polymers, hydroxybutyrate polymers, hydroxyvalerate polymers, para-dioxanone polymers, trimethylene carbonate polymers and their alkyl derivatives, 1,4-dioxepan-2-one polymers, 1,5-dioxepan-2-one polymers, and 6,6-dimethyl-1,4-dioxan-2-one polymers, copolymers of lactic acid and caprolactone, polyether polymers and copolymers including polyarylethers including polyphenylene ethers, polyether ketones, polyether ether ketones; polyphenylene sulfides; polyisocyanates; polyolefin polymers and copolymers, including polyalkylenes including polypropylenes, low and high density, low and high molecular weight polyethylenes, polybutylenes including polybut-1-ene and polyisobutylene, polyolefin elastomers, ethylene propylene diene monomer (EPDM) rubbers, poly-4-methyl-pen-1-enes, ethylene-alpha-olefin copolymers, ethylene-methylmethacrylate copolymers and ethylene-vinyl acetate copolymers; fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; thermoplastic polyurethanes (TPU); elastomers including elastomeric polyurethanes and polyurethane copolymers including block and random copolymers that are polyether based, polyester based, polycarbonate based, aliphatic based, aromatic based and mixtures thereof; p-xylylene polymers; polyiminocarbonates; copoly(ether-esters) including polyethylene oxide-polylactic acid copolymers; polyphosphazines; polyalkylene oxalates; polyoxaamides and polyoxaesters including polyoxaamides and polyoxaesters containing amines and/or amido groups; polyorthoesters; biopolymers including polypeptides, proteins, polysaccharides and fatty acids and esters thereof including fibrin, fibrinogen, collagen, elastin, chitosan, gelatin, starch, glycosaminoglycans including hyaluronic acid; and mixtures or combinations thereof.

22. The method of claim 1, wherein the electrochemically polymerized layer comprises conducting and pi-conjugated polymers derived from corresponding ECAG monomers selected from the group consisting of polyanilines, substituted polyanilines, polypyrroles, polythiophenes, polyacetylenes, polyethylene dioxythiophenes, poly-p-phenylene vinylenes, poly-3,4-ethylenedioxythiophenes, poly-3,4-ethylenedithiathiophenes, polyisathianaphthenes, polypyridothiophenes, polypyrizinothiophenes, poly-3,4-ethylenedioxypyrroles, polyphenylenevinylenes, poly-p-phenylenes, polythionapthenes, polybenxofurans, polyindoles, polydibenzothiophenes, polydibenxofurans, polycarbazoles, polybithiophenes, polybifurans, polybipyrroles, polythienothiophenes, polythienofurans, polythienopyrroles, polyfuranylpyrroles, polyfuranylfurans, polypyrolylpyrroles, polyterthiophenes, polyterfurans, polyterpyrroles, polydithienothiophenes, polydifuranylthiophenes, polydipyrrolylthiophenes, polydithienofurans, polydipyrrolylfurans, polydipyrrolylpyrroles, polyphenylacetylenes, polydiindoles, polydithienovinylenes, polydifuranylvinylenes, polydipyrrolylvinylenes, poly-1,2-trans-3,4-ethylenedioxythienylvinylenes, poly-1,2-trans-3,4-ethylenedioxyfuranylvinylenes, poly-1,2-trans-3,4-ethylenedioxypyrrolylvinylenes, polybis-thienylarylenes, polybispyrrolylarylenes, poly-bis-3,4-ethylenedioxythienylarylenes, poly dithienylcyclopentenones, polyquinolines, polythiazoles, polyfluorenepolyazulenes, poly-2-substituted thieno[3,4-b] thiophenes, poly 6-substituted thieno[3,4-b]thiophenes and mixtures or combinations comprising at least one of the foregoing intrinsically conductive polymers.

23. The method of claim 6, wherein the electrochemically polymerized layer comprises conducting and pi-conjugated polymers derived from corresponding ECAG monomers selected from the group consisting of polyanilines, substituted polyanilines, polypyrroles, polythiophenes, polyacetylenes, polyethylene dioxythiophenes, poly-p-phenylene vinylenes, poly-3,4-ethylenedioxythiophenes, poly-3,4-ethylenedithiathiophenes, polyisathianaphthenes, polypyridothiophenes, polypyrizinothiophenes, poly-3,4-ethylenedioxypyrroles, polyphenylenevinylenes, poly-p-phenylenes, polythionapthenes, polybenxofurans, polyindoles, polydibenzothiophenes, polydibenxofurans, polycarbazoles, polybithiophenes, polybifurans, polybipyrroles, polythienothiophenes, polythienofurans, polythienopyrroles, polyfuranylpyrroles, polyfuranylfurans, polypyrolylpyrroles, polyterthiophenes, polyterfurans, polyterpyrroles, polydithienothiophenes, polydifuranylthiophenes, polydipyrrolylthiophenes, polydithienofurans, polydipyrro lylfurans, polydipyrrolylpyrroles, polyphenylacetylenes, polydiindoles, polydithienovinylenes, polydifuranylvinylenes, polydipyrrolylvinylenes, poly-1,2-trans-3,4-ethylenedioxythienylvinylenes, poly-1,2-trans-3,4-ethylenedioxyfuranylvinylenes, poly-1,2-trans-3,4-ethylenedioxypyrrolylvinylenes, polybis-thienylarylenes, polybispyrrolylarylenes, poly-bis-3,4-ethylenedioxythienylarylenes, poly dithienylcyclopentenones, polyquinolines, polythiazoles, polyfluorenepolyazulenes, poly-2-substituted thieno[3,4-b] thiophenes, poly 6-substituted thieno[3,4-b]thiophenes and mixtures or combinations comprising at least one of the foregoing intrinsically conductive polymers.

24. The method of claim 1, wherein the electrochemically polymerizable, reactive compound of the general formula (I) are selected from the group consisting of:

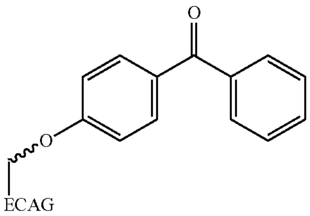

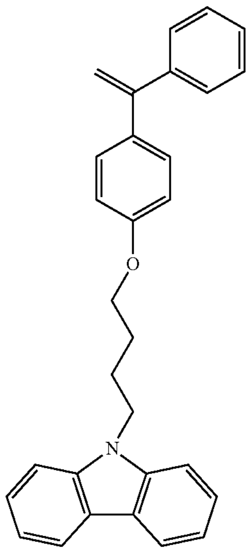

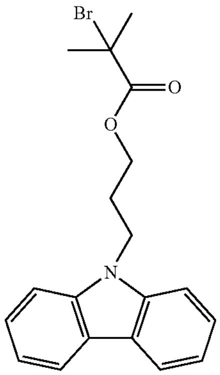

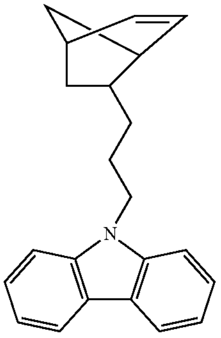

-continued

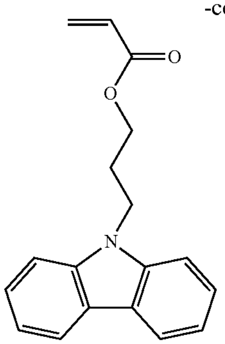

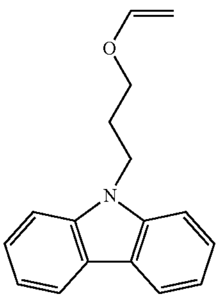

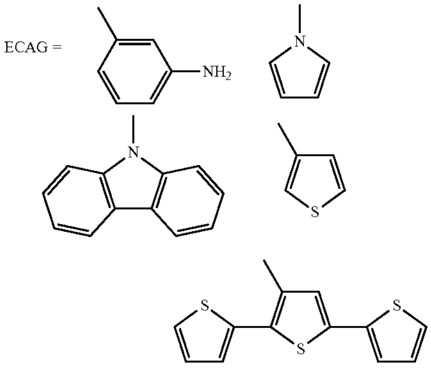

and mixtures or combinations thereof.

25. The method of claim 6, wherein the electrochemically polymerizable, reactive compound of the general formula (I) are selected from the group consisting of:

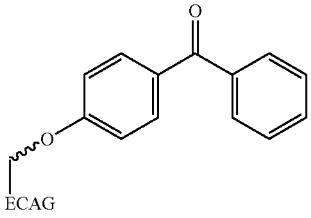

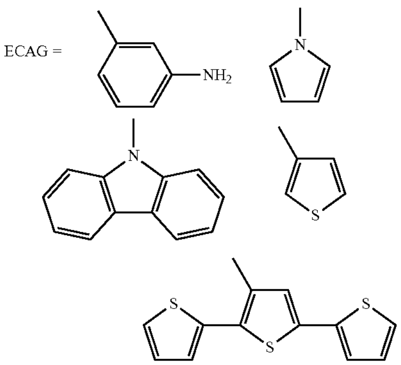

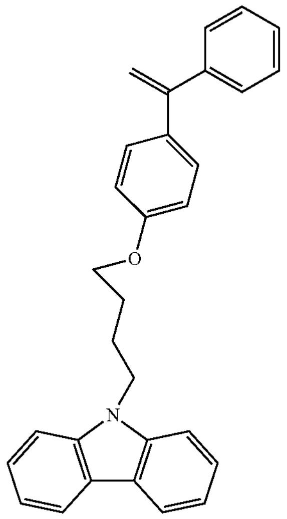
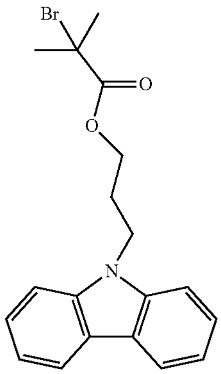
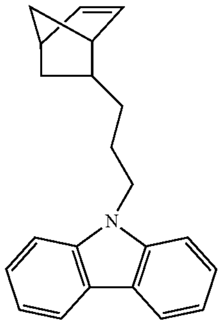
-continued
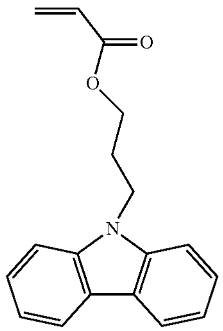
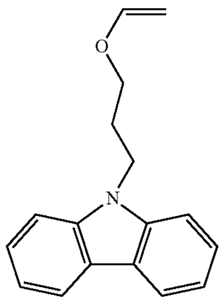
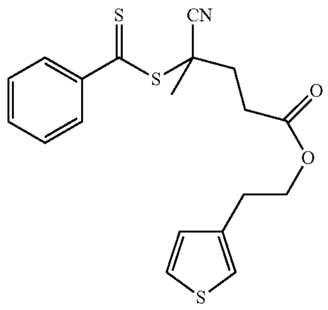
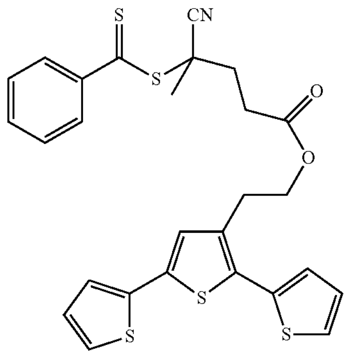
and mixtures or combinations thereof, and
wherein the electrochemically polymerizable, reactive compound of the general formula (III) are selected from the group consisting of:

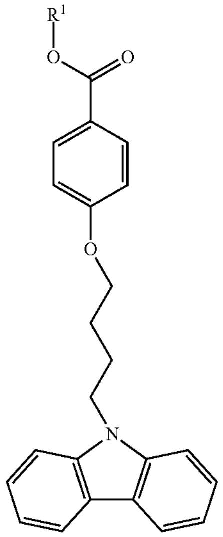
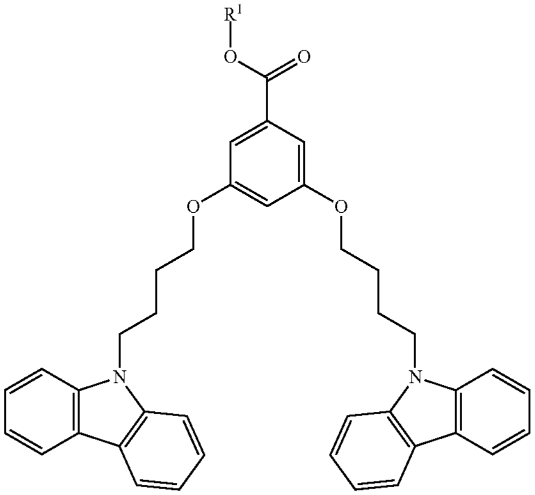
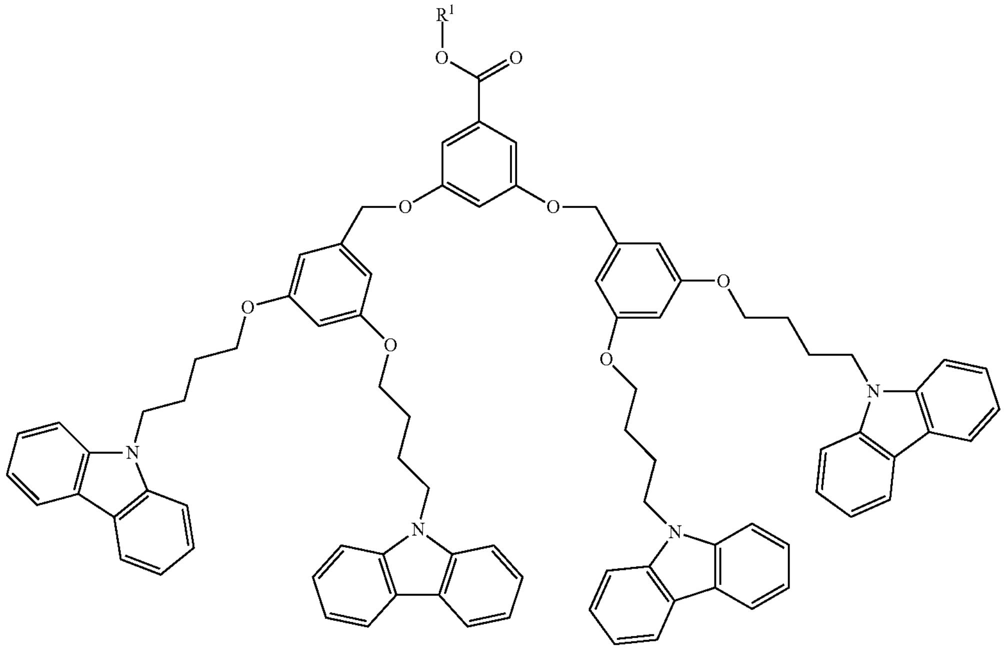

-continued
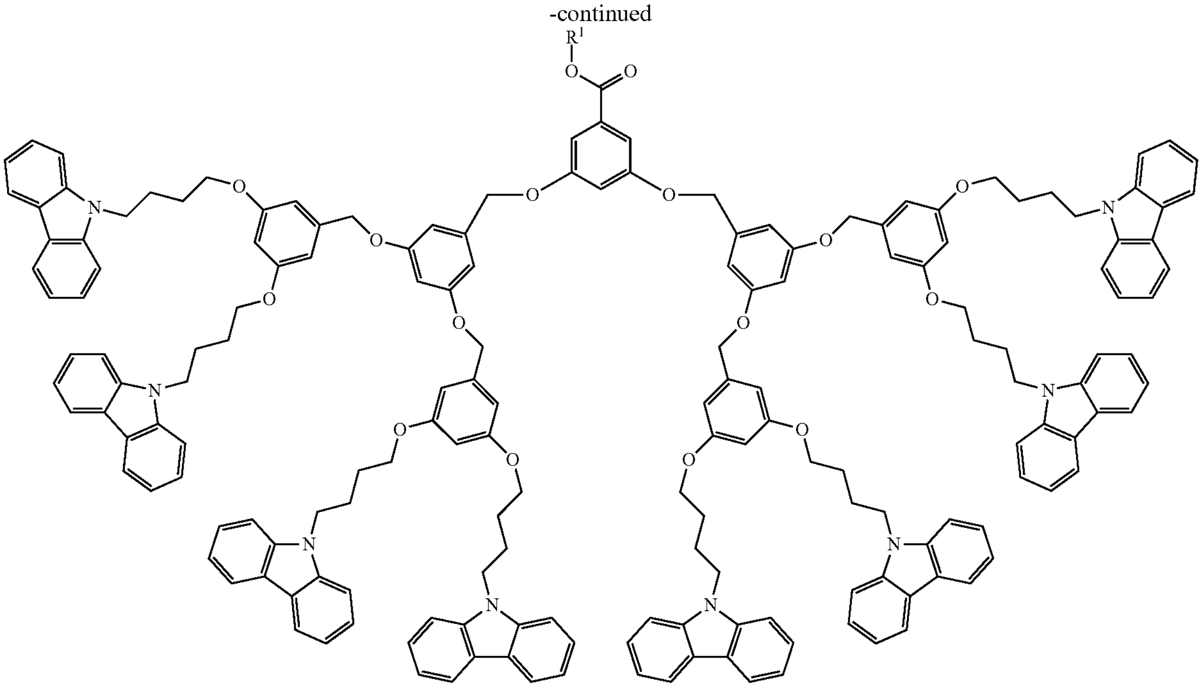
where $R^1$=a hydrogen atom, an alkyl group, or an —($OR^2$)—$OR^3$ group, where $R^2$ is an alkenyl group and $R^3$ is a hydrogen atom or an alkyl group,
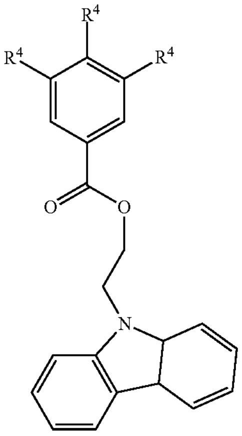
-continued
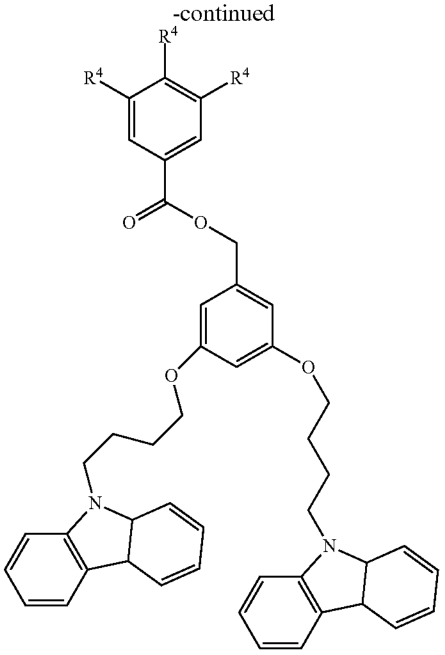
where $R^4$ are a polyglycol groups, and mixtures or combinations thereof.
* * * * *